US012578725B2

(12) United States Patent 
Wurden et al.

(10) Patent No.: US 12,578,725 B2 
(45) Date of Patent: Mar. 17, 2026

(54) SELF-MAINTAINING, SOLAR POWERED, AUTONOMOUS ROBOTICS SYSTEM AND ASSOCIATED METHODS

(71) Applicant: AIGEN INC., Redmond, WA (US)

(72) Inventors: Richard Theodore Wurden, Seattle, WA (US); Narayanan Venkat Ramanathan, Trabuco Canyon, CA (US); Puneet Khattar, Bellevue, WA (US); Nicolas Mathieu Aimon, Redmond, WA (US); Jeffrey Joseph Gorges, Seattle, WA (US)

(73) Assignee: Aigen Inc., Redmond, WA (US)

( * ) Notice: Subject to any disclaimer, the term of this patent is extended or adjusted under 35 U.S.C. 154(b) by 184 days.

(21) Appl. No.: 18/449,643

(22) Filed: Aug. 14, 2023

(65) Prior Publication Data

US 2024/0053748 A1 Feb. 15, 2024

Related U.S. Application Data

(60) Provisional application No. 63/517,339, filed on Aug. 2, 2023, provisional application No. 63/451,893, filed (Continued)

(51) Int. Cl.
| | |
|---|---|
| *G05D 1/00* | (2024.01) |
| *F24S 30/00* | (2018.01) |
| *G06V 20/10* | (2022.01) |

(52) U.S. Cl.
CPC ............ *G05D 1/0088* (2013.01); *F24S 30/00* (2018.05); *G06V 20/188* (2022.01)

(58) Field of Classification Search
None
See application file for complete search history.

(56) References Cited

U.S. PATENT DOCUMENTS

| | | | |
|---|---|---|---|
| 1,987,050 | A | 1/1935 | Burnelli |
| 2,868,477 | A | 1/1959 | Herbert |

(Continued)

FOREIGN PATENT DOCUMENTS

| | | |
|---|---|---|
| AU | 2015295035 A1 | 2/2017 |
| CN | 104554706 A | 4/2015 |

(Continued)

OTHER PUBLICATIONS

English translation of CN-110421580-B performed by 3600 STIC. (Year: 2019).*

(Continued)

*Primary Examiner* — Jason Holloway 
*Assistant Examiner* — Christopher A Buksa 
(74) *Attorney, Agent, or Firm* — Perkins Coie LLP

(57) ABSTRACT

An autonomous ground vehicle for agricultural plant and soil management operations. According to some embodiments, autonomous ground vehicle includes: one or more camera units configured to generate images, an energy storage unit, a solar panel unit, a solar panel control mechanism, a first mechanical arm having a first end effector, an electronic memory storage medium comprising computer-executable instructions; one or more processors in electronic communication with the electronic memory storage medium, configured to execute the computer-executable instructions stored in an electronic memory storage medium for implementing a method of for agricultural plant and soil management operations.

20 Claims, 64 Drawing Sheets

Related U.S. Application Data on Mar. 13, 2023, provisional application No. 63/371,348, filed on Aug. 12, 2022, provisional application No. 63/371,345, filed on Aug. 12, 2022.

(56) References Cited

U.S. PATENT DOCUMENTS

| | | | |
|---|---|---|---|
| 3,552,587 | A | 1/1971 | Warren |
| 5,056,737 | A | 10/1991 | Taylor |
| 5,395,073 | A | 3/1995 | Rutan et al. |
| 9,731,816 | B2 | 8/2017 | Harris et al. |
| 9,965,850 | B2 | 5/2018 | Fryshman |
| 9,984,455 | B1 | 5/2018 | Fox et al. |
| 10,627,386 | B2 | 4/2020 | Saez et al. |
| 10,633,092 | B2 | 4/2020 | Willford |
| 10,676,177 | B1 | 6/2020 | Costello et al. |
| 10,913,529 | B1 | 2/2021 | Piasecki |
| 10,936,871 | B2 | 3/2021 | Tran et al. |
| 11,074,447 | B1 | 7/2021 | Fox et al. |
| 11,124,292 | B2 | 9/2021 | Chen et al. |
| 11,308,323 | B2 | 4/2022 | Sibley et al. |
| 11,406,052 | B2 | 8/2022 | Sibley et al. |
| 11,449,976 | B2 | 9/2022 | Sibley et al. |
| 11,465,162 | B2 | 10/2022 | Sibley et al. |
| 11,521,381 | B2 | 12/2022 | Tran et al. |
| 11,526,997 | B2 | 12/2022 | Sibley et al. |
| 11,635,773 | B2 | 4/2023 | Anishchenko et al. |
| 11,744,240 | B2 | 9/2023 | Wurden |
| 11,794,888 | B1 | 10/2023 | Taylor et al. |
| 12,105,528 | B2 | 10/2024 | Wurden |
| 12,193,429 | B2 | 1/2025 | Wurden |
| 2005/0269441 | A1 | 12/2005 | Barocela et al. |
| 2008/0283673 | A1 | 11/2008 | Yoeli |
| 2010/0012769 | A1 | 1/2010 | Alber et al. |
| 2010/0213309 | A1 | 8/2010 | Parks |
| 2014/0151502 | A1 | 6/2014 | Kosheleff |
| 2015/0051779 | A1 | 2/2015 | Camacho-Cook et al. |
| 2015/0336666 | A1 | 11/2015 | Paduano et al. |
| 2016/0159468 | A1 | 6/2016 | Harris, III et al. |
| 2017/0158327 | A1 | 6/2017 | Willford |
| 2017/0315562 | A1 | 11/2017 | Wang |
| 2017/0320570 | A1 | 11/2017 | Horn |
| 2018/0055036 | A1 | 3/2018 | Diprose |
| 2018/0132473 | A1 | 5/2018 | Diprose |
| 2018/0156770 | A1 | 6/2018 | Saez et al. |
| 2018/0325091 | A1 | 11/2018 | Kroeger et al. |
| 2019/0061968 | A1 | 2/2019 | Tian |
| 2019/0124855 | A1 | 5/2019 | Rowan et al. |
| 2019/0274241 | A1 | 9/2019 | Tippery et al. |
| 2020/0180761 | A1 | 6/2020 | Sloan et al. |
| 2020/0249669 | A1 | 8/2020 | Kosa et al. |
| 2020/0264154 | A1 | 8/2020 | Saez et al. |
| 2020/0285251 | A1 | 9/2020 | Anishchenko et al. |
| 2020/0333782 | A1 | 10/2020 | Kent et al. |
| 2021/0185886 | A1 | 6/2021 | Sibley et al. |
| 2022/0117217 | A1 | 4/2022 | Wurden |
| 2022/0339983 | A1 | 10/2022 | Wurden |
| 2023/0331408 | A1 | 10/2023 | Wurden |
| 2024/0180142 | A1 | 6/2024 | Wurden |
| 2025/0151711 | A1 | 5/2025 | Diprose |
| 2025/0176526 | A1 | 6/2025 | Wurden |

FOREIGN PATENT DOCUMENTS

| | | | | | |
|---|---|---|---|---|---|
| CN | 207427319 | U | | 5/2018 | |
| CN | 109263876 | A | | 1/2019 | |
| CN | 113243275 | A | | 8/2021 | |
| CN | 114614754 | A | | 6/2022 | |
| CN | 110421580 | B | * | 8/2023 | .............. B25J 11/00 |
| EP | 3174388 | B1 | | 9/2019 | |
| KR | 10-1828924 | B1 | | 2/2018 | |
| KR | 10-2020-0103823 | A | | 9/2020 | |
| RU | 2657706 | C1 | | 6/2018 | |
| WO | 01/58756 | A2 | | 8/2001 | |
| WO | 2016/016627 | A1 | | 2/2016 | |
| WO | 2016/162667 | A1 | | 10/2016 | |
| WO | 2016/191825 | A1 | | 12/2016 | |
| WO | 2016/193003 | A1 | | 12/2016 | |
| WO | 2018/050137 | A1 | | 3/2018 | |
| WO | 2018/095450 | A1 | | 5/2018 | |
| WO | 2019/102243 | A1 | | 5/2019 | |
| WO | 2020/036942 | A1 | | 2/2020 | |
| WO | 2021/159123 | A1 | | 8/2021 | |
| WO | 2021/236753 | A1 | | 11/2021 | |

OTHER PUBLICATIONS

Barosa et al., Smart Aquaponics with Disease Detection, 2019, IEEE, p. 1-6 (Year: 2019).

Designboom, "Leonardo: The Skateboarding, Slacklining Robot," https://www.designboom.com/technology/leonardo-fusion-bipedal-walking-robot-flying-drone-slackline-10-07-2021/, Oct. 7, 2021, 6 pages.

Finegan et al., Development of an Autonomous Agricultural Vehicle to Measure Soil Respiration, 2019, IEEE, p. 1-6 (Year: 2019).

International Preliminary Report on Patentability received for PCT Patent Application No. PCT/US23/072175, mailed on Feb. 27, 2025, 7 pages.

International Search Report and Written Opinion received for PCT Patent Application No. PCT/US23/072175, mailed on Nov. 22, 2023, 9 pages.

Khamis et al., LED lighting with remote monitoring and controlling system for indoor greenhouse, 2018, IEEE, p. 81-84 (Year: 2018).

Mondini et al., A preliminary study of a robotic probe for soil exploration inspired by plant root apexes, 2009, IEEE, p. 115-120 (Year: 2009).

Nichele et al., Towards a plant bio-machine, 2017, IEEE, p. 1-8 (Year: 2017).

Reed et al., "Desk Study: Electrical weed control in Field Vegetables", Jan. 7, 2009, in 18 pages.

Santhosh et al., IoT Based Agriculture Using AGRIBOT, 2019, IEEE, p. 1520-1526 (Year: 2019).

Urban Air Mobility News.com, "Solar powered drone will help combat terrorism in Cameroon," https://www.urbanairmobilitynews.com/security-and-law-enforcement/solar-powered-drone-will-help-combat-terrorism-in-cameroon/, Aug. 12, 2019, 6 pages.

Vedula et al., Computer Vision Assisted Autonomous Intra-Row Weeder, 2018, IEEE, p. 79-84 (Year: 2018).

Webpage: WintraOne Gen II, Map larger, map faster, map anywhere, https://wingtra.com/mapping-drone-wingtraone/, publication date unknown, 32 pages.

File History of related U.S. Appl. No. 63/371,348, filed Aug. 12, 2022.

File History of related U.S. Appl. No. 63/451,893, filed Mar. 13, 2023.

File History of related U.S. Appl. No. 63/517,339, filed Aug. 2, 2023.

File History of related U.S. Appl. No. 63/371,345, filed Aug. 12, 2022.

* cited by examiner

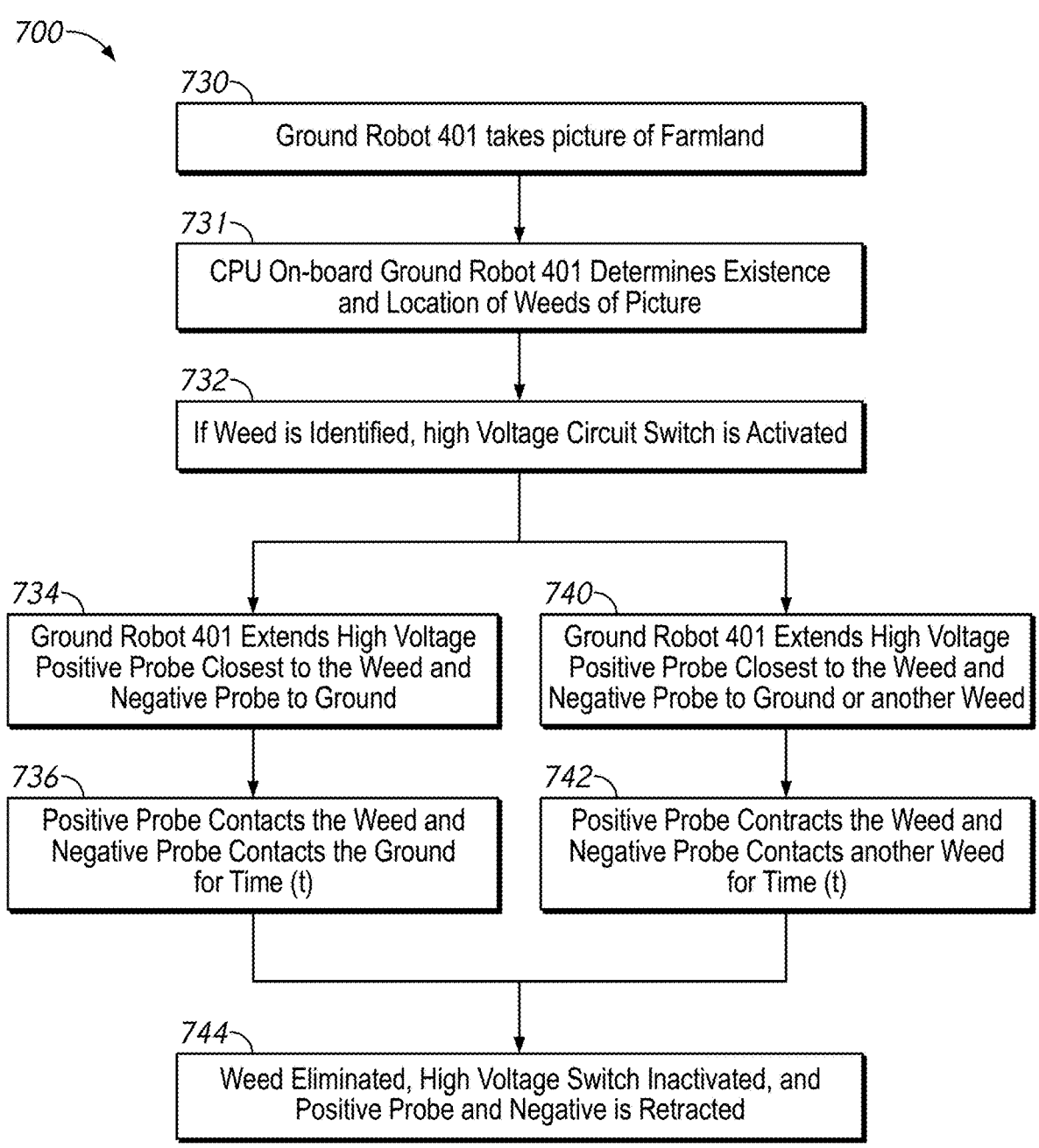

700

730
Ground Robot 401 takes picture of Farmland

731
CPU On-board Ground Robot 401 Determines Existence and Location of Weeds of Picture 732
If Weed is Identified, high Voltage Circuit Switch is Activated 734
Ground Robot 401 Extends High Voltage Positive Probe Closest to the Weed and Negative Probe to Ground 740
Ground Robot 401 Extends High Voltage Positive Probe Closest to the Weed and Negative Probe to Ground or another Weed 736
Positive Probe Contacts the Weed and Negative Probe Contacts the Ground for Time (t)

742
Positive Probe Contracts the Weed and Negative Probe Contacts another Weed for Time (t)

744
Weed Eliminated, High Voltage Switch Inactivated, and Positive Probe and Negative is Retracted

FIG. 6

Software Control Flow

Front View

Top View

Front View

Side View

Side View
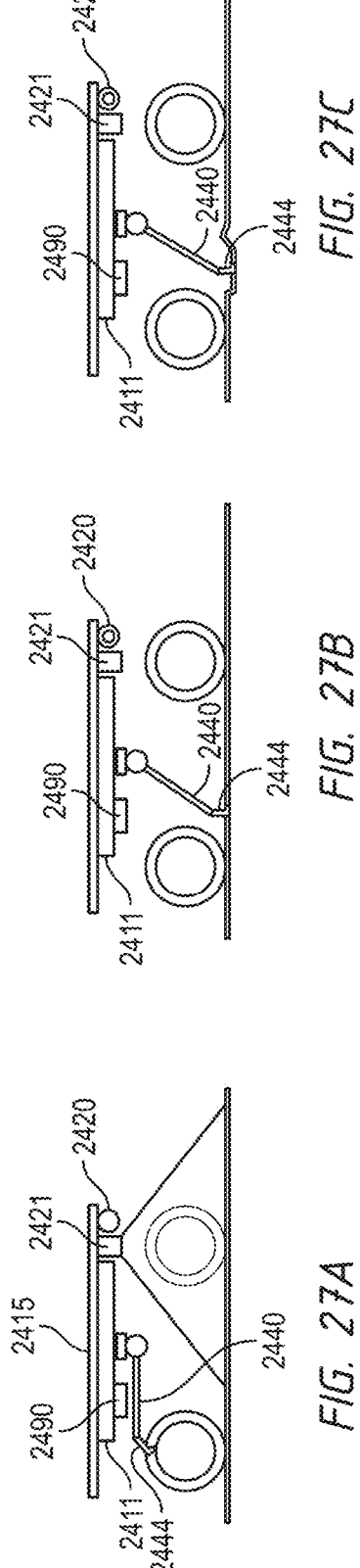
FIG. 27A
FIG. 27B
FIG. 27C
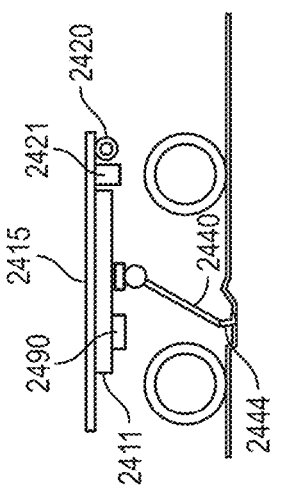
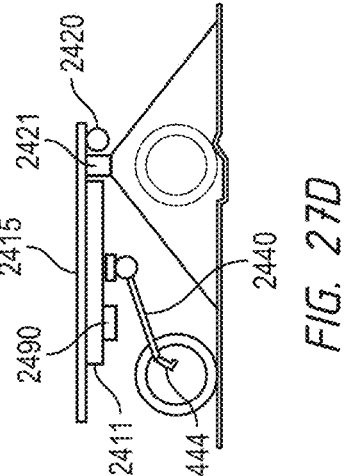
FIG. 27D
FIG. 27E Side View

Front View

SELF-MAINTAINING, SOLAR POWERED, AUTONOMOUS ROBOTICS SYSTEM AND ASSOCIATED METHODS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Patent Application No. 63/371,348, entitled "SELF-MAINTAINING, SOLAR POWERED, AUTONOMOUS ROBOTICS SYSTEM AND ASSOCIATED METHODS," filed Aug. 12, 2022, the contents of which are incorporated by reference herein in their entirety.

This application claims the benefit of U.S. Provisional Patent Application No. 63/371,345, entitled "SELF-MAINTAINING, SOLAR POWERED, AUTONOMOUS ROBOTICS SYSTEM AND ASSOCIATED METHODS," filed Aug. 12, 2022, the contents of which are incorporated by reference herein in their entirety.

This application also claims the benefit of U.S. Provisional Patent Application No. 63/451,893, entitled "SELF-MAINTAINING, SOLAR POWERED, AUTONOMOUS ROBOTICS SYSTEM AND ASSOCIATED METHODS," filed Mar. 13, 2023, the contents of which are incorporated by reference herein in their entirety.

This application also claims the benefit of U.S. Provisional Patent Application No. 63/517,339, entitled "SELF-MAINTAINING, SOLAR POWERED, AUTONOMOUS ROBOTICS SYSTEM AND ASSOCIATED METHODS," filed Aug. 2, 2023, the contents of which are incorporated by reference herein in their entirety.

TECHNICAL FIELD

The present disclosure generally relates to the fields of robotics, remote network connectivity, and precision agriculture.

BACKGROUND

By 2050, the global population will increase from 7.8 billion to 9.7 billion people, and food demand will increase by 70%. During this time, the amount of farmland will be relatively unchanged. As a result, farmers will be challenged to find more efficient, sustainable methods of farming.

SUMMARY

The present disclosure generally relates to the fields of robotics, remote network connectivity, and precision agriculture. More specifically, embodiments of the disclosure relate to ground robots performing plant management without chemical use. In some embodiments, autonomous ground vehicles perform various weed control operations using mechanical, electrical, and/or both mechanical and electrical means to eliminate weeds. In some embodiments, autonomous ground vehicles perform ground terraforming operations and livestock herd management.

Some embodiments comprise an autonomous network of robots wherein at least one inspection robot inspects an area for a specific agriculture asset and at least one ground robot performs an action based on the inspection robot's inspection. In some embodiments, inspection robots perform an inspection of an area of farmland, the inspection data is analyzed via AI to identify areas with high concentrations of weeds, and ground robots travel to identified areas and perform weed control.

Some embodiments relate to an autonomous network of inspection robots that transfer data between each other and are linked to the other networks through a link inspection robot capable of ground and aerial mobility, and in some embodiments, the inspection robots are powered by solar charging and align themselves to the sun. In some embodiments, the inspection robots can affix to the ground at night and during extreme weather.

According to some embodiments, an autonomous ground vehicle for agricultural plant and soil management operations, the autonomous ground vehicle comprising: a ground vehicle unit having two or more wheels or mechanical propulsion mechanisms coupled to the ground vehicle unit; a camera unit coupled to the ground vehicle unit, the camera unit configured to generate one or more images of agricultural ground soil and plant organisms in a forward path of the ground vehicle unit; a first mechanical arm coupled to a first undercarriage portion of the ground vehicle unit, the first mechanical arm having a first end effector comprising a first hoe portion and a first electrode portion; a second mechanical arm coupled to a second undercarriage portion of the ground vehicle unit, the second mechanical arm having a second end effector comprising a second electrode portion; a high voltage booster unit housed in the ground vehicle unit, the high voltage booster unit is electrically connected to the first electrode portion of the first end effector of the first mechanical arm, and the high voltage booster unit is electrically connected to the second electrode portion of the second end effector of the second mechanical arm; an electronic memory storage medium housed in the ground vehicle unit, the electronic memory storage medium comprising computer-executable instructions; one or more processors housed in the ground vehicle unit, the one or more processors in electronic communication with the electronic memory storage medium, the one or more processors configured to execute the computer-executable instructions stored in the electronic memory storage medium for implementing a plant species control management operation, the computer-executable instructions comprises: analyzing, by the one or more processors, the generated one or more images to identify a plant organism and surrounding soil; determining, by the one or more processors, a soil type of the surrounding soil and a plant species of the identified plant organism in the one or more images; comparing, by the one or more processors, the determined plant species type of the identified plant organism to a data store, the comparing performed to determine whether the plant organism is set for plant organism control; generating, by the one or more processors, based on determining that the identified plant organism is set for plant organism control, ground vehicle unit control instructions configured to advance the ground vehicle unit and/or the first mechanical arm to be within a threshold proximity of the identified plant organism; determining, by the one or more processors, a method of plant organism control for the identified plant organism based on the analysis of the identified plant organism and the surrounding soil in the one or more images generated by the camera, the method of plant organism control having options, the options comprising electrical control and mechanical control; generating, by the one or more processors, based on determining the method plant organism control is electrical control, mechanical arm control instructions for electrical control comprising: positioning the first electrode portion to be in contact with the identified plant organism; positioning the second electrode portion to be in contact with the soil or a second plant adjacent to the identified plant organism; activating the high voltage booster unit to generate electric current through the first electrode portion, the identified plant organism, and the second electrode portion; generating, by the one or more processors, based on determining the method plant organism control is mechanical control, mechanical arm control instructions for mechanical control comprising: positioning at least the first hoe portion to be in contact with soil distal to the identified plant organism; moving the first hoe portion through the soil to remove at least a portion of the identified plant organism; executing, by the one or more processors, the generated mechanical arm control instructions.

In some embodiments, the mechanical propulsion mechanism may comprise mechanical legs. In some embodiments, the ground vehicle unit further comprises one or more protrusions coupled to an external portion of the ground vehicle unit, the one or more protrusions configured to engage with the first hoe portion to remove debris material from the first hoe portion. In some embodiments, the autonomous ground vehicle further comprises an energy storage unit housed in the ground vehicle unit, the energy storage unit is electrically coupled to the high voltage booster unit. In some embodiments, the autonomous ground vehicle further comprises a solar panel unit electrically coupled to the energy storage unit, the solar panel unit is coupled to the ground vehicle unit, the solar panel unit is configured to electrically recharge the energy storage unit housed in the ground vehicle unit. In some embodiments, the activating the high voltage booster unit comprises activating with a switch relay. In some embodiments, determining, by the one or more processors, a plant species type of the identified plant organism comprises use of a computer vision algorithm. In some embodiments, determining, by the one or more processors, a plant species type of the identified plant organism comprises use of an artificial intelligence algorithm. In some embodiments, the second end effector of the second mechanical arm further comprises a second hoe portion. In some embodiments, the first hoe portion and the first electrode portion of the first end effector form a single unit.

According to some embodiments, a computer-implemented method for using an autonomous ground vehicle for agricultural plant and soil management and operations, the computer-implemented method comprising: analyze, by a computing system, one or more generated images to identify a plant organism and surrounding soil, the one or more generated images a camera unit coupled to a ground vehicle unit having two or more wheels or mechanical propulsion mechanisms; determining, by the computing system, a soil type of the surrounding soil and a plant species type of the identified plant organism in the one or more generated images; comparing, by the computing system, the determined plant species type of the identified plant organism to a data store, the comparing performed to determine whether the plant organism is set for plant organism control; generate, by the computing system, based on determining that the identified plant organism is set for plant organism control, ground vehicle unit control instructions configured to advance the ground vehicle unit and/or a first mechanical arm to be within a threshold proximity of the identified plant organism, the ground vehicle unit comprises the first mechanical arm coupled to a first undercarriage portion of the ground vehicle unit, the first mechanical arm having a first end effector comprising a first hoe portion and a first electrode portion and a second electrode portion, the ground vehicle unit houses a high voltage booster unit, the high voltage booster unit is electrically connected to the first electrode portion of the first end effector of the first mechanical arm, and the high voltage booster unit is electrically connected to the second electrode portion of the first end effector of the first mechanical arm, the first electrode portion configured to contact a first portion of the plant organism and the second electrode portion configured to contact the surrounding soil or a second portion of the plant organism; determine, by the computing system, a method of plant organism control for the identified plant organism based on the analysis of the identified plant organism and the surrounding soil in the one or more generated images by the camera, the method of plant organism control having options, the options comprising electrical control and mechanical control; generate, by the computing system, based on determining the method plant organism control is electrical control, mechanical arm control instructions for electrical control comprising: positioning the first electrode portion to be in contact with the first portion of the identified plant organism; positioning the second electrode portion to be in contact with the surrounding soil or the second portion of the identified plant organism or an adjacent plant organism to the identified plant organism; activating the high voltage booster unit to generate electric current through the first electrode portion, the identified plant organism, and the second electrode portion; generate, by the computing system, based on determining the method plant organism control is mechanical control, mechanical arm control instructions for mechanical control comprising: positioning at least the first hoe portion to be in contact with soil distal to the identified plant organism; moving the first hoe portion through the soil to remove at least a portion of the identified plant organism; executing, by the computing system, the generated mechanical arm control instructions; wherein the computing system comprises one or more hardware computer processors in communication with one or more computer readable data stores and configured to execute a plurality of computer executable instructions.

In some embodiments, the mechanical propulsion mechanism comprises mechanical legs. In some embodiments, the ground vehicle unit further comprises one or more protrusions coupled to an external portion of the ground vehicle unit, the one or more protrusions configured to engage with the first hoe portion to remove debris material from the first hoe portion. In some embodiments, the autonomous ground vehicle further comprises an energy storage unit housed in the ground vehicle unit, the energy storage unit is electrically coupled to the high voltage booster unit. In some embodiments, the autonomous ground vehicle further comprises a solar panel unit electrically coupled to the energy storage unit, the solar panel unit is coupled to the ground vehicle unit, the solar panel unit is configured to electrically recharge the energy storage unit housed in the ground vehicle unit. In some embodiments, the activating the high voltage booster unit comprises activating with a switch relay. In some embodiments, determining, by the one or more processors, a plant species type of the identified plant organism comprises use of a computer vision algorithm. In some embodiments, determining, by the one or more processors, a plant species type of the identified plant organism comprises use of an artificial intelligence algorithm. In some embodiments, the ground vehicle unit further comprises a second mechanical arm coupled to a second undercarriage portion of the ground vehicle unit, the second mechanical arm having a second end effector comprising a second electrode portion. In some embodiments, the first hoe portion and the first electrode portion of the first end effector form a single unit.

In some aspects, the techniques described herein relate to an autonomous ground vehicle including: a ground vehicle unit having two or more wheels or mechanical propulsion mechanisms coupled to the ground vehicle unit; one or more camera units coupled to the ground vehicle unit, the one or more camera units configured to generate images; an energy storage unit housed in the ground vehicle unit; a solar panel unit coupled to the ground vehicle unit, the solar panel unit electrically coupled to the ground vehicle unit, the solar panel unit configured to electrically recharge the energy storage unit; a solar panel control mechanism configured to change an angle of tilt of the solar panel unit relative to the ground vehicle unit, wherein the angle of tilt of the solar panel unit can be changed as the ground vehicle unit moves to improve solar power generation; a first mechanical arm coupled to a first undercarriage portion of the ground vehicle unit, the first mechanical arm having a first end effector; an electronic memory storage medium housed in the ground vehicle unit, the electronic memory storage medium including computer-executable instructions; and one or more processors housed in the ground vehicle unit, the one or more processors in electronic communication with the electronic memory storage medium, the one or more processors configured to execute the computer-executable instructions stored in the electronic memory storage medium for implementing a method including: analyzing, by the one or more processors, the generated images to identify a plant organism and surrounding soil; determining, by the one or more processors, that the identified plant organism is set for plant organism control based on a plant species type of the identified plant organism; generating, by the one or more processors, ground vehicle unit control instructions configured to advance the ground vehicle unit and/or the first mechanical arm to be within a threshold proximity of the identified plant organism; generating, by the one or more processors, mechanical arm control instructions for mechanical control including: positioning at least the first end effector to be in contact with soil distal to the identified plant organism; moving the first end effector through the soil to remove at least a portion of the identified plant organism; executing, by the one or more processors, the generated mechanical arm control instructions; and generating, by the one or more processors, solar panel control instructions for the solar panel control mechanism to change the angle of tilt of the solar panel unit based on a relative position of the sun to the ground vehicle unit.

In some aspects, the techniques described herein relate to an autonomous ground vehicle, wherein the autonomous ground vehicle is configured to combine with a second autonomous ground vehicle by connecting an adaptor between the autonomous ground vehicle and the second autonomous ground vehicle to form a large autonomous ground vehicle.

In some aspects, the techniques described herein relate to an autonomous ground vehicle, wherein the autonomous ground vehicle further includes a camera cleaning system.

In some aspects, the techniques described herein relate to an autonomous ground vehicle, wherein the autonomous ground vehicle further includes a camera cleaning system, and wherein the camera cleaning system includes at least one of: a cooling system; and the solar panel unit, wherein the solar panel unit is further configured to pivot up and down to create an air flow.

In some aspects, the techniques described herein relate to an autonomous ground vehicle, wherein the autonomous ground vehicle further includes a second mechanical arm coupled to a second undercarriage portion of the ground vehicle unit, the second mechanical arm having a second end effector.

In some aspects, the techniques described herein relate to an autonomous ground vehicle, wherein the solar panel control mechanism includes one or more linear actuators coupled to the ground vehicle unit at a first end and the solar panel unit at a second end, wherein the one or more linear actuators are configured to adjust the angle of tilt the solar panel unit.

In some aspects, the techniques described herein relate to an autonomous ground vehicle, wherein the solar panel control mechanism includes a pulley lift system, the pulley lift system including: a motor; one or more spools coupled to the motor; one or more spring hinges, wherein the one or more spring hinges are coupled to the ground vehicle unit and the solar panel unit; and one or more cables, wherein each cable of the one or more cables includes a first cable end and a second cable end, wherein the first cable end is coupled to the solar panel unit and the second cable end is coupled to and spooled around one of the one or more spools.

In some aspects, the techniques described herein relate to an autonomous ground vehicle, wherein the solar panel control mechanism includes a pulley lift system, the pulley lift system including: a motor; one or more spools coupled to the motor; one or more spring hinges, wherein the one or more spring hinges are coupled to the ground vehicle unit and the solar panel unit; and one or more cables, wherein each cable of the one or more cables includes a first cable end and a second cable end, wherein the first cable end is coupled to the solar panel unit and the second cable end is coupled to and spooled around one of the one or more spools, wherein the one or more spring hinges are configured to bias the solar panel unit to a maximum angle, wherein the pulley lift system is configured to control and adjust the angle of tilt the solar panel unit.

In some aspects, the techniques described herein relate to an autonomous ground vehicle, wherein the autonomous ground vehicle is configured to communicate with one or more third party systems.

In some aspects, the techniques described herein relate to an autonomous ground vehicle, wherein the autonomous ground vehicle is configured to communicate with one or more third party systems, wherein the one or more third party systems include at least one of a computer system and a database.

In some aspects, the techniques described herein relate to an autonomous ground vehicle, wherein the solar panel unit includes one or more machine-readable codes, wherein the one or more machine-readable codes can be used to identify the autonomous ground vehicle.

In some aspects, the techniques described herein relate to an autonomous ground vehicle, wherein the computer-executable instructions, when executed by the one or more processors, further cause implementation of a carbon estimation operation including: generating, by the one or more camera units, a first set of images including one or more images of a first layer of soil under the autonomous ground vehicle; analyzing, by the one or more processors, the first set of images to determine a soil color of the first layer of soil; and determining, by the one or more processors, a soil carbon estimate of the first layer of soil in the first set of images.

In some aspects, the techniques described herein relate to an autonomous ground vehicle, wherein the carbon estimate operation further includes: generating, by the one or more processors, second mechanical arm control instructions including: positioning the first end effector to be in contact with the first layer of soil; and moving the first end effector through the first layer of soil to remove at least a portion of soil, wherein moving at least a portion of the soil exposes a second layer of soil; executing, by the one or more processors, the second mechanical arm control instructions; generating, by the one or more camera units, a second set of images including one or more images of the second layer of soil; analyzing, by the one or more processors, the generated second set of images to determine a soil color of the second layer of soil; and determining, by the one or more processors, a soil carbon estimate of the second layer of soil in the second set of images.

In some aspects, the techniques described herein relate to an autonomous ground vehicle, wherein the autonomous ground vehicle further includes one or more lights configured to illuminate at least the soil beneath the ground vehicle unit.

In some aspects, the techniques described herein relate to an autonomous ground vehicle, wherein the autonomous ground vehicle is configured to perform the carbon estimation operations at night.

In some aspects, the techniques described herein relate to an autonomous ground vehicle, wherein the autonomous ground vehicle further includes a second mechanical arm coupled to a second undercarriage portion of the ground vehicle unit, the second mechanical arm having a second end effector, and wherein at least one of the first mechanical arm and the second mechanical arm include a color calibration component.

In some aspects, the techniques described herein relate to an autonomous ground vehicle, wherein the autonomous ground vehicle is configured to discharge from the energy storage unit into a residential grid.

In some aspects, the techniques described herein relate to an autonomous ground vehicle, wherein the autonomous ground vehicle is configured to determine a local wind speed, and wherein the autonomous ground vehicle is configured to perform wind protection operations based on the determined local wind speed.

In some aspects, the techniques described herein relate to an autonomous ground vehicle, wherein the autonomous ground vehicle further includes a second mechanical arm coupled to a second undercarriage portion of the ground vehicle unit, the second mechanical arm having a second end effector, wherein the autonomous ground vehicle is configured to determine a local wind speed, and wherein the autonomous ground vehicle is configured to perform wind protection operations based on the determined local wind speed, wherein wind protection operations include at least one of: returning to a base of operations, looking for shelter, orientating the ground vehicle unit to be more aerodynamic, and latching to ground below the ground vehicle unit using the first mechanical arm and second mechanical arm.

In some aspects, the techniques described herein relate to an autonomous ground vehicle, wherein the autonomous ground vehicle further includes a cooling system, the cooling system including: an air inlet; an air outlet; one or more filters; and at least one of a heatsink or a fan, wherein the cooling system is configured to cool a central electronic unit of the autonomous ground vehicle.

BRIEF DESCRIPTION OF THE DRAWINGS

Various embodiments will be described hereinafter with reference to the accompanying drawings. These embodiments are illustrated and described by example only and are not intended to limit the scope of the disclosure. In the drawings, similar elements have similar reference numerals.

FIG. 6 is a method for identifying and eliminating a weed with a ground robot, according to an embodiment.

FIGS. 24A-24E illustrate embodiments of a ground robot being combined with another ground robot to form a large ground robot.

FIGS. 27A-27E illustrate embodiments of a ground robot performing a nighttime carbon estimation operation.

FIGS. 28A-28F illustrate embodiments of a ground robot performing a wind protection operation.

DETAILED DESCRIPTION

Figure 1:
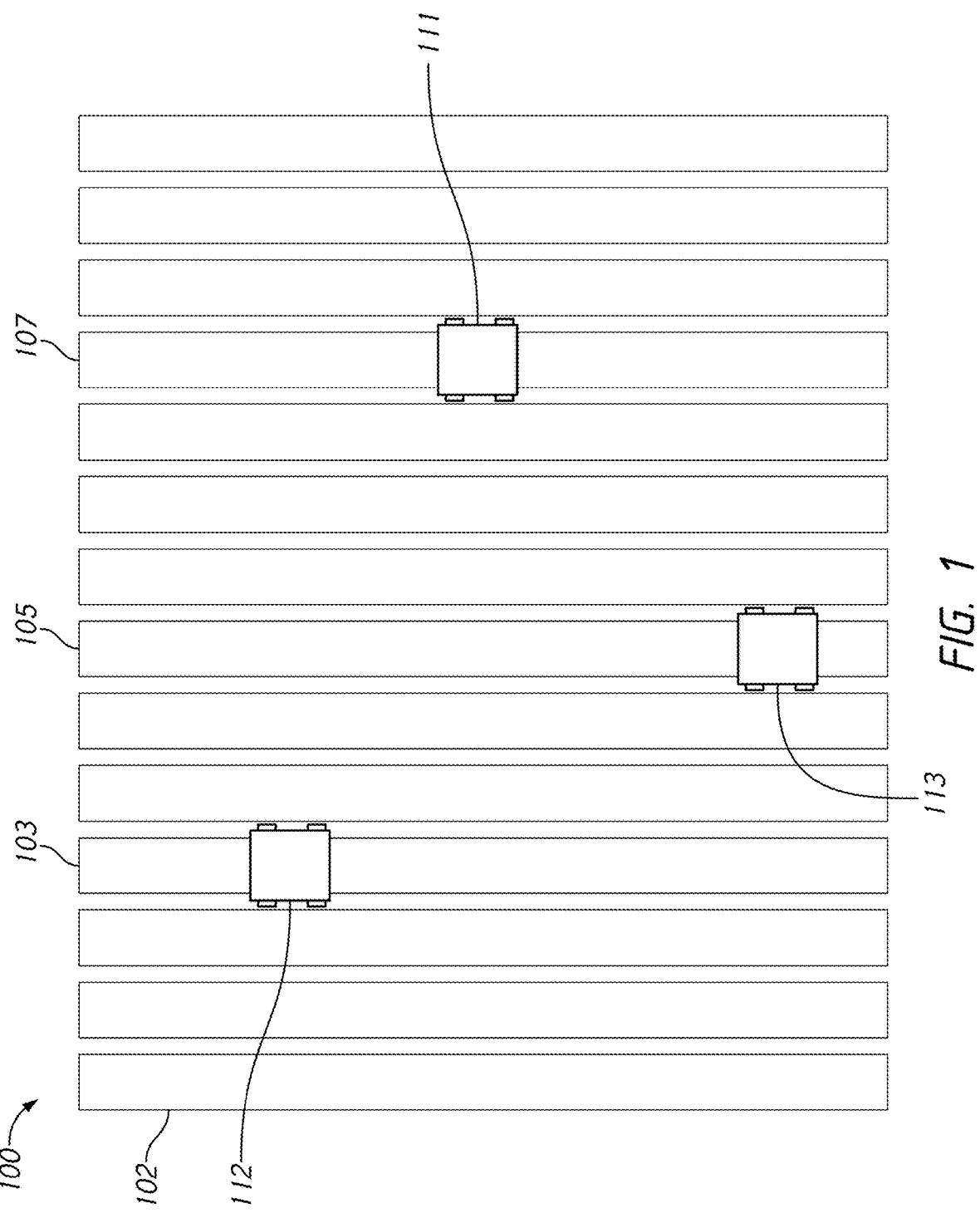
FIG. 1 is a diagram of Collaborative Robot Network performing an inspection and taking an advanced action on farmland, according to an embodiment of the disclosure.

Although embodiments, examples, and illustrations are disclosed below, the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features, and no single feature is solely responsible for its desirable attributes or is essential to practicing the disclosures herein described.

By 2050, the global population will increase from 7.8 billion to 9.7 billion people, and food demand will increase by 70%. During this time, the amount of farmland will be relatively unchanged. As a result, farmers will be challenged to find more efficient, sustainable methods of farming. It is clear that farmers do not have access to the data, analysis, and guidance needed to manage their crops to meet the elevated demands.

Furthermore, a high percentage of farmers cannot use current technology because it is not scalable or affordable. Farmers and agriculture professionals need technology that not only gathers data but also takes immediate action, since agriculture is largely based on weather and timing. Specifically, farmers only take action when it is too late. By the time farmers find the problems on their farmland, they have spread. Also, satellites don't provide the resolution needed even for the most basic analysis.

To combat these issues, various concepts are disclosed herein to provide solutions for more efficient and sustainable farming. In some embodiments of the disclosure, autonomous ground vehicles perform various weed control operations using mechanical, electrical, and/or both mechanical and electrical means to eliminate weeds. In some embodiments, the autonomous ground vehicles disclosed herein can comprise one or more mechanical arms coupled to the autonomous ground vehicles. In some embodiments, the autonomous ground vehicles disclosed herein can comprise one or more electrode portions coupled to the one or more mechanical arms, wherein the one or more electrode portions are configured to make contact with one or more plants or plant portions and/or ground areas in order to damage the plant by sending an electric current through the plant and/or the roots of the plant. In some embodiments, the autonomous ground vehicles disclosed herein can comprise one or more hoe portions coupled to the one or more mechanical arms. In some embodiments, the one or more hoe portions are configured to mechanically remove a plant from the soil or remove a portion of a plant. In some embodiments, the autonomous ground vehicles disclosed herein can comprise one or more cameras configured to capture one or more image(s) and/or video of areas around the autonomous ground vehicle, including but not limited to a forward path of the autonomous ground vehicle. In some embodiments, the one or more image(s) and/or video are analyzed by a computing system either housed in the autonomous ground vehicle or in a cloud server connected to the autonomous ground vehicle through a communications network, wherein the computing system is configured to identify plant types in the one or more image(s) and/or video and determine whether the identified plant should be terminated or allowed to continue to grow. In some embodiments, the computing system can be configured to determine whether the identified plant should be terminated by using the one or more hoe portions and/or the one or more electrode portions. In some embodiments, the computing system can be configured to determine the method of plant termination, for example, by mechanical damage through using the one or more hoe portions or by electrical current damage through using the one or more electrode portions, based on analyzing the one or more image(s) and/or video. In some embodiments, the computing system is configured to analyze plant types and compare the identified plant type to determine whether the plant is a desirable plant type, and/or is conducive or detrimental to the desired crop and/or soil by comparing the plant type to a database, data store, lookup table, configuration file, or the like. In some embodiments, the computing system is configured to analyze soil conditions and/or soil type and/or soil moisture and/or soil composition and/or the like to determine the method of plant termination. In some embodiments, if the computing system determines that the soil is hard, then the system can be configured to not use the one or more hoe portions to remove the plant because the one or more hoes may not be able to dig into the soil, and the system can be configured to use the one or more electrode portions to terminate the plant. In some embodiments, autonomous ground vehicles perform ground terraforming operations (for example, ground soil management operations and/or the like) to restore arid environment ground soil conditions and degraded farmland. In some embodiments, the autonomous ground vehicle disclosed herein is configured to use the one or more hoe potions in conjunction with the one or more cameras to create openings and/or hills and/or crescent shaped mounds and/or sloped areas and/or other land features configured to capture water and/or wind and/or soil and/or seeds and/or other items in order to restore the ground soil conditions. In some embodiments, autonomous ground vehicles perform livestock herd and ground soil management by monitoring which plant life is consumed and the quantity consumed by livestock and the ground and vegetation condition to prevent detrimental overgrazing of the land. In some embodiments, the autonomous ground vehicles disclosed herein can be configured to use the one or more mechanical arms to produce waving motions or sliding motions or gyrating motions or oscillating motions or other types of motions in order to scare the livestock or herd the livestock towards a particular grazing area and away from a grazing area that has been determined by the autonomous ground vehicle and/or computing system to be overgrazed and/or to prevent damage to the area. In some embodiments, the one or more mechanical arms may comprise one or more minors or flags or other items that are configured to capture the attention of the livestock in order to scare or herd the livestock in a particular direction. In some embodiment, the autonomous ground vehicle can be configured to be a ground vehicle that can be used for multiple purpose, for example, weed management, ground soil management, and/or livestock herding management such that a user of the autonomous ground vehicle need only one machine to perform one or more forgoing tasks. In some embodiments, the autonomous ground vehicle can comprise the necessary software to perform one or more of the weed management, ground soil management, and/or livestock herding management operations. In some embodiments, the autonomous ground vehicle can comprise one or more instruments necessary for performing weed management, ground soil management, and/or livestock herding management operations.

In some embodiments, the mechanical arm includes a yaw motor, a pitch motor and a hoe arm with an end effector comprising a hoe portion, a shovel portion, and an electrode, or any combination thereof. In some embodiments, the hoe arm is coupled to the autonomous ground vehicle structure, for example, to the undercarriage portion of the ground vehicle unit's frame. In some embodiments, the pitch motor is connected to the vehicle structure, with the output shaft of the pitch motor being oriented in a vertical direction such that the output shaft rotates about a vertical rotation axis. In some embodiments, a bracket is coupled to the output shaft of the pitch motor. In some embodiments, the yaw motor is coupled to the bracket and positioned on the bracket such that an output shaft of the yaw motor is oriented in a horizontal direction, such that the output shaft rotates about a horizontally oriented rotation axis. In some embodiments, the output shaft of the yaw motor is coupled to a proximal end of the hoe arm. With such an arrangement, the hoe arm can be caused to rotate about two separate axes of rotation, namely a vertical axis defined by the output shaft of the pitch motor and a horizontal axis defined by the output shaft of the yaw motor. Other embodiments may include more or less drive motors and/or axes of rotation, other embodiments may position the multiple axes of rotation in different orientations, and/or the like. Further, in some embodiments, the two motors are actually motor assemblies that each include a motor and gearbox. In such a configuration, the output shafts are actually an output shaft of a gearbox that is coupled to the motor. Such a configuration can be desirable, for example, to provide a mechanical advantage, to change an orientation of the rotation axis, and/or the like. In some embodiments, the motors desirably comprise brushless DC motors, which can operate relatively efficiently. Some embodiments may, however, use different types of electric motors, hydraulic and/or pneumatic motors, linear actuators, rack and pinon systems, hydraulic and/or pneumatic cylinders or actuators, and/or the like.

Current robotic systems have struggled to meet farmers' and agriculture professionals' needs because these systems have not successfully integrated robots and software analytics. Instead, each individual technology has been used in and of itself and generally relies on human interaction and infrastructure. Companies have specialized in designing and building. Other companies have specialized in software analytics for crops. Other companies have specialized in creating ground robots to perform actions on a farm such as weed control or seeding. However, in order for farmers to truly benefit, it can be desirable to combine all three of these technologies, or at least two of these technologies. Each technology has significant shortcomings when used by itself, although it is also possible to use them by themselves.

Weeds compete with crops for nutrients and water, and the presence of weeds will reduce a farmer's crop yield. Currently, farmers are spraying large amounts of herbicides over entire fields, even for isolated problems, with spraying equipment attached to tractors or airplanes. These methods are expensive and are becoming ineffective as weeds are becoming resistant to herbicides. Over 250 herbicide resistant species of weeds exist in the United States of America. Additionally, herbicides are known carcinogens and harmful to farmers and farmland.

While mechanical and electrical weed control robots have been used previously, these robots are very expensive, and struggle to catch issues after weeds spread seeds. Current robots also struggle to effectively remove weeds. Removing weeds before they spread seeds decreases the probability of recurring weeds in the next growing season. Because farmers are heavily invested in pesticide application equipment and infrastructure, farmers need an efficient, low-cost method of removing weeds. Traditional mechanical weed control robots undergo high levels of wear that force the robots to be large and complex and require the farmer to perform frequent in-field service. In addition, the current robots are heavy and cause damage to the farmland due to soil compaction. Many electrical weed control robots have a high voltage system which runs continuously, resulting in an unsafe environment for people or animals near the robot. Additionally, running continuously results in large amounts of energy consumption.

In addition, the industry has struggled to develop ground robots that can perform weed control in close proximity to the crops and without damaging the crops without pesticide use.

Additionally, there is a need for a network of ground robots that perform actions such as weed control. With the overuse of herbicides in modern farming practices and rise of organic farming, farmers need improved methods of weed control without harmful chemicals. Current agriculture robots are expensive, complex, large, and cannot perform weed control in close proximity to the crops after germination. Furthermore, the current technology requires a major capital investment and infrastructure investment for the farmer. As a result, the proposed robots in this disclosure create a dynamic and decentralized network with limited or no infrastructure, wherein the robots are continuously inspecting the fields to determine the location of weeds and performing weed control in areas identified by AI analysis of the data.

Remote Network Connectivity

While connectivity has improved in highly urban areas, connectivity is poor to nonexistent in remote areas because there is no budget to invest in cellular bonding or satellite. Poor connectivity is a big issue in developing countries, such as Southeast Asia, Africa, and South America. In addition, poor connectivity is limiting telecommunication as well as data transfer of critical information for both individuals and entities.

Furthermore, poor connectivity is holding back many industries, such as agriculture and utility inspection, from growing and fully utilizing technology in other fields, such as Internet of Things (IoT), automated equipment, and cloud-based Artificial Intelligence (AI) analysis tools. Even in the United States, a pioneer country in connectivity, only about one-quarter of farms currently use any connected equipment or devices to access data, and that technology isn't typically state-of-the-art, running on 2G or 3G networks that telecommunication companies plan to dismantle or on very low-band IoT networks that are complicated and expensive to set up. In either case, those networks can support only a limited number of devices and lack the performance for real-time data transfer, which is essential to unlock the value of more advanced and complex use cases.

For the agriculture industry to advance and meet the increased food demands of the 21st century, it faces one major obstacle: many regions lack the necessary connectivity infrastructure, making development of it paramount to integrate advanced crop monitoring, livestock monitoring, building and equipment management, and autonomous farming machinery. These advancements contribute to higher yields, lower costs, and greater resilience and sustainability for farmers and agriculture professionals allowing them to meet the 21st century food demand. In regions that already have a connectivity infrastructure, farms have been slow to deploy digital tools because their impact has not been sufficiently proven. The global farming industry is highly fragmented, with most labor done by individual farm owners. Particularly in Asia and Africa, few farms employ outside workers. On such farms, the adoption of connectivity solutions should free significant time for farmers, which they can use to farm additional land for pay or to pursue work outside the industry.

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications, and equivalents that may be included within the spirit and scope of the disclosure. Furthermore, in the following detailed description of the present disclosure, numerous specific details are set forth in order to provide a thorough understanding of the present disclosure. However, it will readily be apparent to one skilled in the art that the present disclosure may be practiced without these specific details.

In other instances, well-known methods, procedures, and components have not been described in detail so as not to unnecessarily obscure aspects of the present disclosure. These conventions are intended to make this document more easily understood by those practicing or improving on the inventions, and it should be appreciated that the level of detail provided should not be interpreted as an indication as to whether such instances, methods, procedures, or components are known in the art, novel, or obvious.

Definitions

Artificial Intelligence is the theory and development of computer systems able to perform tasks that normally require human intelligence, such as visual perception, speech recognition, decision-making, and translation between languages. In addition, artificial intelligence may be used to teach the aircraft how to maneuver on the ground or align to the sun.

Gantry is interchangeable with "robot arm" and is the movable structure that is attached frame of the robot wherein the end effector is at the terminating action end. In some cases, the gantry may be attached to a track system capable of moving in multiple direction.

End effector is a device or tool attached to or integrally formed at the terminating end of a robot arm or gantry. In some embodiments, the end effector is a weed control application unit, such as an electrical probe and/or mechanical weed device. In some embodiments, the end effector is a weed control application unit such as an electrical probe, mechanical tool, or combination thereof. In some embodiments, the end effector comprises a hoe unit, a shovel unit, and an electrode or any combination thereof.

Linear actuator converts energy into linear push or pull movements, and some examples include hydraulic cylinder, pneumatic cylinder, electromechanical cylinder, ball screw, lead screw, and/or the like.

Wi-Fi is a wireless networking technology that allows devices to interface with the Internet and interface with one another, creating a network.

Wi-Fi Router is wireless routers offer a convenient way to connect a small number of wired and any number of wireless devices to each other for access to the Internet.

Mobile Hotspot is a common feature on smartphones with both tethered and untethered connections. When you turn on your phone's mobile hotspot, you share your wireless network connection with other devices that can then access the Internet.

Wi-Fi Hotspot is a mobile hotspot obtained through a cell phone carrier. It's a small device that uses cellular towers that broadcast high-speed 3G or 4G broadband signals. Multiple devices, like tablets, phones, and laptops, can then connect wirelessly to the device.

LTE is short for "Long-Term Evolution" and broadcasts signals over cellular towers. LTE download speeds from 5 Mbps to 100 Mbps.

Satellite is a machine that is launched into space and moves around Earth or another body in space. At a minimum, a satellite comprises an antenna and power source, such as a battery or solar panel.

Solar Energy is radiant light and heat generated from the sun that can be harnessed using a range of ever-evolving technologies, such as solar heating or solar charging.

Biomimicry is a practice that learns from and mimics the strategies found in nature to solve human design challenges. The robotic system seeks to use artificial intelligence to mimic nature and evolve to continuously adapt to the robotic system's environment.

Herbicide is a chemical substance toxic to plants.

Central Processing Unit (CPU) performs basic arithmetic, logic, controlling, and input/output (I/O) operations specified by the instructions in the program. In some embodiments, the CPU may include a GPU and/or a TPU.

Accelerator is the use of computer hardware specially made to perform some functions more efficiently than is possible in software running on a general-purpose central processing unit (CPU).

Graphics Processing Unit (GPU) is a specialized, electronic circuit designed to rapidly manipulate and alter memory to accelerate the creation of images in a frame buffer intended for output to a display device.

Tensor Processing Unit (TPU) is a highly optimized for large batches and convolutional neural networks and has the highest training throughput.

Transformer is a device that transfers electricity from one circuit to another with changing voltage level but no frequency change.

RGB is an additive color model in which red, green, and blue light are added together in various ways to reproduce a broad array of colors.

Collaborative Robot Network with Optimized Weed Control Methods

It should be noted that the disclosed embodiments of a Collaborative Robot Network with Optimized Weed Control Methods may be combined with any embodiments disclosed herein, and individual features of the Collaborative Robot Network with Optimized Weed Control Methods may be combined with individual features of any other embodiment. Any other embodiments may also be combined with the disclosed Collaborative Robot Network with Optimized Weed Control Methods, and individual features of any embodiment may be combined with individual features of the disclosed Collaborative Robot Network with Optimized Weed Control Methods.

A ground robot or autonomous ground vehicle, as the terms are used herein, are broad terms that can include, but are not limited to, ground-based robot, ground vehicle, ground-based vehicle, autonomous ground vehicle, autonomous ground-based vehicle, unmanned vehicle, unmanned robot, autonomous robot, autonomous vehicle, autonomous robotic vehicle, land robot, land-based robot, land vehicle, land-based vehicle and/or the like. Robotic arm, as the term is used herein, is a broad term that can include, but is not limited to, robot arm, mechanical arm, probe, hoe arm, and/or the like. A weed, as the term is used herein, is a broad term that can include, but is not limited to, a plant, agricultural plant, shrub, greenery, vegetation, undergrowth, plant species, plant organism, herb, flower, vegetable, flora, and/or the like.

In some embodiments, the systems described herein (for example, such as the ground robots) may be configured to determine one or more of: an absolute depth and a relative depth of the ground and/or objects on the ground. For example, the ground robots may be configured to determine the absolute depth and/or the relative depth of a plant or weed in the ground. In some embodiments, the ground robots may include one or more encoders that may or may no be a part of or coupled to an electric motor. In some embodiments, the ground robots may use the encoders to determine the absolute depth of the ground. For example, as described herein, the ground robots may include motors (e.g., the motors at least described with reference to FIGS. 27A-27C) configured to move the robotic arms about two or more degrees of freedom. The motors may include encoders (e.g., such as position encoders), or the encoders may be added to the motors. As the ground robots move the robotic arms, the encoders may be configured to measure/determine the angle of rotation of the robotic arm within one or more axis of rotation. For example, as the ground robot moves the arm about the pitch axis, the encoder may determine the angle of rotation about the pitch axis. In this example, the forward and reverse directions of travel of the ground robot may be defined as the positive x and negative x directions respectively, the left and right directions of travel may be defined at the positive y and negative y directions respectively, and the upward (towards the sky) and downward (towards the ground) directions may be defined as the positive z and negative z directions respectively. Continuing with the example, the pitch axis of the robotic arm corresponds to the y-axis and as the robotic arm rotates about the y-axis, the encoder may be configured to determine the angle of rotation. It is recognized that the ground robots described herein can include any number of motors and encoders and the angle of rotation about each axis of rotation may be determined by the encoders. In some embodiments, the ground robots may determine the absolute depth of the ground using the determined angle of rotation and the known length of the robotic arms. For example, during a plant management operation, the ground robot may move the robotic arm about the y-axis in an arc to contact a weed or the soil near the weed. When the end effector or the robotic arm (e.g., such as a hoe) contacts the ground, the ground robot may detect/measure a change in current in the motor. By using the angle of the robotic arm when the change in current is measured and the known length of the robotic arm, the ground robot can determine the absolute depth of the ground at the current x/y location. In some embodiments, the ground robot can continually determine an absolute depth of the ground robot's location based on the continued striking of the ground during a plant management operation. For example, each time the ground robot removes a weed, the ground robot may determine the absolute depth of the weed.

In some embodiments, the systems described herein may be configured to determine the relative depth of the ground and/or objects on the ground. For example, the ground robots may be configured to determine the relative depth of a plant or weed on the ground that the ground robot is advancing towards to perform a plant management operation. The relative depth of the ground surrounding a weed targeted for removal is important for ensuring that the end effector of the robotic arm strikes in the correct location to sufficiently contact the weed itself or the ground in front of or behind the weed as desired. As described herein, the ground robots can include one or more camera units. In some embodiments, the ground robots may use the one or more camera units to determine an x and y location of the weed set for removal, however, the x and y location may not provide the ground robot with enough information to strike at the correct location. Because the robotic arms move in an arc, the x-y location that the ground robot's end effector strikes the ground at is dependent on the relative height of the ground. For example, a weed on small hill has a greater z location than weed on level ground and as such, the desired x-y location to strike for any particular weed varies with the z location of the weed. Because agricultural ground is typically uneven, knowledge of the relative depth of a target weed may be required for an accurate weed management operation.

In some embodiments, the ground robots may include a front camera unit and rear camera unit. In some embodiments front camera unit includes a downwards (negative z) facing camera and a forwards (positive x) facing camera. In some embodiments, the rear camera unit includes a downwards (negative z) facing camera and a rearwards (negative x) facing camera. In some embodiments, the ground robots may use either the front camera unit or the rear camera unit to determine the relative depth of the ground. In some embodiments, the ground robots may use the images from either camera and stereo measurement to determine the relative depth of the ground. For example, in some embodiments the ground robot may use the rear camera unit to determine the relative depth of the ground. Because the ground robots may be continuously traveling during plant management operations, the rear camera unit is continually generating new images of the area around and/or below the ground robot. In some embodiments, the ground robot may perform a stereo measurement to determine the relative depth of the ground by comparing two of more images from the same camera unit. For example, the ground robot can determine the distance traveled between capturing the two or more images to perform the stereo measurement. In one example, the ground robot may take a first image of a weed at a first known x-y location and a second image of the weed at a second known x-y location. Using a computer system, the ground robot may apply a triangulation geometry calculation to determine the relative depth of the weed. The ground robot may then use the relative depth to accurately strike the weed or the ground near the weed at a desired location.

In some embodiments, the ground robots described herein may use both the determined absolute depth and relative depth of the ground to perform accurate plant management operations. For example, the ground robots may use the front camera unit to determine an x-y location of a weed in, for example, the forward path of the vehicle. Use of the front camera unit to identify weeds may provide the ground robot with a lead time before striking the ground with the robotic arm such that the ground robots can perform plant management operations while in continuous motion. Continuing with the example, the ground robots may then use the rear camera unit to determine the relative depth of the weed. With this knowledge, the ground robot can move either the first robotic arm or the second robotic arm in an arc to strike the weed or the ground near the weed to remove the weed. As the end effector of the ground robot strikes the ground, the ground robot can determine the absolute depth of the ground at the location. In some embodiments, the absolute depth may be used to calibrate the relative depth of the ground for the next weed the ground robot encounters. For example, based on the absolute depth of the ground, the ground robot can remap/recalibrate the rear camera's relative depth measurement. In some embodiments, the ground robot may recalibrate the depth calculation each time the ground robot strikes the ground with the robotic arm. In some embodiments, the ground robot may be configured to alternate between using a first robotic arm and a second robotic arm to remove weeds in the forward path of ground robot.

In some embodiments, the ground robots described herein may use a time of flight sensor to determine the relative and/or absolute depth of the ground. In some embodiments, the ground robots described herein may use one or more lasers to determine the relative and/or absolute depth of the ground. In some embodiments, the ground robots may strike the ground behind a weed (e.g., further from the ground robot in the positive x direction) and drag the end effector (e.g., a hoe) in the negative x direction to remove all or a portion of the weed from the ground. In some embodiments, the ground robots may strike the ground in front of a weed (e.g., closer to the ground robot in the positive x direction) and push the end effector (e.g., using the movement of the ground robot) in the positive x direction to remove all or a portion of the weed from the ground.

As shown in FIG. 1, an embodiment of Collaborative Robot Network 100 comprises at least one ground robot 111-113, agriculture asset 102, and sun (not shown). Sun beams (not shown) emitted from sun (not shown) hit the solar panel of ground robots 111-113 to provide power for ground movement, data collection, and data transmission. One or more of the ground robots 111-113 ("inspection robots") analyzes inspection data with on-board AI processer and transfers points of action to the other ground robots 111-113. Ground robots 111-113 can move on the ground to a point of action determined by the robots or a remote system. After reaching the point of action, ground robots 111-113 will perform an action, such as weed control (mechanical, chemical, electrical, and/or a combination thereof), soil samples, moisture level sampling, nitrogen sampling, or more detailed imaging. Ground-based robots 111-113 are operated autonomously via AI. In some embodiments, ground-based robots 111-113 may be remotely operated by at least one pilot. In some embodiments, ground robots 111-113 weigh no more than, for example 150 pounds, which allows a single robot to be shipped over standard freight and reduces soil compaction and damage to the farmland without using a complex track system to distribute the ground robot's weight. In some embodiments, ground robots 111-113 weigh no more than 75 pounds, 100 pounds, 125 pounds, 175 pounds, 200 pounds, 250 pounds, 300 pounds, 350 pounds, 400 pounds, and/or the like.

In some embodiments, inspection robots can move across agriculture asset 102 that is a field of crops, such as corn. The inspection robots take pictures of crop rows 103, 105, and 107. The inspection robots compiles imagery including RGB, RGB and near infrared, or hyperspectral, and analyzes imagery to identify areas of action, which may include areas with weeds, areas with irrigation issues, areas with high crop stress, or the like. The areas of action are transferred to the other ground robots 111-113. Ground robots 111-113 travel to the point of action and begin taking action, such as weed control (see FIGS. 4-5). In some cases, ground robots can perform mechanical, electrical, chemical, or hot oil weed control. In some cases, a farmer may receive a notification to take ground robot to a specific place in the field, and farmer will transport the ground robot manually. In some embodiments, ground robots weigh less than 150 pounds which allows them to be easily transport from one filed to another via a truck or tractor.

In some embodiments, the inspection robot will inspect after the other ground-based robots 111-113 take action. In the case of weed control actions, the inspection robot will inspect to see if all of the weeds are removed and to see if any crops have been damaged by comparing images before weed control and after weed control. In some embodiments, re-inspection takes place days after the weed control is performed, for example, 2-3 days later, because it may take time for the weed to weaken, biodegrade, or otherwise be eliminated.

In some embodiments, inspection robot will inspect consecutive days or multiple times a day to determine the accuracy of the imagery. Inspection robot may capture imagery multiple times when performing crop count of, for example rows 103, 105, 107, and/or the like. In some embodiments, ground robots 111-113 will capture further images near the crop or on the ground to provide more data for analysis via AI.

In some embodiments, ground-based robots 111-113 have at least one solar panel. Sun beams (not shown) emitted from sun (not shown) hit solar panel of ground-based robots to provide power for flight, ground movement, data collection, and data transmission. In other embodiments, ground robots 111-113 have batteries (for example, like battery 503 in FIG. 4A). In another embodiment, ground-based robots 111-113 have solar panels (for example, like solar panel 415 in FIG. 3A) and batteries.

In some embodiments, inspection robots transmit inspection data to the other ground-based robots 111-113, and ground-based robots 111-113 transmit inspection data to cloud computing and storage via satellite. In some embodiments, inspection robots transmit data to ground-based robots 111-113, and ground-based robots 111-113 transmit inspection data to cloud computing and storage via Wi-Fi networks. In some embodiments, inspection robots transmit inspection data to ground-based robots 111-113, and ground-based robots 111-113 transmit inspection data to cloud computing and storage via cellular networks. In some embodiments, inspection robots transmit inspection data to ground-based robots 111-113, and ground-based robots 111-113 utilize on-board AI processors to process inspection data. In some embodiments, inspection robots can perform an inspection task, such as taking pictures of agriculture asset 102 and transfer the picture to cloud computing network via LTE network. In some embodiments, agriculture asset 102 is field of row crops, such as corn or sugar beets. In some embodiments, agriculture asset 102 is field of field crops, such as soybeans or rice. In some embodiments, agriculture asset 102 is group of livestock, such as cattle.

Figures 2A, 2B:
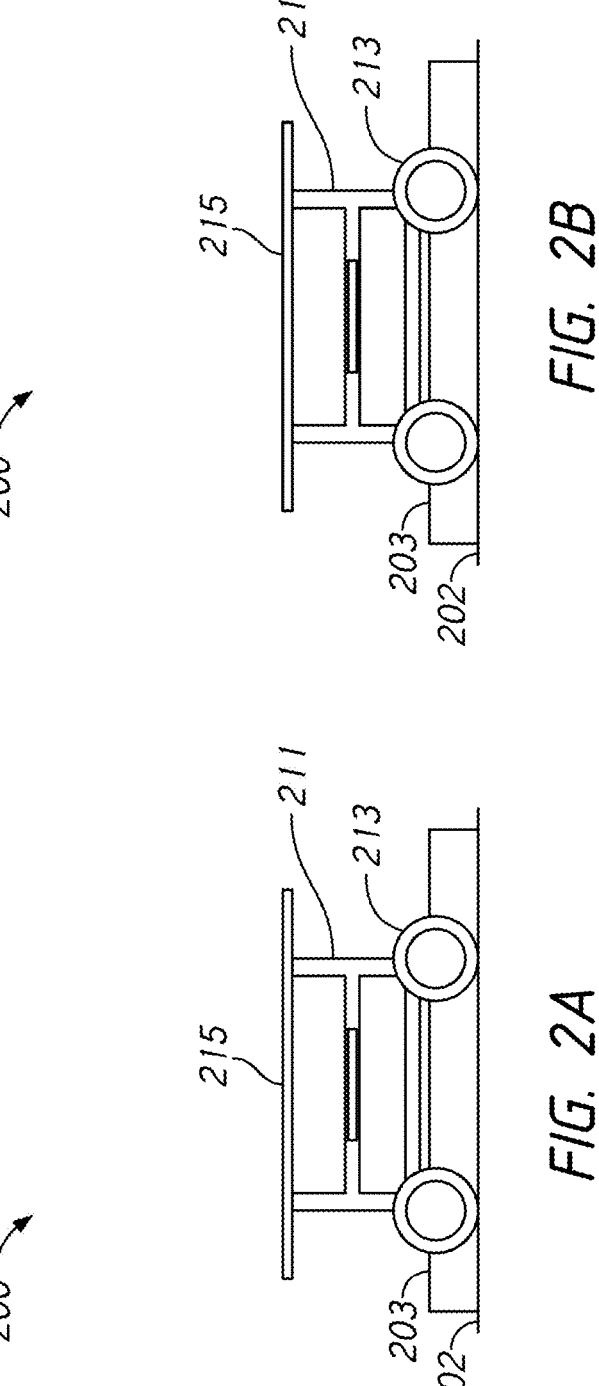
FIG. 2A is a diagram of Collaborative Robot Network showing a ground robot performing an inspection, according to an embodiment.
FIG. 2B is a diagram of Collaborative Robot Network showing a ground robot, according to an embodiment.

As shown in FIGS. 2A & B, an embodiment of Collaborative Robot Network 200. Inspection robots (not shown) can act as an antenna for ground robot 211. In some embodiments, ground robot 211 uses wheels 213 to move on ground 202 along agricultural asset 203. Ground robot 211 transfer data to inspection robots, and then the inspection robots transfer data to a cellular network (not shown). In some embodiments, ground robot 211 transfer data to inspection robots, and then inspections robots transfer data to a satellite. In some embodiments, ground robot 211 transfer data to inspection robots, and then inspection robots transfer data to a Wi-fi network (not shown). In some embodiments, ground robot 211 has solar panel 215 coupled to it.

Some Differences Between Collaborative Robot Network with Optimized Weed Control Methods and the Prior Art Farmers are struggling to catch issues on the farmland early. Current farming methods and practices find issues after significant damage to crops, such an irrigation leak or plant disease. Therefore, it is advantageous to have a robot that can continuously inspect a parcel of land and have means to quickly analyze the data and either take immediate action or provide an actionable report to the farmer.

One area of interest is weed control. Weeds compete with crops for nutrients, and the presence of weeds will reduce a farmer's crop yield. Currently, farmers are spraying large amounts of herbicides over entire fields even for isolated problems with spraying equipment attached to tractors or airplanes. These methods are expensive and becoming ineffective as weeds are becoming resistant to herbicides. Over 250 herbicide resistant species of weeds exist in the United States of America. Additionally, herbicides are known carcinogens and harmful to farmers and farmland.

While mechanical and electrical weed control robots have been used previously, these robots are very expensive, and struggle catch issues after weeds spread seeds and struggle to effectively remove weeds. By removing weeds before they spread seeds, seeds will need to transfer from another field, which will decrease the probability of recurring weeds in the next growing season. Since farmers are heavily invested in pesticide application equipment and infrastructure, farmers need an efficient, low-cost method of removing weeds. Traditional mechanical weed control robots undergo high levels of wear that force the robots to be large and complex and require the farmer to perform frequent in field service. In addition, the current robots are heavy and cause damage to the farmland due to soil compaction. Also, a number of the electrical weed control robots have the high voltage system run continuously which results in an unsafe environment for people or animals near the robot and this creates large amounts of energy consumption. Therefore, it is advantageous to have robots that can detect weeds before they spread and quickly remove the weeds, which decreases the wear on the robots and size of the robots.

Precision Weeding with Camera and CPU.

Figure 3A:
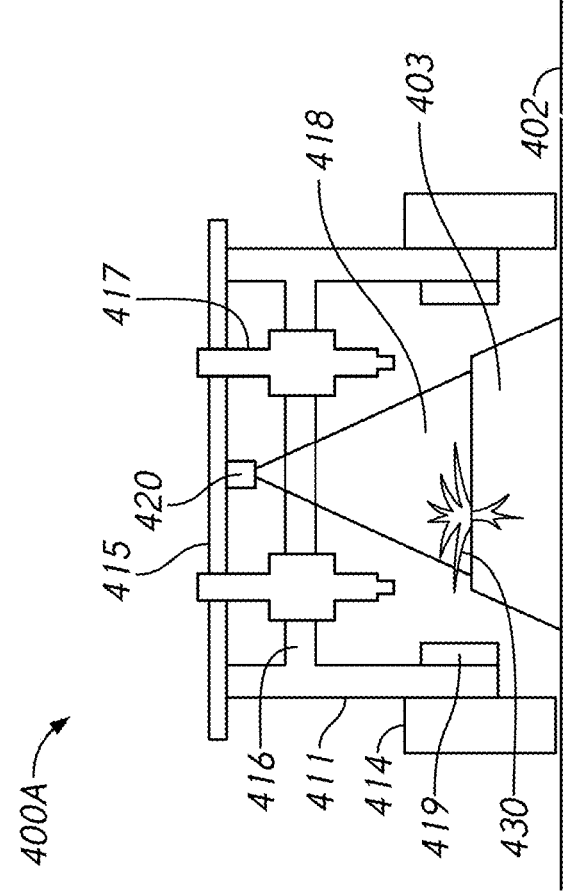
FIG. 3A is a diagram of a front view of ground robot showing a camera enabled weed control end effector, according to an embodiment.
Figure 3B:
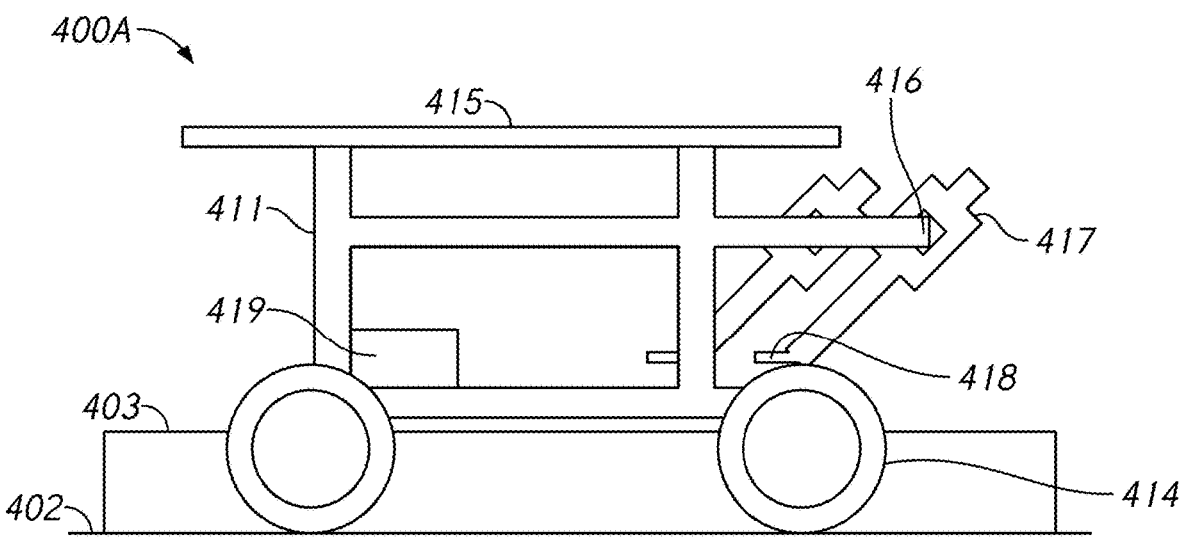
FIG. 3B is a diagram of a side view of a ground robot showing a plant management end effector with two moving probes, according to an embodiment.
Figure 3C:
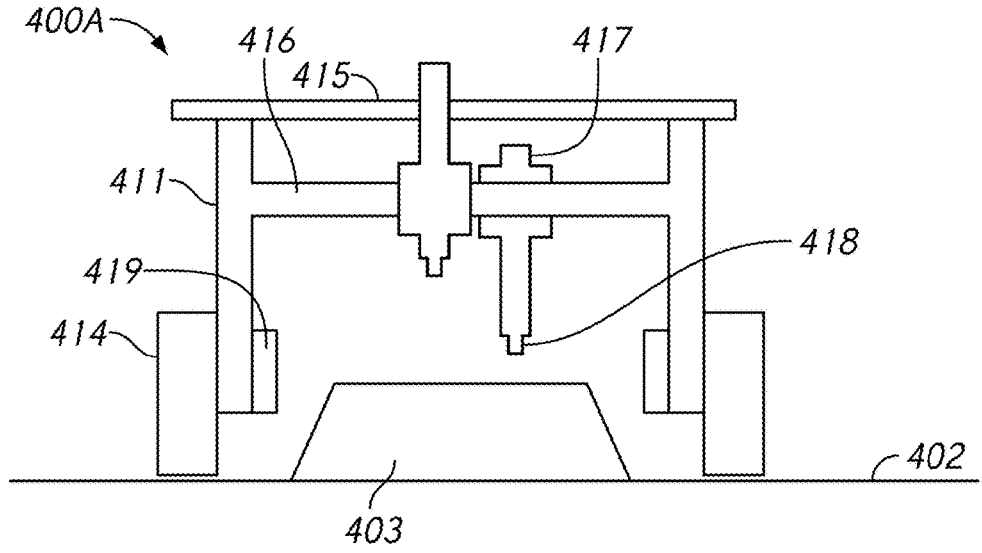
FIG. 3C is a diagram of a front view of the ground robots showing a plant management end effector with two moving probes, according to an embodiment.

As shown in FIG. 3A, an embodiment of a precision weeding system 400A, ground robot 411 uses wheels 414 to travel on ground 402 along crop row 403 to find weeds. Motor and gearboxes 419 are coupled to ground robot 411. In some embodiments, ground robot 411 uses camera 420 to detect weed 430 in crop row 403. When camera 420 takes an image, records a video, and/or the like, and CPU (for example, like CPU 507 in FIG. 4A) determines the existence and location of weed 430, high voltage circuit (for example, like HV Booster 511 in FIG. 4A) is enabled and the gantry end effector assembly containing probes 417 controlled by the CPU moves towards weed 430. In some embodiments, each end effector is comprised of at least one probe, and the end effector is attached to a gantry that can move on a track system 416 powered by motors that allow the gantry and end effector assembly to move in 2 or 3 dimensions. In some embodiments, ground robot is powered by solar panel 415. In some embodiments, ground robot 411 is powered by batteries (for example, like battery 503 in FIG. 4A). In some embodiments, ground robot 411 is powered by solar panels 415 and batteries, wherein solar panels 415 charge batteries.

Figure 4A:
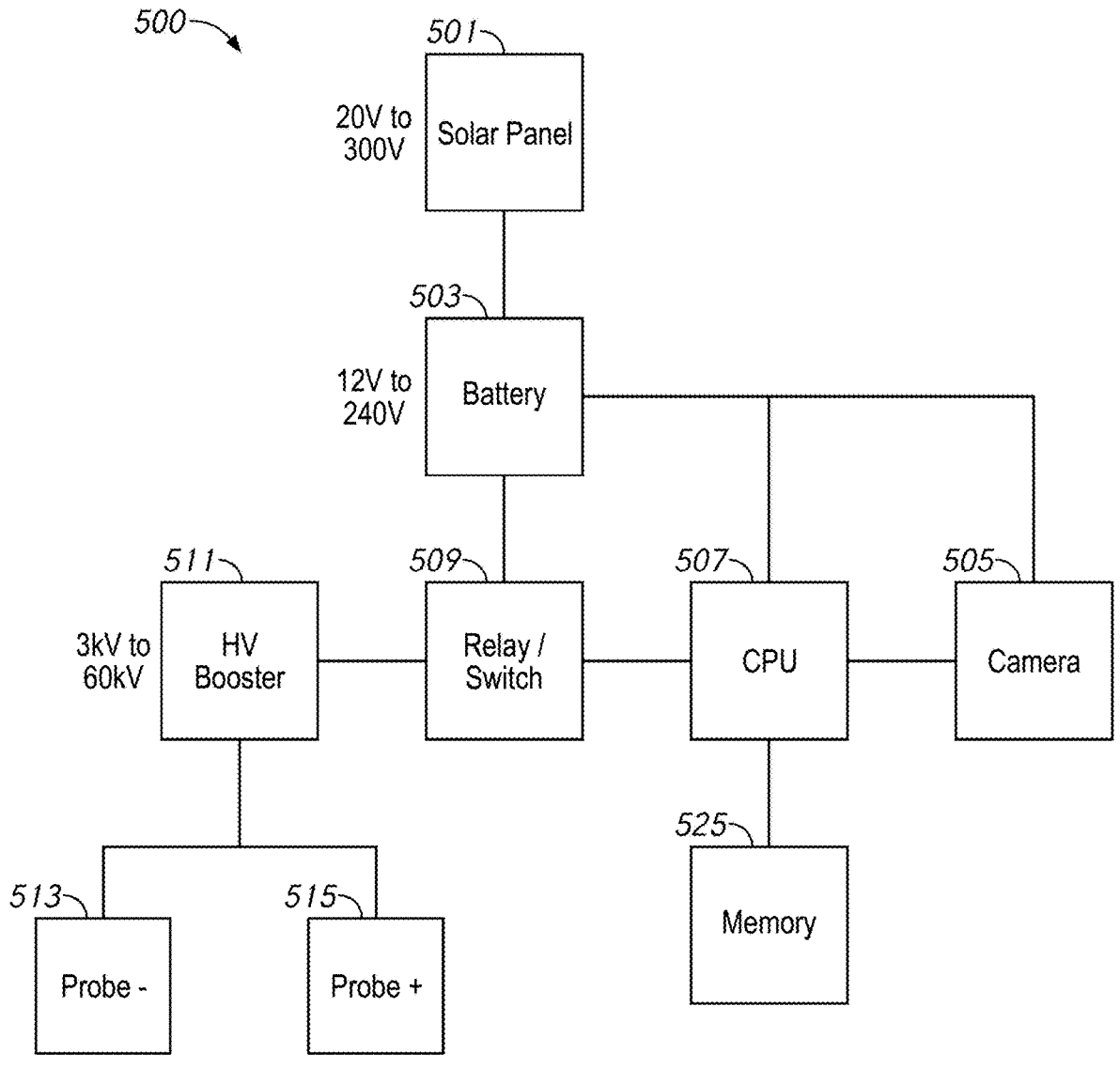
FIG. 4A is a diagram of a weed control circuit used in robots to electrocute a weed through the roots of said weed, according to an embodiment.
Figure 5A:
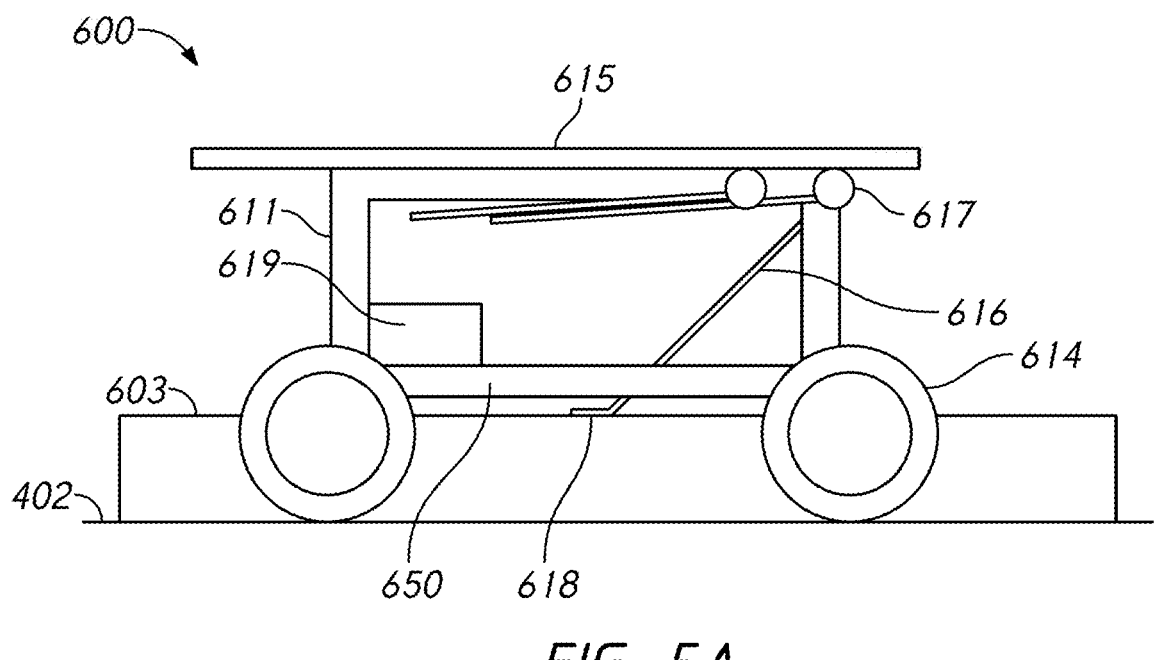
FIG. 5A is a side view showing a ground robot with a high volume weed control end effector used to eliminate multiple weeds at the same time, according to an embodiment.
Figure 5B:
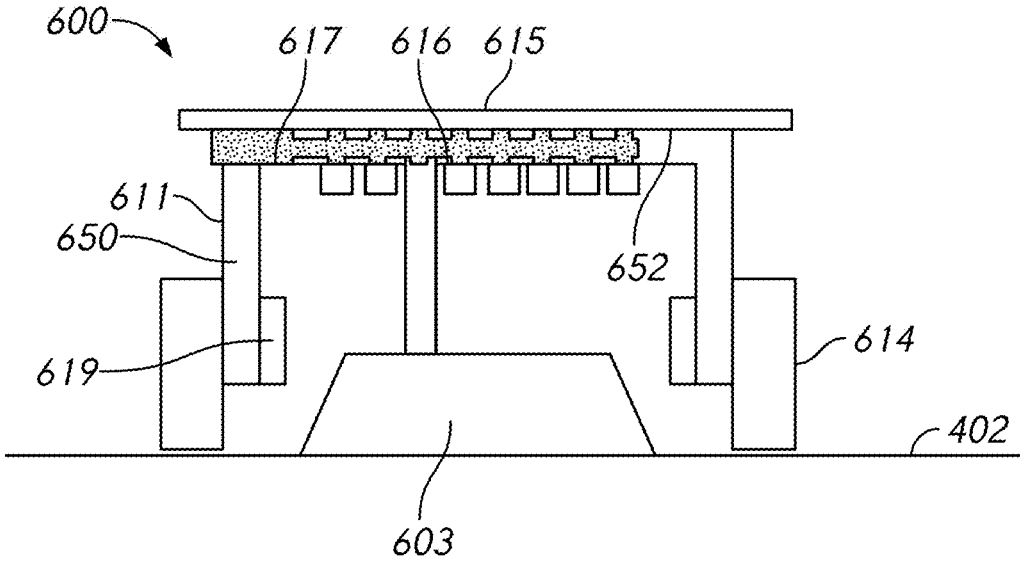
FIG. 5B is a front view showing a ground robot with a high volume weed control end effector used to eliminate multiple weeds at the same time, according to an embodiment.

As shown in FIGS. 5B & C, ground robot 411 uses angled gantry end effector containing probes 417 to move towards weeds. One angled probe 417 will move towards the weed identified by the CPU (for example, like CPU 507 in FIG. 4A) and camera (for example, such as camera 420 in FIG. 3A), and the other angled probe 417 will move towards the ground to create a circuit through the ground. In some embodiments, one angled probe 417 will move towards the weed identified by the CPU and camera, and the other angled probe 417 will move towards another weed identified by the CPU and camera, creating a circuit through the ground to both weeds. In some embodiments, probes 417 may contain tip, distal end, and/or the like 418. The tip 418 may include an electrode in any embodiments disclosed herein.

Figures 3D, 3E:
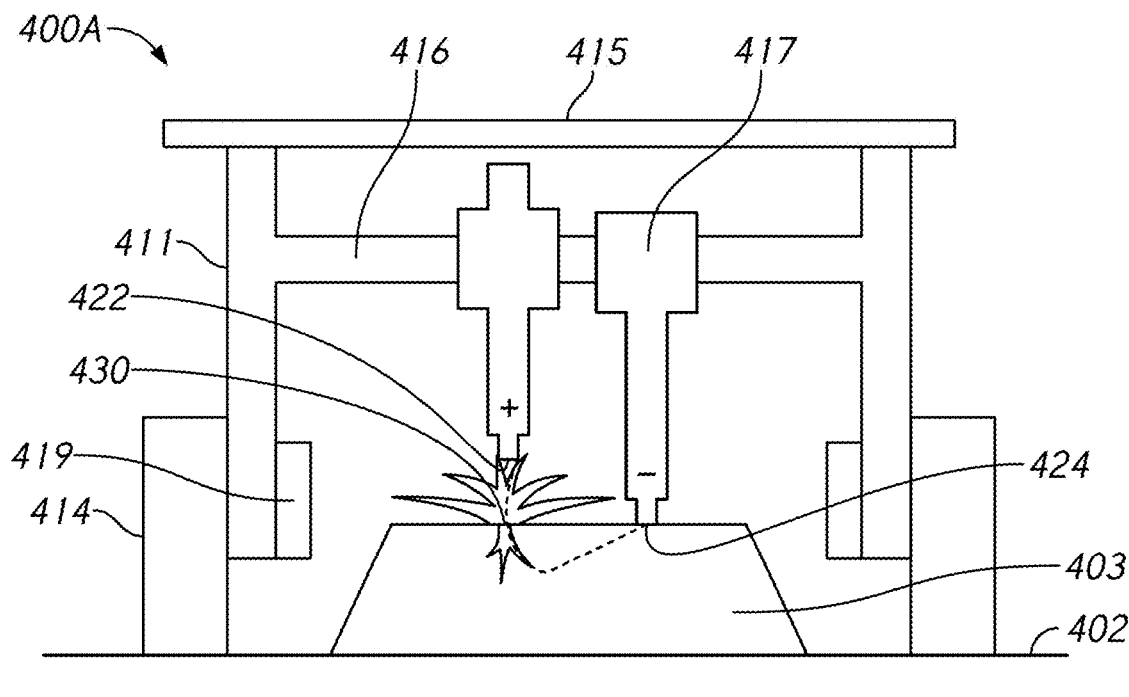
FIG. 3D is a diagram of a front view of a ground robot showing weed control circuit for eliminating weeds through the ground, according to an embodiment.
FIG. 3E is a diagram of a front view of a ground robot showing a weed control circuit for eliminating weeds through the ground after high voltage circuit is activated, according to an embodiment.
Figure 3F:
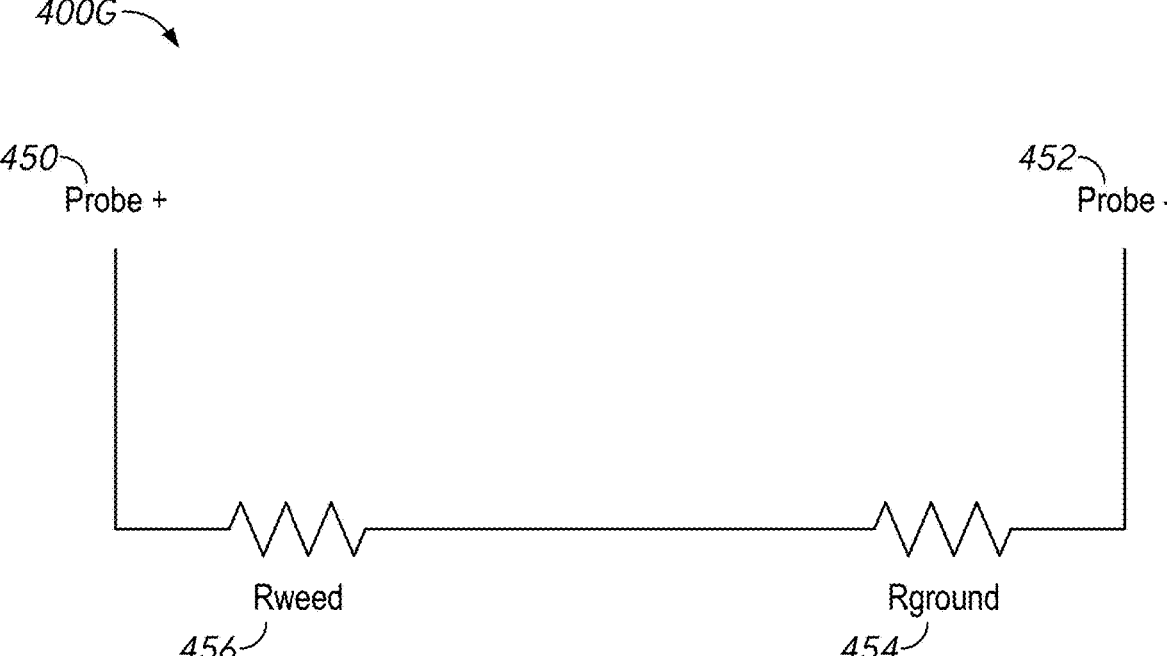
FIG. 3F is an electrical schematic showing the circuit between the positive probe and negative probe to eliminate weeds, according to an embodiment.

FIGS. 3D & E show the circuit for eliminating weeds wherein positive probe 422 makes contact with weed 430, negative probe 424 makes contact with ground, the ground and weed are resistors, and the power source is the solar panel. In some embodiments, the negative probe makes contact with another weed. In some embodiments, positive probe 422 and negative probe 424 are made of metal, such as nickel, steel, or aluminum. In some embodiments, positive probe 422 and negative probe 424 are coated with a metallic plating, such as nickel, zinc, or a combination thereof. In some embodiments, negative probe 424 is sharp in order to pierce the ground 403.

Figures 3G, 3H, 3I:
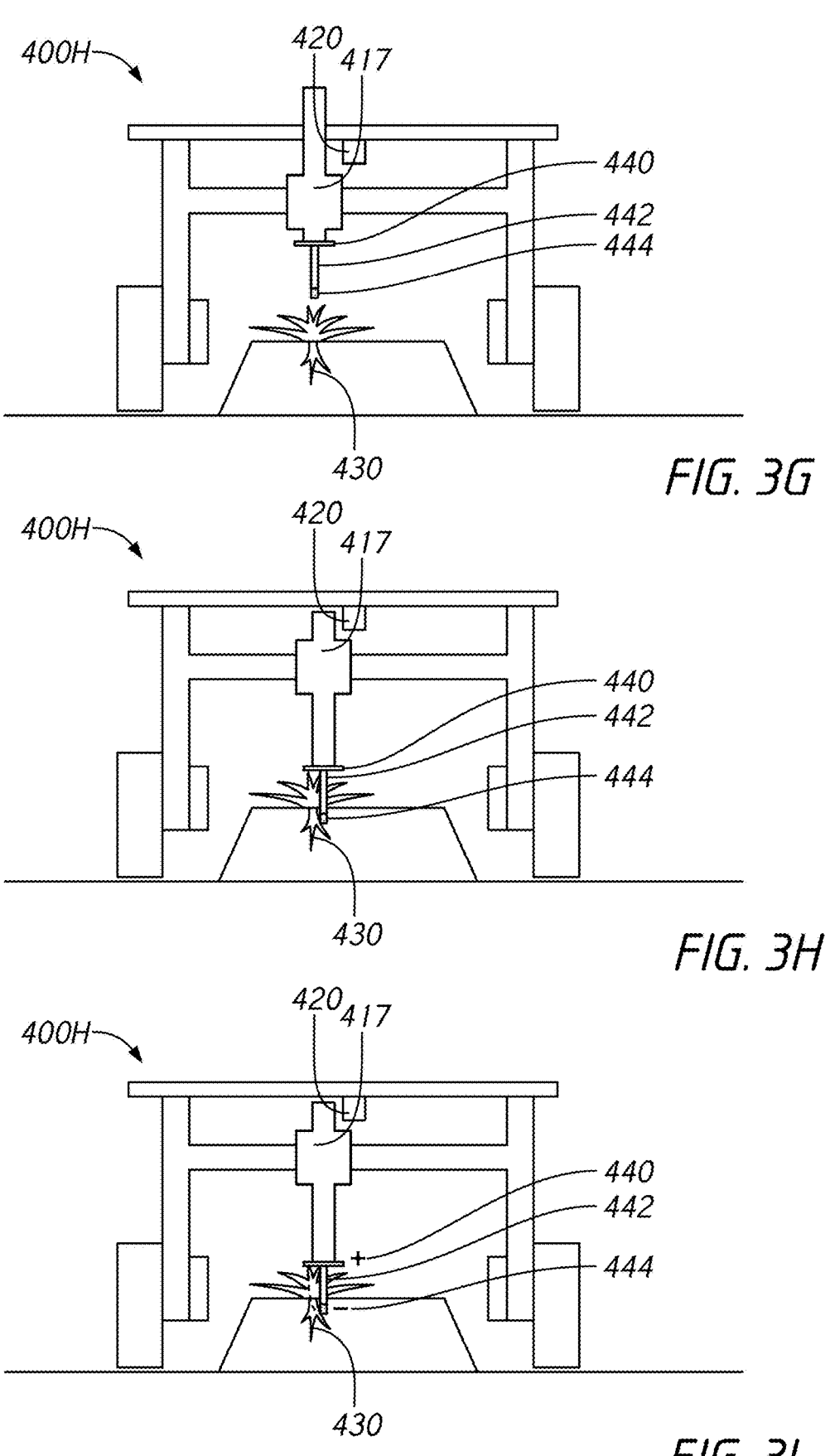
FIG. 3G is a diagram of a front view of a ground robot with an end effector with a single probe for eliminating weeds where the gantry is in a retracted position, according to an embodiment.
FIG. 3H is a diagram of a front view of a ground robot with an end effector with a single probe for eliminating weeds where the gantry is in an extended position and the probe is making contact with a weed, according to an embodiment.
FIG. 3I is a diagram of a front view of a ground robot with an end effector with a single probe showing the electrical circuit when the high voltage system is activated, according to an embodiment.

FIG. 3H shows a circuit 400G for eliminating or weakening weeds through their roots wherein there is a current path from positive probe 450 to negative probe 452 through the resistance for weed 456 and resistance of ground 454. In some embodiments, two or more weeds may be added to the circuit in series, where all weeds would be eliminated or weakened. In some embodiments, positive probe 450 and negative probe 452 are controlled by a CPU connected to a camera wherein the probes are moved to locations of weeds determined by the CPU and the circuit is activated only when the probes have reached the locations determined by the CPU.

FIG. 3G-I shows an embodiment where ground robot 411 has a single probe 442 comprised of a negative region 444 near the terminating end of probe 442 and a positive region 440 along the body or at the base of probe 442. In some embodiments, negative region 444 is a sharp or rounded tip, positive region 440 is a collar, and the region between negative region 444 and positive region 440 is an insulator. As shown in FIG. 4H, camera 420 takes an image, records a video, and/or the like, and the CPU analyzes the image to locate the weed; the CPU then communicates with the motors of controlling the position of the gantry and end effector assembly 417 to move the probe to the approximate position of the weed and extend probe 442 towards the weed. Once negative region 444 of probe 442 makes contact with the ground and positive region 440 makes contact with the weed, a switch flips to activate the high voltage circuit and the weed is electrocuted. In some embodiments, the switch is turned on based on the camera determining when probe 442 makes contact with the ground and the weed.

After the weed is eliminated, the switch is turned off and probe 442 retracts. In some embodiments, the switch is turned on to activate the circuit for a predetermined amount of time (t). In some embodiments, the predetermined amount of time is between 1-5 seconds. In some embodiments, the predetermined amount of time for the high voltage circuit to be switched on is based on any combination of weather, size of the weed, moisture level (humidity), and weed type. CPU receives inputs for parameters that determines the amount of time need to weaken and eliminate weeds. In some embodiments, the model for predicting predetermined amount of time is adjusted based on feedback from aerial inspection data after weed control that determines efficiency of the model. Predetermined times will be adjusted accordingly. In some embodiments, the model for predicting predetermined amount of time is adjusted based on feedback from ground robot inspection data after weed control that determines efficiency of the model. Predetermined times will be adjusted accordingly.

In some embodiments, the camera could be used in combination with at least one sensor that could be capable of measuring voltage or resistance such as a comparator or ADC, ultra-sonic sensors, force feedback sensors, or the like. In some embodiments, a camera could be replaced by at least one sensor capable of measuring voltage or resistance such as a comparator or ADC, ultra-sonic sensors, force feedback sensors, or the like.

FIG. 15A-D shows alternatives of ground robot designs and configurations. In some embodiments, the ground robots can perform electrical weed control described herein.

As shown in FIG. 4A, ground robot 500 comprises at least one solar panel 501, at least one energy storage device 503, high voltage booster 511, switch 509, CPU 507, camera 505, negative probe 513, and positive probe 515 to weaken and eliminate weeds. Robot 500 moves on a farmland and camera 505 takes imagery, records a video, and/or the like. CPU continuously analyzes the imagery being taken, and when the CPU identifies a weed, switch 509 connected to energy storage device 503 and high voltage booster 511 are activated, where high voltage booster 511 is connected to positive probe 515 and negative probe 513. In some embodiments, the voltage of solar panel 501 is between 20 volts and 300 volts; the voltage of energy storage device 503 is between 12 volts and 240 volts; and the voltage of high voltage booster 511 is between 3,000 volts and 60,000 volts. In some embodiments, solar panel 501 generates 100 watts of power. In some embodiments, high voltage booster 511 is a pulsed circuit transformer. In other embodiments, high voltage booster 511 is a current source or negative ion generator. After positive probe 515 and negative probe 513 create a circuit through the weed and ground for a predetermined amount of time, the switch 509 disconnects energy storage device 503 and high voltage booster 511. In some embodiments, there is no energy storage device 503 and the switch 509 connects high voltage 511 and solar panel 501 where solar panel 501 provides power for CPU 507 and camera 505. In this case, positive probe 515 and negative probe 513 are stationary. In some embodiments, the circuit for eliminating weeds of robot 500 is a direct current (DC) circuit. In some embodiments, the energy storage device is a battery.

In some embodiments, robot 500 comprises at least one solar panel 501, high voltage booster 511, switch 509, CPU 507, camera 505, negative probe 513, and positive probe 515 to eliminate weeds. In some embodiments, switch 509 is a relay. In some embodiments, positive probe 515 and negative probe 513 are combined into a single probe that moves to the location of a single weed. In some embodiments, the voltage of energy storage device 503 is between 12 volts and 240 volts. In some embodiments, the voltage of energy storage device 503 is between 24 volts and 240 volts and/or the like. In some embodiments, there is a super-capacitor bank with the energy storage device on the low voltage side. In some embodiments, the system comprises one or more capacitors on the high voltage side. In some embodiments, the one or more capacitors may comprise one or more super-capacitors. In some embodiments, robot 500 includes memory 525. In some embodiments, memory 525 is connected to CPU 507.

Figure 4B:
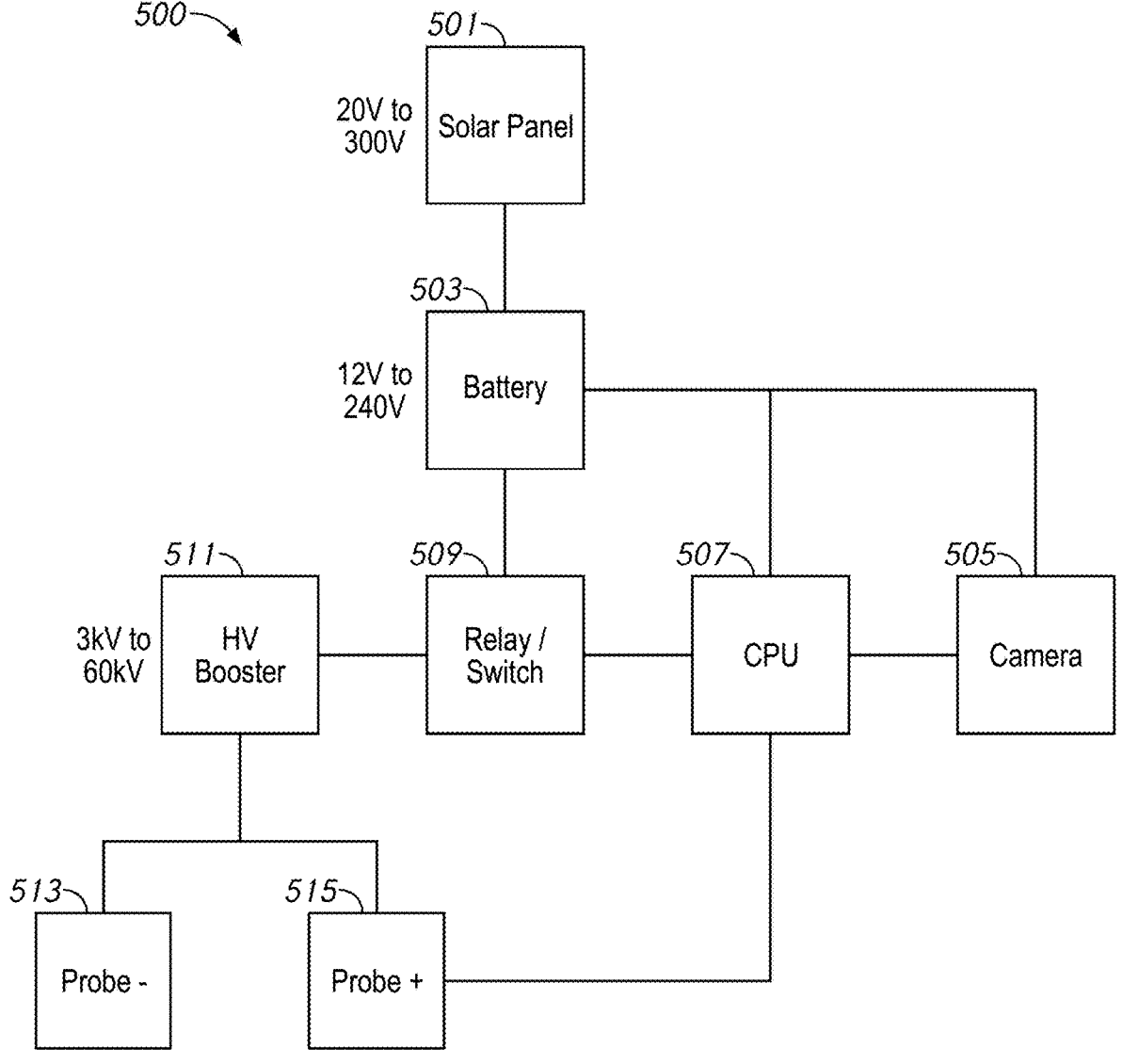
FIG. 4B is a diagram of a weed control circuit used in robots to electrocute a weed through the roots of said weed in FIG. 4A, where the position of the probes is controlled by a CPU, according to an embodiment.
Figure 14:
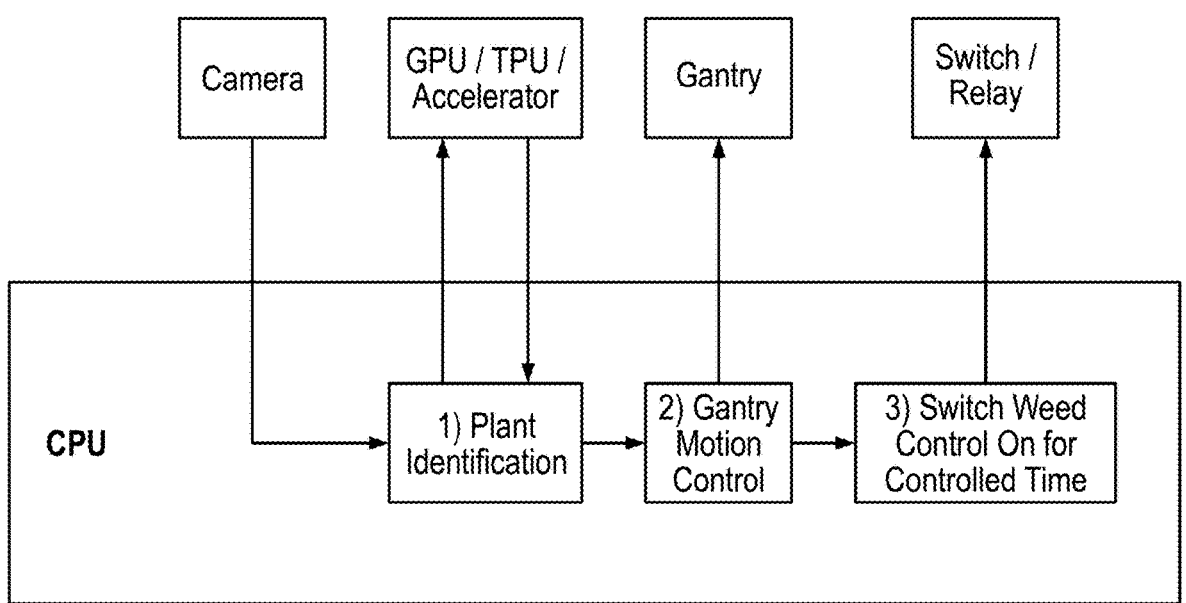
FIG. 14 is a schematic of a software control flow for a ground robot for identification of weeds, movement of end effector, and activation of high voltage circuit, according to an embodiment.
Figure 15A:
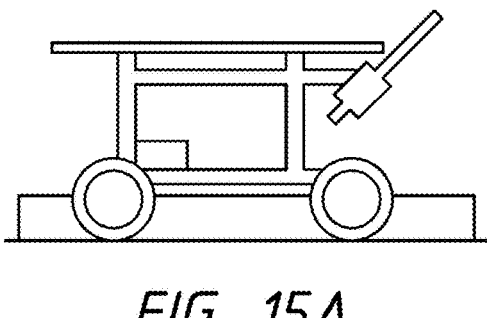
FIGS. 15A-15F show alternative designs for weed control robots with end effectors and probes in various positions to perform weed control, according to an embodiment.
Figure 15B:
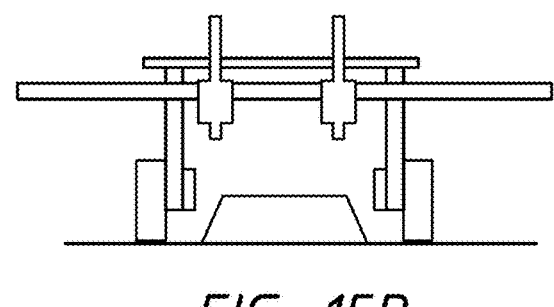
Figure 15C:
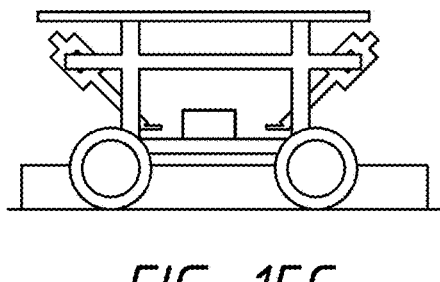
Figure 15D:
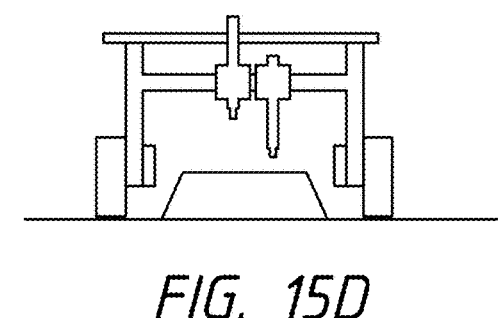
Figure 15E:
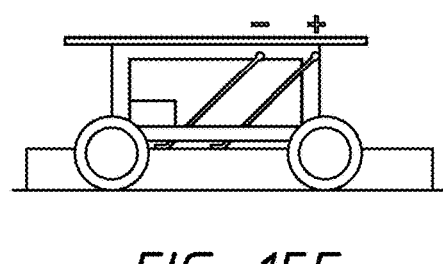
Figure 15F:
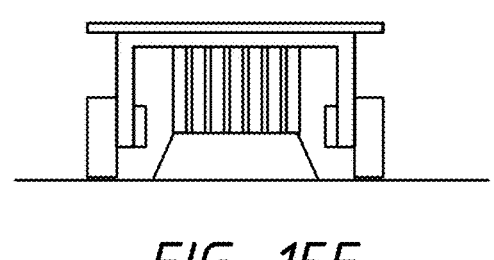

As shown in FIG. 4B, another embodiment of ground robot 500 wherein positive probe 515 and negative probe 513 are components of an end effector that is attached to a gantry, where the gantry is controlled by the CPU and moves on a track system with motors or other methods to a specific position determined by CPU 507. In some embodiments, the end effector is configured such that the probe tip is oriented at angle to the ground (see FIG. 21). In some embodiments, the angle is between 20-75 degrees. In some cases, positive probe 515 moves to a position of a weed determined by CPU 507 analysis of image taken by camera 505 and negative probe 513 moves to a position of ground determined by CPU 507 analysis of image, video, and/or the like taken by camera 505. Once the probes are in the position and camera verifies the position, the switch is turned on and the high voltage circuit is activated to eliminate the weeds. This process creates a safety mechanism since the camera verifies that a human or animal is not present in the circuit prior to the high voltage circuit being activated. In some embodiments, the positive probe and negative probe are a single probe as described in FIGS. 3G-I. FIG. 14 shows a software diagram where the image is processed by the CPU, and the CPU identifies the weed, controls the gantry and end effector assembly, and controls the switch to turn on the high voltage circuit to weaken or eliminate weeds. In some embodiments, image processing is performed by the GPU, TPU, or accelerator onboard the ground robot.

High Speed Precision Weeding with Camera and GPU.

As shown in FIGS. 5A & B, an embodiment of high-speed precision weeding system 600, ground robot 611 includes a frame 650 which comprises, among other elements, an undercarriage portion 652, and may be coupled to wheels 614 to travel along crop row 603 to find weeds. In some embodiments, motor and gearboxes 619 are coupled to ground robot 611. In some embodiments, ground robot 611 uses camera (for example, such as camera 420 in FIG. 3A) to detect weed 630 in crop row 603. When camera takes an image, records a video, and/or the like, and CPU (for example, like CPU 507 in FIG. 4A) determines the existence and location of weed 630, high voltage circuit (for example, like HV Booster 511 in FIG. 4A) is enabled and the closest finger 616 moves towards the weed. Each finger is controlled by a motor 617. In some embodiments, fingers 616 have contain a tip 618 at the distal end of 616. In some embodiments, ground robot is powered by solar panel 615. In some embodiments, multiple fingers can move to eliminate more than one weed at a time. In some embodiments, one finger moves to the weed and another finger moves towards the ground. In some embodiments, the wheels are made of metal or have metal studs to act as the negative probe to connect the circuit to the ground. In some embodiments, ground robot 611 is powered by batteries (for example, like battery 503 in FIG. 4A). In some embodiments, ground robot 611 is powered by solar panels 615 and batteries wherein solar panels 615 charge batteries. In some embodiments, the fingers are stationary and drag across the ground as shown in FIG. 23E &F wherein the camera and CPU identify the streamer to activate the high voltage switch to eliminate the weed closest to the weed of interest. In some embodiments, the ground robots can perform electrical weed control described herein. In some embodiments, image processing is performed by the GPU, TPU, or accelerator onboard the ground robot.

Method for Precision Weeding with Camera and CPU.

FIG. 6 shows an embodiment of a process flow diagram 700 illustrating an example of precision weed control with ground robot 401 (where ground robot 401 can be any ground robot disclosed herein, such as ground robot 411, 611, and/or the like). The process flow illustrated in FIG. 6 may be performed by a ground robot while in operation at, for example, a farmland while performing a crop inspection.

At block 730, the process begins when ground robot uses a camera to take an image, records a video, and/or the like, of the farmland. At block 731, the CPU on-board the ground robot identifies the existence and location of a weed. In some embodiments, image processing is performed by the GPU, TPU, or accelerator onboard the ground robot.

At block 732, if a weed was identified in block 731 the high voltage circuit switch is activated.

The process flow then varies depending on whether it would be better, more efficient, and/or the like to move the negative probe to the ground or to another weed. For example, if multiple weeds are within reach of the probe, the AI system may choose to move the negative probe to another weed to complete the circuit. If the AI system decides it would be better to move the negative probe to the ground, the process flow proceeds to block 734. If the AI system decides it would be better to move the negative probe to another weed, the process flow proceeds to block 740.

At block 734, the ground robot extends the high voltage positive probe that is closest to the weed to the weed and the negative probe to the ground. At block 736, the positive probe contacts the weed and the negative probe contacts ground, connecting the weed and the ground to the high voltage circuit for a substantial amount of time (t) to eliminate the weed. The time to eliminate the weed is dependent on the size of the high voltage booster (pulsed transformer circuit), voltage, and the size of the power source. As the voltage increases, the size of the transformer increases, or the size of the power source increases, the time to eliminate weeds when the probes are making contact with the weed and ground decreases.

At block 744, when the weed is eliminated or weaken, the high voltage switch is inactivated, and the positive probe and negative probe are retracted.

At block 740, the ground robot extends the high voltage positive probe to one weed and the negative probe to the other weed. At block 742, the positive probe contacts one weed and the negative probe contacts another weed, connecting the two weeds to the high voltage circuit for a substantial amount of time (t) to eliminate the weed. At block 744, when the weeds are eliminated or weaken, the low voltage switch is inactivated, and the positive probe and negative probe are retracted.

Solar Optimization.

Solar power can be important to sustain passive power requirements that could be used to power data transfer, electrical weed control, data compression, low voltage power systems, or communication systems. Power consumption for transferring data to satellites is approximately 25 watts. Power consumption for transferring data to cellular networks is approximately 2.5 watts. Power consumption for transferring data to Wi-Fi is approximately 1.5 watts.

With traditional ground robots, the current robots would run out of battery very quickly when transferring data and have to perform a large number of battery swaps. However, with the ability to charge while moving on the ground and in the air, the ground robots in this embodiment are able to transfer data throughout the day when the sun is out and do not require centralized charging. The systems disclosed herein enable the entire network to be in remote and rural areas since there is no infrastructure or human involvement needed.

This technology eliminates the need for a large infrastructure of charging stations and creates sustainable surveillance and inspection methods. By enabling the robots to charge on the ground or in flight, the robots essentially have unlimited range while using clean energy.

Figure 7:
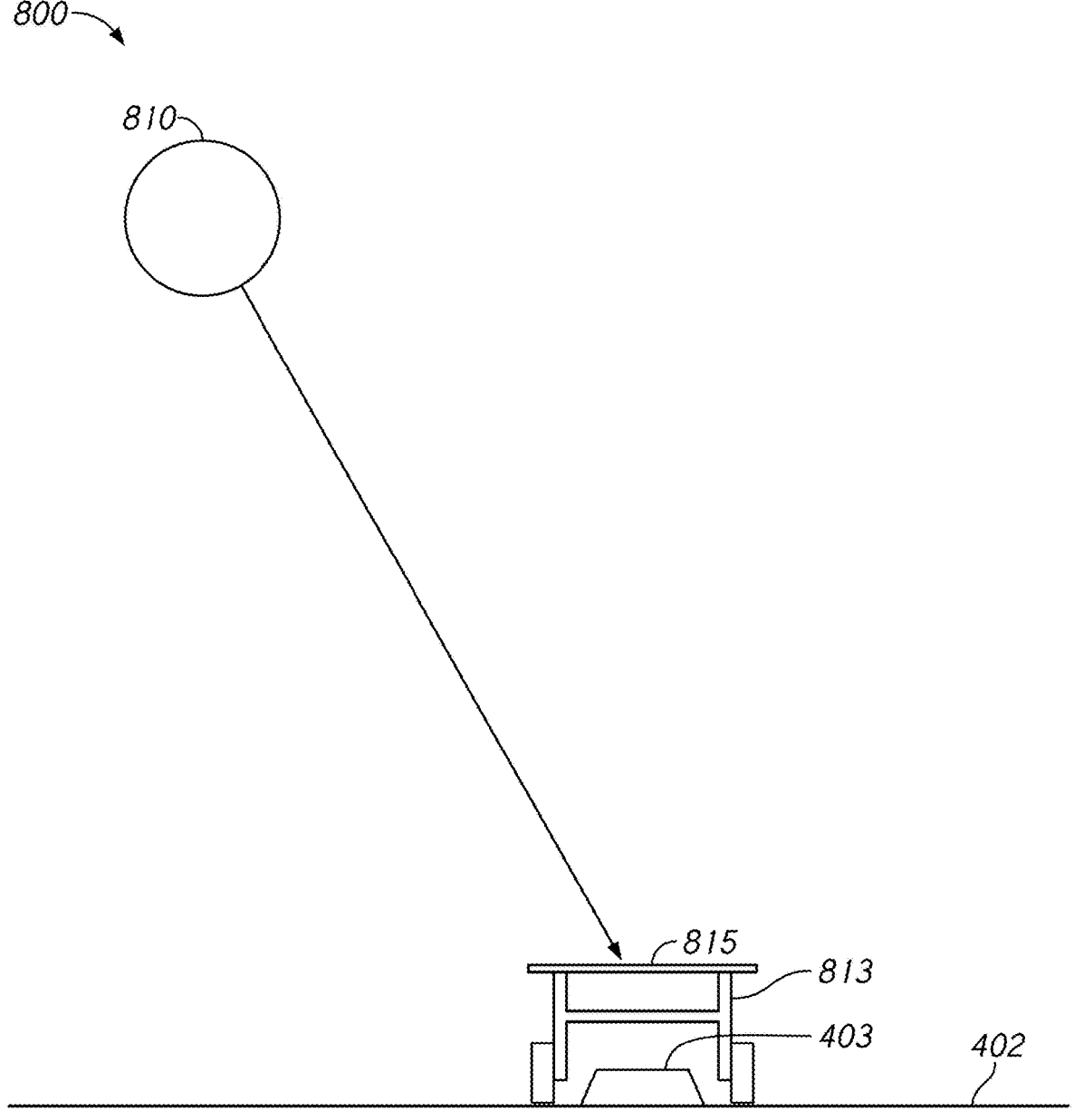
FIG. 7 is a diagram of solar charging ground robots in Collaborative Robot Network, according to an embodiment.
Figure 8:
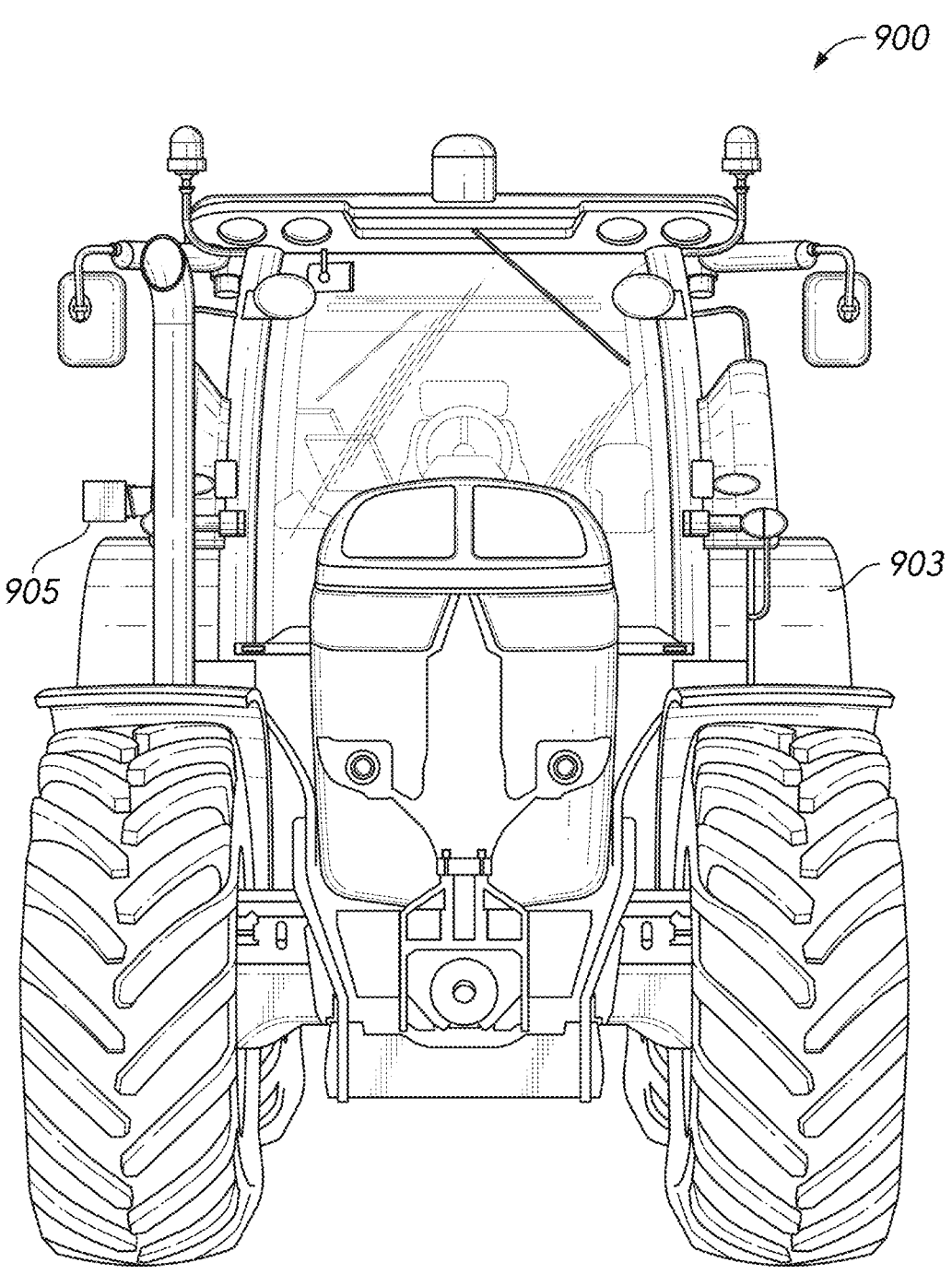
FIG. 8 is a front view of a tractor, according to an embodiment.

FIG. 7 shows an embodiment of solar optimization system 800. FIG. 8 illustrates the path of the solar rays emitted from the sun 810 to the solar panels 815 of the ground robot 813. Most tractors and farm machines require gas for power; however, in some embodiments, ground robot 813 uses solar energy to move up and down the fields and take actions, such as eliminating weeds.

In yet another embodiment, ground robot 813 has solar panels and batteries. By having both solar panels and batteries, the ground robots are able to transfer data and perform actions via solar power during the day and batteries during the night. The batteries can be fully charged when the sun goes down.

Tractors and Other Farming Machines.

Shown in FIG. 8 is an embodiment farming machines 900. Inspection robots inspect farmland and identifies areas of interest for tractor 903 to take action on. In some embodiments, inspection robots take pictures of farmland and analyzes data with on-board AI processor to identify areas on the farmland with weeds. Inspection robots transfer data regarding areas with weeds to tractor 903, and tractor 903 sprays identified areas of concern with pesticides. This practice reduces wear on the tractor and soil compaction that will help preserve the farming equipment and reduce crop yield loss. In some embodiments, inspection robots can identify where standing water or high moisture content exists on the field and transfer these areas back to the tractor to avoid the areas to prevent damage to the tractor and the field itself.

In some embodiments, inspection robots can attach to combines, fruit pickers, harvesters, and/or the like. In some embodiments, inspection robots can provide a Wi-Fi connectivity signal to tractor 903 in order to transfer data and interface with other machines or sensors. In some embodiments, inspection robots can act as an antenna for tractor 903 to enable transfer of data, such as crop yield or loss to farmer or agriculture professional.

Wi-Fi Network and Robot Network Interface.

Figure 9:
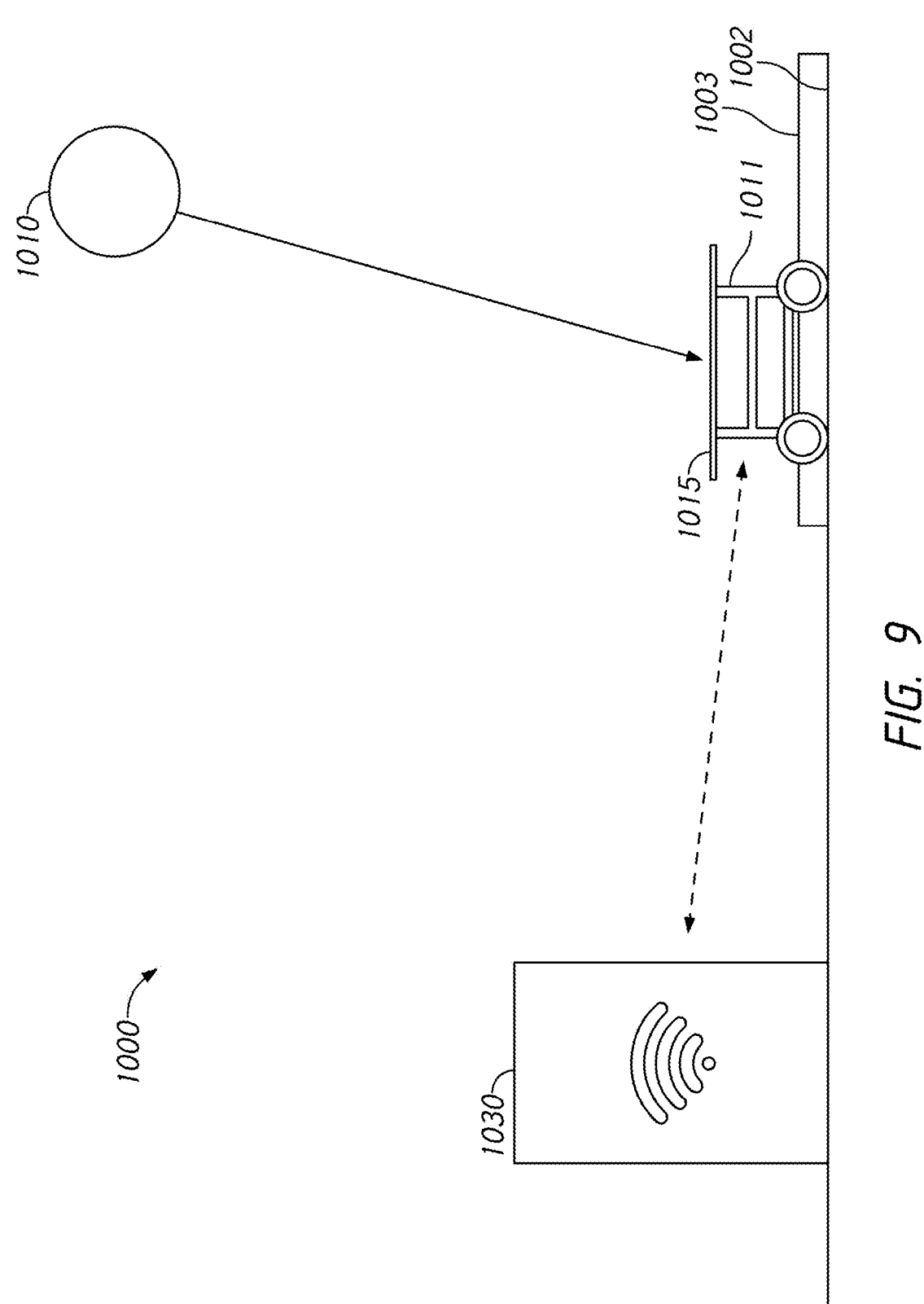
FIG. 9 is a diagram of Collaborative Robot Network wherein a ground robot is connected to a Wi-Fi network, according to an embodiment.

As shown in FIG. 9, an embodiment of Collaborative Robot Network 1000 generally comprises at least one inspection robot (not shown), at least one Wi-Fi Network 1030, at least one ground robot 1011, and sun 1010. Inspection robot may fly or move on the ground 1002 to collect data with sensors or cameras. Ground robot 1011 has the ability to move on farmland 1003 and perform actions, such as take imagery or perform weed control. In some embodiments, inspection robot attaches to ground robot 1011 to charge and seek protection during extreme weather events. In some embodiments, inspection robot transfers imagery to ground robot to perform analysis of data with on-board AI processer of ground robot 1011.

In some embodiments, sun beams emitted from sun 1010 hit solar panel 1015 of ground robot 1011 to provide power for ground movement, data collection, and data transmission to Wi-Fi connection 1030. In order to transmit data over, ground robot must be within 500 feet of the connection. Inspection robots can transfer imagery data over private LTE network to ground robot, and ground robot 1011 can transfer data via Wi-Fi to cloud analytics software provider. In some embodiments, Wi-Fi connection could be in a building or at a farm. In some embodiments, ground robot 1011 is positioned within 500 feet of potential user, such as a home, business, building, or person. Ground robot 1011 transfers Wi-Fi with the nearest inspection robot that remotes Wi-Fi connection ground robot through a network of inspection robots linked to a network in another area.

Private User and Robot Network Interface

Figure 10:
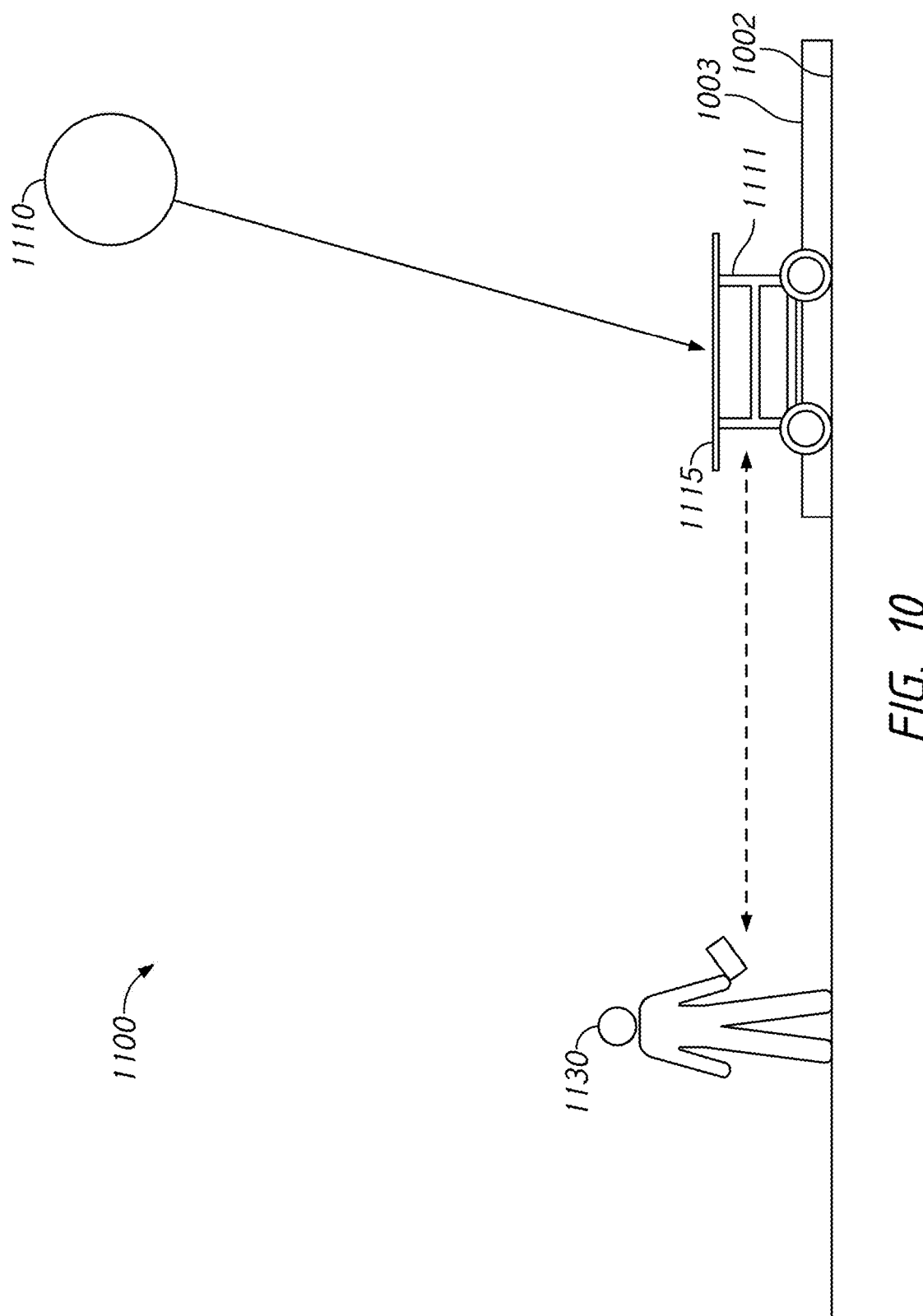
FIG. 10 is a diagram of Collaborative Robot Network wherein ground robot is transmitting data from a person, according to an embodiment.

FIG. 10 shows ground robot 1111 transferring data from user 1130. In some embodiments, data may be cell phone calls, text messages, emails, pictures, or videos. The user will have a chip in his device that specifies a frequency allowing the user to access the private network. Once the data is transferred onto the ground robot 1111, the data is transferred back to Collaborative Robot Network 1100 comprised of inspection robots (not shown) and/or ground robots. The closest robot to the cell tower transfers data directly to the cellular tower. In 1100 dynamic telecommunication network, users will access the nearest robot to transfer data. In some embodiments, the user must be within 30 miles the nearest network robots. Private network robots can move on the ground or fly to where users have requested data. If service subscriptions are cancelled, the private network robot can be repositioned easily. In some embodiments, sun beams emitted from sun 1110 hit solar panel 1115 of ground robot 1111 to provide power for ground movement, data collection, and data transmission to user 1130.

Method for Inspection and Immediate Action by Robots.

Inspection robots can perform an inspection of an agriculture asset and various forms of analyzing the data and transferring the data to a farmer. In some embodiments, the agriculture asset is a group of crops, such as sugar beets, corn, and/or the like. In some embodiments, the agriculture asset is a group of livestock, such as cattle, sheep, and/or the like.

In some embodiments, the inspection robot takes off from the ground 1002 or takes off from ground robot 1011. The inspection robot begins to scan the agricultural asset 1003. The inspection robot completes the scan of the agricultural asset. For example, a completed scan may be scanning a certain number or crop rows, a certain number of livestock, a certain number of fields and/or the like. Depending on the embodiment, the inspection robot may use different methods to analyze the data from the scan.

In some embodiments, the inspection robot uses an on-board AI processor to analyze data from the scan. The analysis of the agricultural asset 1003 is compiled in a report and sent to farmer, agricultural professional, and/or the like.

In some embodiments, the inspection robot transfers data from the scan to cloud 1030 for analysis. The cloud 1030 performs analysis on the data. The analysis of the agricultural asset 1003 is compiled in a report and sent to farmer, agricultural professional, and/or the like.

In some embodiments, inspection robot transfers data from scan to ground robot 1011. In some embodiments, ground robot 1011 uses AI processor to analyze the data. The analysis of the agricultural asset 1003 is compiled in a report and sent to farmer, agricultural professional, and/or the like.

In some embodiments, the inspection robot identifies an area where it may appear to have an issue with a plant disease, and ground robot will analyze the data and travel to the area to capture more images. The images from the inspection robot and the ground robot will be analyzed and compiled into a report with recommendations to the farmer on crop health and weed populations.

The inspection robot begins to scan the agricultural asset 1003. Inspection robot completes the scan of the agricultural asset 1003. For example, a completed scan may be scanning a certain number or crop rows, a certain number of livestock, a certain number of fields and/or the like. Inspection robot transfers data from scan to ground robot 1011.

In some embodiments, inspection robot uses AI processor to analyze the data and identify areas that require action. The ground robot 1011 determines the distance from the areas that require action. The closest ground robot travels to the area that requires action. Ground robot 1011 takes action identified by analysis. For example, the action may be herding livestock, removing weeds, performing a crop inspection, digging holes and/or the like.

In some embodiments, the ground robots communicate with each other to determine which ground robot should travel to the area that requires action. For example, some robots might be presently occupied with a task and will continue completing the tasks even if they are the closes robot. Some robots may have special equipment for completing the required action.

In some embodiments, the inspection robot takes off from the ground 1002 or takes off from ground robot 1011. Inspection robot begins to scan a field of crops 1003 to find weeds. Inspection robot completes the scan of the field of crops 1003. Inspection robot then transfers data from scan to ground robot 1011.

Ground robot 1011 uses AI processor to analyze the data and identify areas of the field of crops 1003 where weeds are present or starting to spread. The ground robot 1011 determines the distance from the areas with weeds. The closest ground robot travels to the area that requires action. In some embodiments, there may be more than one ground robot on the farm and the ground robot will communicate with other ground robots to determine which robot is closest to the area with weeds and the closest robot will travel to the area and perform weed control. Ground robot 1011 performs weed control. In some embodiments, the weed control may be with chemical, mechanical, machine, or electrical means or any combination thereof.

In some embodiments, the inspection robot can perform re-inspection of a plot of land after ground robot performs weed control. The inspection robot will take images, records a video, and/or the like of crops and weeds prior to weed control and after weed control to determine weed elimination efficiency and if there is damage to crops during the process.

The inspection robot takes off from the ground 1002 or takes off from ground robot 1011. The inspection robot begins to scan a field of crops 1003. Inspection robot completes the scan of the field of crops 1003. Inspection robot transfers data from scan to ground robot 1011.

Ground robot 1011 uses AI processor to analyze the data and identify areas of the field of crops 1003 that need further inspection. The ground robot 1011 determines the distance from the areas that require inspection. The closest ground robot travels to the areas that that need further inspection. In some embodiments, there may be more than one ground robot on the farm and the ground robot will communicate with other ground robots to determine which robots are closest to the areas that require further inspection, and the closest robots will travel to the areas.

Ground robot 1011 performs additional inspection. In some embodiments the additional inspection could be additional scanning, sampling, and/or the like. Ground robot superimposes data into inspection robot scanning and compiles a report for farmer. In some embodiments, the ground robot will compile a report based on the imagery to show the metrics to the farmer.

Moveable Solar Panel on Ground Robot for More Effective Solar Charging

Figure 11:
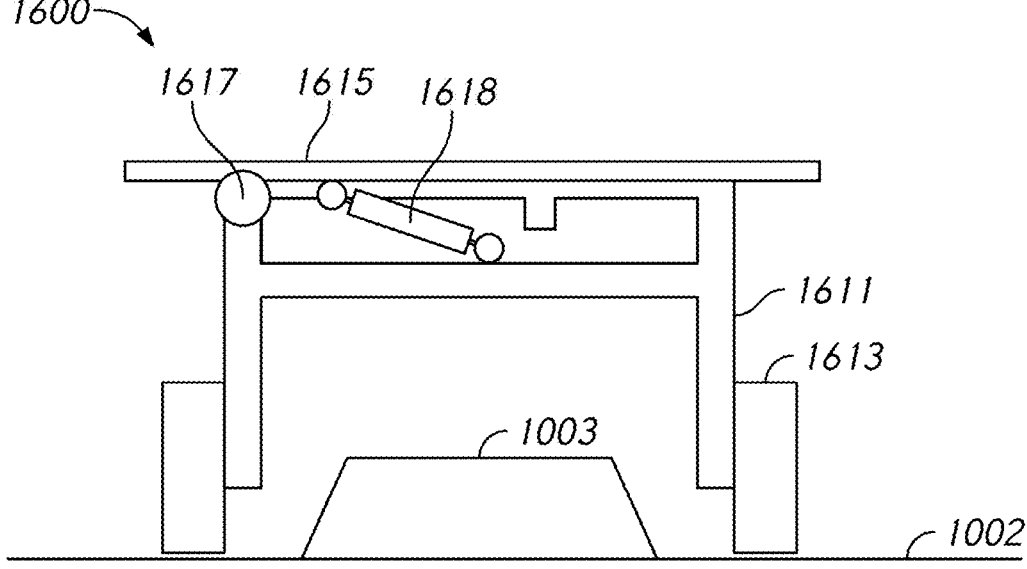
FIG. 11 is a diagram of Collaborative Robot Network showing a side view of a ground robot with a movable solar panel, according to an embodiment.
Figures 16A, 16B:
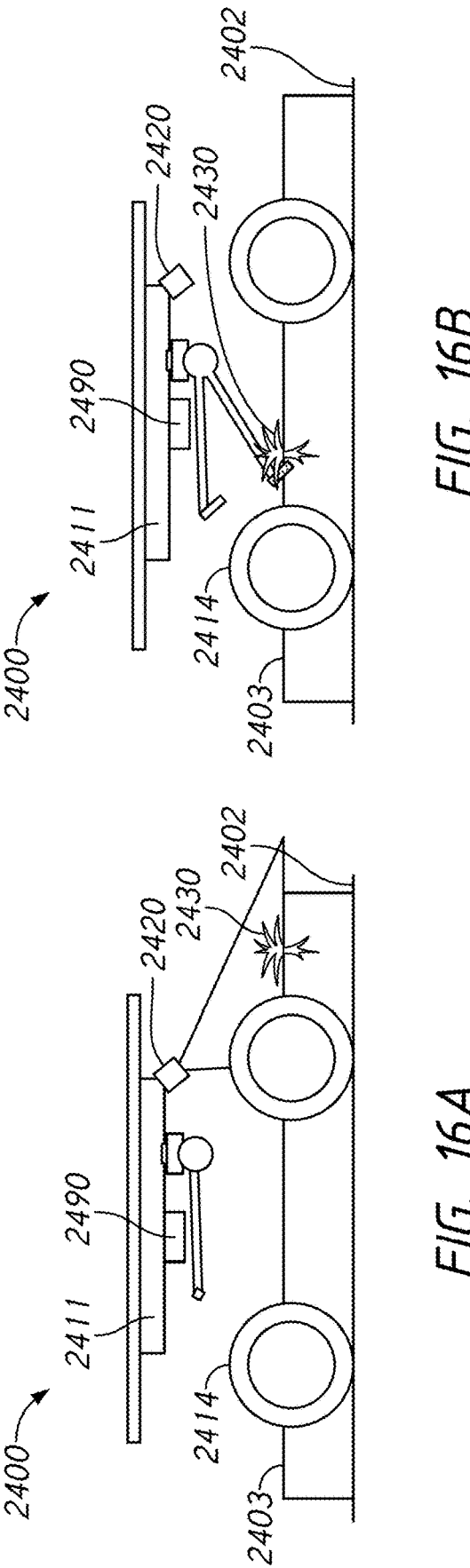
FIG. 16A is a diagram of a Hybrid Electrical Mechanical Autonomous Ground Vehicle performing an inspection, according to an embodiment.
FIG. 16B is a diagram of a Hybrid Electrical Mechanical Autonomous Ground Vehicle taking advanced mechanical action on farmland, according to an embodiment of the disclosure.

As shown in FIG. 11A, an embodiment Collaborative Robot Network 1600. Ground robot 1611 comprises moveable solar panel 1615, pivot 1617, linear actuator 1618, robot frame, perch bar 1619, and at least two wheels 1613. FIG. 16A shows linear actuator 1618 in a fully retracted position. In some embodiments, linear actuator 1618 is a pneumatic linear actuator. In some embodiments, linear actuator 1618 is a hydraulic linear actuator. Linear actuator 1618 can extend to angle solar panel 1615 towards the sun, which can result in up to, for example 35% more efficiency in solar charging. In some embodiments, the increase in solar charging efficiency can be 5%, 10%, 15%, 20%, 25%, 30%, 35%, 40%, and/or the like. As linear actuator 1618 extends or retracts, moveable solar panel 1615 pivots about pivot 1617. Pivot 1617 could be on either side of the robot. In some embodiments, pivot 1617 is a hinge mechanism capable of at least 60 degrees of rotation. In some embodiments, wheels 1613 may be a track system for ground movement. In some embodiments, inspection robot is attached to ground robot 1611 and is capable of charging inspection robot. In some embodiments, ground robot 1611 charges inspection robot with solar power. In some embodiments, ground robot 1811 charges inspection robot with battery power. In some embodiments, a first latching leg of inspection robot is a positive terminal and a second latching leg of inspection robot is a negative terminal. In some embodiments, ground robot 1611 can include a positive region and a negative region to which the first and second latching legs of inspection robot can attach. When both legs are in contact, then a circuit is created to charge the battery of the inspection robot with a current path through the latching legs of the inspection to the battery (for example, like battery 503 in FIG. 4A) of inspection robot. In some embodiments, the solar panel 1615 is coupled to ground robot 1611.

Figures 12A, 12B, 12C:
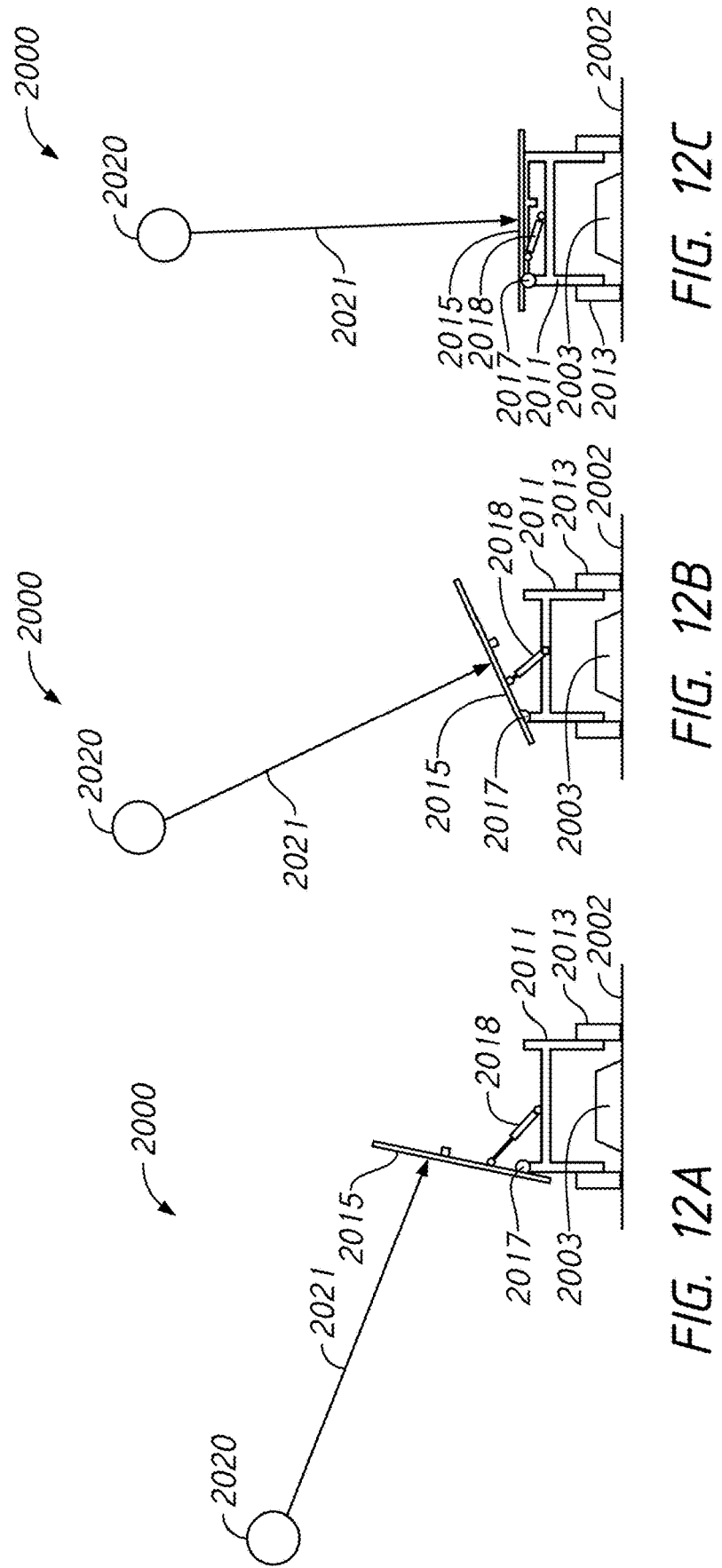
FIG. 12A is a diagram of Collaborative Robot Network showing a front view of a ground robot with a movable solar panel aligned to the sun for solar charging, according to an embodiment.
FIG. 12B is a diagram of Collaborative Robot Network showing a front view of a ground robot with a movable solar panel aligned to the sun at yet another position for solar charging, according to an embodiment.
FIG. 12C is a diagram of Collaborative Robot Network showing a front view of a ground robot with a movable solar panel aligned to the sun at the highest point in the sky for solar charging, according to an embodiment.
Figure 20A:
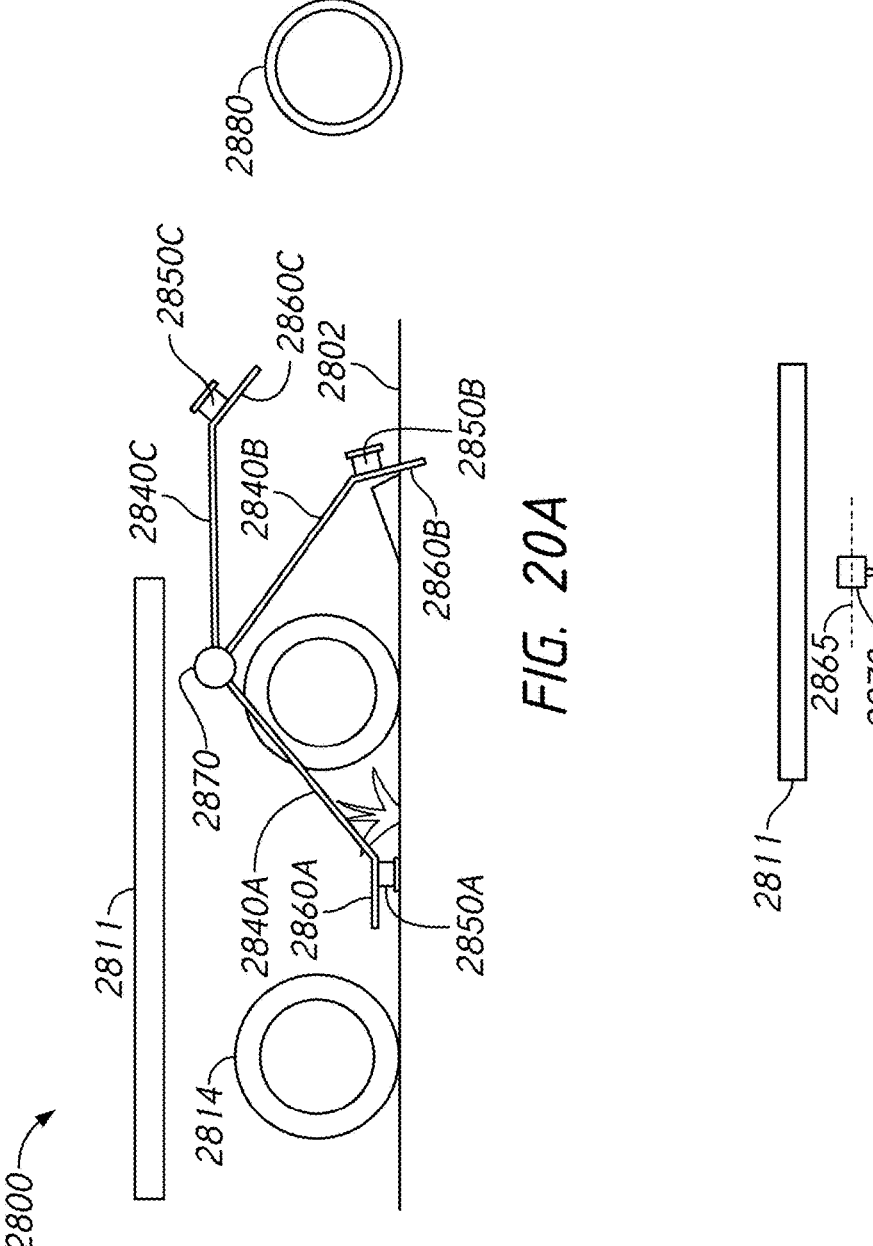
FIG. 20A is a diagram of a Hybrid Electrical Mechanical Autonomous Ground Vehicle showing three functional mechanical arm positions, according to an embodiment of the disclosure.
Figure 20B:
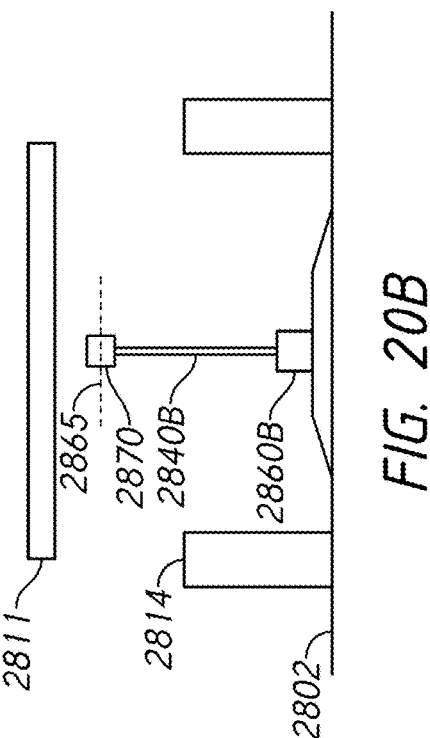
FIG. 20B is a diagram of a Hybrid Electrical Mechanical Autonomous Ground Vehicle showing a front view.

FIGS. 12A-12C show an embodiment Collaborative Robot Network 2000. FIGS. 20A-20C illustrate the placement of moveable solar panel 2015 of ground robot 2011. By identifying the location of sun 2020 with a camera and controlling linear actuator 2018 to orient solar panel 2015 to the sun 2020 for an optimal angle for sun beam 2021, ground robot 2015 is able to increase its charging rate in up to, for example 35%. In some embodiments, the increase in charging rate can be 5%, 10%, 15%, 20%, 25%, 30%, 35%, 40%, and/or the like. As sun 2020 moves in the sky, the CPU will control linear actuator 2018 to angle solar panel 2015 towards sun 2020. In some embodiments, ground robot 2011 travels on wheels 2013 on ground 2002 down crop row 2003 in order for sun 2020 to be on the same side as hinge 2017. In order to do this, ground robot 2011 travels down one crop row, and at the end of the crop row, ground robot drives forward at a slight angle and then reverse the motors to travel down the next row. Ground robot 2011 will continue to use this method to keep the solar panel oriented towards the sun. In some embodiments, inspection robot may attach to ground robot 2011.

Ground Robot with Integrated Camera Angled Weed Control End Effectors.

Figure 13:
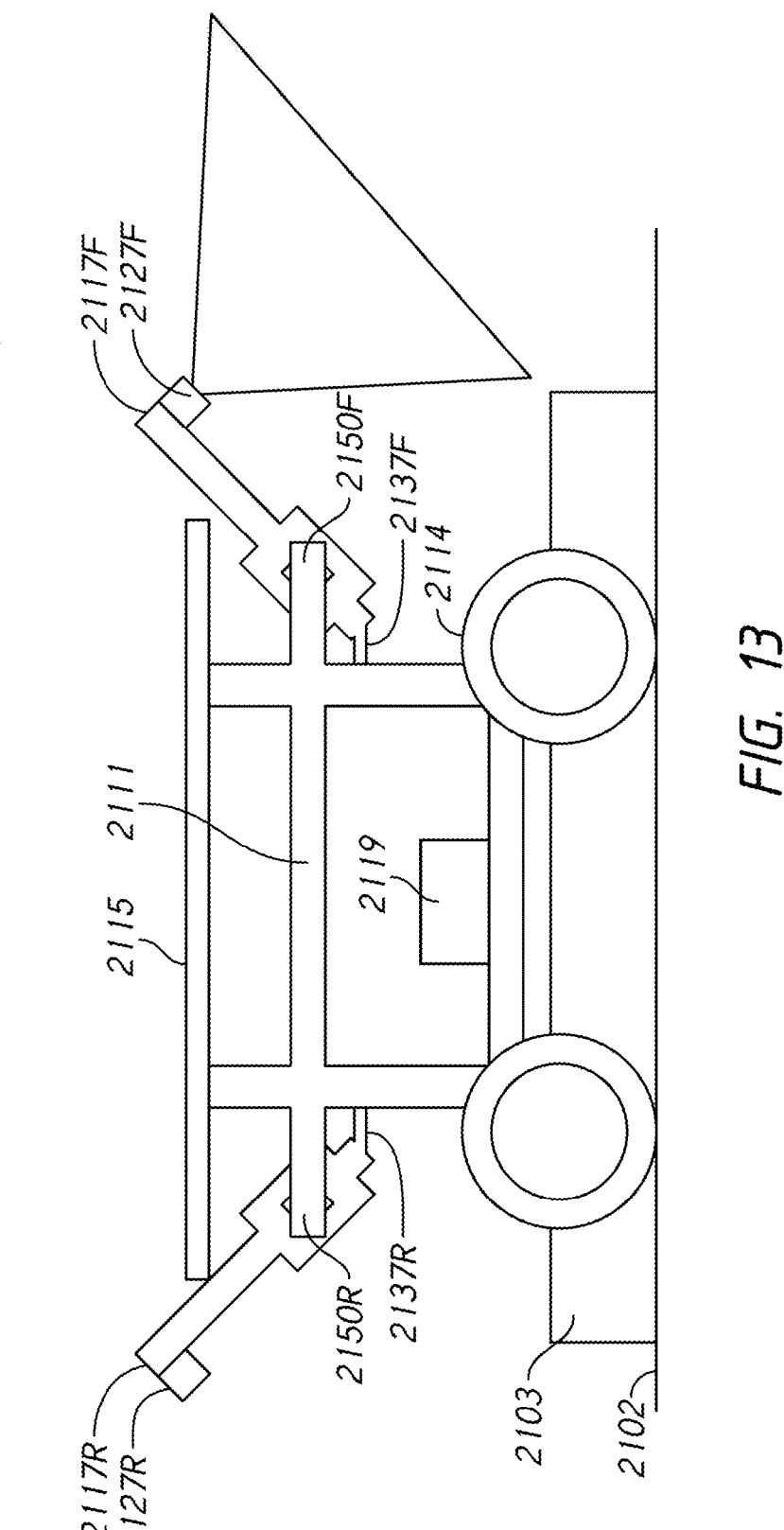
FIG. 13 is a diagram of a side view of a ground robot showing a rear end effector and forward end effector, where each gantry contains at least one camera, according to an embodiment.

As shown in FIG. 13, an embodiment Collaborative Robot Network 2100. Ground robot 2111 comprises at least one solar panel 2115, at least one rear gantry 2117R, at least one forward gantry 2117F, a frame, at least two wheels 2114, and at least one battery 2119. Each rear gantry 2117R comprises an end effector containing at least one probe 2137R, and each forward gantry comprises an end effector containing at least one probe 2137F. In some embodiments, each rear gantry 2117R comprises camera 2127R and end effector containing at least one probe 2137R, and each forward gantry comprises camera 2127F and end effector containing at least one probe 2117F. In some embodiments, rear gantry 2117R is coupled and/or connected to ground robot 2111 at 2150R. In some embodiment, 2150R may be a motor system to allow rotation in one or more plants of motion of rear gantry 2117R. In some embodiments, forward gantry 2117F is coupled and/or connected to ground robot 2111 at 2150F. In some embodiment, 2150F may be a motor system to allow rotation in one or more plants of motion of forward gantry 2117F. In some embodiments, the gantries are angled between 20-70 degrees and the end effectors are attached to a gantry that can move on a track system in up to 3 directions. This configuration is advantageous as it allows ground robot 2111 to move either in the forward or reverse direction since there are rearward and forward-facing cameras. Furthermore, if the probe of the forward end effector cannot contact a weed, then the probe of the rear end effector can contact the weed to weaken or eliminate the weed. This is important so that the ground robot does not have to travel back down the row if it misses a weed. In some embodiments, ground robot 2111 uses wheels 2114 to travel on ground 2102 along crop row 2103.

Some Disclosed Embodiments May Include One or More of the Following Benefits and Advantages The Collaborative Robot Networks disclosed herein may have at least one or more of the following advantages over traditional agriculture robotics and methods of weed control:

1. Early detection of weeds and long-term mitigation. By inspecting with the inspection robot and taking immediate action with ground robots, farmers are able to catch weeds early and remove them before seeding. Ground robots can perform mechanical, electrical, chemical, or hot oil weed control on the areas identified to eliminate the weeds prior to seeding. This will eliminate transfer of weed seeds in a specific field to the next year since in some cases weed seeds can stay in the ground for up to 5 years. Farmers will be able to stop future weeds from sprouting and spreading, decreasing the amount of weed controlled need in the future.
2. Flexible, continuous weed control. By continuously inspecting the fields, this system is able to perform effective weed control when environmental factors change to ensure weeds are removed at or before they reach a critical size prior to seeding.
3. Weed control without herbicides. In some embodiments, the ground robot described herein kills weeds by electrical means. Farmers are able to reduce the herbicides, water, and gasoline used in traditional weed control by using electricity to eliminate weeds.

4. Improved safety over other electrical weed control methods. Since the camera and CPU work together to identify a weed in order to activate the high voltage circuit, the risk of hurting a human or animal is greatly reduced compared to other electrical weeding methods. Furthermore, since the high voltage circuit is shut off after the weed control for each weed, a person servicing the robot is relatively safe. Also, the proposed circuit uses DC power instead of AC power. AC power stimulates sweating and causes muscular contractions in mammals, which makes it 4-5 times more dangerous for humans or animals in close proximity to the robots.

5. Compared to the traditional electrical weed control methods, this system saves power because the circuit is activated for a small amount of time only during weed control for an individual weed. Traditional electrical weed control has the electrical high voltage circuit continuously running in order to eliminate weeds, which requires large amounts of power that would make solar powered weeding difficult, if not impossible. Instead, large batteries are needed that increase the weight and complexity of the robots.

6. Compared to traditional weed control systems, the ground robot has the ability to take precise action on a specific weed which allows it to perform weed control very close to the crops. In row crops, this is critical because the farmer needs to remove the weeds closest to the crops because they compete with the crops for nutrients and water.

7. Compared to traditional systems, coupling the ground robot with an inspection robot allows the ground robot to be more efficient and address issues in a specific location based on the inspection robot's inspection data. This reduces the number of ground robots needed to monitor a parcel of land, especially when it comes to performing weed control. The inspection robot acts as a force multiplier for each robot improving the efficiency of the robot by at least 3 times compared to ground robots only.

8. Compared to traditional weed control systems, both the inspection robot and ground robot have electrical methods and mechanisms to eliminate weeds and eliminate pesticide use. By using a camera-controlled switch to enable the high voltage system, the proposed electric method of weed control ensures that people and animals will not be harmed by the robots since the circuit will not activate unless a weed is identified. Also, a single probe design further reduces the weight and complexity of the hardware required to build an end effector to facilitate electric weed control to eliminate or weaken weeds.

9. By using a moveable solar panel, the ground robot is able increase its charging efficiency by up to 35% by aligning the solar panel to the sun. In addition, the inspection robot can use the ground robot as shelter during extreme weather and charge when attached to the ground robot. This enables the collaborative network of robots to function with little to no infrastructure for farmers.

10. Compared to traditional inspection systems, collaboration between the ground robot and the inspection robot enables the system to gain higher resolution and more useful data. because the inspection robot can identify areas that need to be inspected close up by the ground robot. By superimposing this data, the farmer will have access to better data to take action. Also, in some cases, by having AI processors on board the ground robot, the collaborative robot network will be able to perform edge AI analysis that saves time and cost of transferring to the cloud for analysis.

11. Compared to traditional systems, the inspection robot can act as an antenna for the ground robot to minimize ground effect and facilitate data transfer between farms and cloud analysis software, which will enable next generation analytics at farms to increase yield and reduce waste. In some cases, a network of inspection robots could be connected to a ground robot and transfer data such as phone calls, text messages, and pictures in remote areas.

12. Edge AI with ground robots. With the ground robot, the inspection robot can transfer data directly to the ground robot which will have an accelerator, GPU, or TPU to analyze the data and transfer reports directly to the farmer. In some cases, the ground robot will transfer a point of interest to other ground robots or an inspection robot to take an action, such as weed control. This saves time and money since large images do not have to be upload to the cloud.

Hybrid Electrical Mechanical Autonomous Ground Vehicle

It should be noted that the disclosed embodiments of a Hybrid Electrical Mechanical Autonomous Ground Vehicle may be combined with any embodiments disclosed herein, and individual features of the Hybrid Electrical Mechanical Autonomous Ground Vehicle may be combined with individual features of any other embodiment. Any other embodiments may also be combined with the disclosed Hybrid Electrical Mechanical Autonomous Ground Vehicle, and individual features of any embodiment may be combined with individual features of the disclosed Hybrid Electrical Mechanical Autonomous Ground Vehicle. For example, the hybrid electrical mechanical autonomous ground vehicle embodiments can comprise one or more hoe portions and one or more electrode portions coupled to a distal end of the one or more mechanical arms that are proximately coupled to the ground vehicle in such a way that the one or more mechanical arms can be positioned and/or rotated to use any of the one or more hoe portions, shovel portions, and/or electrode portions.

The ground robots described in Hybrid Electrical Mechanical Autonomous Ground Vehicle share many similarities to the ground robots describe in Collaborative Robot Network with Optimized Weed Control Methods, and the same or similar reference numbers are used to refer to the same or similar elements.

As shown in FIGS. 16A-16D, an embodiment of Hybrid Electrical Mechanical Autonomous Ground Vehicle 2400. Ground robot 2411 generally comprises at least two wheels 2414 (such as two, three, four, or more wheels), solar panel 2415, camera 2420, computer 2490, robotic arm 2440 (e.g., robotic arm, mechanical arm, and/or the like), robotic arm 2450 (e.g., robotic arm, mechanical arm, and/or the like). In some embodiments, the computer 2490 (and/or any computers described herein) may include a global positioning system "GPS" which may be used to determine the ground robot's location. In this embodiment, the robot 2411 desirably comprises four wheels 2414 (with two shown in the side views of FIGS. 16A and 16B, and a similar set of two wheels on the other side, as can be seen in the end views of FIGS. 16C and 16D). Other embodiments may include more or fewer wheels and/or may use a different type of propulsion system, such as tracks. The robotic arm 2440 includes a hybrid mechanical electrical end-effector with a positive electrode 2442 and a hoe 2444. The robotic arm 2450 includes a hybrid mechanical electrical end-effector with a negative electrode 2452 and a hoe 2454. For clarity, these figures (and FIGS. 17A-17F, 18A-18D, 20A-20B, 23A-23B discussed below) do not show the full frame of the ground vehicle unit that connects the other elements of the Autonomous Ground Vehicle (such as the wheels 2414, the solar panel 2415, the camera 2420, robotic arms 2440 and 2450, and/or the like) to each other and to the ground vehicle unit, in order to show more detail of other features of the robot 2411. A frame similar to frame 650 including the undercarriage 652 as used in robots 611 described above with reference to FIGS. 6A-6B may be included in robot 2411.

In some embodiments, the hoe can comprise a warren hoe. A warren hoe is a hoe that comprises a generally heart or triangular-shaped blade set at a generally right angle to the handle (e.g., to the mechanical arm which would be equivalent to the handle in this use case). Such a warren hoe has been found to be desirable in the present use cases. Some embodiments may use different hoe shapes and/or different blades that may not necessarily be considered a hoe. For example, in some of the embodiments disclosed herein, the systems can comprise a draw hoe, a warren hoe, a hula hoe, a scuffle hoe, a collinear hoe, a wheel hoe, a fork hoe, a cultivator, a plough hoe, a sharp hoe, a dull hoe, a rounded hoe, a plant and/or soil disturbance tool that can come in various shapes and sizes, and/or the like. Further, some embodiments may position the hoe blade at an angle other than a right angle to the mechanical arm, such as approximately, no greater than, or no less than, 30, 45, 50, 60, 70, 80, or 90 degrees.

A shovel is a tool that comprises a generally broad flat blade with upturned sides set at generally a 45-degree angle to the handle (e.g., to the mechanical arm which would be equivalent to the handle in this use case). Such a shovel has been found to be desirable in the present use cases. Some embodiments may use different shovel shapes and/or different blades that may not necessarily be considered a shovel. For example, some embodiments may utilize a trench shovel, a flat shovel, an edging shovel, a square digging shovel, a pointed digging shovel, a round digging shovel, a scoop shovel, and/or the like. Further, some embodiments may position the shovel blade at an angle other than a 45-degree angle to the mechanical arm, such as approximately, no greater than, or no less than, 0, 10, 20, 30, 40, 45, 50, 60, 70, 80, or 90 degrees. In some embodiments, the shovel does not have upturned sides.

The positive electrode 2442 of robotic arm 2440 is coupled to hoe 2444 such that when a switch (for example, like switch 509 in FIG. 4A) is activated, the hoe 2444 becomes positively charged. The negative electrode 2452 of robotic arm 2450 is coupled to hoe 2454 such that when a switch is activated, the hoe 2454 becomes negatively charged. As described below, the switches (which may comprise one or more switches, relays, transistors, and/or the like) may desirably be automatically activatable by the robot's control system, without requiring manual activation by a user. In some embodiments the system can activate the high voltage booster unit using a switch relay such that the system need not continuously generate electrical current. In some embodiments, the high voltage booster unit can be configured to continuously generate electrical current. Robotic arm 2440 and robotic arm 2450 are coupled to Ground Robot 2411 and are powered by at least one motor (and desirably at least two motors, such as to control two separate degrees of motion and/or to control rotation of the arm about two separate rotational axes). Robotic arm 2440 and robotic arm 2450 can rotate around a central axis 2465 and move up and down. In this embodiment, the central axis is a pitch axis that is parallel to the wheel rotation axis. In other embodiments, the central axis may be a yaw axis or a roll axis. In some embodiments robotic arm 2440 and robotic arm 2450 can use the structures of FIGS. 19A-19C. Further details of example rotation axis orientations are provided below with reference to FIGS. 19A-19C.

In operation, ground robot 2411 uses wheels 2414 to travel on ground 2402 along crop row 2403 to find weeds. Ground robot 2411 uses camera 2420 to detect weed 2430 in crop row 2403. When camera 2420 takes an image, records a video, and/or the like, and CPU (for example, like CPU 507 in FIG. 4A) determines the existence and location of weed 2430, Ground Robot 2411 may use an AI system (such as the AI systems discussed below) to determine whether to remove weed 2430 with either hoes 2444 or 2454, or by electrical means. This determination desirably considers several factors which can include the type of soil, the condition of the soil, the type of crop, the type of weed, and/or the like. Although some embodiments desirably use an AI system, other types of systems such as machine learning, machine vision, coded image processing systems and/or the like, could be implemented in other embodiments.

As shown in FIG. 16B, if mechanical means are found optimal based on the AI determination, ground robot 2411 uses wheels 2414 to position itself above weed, uses camera 2420 and CPU (for example, like CPU 507 in FIG. 4A) to determine the location of weed 2430, and then uses either robot arm 2440 or 2450 to hoe the weed out of the ground. In some embodiments, only a portion of the weed is removed from the remaining plant matter, such as removing the stem from the roots and/or the like.

Figures 16C, 16D:
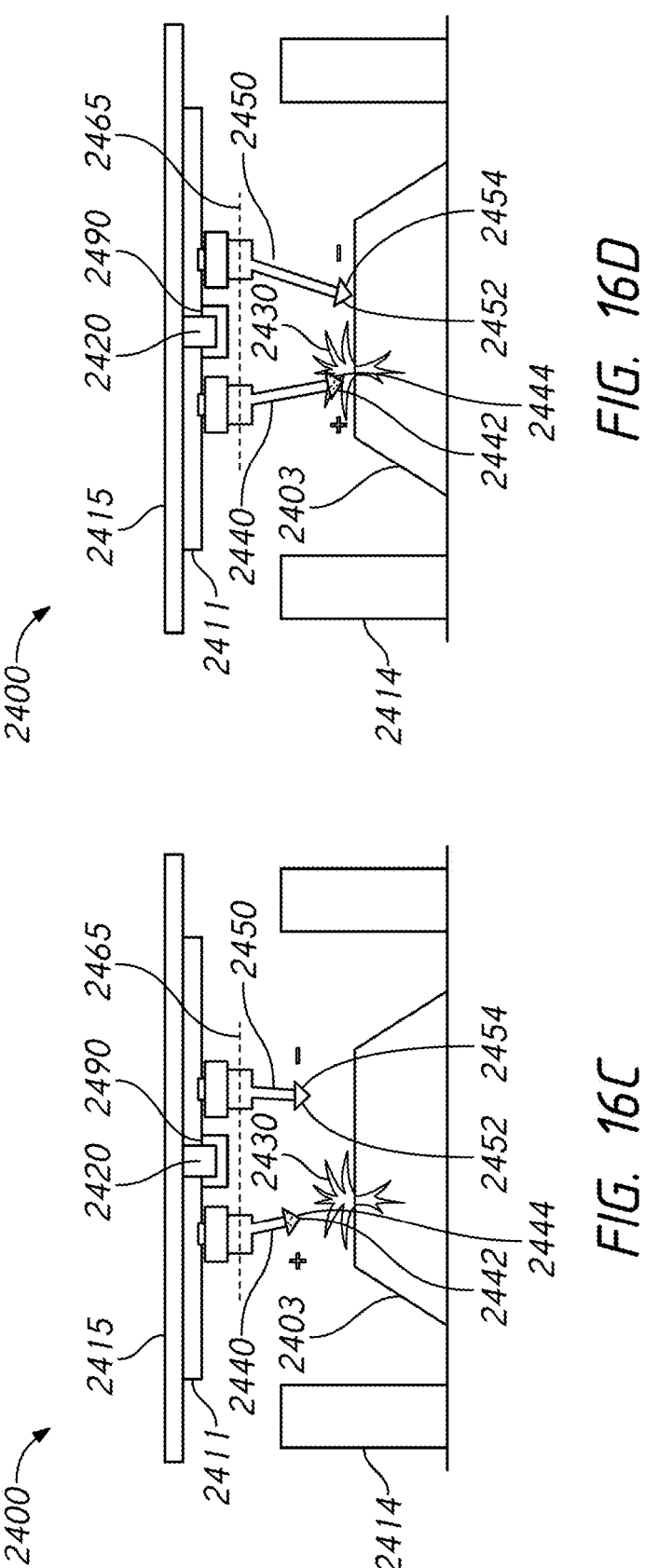
FIG. 16C is a front view of a Hybrid Electrical Mechanical Autonomous Ground Vehicle, according to an embodiment of the disclosure.
FIG. 16D is a diagram of a Hybrid Electrical Mechanical Autonomous Ground Vehicle taking advanced electrical action on farmland, according to an embodiment of the disclosure.

As shown in FIG. 16D, if electrical means are found optimal based on the AI determination, ground robot 2411 uses wheels 2414 to position itself above weed 2430, ground robot high voltage circuit (for example, like HV Booster 511 in FIG. 4A) is enabled, robotic arm 2440 moves to make contact with the weed 2430, while robotic arm 2450 makes contact with the ground, creating a circuit to electrocute the weed. In some embodiments, robotic arm 2440 makes contact with one weed, while robotic arm 2450 makes contact with another weed. When the high voltage circuit is enabled, a circuit is created between the two weeds and both weeds are electrocuted.

In some embodiments, the wheels (and/or other propulsion system, such as tracks) are made of metal or have metal studs or some other conductive component to act as the negative probe to connect the circuit to the ground. In some embodiments, ground robot 2411 is powered by batteries (for example, like battery 503 in FIG. 4A). In some embodiments, ground robot 2411 is powered by solar panels 2415 and batteries, wherein solar panels 2415 charge the batteries. In some embodiments, image, video, and/or the like, processing is performed by the GPU, TPU, or an accelerator onboard the ground robot.

In some embodiments, ground robot 2411 can have more than one camera. In some embodiments, ground robot 2411 can have more than two robotic arms (or only one robotic arm, which could, for example, be desirable if something other than a second robotic arm is used as a negative electrode). In some embodiments, robotic arms 2440 and 2450 are coupled to a hybrid mechanical electrical end-effector that includes any combination of a shovel, a hoe, and an electrode, or all three as shown in FIGS. 20A-20B. In some embodiments, a cleaning mechanism (such as cleaning mechanism 2660 shown in FIGS. 18C-18D and discussed in more detail below) can be coupled to ground robot 2411. In some embodiments, the robotic arm is a two-axis robotic arm.

In some embodiments, ground robot 2411 houses an electronic memory storage medium, such as memory 525 shown in FIG. 4A, comprising computer-executable instructions. In some embodiments, the electronic memory storage medium may be external to computer 2490. In some embodiments, the ground robot 2411 houses one or more processors (such as CPU 507 shown in FIG. 4A) that are in electronic communication with the electronic memory storage medium and are configured to execute the computer-executable instructions stored in the electronic memory storage medium for implementing a plant species control management operation. In some embodiment, a high voltage booster (for example, high voltage booster 511 in FIG. 4A) is electrically connected to the end-effector of robotic arm 2440. A high voltage booster can comprise, for example, an electrical circuit that takes electrical current at a first voltage level as an input, and outputs electrical current at a second, higher voltage level. For example, the voltage booster may receive electrical current from a solar array and/or battery at a level in a range of 1 kV-10 kV, and output electrical current at a higher voltage level, such as in a range of 20 kV-200 kV. Such an output range can be desirable, for example, as a level of voltage that is sufficient to eliminate weeds. In some embodiments, the high voltage booster is electrically coupled to the end effector of robotic arm 2450. In some embodiments, the high voltage booster is or comprises a transformer. In some embodiments, the high voltage booster is or comprises a pulse transformer circuit. In some embodiments, the camera 2420 generates one or more images. In some embodiments, the camera generates one or more images of the agricultural ground soil and plant organisms in the forward path of the vehicle. In some embodiments, an additional camera is coupled to the undercarriage of ground robot 2411 to generate additional images. In some embodiments, the generated one or more images are used to determine whether a detected plant organism is set for a plant species control management operation, such as mechanical removal, electrocution, and/or the like, by determining the plant species type and/or analysis of the agricultural ground soil. In some embodiments, the plant species type is determined by one or more processors comparing the generated image of the plant to a data store, catalogue, list, look up table, and/or the like of other plant species. In some embodiments, the one or more processors generate ground robot control instructions configured to advance the ground robot and mechanical arm to be within a threshold proximity of the identified plant organism. In some embodiments, when the method of plant organism control is electrical control, the one or more processors generate and execute mechanical arm control instruction to: position the end-effector of robotic arm 2440 to be in contact with the identified plant organism, position the end effector of robotic arm 2450 to be in contact with the soil or a second plant organism adjacent to the identified plant organism, and activate the high voltage booster to generate electric current through the end-effector of robotic arm 2440, the identified plant organism, and the end effector of robotic arm 2450. In some embodiments, when the method of plant organism control is mechanical control, the one or more processors generate and execute mechanical arm control instruction to: position the hoe portion 2454 of robotic arm 2440 to be in contact with soil distal to the identified plant organism and move the hoe portion 2454 through the soil to remove at least a portion of the identified plant organism.

In some embodiments, an energy storage unit (which may include, for example, a battery, supercapacitor, and/or the like) is housed in ground robot 2411 and the energy storage unit is electrically coupled to a high voltage booster unit. In some embodiments, solar panel 2415 is electrically coupled to the energy storage unit and is configured to recharge the energy storage unit. In some embodiments, solar panel 2415 is coupled to ground robot 2411. In some embodiments, the one or more processors are in electronic communication through an electronic network with a central server system. In some embodiments, activating the high voltage booster unit comprises activating with a switch relay. In some embodiments, the plant species type is determined by use of a computer vision algorithm. In some embodiments, the plant species type is determined by use of an artificial intelligence algorithm.

In some embodiments, the AI system determines if the weed should be mechanically or electrically eliminated based on the energy required for the removal. The AI system makes this determination based on the one or more images of the agricultural ground soil and plant organisms in the path of the ground robot. There are some cases where electrical removal will use less energy, and some cases where mechanical will use less energy. For example, sometimes electrical removal will be more efficient when removing large weeds or weeds in hard, compact, and/or the like soil conditions. Further, sometimes mechanical removal will be more efficient when removing weeds from soft, non-compact, and/or the like soil conditions. In some embodiments, being able to mechanically remove a weed can be used a safety feature when the AI system in conjunction with the cameras disclosed herein (such as cameras 2420, 2520, 420, and/or the like) determine that electrical removal may be unsafe because of external conditions such as a person or animal nearby. In some embodiments, the AI system may determine that electrical weeding is desirable so that the soil is not disturbed. In some embodiments, the AI system may determine that mechanical weeding is desirable to till the soil. In some embodiments, the AI system uses a predictive algorithm to determine where the plant organism that is set for plant organism control is, based on the one or more images generated by the one or more cameras. Based on the analysis of the one or more images, the AI systems predicts a movement to be within a threshold distance. This method allows the plant organism control operations to occur in real time while the ground robot moves in a continuous forward path without stopping.

In some embodiments, the robotic arms disclosed herein (such as robotic arms 2440, 2640, 2840, and/or the like) are coupled to the undercarriage portion of the ground vehicles disclosed herein (such as undercarriage portion 652 of ground robot 611 and/or the like). In some embodiments, the robotic arms can move in two axes such as the pitch axis and the yaw axis (for example, by use of a pitch and yaw motor like robotic arm 2740 in FIG. 27A, discussed in more detail below) and/or the like. In some embodiments the robotic arms can move in more than two axes. In some embodiments the robotic arms can move in three axes such as the pitch axis, yaw axis, and roll axis or any combination thereof. In some embodiments, the robotic arms can move in two degrees of motion. In some embodiments, the robotic arms can move in more than two degrees of motion. In some embodiments, the robotic arms can move in three degrees of motion. In some embodiments, the multiple degrees of motion involve only rotational motion. In some embodiments, the multiple degrees of motion involve a combination of rotational motion and translational motion (such as, for example, sliding along a track coupled to the robot frame, the arm including a telescopic portion, and/or the like). In some embodiments, the robotic arm has a hybrid mechanical electrical end-effector comprising a hoe portion and an electrode portion that form one unit such that the hoe portion can be electrically charged. In some embodiments, the robotic arm has a hybrid mechanical electrical end-effector comprising a hoe unit and a shovel unit that are electrically charged. In some embodiments, the robotic arm has a hybrid mechanical electrical end-effector comprising a separate hoe unit and a separate electrode. In some embodiments, the robotic arm has a hybrid mechanical electrical end-effector comprising a separate hoe unit, a separate shovel unit, and a separate electrode. In some embodiments, the robotic arm has a hybrid mechanical electrical end-effector that is separated from the primary rod of the robotic arm by an insulator. In some embodiments, the primary rod of the robotic arm is a conductor. In some embodiments, the primary rod of the robotic arm is not a conductor. In some embodiments, the hoe and/or shovel unit are fixedly coupled (or integrally formed) to an end portion of the robotic arm. In some embodiments, the hoe and/or shovel unit are able to move with respect to the end portion of the robotic arm (such as by rotating, translating, and/or the like, under the power of a motor, hydraulic cylinder, pneumatic cylinder, and/or the like).

In some embodiments, the ground robot can use the end effectors of the robotic arms disclosed herein (such as robotic arms 2440, 2640, 2840, and/or the like) to peel back layers of soil and take images with the cameras disclosed herein (such as cameras 2420, 2520, 420, and/or the like) of the root structure and soil color of each layer to estimate the amount of carbon stored in the ground. For example, the ground robot may take one or more images of the undisturbed soil, then remove a first layer of soil (e.g., the top 1, 2, 3, 4, 5, 6, 7, 8, 9, 10, 15, 20, 25, 50, and/or the like millimeters of soil) and take one or more images of the soil, remove a second layer of soil (e.g., the next 1, 2, 3, 4, 5, 6, 7, 8, 9, 10, 15, 20, 25, 50, and/or the like millimeters of soil) and take one or more images of the soil, and so on, recording new images each time a layer of soil is removed. In some embodiments, the captured images may then be stored for further analysis. In some embodiments, the captured images are analyzed by the ground robots immediately or shortly after the images are captured (e.g., via edge computing architecture). In some embodiments, peeling back layers of soil may include positioning a portion of the mechanical arm (for example, a hoe portion, shovel portion and/or the like) to be in contact with the ground and then using the propulsion units (for example, the wheels) to drag the mechanical portion arm along the ground to remove a layer of soil. In some embodiments, the motors in the mechanical arm are used to drag the mechanical portion arm along the ground to remove a layer of soil. In some embodiments, this analysis is conducted by use of the AI system. This feature is advantageous because it enables the ground robot to measure carbon sequestration. In some embodiments, the ground robots use the shovel portion of the hybrid electrical mechanical end effectors disclosed herein to peel back the layers of soil. In some embodiments, the ground robots use the hoe portion of the hybrid electrical mechanical end effectors, also known as a multi-use end-effector, disclosed herein to peel back the layers of soil.

In some embodiments, the ground robots described herein may be configured to measure the amount of force required to peel back a layer of soil. For example, as the ground robot (e.g., ground robot 2411) uses robotic arm 2440 or 2450 to remove a layer of soil, accelerometers and/or the like in the robotic arms may be used to determine the amount of force used to move the soil. In some embodiments, the ground robots may be configured to remove a pre-determined amount of soil each time the ground robot peels back a layer of soil. For example, the ground robots may be configured to dig using a portion of the end effector (e.g., hoe, shovel, and/or the like) to a pre-determined depth and remove the same sized area of ground soil (and pre-removal soil volume) each time a layer of soil is peeled back. Removing the same amount of soil allows the ground robots to compare the relative force required to peel back layers of soil at different areas. The ground robots may store the force data collected from various soil moving operations and utilize the data for further analysis. For example, by comparing the force required to move soil layers at various areas of a farm, the ground robot can determine the relative soil compression at each area where soil was removed, which may impact farming operations. For example, a ground robot may estimate the amount of soil compression prior to performing a weed removal operation and modify the removal method based on the determined level of soil compression. In another example, the force data may be used to estimate soil density in different areas of a farm. The relative soil density may indicate which areas have more porous soil, which may impact plant planning as more porous soil allows better soil retention which impacts plant growth.

In some embodiments, the amount of carbon stored in soil (e.g., at a particular location) is estimated by comparing images of the soil (e.g., images captured as the soil is peeled back) to a soil image database. The soil image database may comprise images of different types/orders of soil (e.g., Entisols, Aridisols, Alfisols, Ultisols, Gelisols, Andisols, Inceptisols, Mollisols, Spodosols, Oxisols, Histosols, Vertisols, and/or the like) as well as images of the different soil types/orders with different levels of carbon stored in the soil. For example, for each soil type, there may be tens, hundreds, thousands, and/or the like images, where each image shows the same soil with a different stored carbon amount (e.g., ranging from low carbon storage to high carbon storage). In some embodiments, rather than or in addition to images of the soil, color samples for each soil type at a range of different stored carbon levels may be stored in the soil image database. For example, for each soil type, there may be tens, hundreds, thousands, and/or the like color sample images, where each color sample image shows the same soil with a different color based on the amount of carbon stored (e.g., ranging from low carbon storage to high carbon storage). In some embodiments, the soil image database may be stored on the ground robot (e.g., in an electronic memory storage medium, such as memory 525 shown in FIG. 4A) so that the ground robot can perform carbon estimation analysis while in the operation. In other embodiments, the soil image database may be stored on a computing device and the images captures by the ground robots may be analyzed on the computing device.

In operation, the ground robots may be configured to collect images of different soil layers throughout a particular area of land, such as a farm. The ground robots may perform peeling operations and capture images as described above at a certain number of locations per unit of area of the farmland. For example, the ground robots may peel the soil and capture images at 1, 2, 3, 4, 5, 10, 15, 20, 25, and/or the like different locations per acre of farmland. The different locations may be random, may be pre-programmed in the ground robots based on the farmland, or may be determined by the ground robot's AI system. The number of samples captured may vary from acre to acre and for different farmlands. Generally, the number of samples and location of image collection is based on achieving an accurate estimate of the carbon stored in each acre/unit area of land. It is recognized that while specific example are described with reference to farmland and farming operations, the ground robots described herein may perform the same operations and analysis on other areas of land not used for farming purposes.

In an embodiment where the ground robots perform the carbon estimation, images of the peeled soil layers may be captured and compared to the soil image database in order to estimate the amount of carbon in the soil for the particular location. The image comparison may be performed by the ground robot's AI system and may require image processing as described below. For example, based on the image processing, one or more colors in the images may be extracted and compared with the images in the soil image database to find the closest color match. Based on the color match, a carbon estimate (e.g., an estimate of the amount of carbon stored in the soil) may be determined for each image. In some embodiments, the carbon estimate may be stored in a carbon database (e.g., in an electronic memory storage medium, such as memory 525 shown in FIG. 4A). In some embodiments, each carbon estimate may be stored in the carbon database with the GPS location where the images used for the carbon estimate were collected. For example, as the ground robot captures images of the soil layers, the computer (e.g., computer 2490) may determine the GPS location and the location may be linked to the images and subsequent carbon estimate. In some embodiments, the ground robots may calculate and store a carbon estimate for each unit of area (e.g., an acre) of land by averaging the carbon estimate from each sample location in the particular unit of area of land. Based on the average carbon estimates for each unit of area, the amount of carbon stored in, for example, an area of farmland can be estimated. As the ground robots continue to provide carbon estimations over time, the variation of stored carbon for particular areas of land can be tracked. For example, a carbon estimate for a particular area of land may be determined every week, month, season, year, and/or the like. The changes in carbon storage over time can be used to inform various land management decisions. For example, if a particular unit of farmland shows a decrease in carbon storage overtime, the amount of chemicals used on the farmland may be reduced in order to improve the amount of carbon stored in the soil. In another example, an increase in carbon storage over time can show the benefits of sustainable farming practices, such as, for example, using ground robots described herein for weed management operations rather than using chemicals. The carbon estimates for different areas of land overtime may be stored in, for example, a central database, so that the carbon storage in different areas of land can be compared over time. In some embodiments, the carbon estimate may be shared with an internal organization and/or external carbon exchange.

Using ground robots to perform carbon estimations may provide benefits over current methods. The ground robots may be able to perform accurate estimates using image analysis instead of requiring manual sampling at each location. Because the ground robots are autonomous, vast areas of farmland and other land may be accessed and carbon storage may be accurately tracked. Carbon storage was difficult to estimate previously because of the vast quantities of land that needed to be analyzed and the manual intensive requirements of carbon estimation. Additionally, some carbon storage estimation methods required human analysis, leading to error.

During color analysis (e.g., in the image processing of soil layers), lighting conditions may impact the color measured from an image. For example, the measured color of a soil image taken at low light may differ from the measured color of an image of the same soil taken at high light. Because the color may differ depending on the amount of light, the amount of carbon estimated will also likely differ. To prevent different light quality from impacting the carbon estimation process, in some embodiments, the ground robots described herein (e.g., ground robot 2411) may include a color calibration component. The color calibration component may be positioned on, for example, one or more of the robotic arms. The color calibration component may comprise a portion of the robotic arm that is colored (e.g., white) and may be used for white balance calibration. For example, the color calibration component may comprise a white colored piece of metal and may include a coating to prevent the component from getting scratched or tarnished. In some embodiments, while the ground robot captures images of the layers of soil, the color sampling component may also be positioned (e.g., by moving the robotic arm) to be included in the image. The ground robot's AI system may then use the color calibration component as a reference when measuring the color of the sample image for a more accurate color measurement. In some embodiments, the color calibration component may comprise one or more colors. In some embodiments, the ground robot may clean the color calibration component using one of the methods described herein. One benefit of having the color calibration component on the ground robot's robotic arm(s) may be that the ground robots can clean the color calibration component using the robotic arms in a similar manner as the ground robot may clean one robotic arm with another robotic arm.

In some embodiments, the ground robots described herein may include one or more lights such as, for example, light emitting diodes ("LEDs"), incandescent lights, fluorescent lights, compact fluorescent lights, halogen lights, and/or the like. The lights may be positioned anywhere on the ground robot but may be preferably positioned on the ground robots frame (e.g., frame 650) and directed towards the ground such that the ground below and around the ground robot is illuminated. In some embodiments, the ground robots may use the lights during, for example, nighttime operations or when the ground robots are operating in low light conditions. For example, the lights may be used to perform soil peeling and carbon estimation operations as described above during the night. Nighttime carbon estimation operations are described below with reference to FIGS. 58A-58F. One benefit of estimating soil carbon levels at night may be that the light conditions can be controlled for consistent lighting. As described above, varying light conditions can impact color analysis. By collecting soil images and conducting the color analysis at night, the same amount of light and same brightness level can be used each time a soil image is taken to ensure consistency. It may be preferable that the lights used are significantly brighter than other types of lights that may be present at night (e.g., the moon, farm lights, and/or the like) so that variations in brightness do not impact the amount of light present when the images are taken. For example, the amount of light in the image should be approximately the same as on a full moon night as a moonless night. In some embodiments, the ground robot's solar panel can provide consistent lighting conditions by shading the area under the ground robot where the soil layer is peeled back for image capturing. Another possible benefit of night operations is that the carbon estimation operations do not impact the normal farm operations that occur during the day. Additionally, the same ground robots performing weed management operations can perform carbon estimation operations at night.

FIGS. 27A-27F illustrate embodiments of a ground robot 2411 performing a carbon estimation operation at night. It is recognized that ground robot 2411 is used as an example only and any of the ground robots described herein may include one or more lights and perform carbon estimation operations at night. It is also recognized that while certain steps are described, in other embodiments, a night carbon estimation operation may include more or less steps and/or the steps may be performed in a different order.

As shown in FIG. 27A, ground robot 2411 may include one or more lights 2421. The lights 2421 may be positioned on the ground robots frame (e.g., frame 650), the base of the solar panel 2415, and/or any other suitable location such that the lights 2421 illuminate at least a portion of the ground below the ground robot 2411. In some embodiments, the lights 2421 may be place near or inside the housing(s) of the one or more cameras 2420. FIG. 27A illustrates the first step in a night carbon estimation operation where ground robot 2411 drove to a sampling location and takes one or more images of the undisturbed soil. As described above, the soil images may be stored in a soil image database, for example, in an electronic memory storage medium of computer 2490.

FIG. 27B illustrates the second step in the night carbon estimation operation, where the ground robot 2411 begins peeling back a first layer of soil using the end effector of robotic arm 2440 or 2450 (e.g., using hoe 2444, hoe 4254, and/or any other suitable portion of the end effector). As described above, in some embodiments, the first layer of soil may comprise the top 1, 2, 3, 4, 5, 6, 7, 8, 9, 10, 15, 20, 25, 50, and/or the like millimeters of soil. FIG. 58C illustrates the third step in the night carbon estimation operation where the first layer of soil has been removed.

FIG. 27D illustrates the fourth step in the night carbon estimation operation, where the ground robot 2411 positions itself (e.g., using wheels 2414) such that the hole where the first layer of soil was removed is below the camera 2490. The ground robot 2411 then captures one or more images of the soil with the first layer of soil removed. The new soil images may then be stored in the soil image database.

FIG. 27E illustrates the fifth step in the night carbon estimation operation, where the ground robot 2411 repositions itself relative to the hole and uses robotic arm 2440 or 2450 to remove a second layer of soil (e.g., the next 1, 2, 3, 4, 5, 6, 7, 8, 9, 10, 15, 20, 25, 50, and/or the like millimeters of soil). Similar to the step shown in FIG. 58D, the ground robot 2411 would then take one or more images of the soil once the second layer of soil was removed. The ground robot 2411 may repeat this process of removing layers of soil, capturing images of the soil and so on, for as many layers as required. For example, during a night carbon estimation operation (and/or a day carbon estimation operation), the ground robot 2411 may remove 1, 2, 3, 4, 5, 6, 7, 8, 9, 10 and/or the like layers of soil, each time capturing new images of the newly exposed soil and storing the images in the soil image database as required.

Performing stored carbon estimation analysis at night may provide a benefit of allowing the ground robots to perform operations during both the day and the night. Nighttime carbon estimation would have been difficult to do previously because it is difficult to consistently replicate the image collection conditions at night. Additionally, as described above, carbon estimation at night may be more accurate than during the day because of the consistent lighting conditions. For example, when carbon estimation is performed during the daytime, brighter lights, additional calibration, and further components for the ground robots (e.g., a skirt) may be required. Conversely, nighttime carbon estimate may not require these additional measures and may provide a more accurate result that would be difficult to replicate during the day.

In some embodiments, ground robots as described herein may use an AI system to perform object inferencing, object recognition, image processing, color analysis, and/or the like. For example, the control system and/or AI system may process images recorded by the one or more cameras, where image processing generally refers to a method of manipulating an image to enhance and/or extract information from the image. The AI system performs digital images processing where the digital images are manipulating using computer algorithms. In some embodiments, the image processing is used to measure, characterize, classify and/or the like objects in the image. In some embodiments the image processing is used to detect a color in the image. In some embodiments, the image processing follows some and/or all the following steps. First, image acquisition can be performed, where one or more images are captured using one or more cameras, other sensors and/or the like, and converted into a manageable entity. In some embodiments, the manageable entity is for example, a digital image file and/or the like. In some embodiment, the image acquisition method is scraping. Next, image enhancement can be performed, where the quality of the image is improved in order to extract information from the image for further processing. Next, image restoration can be performed to improve the image quality. In some embodiment, the image restoration comprises removal of noise (for example, senor noise, motion blue, and/or the like) from the images. In some embodiments, the noise can be removed by using filters (for example, low-pass filter, median filters, and/or the like). In some embodiments, the AI system analyses the image data by using a model of the local image structure and controls filtering based on local information. In some embodiments, image restoration removes other corruptions from the image such as blurs, missing pixels, camera misfocus, and/or the like by using models such as probabilistic and mathematical and/or the like. In some embodiments, the AI system uses edge detection methods for data extraction and image segmentation. Next, color imaging processing can be performed, where one or more images undergo different processing, for example, pseudocolor, RGB and/or the like processing. Next, image compression and/or decompression can be performed, where compression can be used to reduce the size and/or resolution or the images and decompression can be used to restore the image to the original size and/or resolution. In some embodiments, image compression and/or decompression can be used during an image augmentation process to extend the data set with augmented images. Next, morphological processing can be performed to describe and/or define the shapes and structures of the objects in the one or more images. In some embodiments, the morphological processing can be used to create data sets for training AI models (for example, to train the AI model to detect and/or recognize certain objects in the images such as plants, weeds, soil, humans, animals, and/or the like). Next, image recognition can be performed, where certain features of individual objects in the one or more images can be identified. In some embodiments, various techniques are used for image recognition, such as object detection, objection recognition, segmentation, and/or the like. Use of object detection can be beneficial to identify and/or detect semantic objects of particular classes (for example, such as plants, weeds, soil types, humans, animals, and/or the like) in the images. In some embodiments, the AI system undergoes a process of deep learning development that may include cycles of the previously described image processing method to further develop the AI model. Finally, representation and description may be performed, where the processed data may be visualized and described. In some embodiments, the visualization tools are used to turn AI model outputs into readable image that may be used to perform additional analysis.

In some embodiments, ground robots as described herein may use an AI system to make decisions that can be used for operation of the ground robot and/or to perform one or more of the weed management, ground soil management, livestock herding, and/or the like management operations. In some embodiments, the decision making can utilize the image processing described above to make decisions. For example, based on the results of the image processing in a weed management operation, the AI system may choose to perform either and/or both a mechanical weed management operation and an electrical weed management operation. In some embodiments, the AI system determines if the weed should be mechanically or electrically eliminated based on the energy required for the removal. The AI system makes this determination based on one or more images of the agricultural ground soil and plant organisms in the path of the ground robot. There are some cases where electrical removal will use less energy, and some cases where mechanical will use less energy. For example, the AI system may determine that electrical removal will be more efficient when the image processing is used to determine that a weed set for elimination is large, the soil is hard or compact, and/or the like. Sometimes, the AI system may determine that mechanical removal will be more efficient when the image processing is used to determine that a weed set for elimination is small, the soil is soft or not compact, and/or the like.

As shown in FIGS. 17A-17F, an embodiment of Hybrid Electrical Mechanical Autonomous Ground Vehicle 2500. Ground robot 2511 generally comprises at least two wheels 2514 (and/or other propulsion systems, as discussed above), solar panel 2515, camera 2520, computer 2490, robotic arm 2540, robotic arm 2550. The robotic arm 2540 includes a hybrid mechanical electrical end-effector with a positive electrode 2542 and a hoe 2544. The robotic arm 2550 includes a hybrid mechanical electrical end-effector with a negative electrode 2552 and a hoe 2554.

In some embodiments, the hoe may comprise a hula hoe. A hula hoe is a hoe that comprises a square or stirrup-shaped blade set at a generally right angle to the handle (e.g., to the mechanical arm which would be equivalent to the handle in this use case). Such a hula hoe has been found to be desirable in the present use cases. Some embodiments may use different hoe shapes and/or different blades that may not necessarily be considered a hoe. For example, some embodiments may utilize a draw hoe, a hoe, a scuffle hoe, a collinear hoe, a wheel hoe, a fork hoe, a cultivator, a plough hoe, a stirrup hoe, and/or the like. In some embodiments, the hula hoe may be a pendulum-type hoe that allows it to move in a back and forward motion with respect to the handle. The back and forward motion may be achieved by including a pivot in the connection between the hoe and the handle, which allows the blade to change angle with respect to the handle. This pendulum action may be advantageous to allow for the blade to cut at the correct angle on both backwards and forwards cuts. Some embodiments may position the hoe blade at an angle other than a right angle to the mechanical arm, such as approximately, no greater than, or no less than, 30, 45, 50, 60, 70, 80, or 90 degrees.

The positive electrode 2542 of robotic arm 2540 is coupled to hoe 2544 such that when a switch (for example, like switch 509 in FIG. 4A) is activated, the hoe 2544 becomes positively charged. The negative electrode 2552 of robotic arm 2550 is coupled to hoe 2554 such that when a switch is activated, the hoe 2554 becomes negatively charged. As describe below, the switches (which may comprise one or more switches, relays, transistors, and/or the like) may desirably be automatically activatable by the robot's control system, without requiring manual activation by a user. Robotic arm 2540 and robotic arm 2550 are coupled to Ground Robot 2511 and are powered by at least one motor (and desirably at least two motors, such as to control two separate degrees of motion and/or to control rotation of the arm about two separate rotational axes). Robotic arm 2540 and robotic arm 2550 can rotate around a central axis 2565 and move up and down. In this embodiment, the central axis is a pitch axis that is parallel to the wheel rotation axis. In other embodiments, the central axis may be a yaw axis or a roll axis. In some embodiments, robotic arm 2540 and robotic arm 2550 can use the structures of FIGS. 19A-19C. Further details of example rotation axis orientations are provided below with reference to FIGS. 19A-19C.

In operation, ground robot 2511 uses wheels 2514 to travel on ground 2502 along crop row 2503 to find weeds. Ground robot 2511 uses camera 2520 to detect weed 2530 in crop row 2503. When camera 2520 takes an image, records a video, and/or the like, and CPU (for example, like CPU 507 in FIG. 4A) determines the existence and location of weed 2530, Ground Robot 2511 uses an AI system to determine whether to remove weed 2530 with either hoes 2544 or 2554, or by electrical means. This determination considers a number of factors which can include the type of soil, the condition of the soil, the type of crop, and the type of weed.

Figures 17A, 17B:
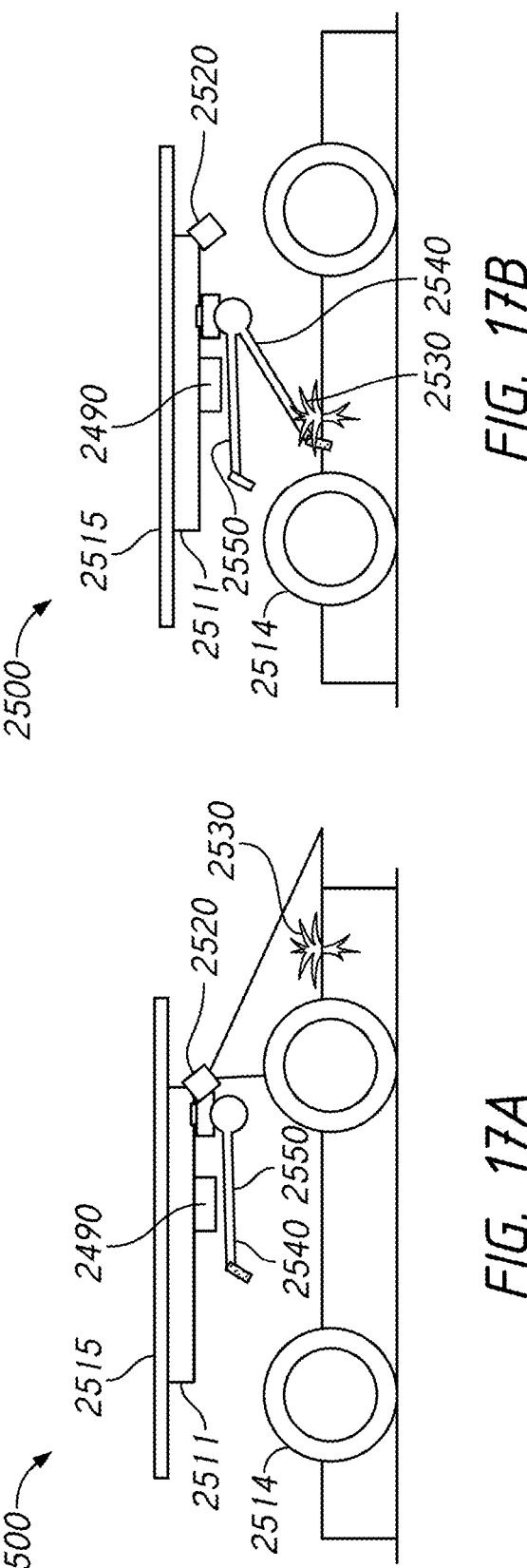
FIG. 17A is a diagram of a Hybrid Electrical Mechanical Autonomous Ground Vehicle performing an inspection, according to an embodiment of the disclosure.
FIG. 17B is a diagram of a Hybrid Electrical Mechanical Autonomous Ground Vehicle taking advanced mechanical action on farmland, according to an embodiment of the disclosure.

As shown in FIG. 17B, if mechanical means are found optimal based on the AI determination, ground robot 2511 uses wheels 2514 to position itself above weed, uses camera 2520 and CPU (for example, like CPU 507 in FIG. 4A) to determine location of weed 2530, then uses either robot arm 2540 or 2550 to hoe the weed out of the ground.

Figures 17C, 17D:
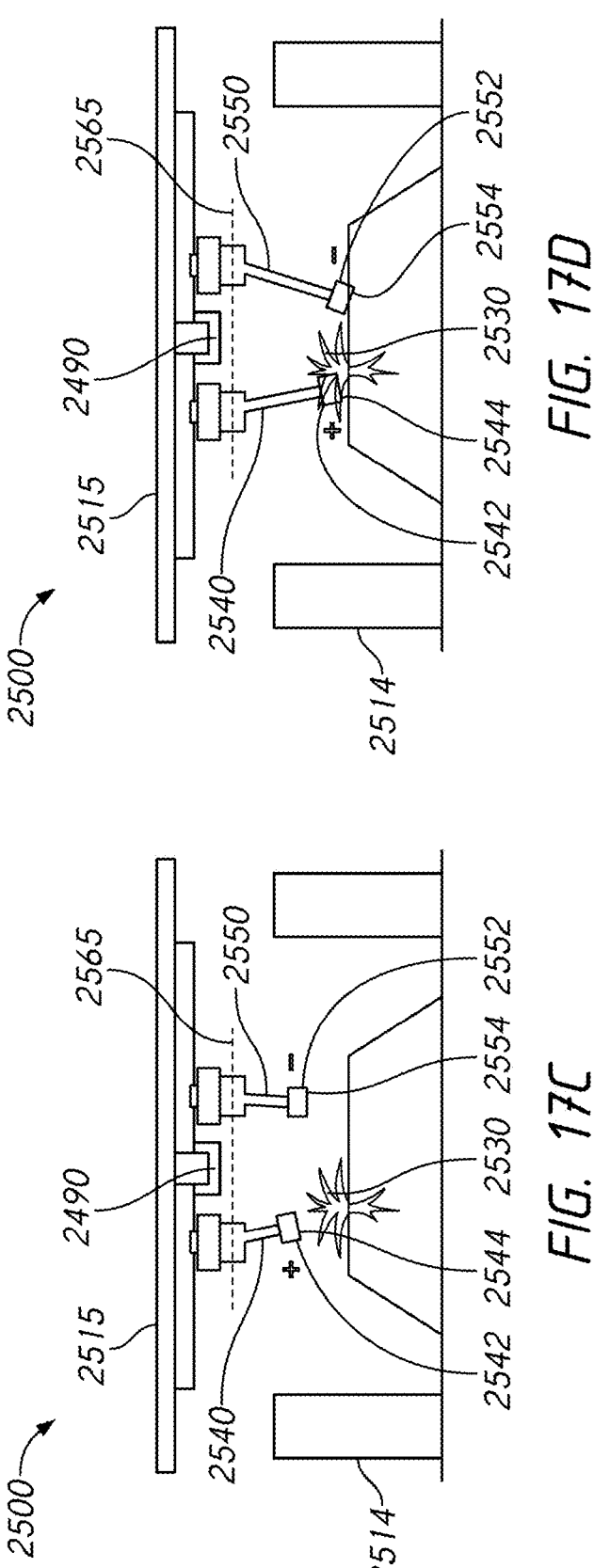
FIG. 17C is a front view of a Hybrid Electrical Mechanical Autonomous Ground Vehicle, according to an embodiment of the disclosure.
FIG. 17D is a diagram of a Hybrid Electrical Mechanical Autonomous Ground Vehicle taking advanced electrical action on farmland, according to an embodiment of the disclosure.
Figures 17E, 17F:
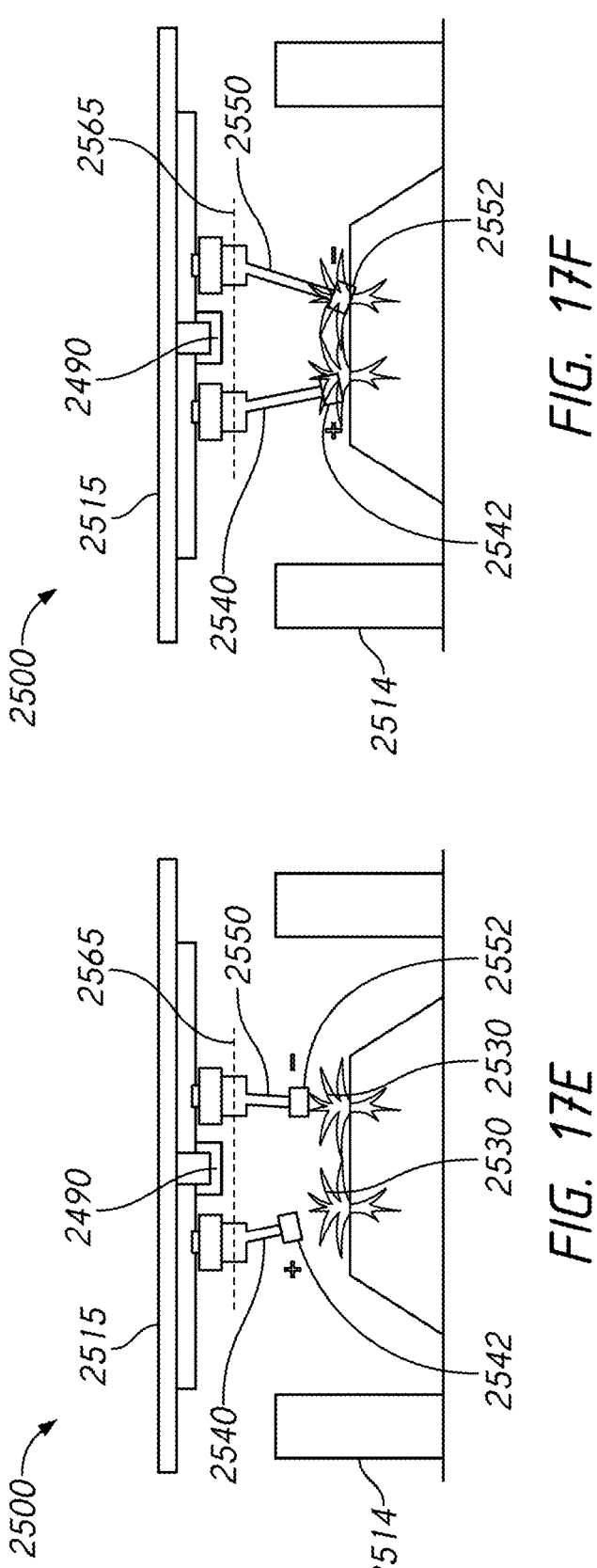
FIG. 17E is a front view of a Hybrid Electrical Mechanical Autonomous Ground Vehicle, according to an embodiment of the disclosure.
FIG. 17F is a diagram of a Hybrid Electrical Mechanical Autonomous Ground Vehicle taking advanced electrical action on multiple weeds on farmland, according to an embodiment of the disclosure.

As shown in FIG. 17D, if electrical means are found optimal based on the AI determination, ground robot 2511 uses wheels 2514 to position itself above weed 2530, ground robot high voltage circuit (for example, like HV Booster 511 in FIG. 4A) is enabled, robotic arm 2540 moves to make contact with the weed 2530 while robotic arm 2550 makes contact with the ground, creating a circuit to electrocute the weed. In some embodiments, robotic arm 2540 makes contact with one weed, while robotic arm 2550 makes contact with another weed. When the high voltage circuit is enabled, a circuit is created between the two weeds and both weeds are electrocuted. In some embodiments, ground robot 2511 positions itself above weed 2530 while in continuous motion, such that the plant management operation occurs while the ground robot 2511 continues to travel in a forward or backwards path. In some embodiments, this process can be accomplished by use of an AI system that uses a predictive algorithm to determine where the plant organism that is set for plant organism control is, based on the one or more images generated by the one or more cameras. Based on the analysis of the one or more images, the AI systems predicts a movement to be within a threshold distance. This method allows the plant organism control operations to occur in real time while the ground robot moves continuously without stopping.

In some embodiments, the wheels (and/or other propulsion system, such as tracks) are made of metal or have metal studs to act as the negative probe to connect the circuit to the ground. In some embodiments, ground robot 2511 is powered by batteries (for example, like battery 503 in FIG. 4A). In some embodiments, ground robot 2511 is powered by solar panels 2515 and batteries wherein solar panels 2515 charge the batteries. In some embodiments, image, video, and/or the like, processing is performed by the GPU, TPU, or an accelerator onboard the ground robot.

Figures 26A, 26B, 26C, 26D, 26E, 26F:
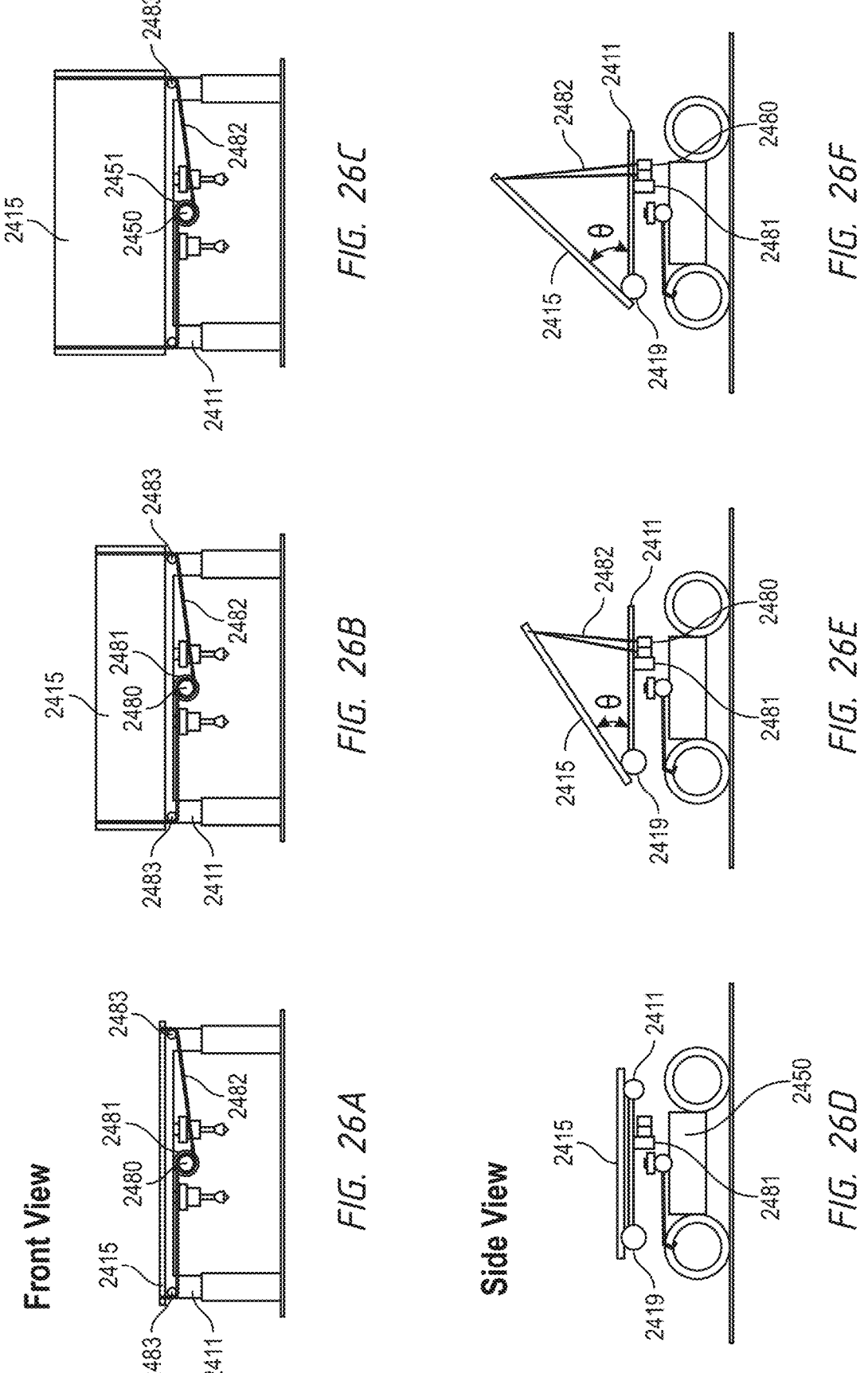
FIGS. 26A-26F illustrate embodiments of a ground robot using a pulley lift system.

In some embodiments, ground robot 2511 can have more than one camera. In some embodiments, ground robot 2511 can have more than two robotic arms. In some embodiments, robotic arms 2540 and 2550 are coupled to a hybrid mechanical electrical end-effector that includes any combination of a shovel, a hoe, and an electrode, or all three as shown in FIG. 28. In some embodiments a cleaning mechanism as shown in FIG. 26C-D can be coupled to ground robot 2511. In some embodiments, the robotic arm is a two-axis robotic arm.

Figures 18A, 18B, 18C, 18D:
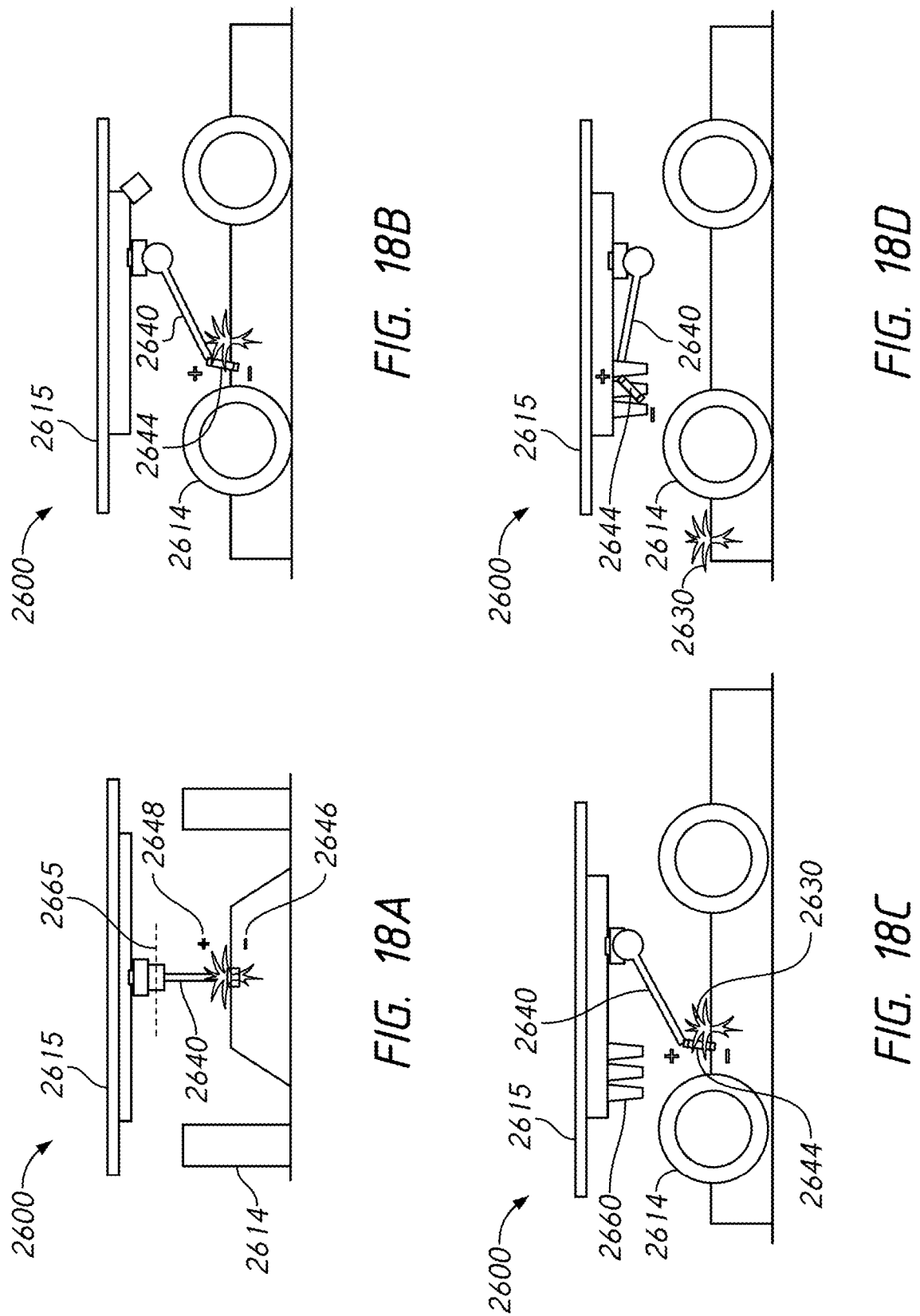
FIG. 18A is a diagram of a Hybrid Electrical Mechanical Autonomous Ground Vehicle with a single hoe with integrated positive and negative electrodes, according to an embodiment of the disclosure.
FIG. 18B is a diagram of a Hybrid Electrical Mechanical Autonomous Ground Vehicle with a single hoe with integrated positive and negative electrodes, according to an embodiment of the disclosure.
FIG. 18C is a diagram of a Hybrid Electrical Mechanical Autonomous Ground Vehicle showing a cleaning mechanism, according to an embodiment of the disclosure.
FIG. 18D is a diagram of a Hybrid Electrical Mechanical Autonomous Ground Vehicle taking cleaning action, according to an embodiment of the disclosure

As shown in FIGS. 18A-18D, an embodiment of Hybrid Electrical Mechanical Autonomous Ground Vehicle 2600. FIGS. 18A-18B show an embodiment of a ground robot 2611 generally comprises at least two wheels 2614 (and/or other propulsion systems, as discussed above), solar panel 2615, camera (for example, like camera 2520 in FIG. 17A), and robotic arm 2640. The robotic arm 2640 includes a hybrid mechanical electrical end-effector comprised of a hoe 2644. The hoe 2644 is comprised of a negative region 2646 near the terminating end of hoe 2644 and a positive region 2648 along the body or at the base of hoe 2644. In some embodiments, negative region 2646 is a sharp or rounded tip, positive region 2648 is a collar, and the region between negative region 2646 and positive region 2648 is an insulator. In some embodiments, when a switch (for example, like switch 509 in FIG. 4A) is activated, the hoe becomes charged. As describe below, the switches (which may comprise one or more switches, relays, transistors, and/or the like) may desirably be automatically activatable by the robot's control system, without requiring manual activation by a user. Robotic arm 2640 is coupled to Ground Robot 2611 and is powered by at least one motor (and desirably at least two motors, such as to control two separate degrees of motion and/or to control rotation of the arm about two separate rotational axes). Robotic arm 2640 can rotate around a central axis 2665 and move up and down. In this embodiment, the central axis is a pitch axis that is parallel to the wheel rotation axis. In other embodiments, the central axis may be a yaw axis or a roll axis. In some embodiments, robotic arm 2640 can use the structures of FIGS. 19A-19C. Further details of example rotation axis orientations are provided below with reference to FIGS. 19A-19C.

In operation, ground robot 2611 uses wheels 2614 to travel on ground 2602 along crop row 2603 to find weeds. Ground robot 2611 uses camera to detect weed 2630 in crop row 2603. When camera takes an image, records a video, and/or the like, and CPU (for example, like CPU 507 in FIG. 4A) determines the existence and location of weed 2630, Ground Robot 2611 uses AI system to determine whether to remove weed 2630 with either hoe 2644, or by electrical means. This determination considers a number of factors which can include the type of soil, the condition of the soil, the type of crop, the type of weed, and/or the like.

As shown in FIG. 18B, if mechanical means are found optimal based on the AI determination, ground robot 2611 uses wheels 2614 to position itself above weed, uses camera and CPU (for example, like CPU 507 in FIG. 4A) to determine location of weed 2630, then uses robotic arm 2640 to hoe the weed out of the ground.

As shown in FIG. 18A, if electrical means are found optimal based on the AI determination, ground robot 2611 uses wheels 2614 to position itself above weed, the ground robot high voltage circuit (for example, like HV Booster 511 in FIG. 4A) is enabled, robotic arm 2640 moves to make contact with the weed. Once hybrid electrical mechanical end effector makes contact with the weed, a switch flips to activate the high voltage circuit and the weed is electrocuted. Electricity travel directly through the stem of the weed. In some embodiments, the switch is activated and the weed is electrocuted when the hybrid electrical mechanical end effector makes contact with the weed and the ground. In some embodiments, the switch is activated and the weed is electrocuted when the hybrid electrical mechanical end effector makes contact with the weed and an adjacent weed, the adjacent weed also being electrocuted.

In some embodiments, the wheels (and/or other propulsion system, such as tracks) are made of metal or have metal studs to act as the negative probe to connect the circuit to the ground. In some embodiments, ground robot 2611 is powered by batteries (for example, like battery 503 in FIG. 4A). In some embodiments, ground robot 2611 is powered by solar panels 2615 and batteries wherein solar panels 2615 charge the batteries. In some embodiments, image, video, and/or the like, processing is performed by the GPU, TPU, or an accelerator onboard the ground robot.

In some embodiments, ground robot 2611 can have more than one camera. In some embodiments, robotic arm 2640 are coupled to a hybrid mechanical electrical end-effector that includes any combination of a shovel, a hoe, and an electrode, or all three as shown in FIG. 20. In some embodiments the hoe 2644 is a warren hoe, a hula hoe, and/or the like. In some embodiments, the robotic arm is a 2-axis robotic arm.

As shown in FIG. 18C-18D, in some embodiments a cleaning mechanism 2660 can be coupled to ground robot 2611. In some embodiments, the cleaning mechanism comprises one or more protrusions, one or more brushes, one or more integrated brushes, one or more finger elements, and/or the like. Once the ground robot has removed a weed as previously described, the robotic arm 2640 can move the end effector 2644 to the cleaning mechanism 2660 to remove debris such as dirt, soil, burs, plant matter, rocks, sand, dust, water, sticks and/or the like. A cleaning mechanism is advantageous for optimal weed removal as well as to prevent the end effector from short circuiting.

In some embodiments, the robotic arm 2640 moves the end effector 2644 through the cleaning mechanism in different planes of motion to remove the debris. In some embodiments, the ground robot 2611 uses a camera and an AI system to ensure the debris has been removed. For example, the ground robot 2611 may use one or more cameras to detect the amount of debris that has accumulated on one or more end effectors. In some embodiments, the one or more cameras may detect the amount of debris on the one or more end effectors by comparing one or more current images of the end effectors to one or more stored images of the end effectors. For example, the ground robot 2611 may perform image edge detection to identify if there is sufficient debris on an end effector to perform a cleaning operation. In some embodiments, the ground robot 2411 may perform a cleaning operation after a certain threshold of distortion is identified in the image edge detection. For example, when there is 5%, 10%, 15%, 20%, 25%, 50%, and/or the like distortion in the image. In some embodiments, the end effector 2644 is cleaned after every weed is removed. In some embodiments, the end effector 2624 is cleaned after a certain number of weeds are removed, or a duration of time has passed. In some embodiments, the end effector 2644 is cleaned when the AI system determined a cleaning is necessary, for example, such as when the AI system detects a specific quantity of debris or issues with the circuit, and/or the like. In some embodiments, the cleaning mechanism comprises one or more protrusions coupled to an external portion of the ground vehicles disclosed herein (such as ground robot 2811, 2611, 2411 and/or the like). In some embodiments, the cleaning mechanism can be used to clean a robotic arm, an end effector, an electrode, a hoe portion, a shovel portion, and/or the like (including any of the robotic arms, end effectors, electrodes, hoe portions, and shovel portions disclosed herein).

In some embodiments, the cleaning mechanism 2660 contains a sharpener, hone, grinder and/or the like that can be used to sharpen tools on the end effector 2644 such a shovel, a hoe, and/or the like. In some embodiments the robotic arm 2640 moves the end effector 2644 through the sharpener to sharpen the tools.

In some embodiments, the ground robots described herein may be able to clean and/or sharpen the end effectors of one robotic arm using the end effector of the other robotic arm. Referring to ground robot 2411 shown in FIGS. 24A-24D as an example, the ground robot 2411 may be configured to use robotic arm 2440 to clean and/or sharpen the end effector of other robotic arm 2450 and vice versa while in operation. For example, as the ground robot 2411 performs an operation, the end effectors may collect debris which may impact the operations (e.g., weed control operations) the ground robot is performing. To remove the debris (e.g., break and remove burs), the ground robot's control system may be configured to move the two end effectors together so that a portion of one end effector contacts a portion of the other end effector and further movement of either end effector results in the removal of debris. For example, if the ground robot 2411 determines that there is too much debris in the negative electrode 2452 of robotic arm 2450, the ground robot 2411 may move the robotic arm 2440 such that a portion of the end effector (e.g., hoe 2444) scrapes all or some of the debris that is impacting the negative electrode 2452. In another example, if the ground robot 2411 determines that there is too much debris on the end effector (e.g., hoe 2454) of robotic arm 2450 (e.g., if the hoe 2454 had significant mud caked to the outside), the ground robot 2411 may move the robotic arm 2440 such that a portion of the end effector (e.g., hoe 2444) scrapes all or some of the debris that is impacting the end effector of robotic arm 2450.

Similar to cleaning operations, in some embodiments, the ground robots described herein may perform a sharpening operation on one end effector (e.g., a hoe or shovel portion) using the other end effector. For example, as the ground robot 2411 performs an operation, portions of the end effector, such as, for example a shovel portion and/or hoe portion (e.g., hoe 2444, hoe 2454, and/or the like) may become dull which may impact the operations (e.g., weed control operations) the ground robot is performing. Rather than returning to the farm for manual sharpening, the ground robot's control system may be configured to move the two end effectors together so that a portion of one end effector contacts a portion of the other end effector and further movement of either end effector results in the sharpening of a portion of the other end effector. For example, if the ground robot 2411 determines that a portion of the end effector (e.g., the hoe 2454) of robotic arm 2450 is too dull, the ground robot 2411 may move the robotic arm 2440 such that a portion of the end effector (e.g., hoe 2444) scrapes the end effector (e.g., hoe 2454) of robotic arm 2450 and causes the end effector to become sharper.

In some embodiments, the ground robot 2411 may implement one or more methods to determine when a cleaning and/or sharpening operation should be performed. For example, in some embodiments, the ground robot 2411 may use one or more cameras (e.g., camera 2420) and/or an AI system (e.g., as described above) to determine when debris should be removed and/or ensure that the debris has been removed following a cleaning operation. For example, the ground robot 2411 may use one or more cameras to detect the quantity of debris that has accumulated on one or more end effectors. In some embodiments, the one or more cameras may detect the quantity of debris on the one or more end effectors by comparing one or more current images of the end effectors to one or more stored images of the end effectors. For example, the ground robot 2411 may perform image edge detection to identify if there is sufficient debris on an end effector to perform a cleaning operation. In some embodiments, the ground robot 2411 may perform a cleaning operation after a certain threshold of distortion is identified in the image edge detection. For example, when there is 5%, 10%, 15%, 20%, 25%, 50%, and/or the like distortion in the image. In some embodiments, an end effector may be cleaned and/or sharpened after every weed is removed. In some embodiments, an end effector may be cleaned and/or sharpened after a certain number of weeds are removed, or a duration of time has passed. In some embodiments, an end effector is cleaned when the AI system determined a cleaning is necessary, for example, such as when the AI system detects a specific quantity of debris or issues with the circuit, and/or the like.

In some embodiments, when performing a sharpening operation, the ground robot 2411 may determine (e.g., using one or more cameras) the specific angles to align the end effectors for correct sharpening. For example, a sharpening angle of 45 degrees of one end effector relative to the other end effector may be optimal for sharpening. Using the one or more cameras and the control system, the ground robot 2411 may compare images of the two end effectors (e.g., hoe 2454 and 2444) and adjust the positions of the robot arms (e.g., 2450 and 2440) relative to each other until the correct angle (e.g., as determined by updated images from the one or more cameras) is achieved. The ground robot 2411 may then commence a sharpening operation while maintaining the correct angle. In some embodiments, the end effectors may include a sharpening portion that can be used the sharpen an alternate end effector. For example, the ground robot 2411 may move one end effector (e.g., hoe 2444) through the sharpening portion on the other end effector (e.g., on robotic arm 2450) to sharpen the first end effector.

The ability to perform autonomous cleaning and/or sharpening operations while a ground robot is in use ensures that the ground robots can operate autonomously and perform operations for a significant period of time without requiring manual intervention. For example, rather than being forced to return to a base of operations, such as a farm, or requiring manual intervention at the point of operation each time an issue with an end effector is detected, the ground robots can detect and resolve issues in the field and continue to perform their current operation. Autonomous cleaning and/or sharpening operations are difficult to implement because the ground robots need to be able to identify an issue (e.g., too much debris), and perform an automated operation to remedy the issue (e.g., remove the debris). In some embodiments, this solution requires precise image detection and analysis as well an advanced control system that allows the ground robot to move the robotic arms precisely and within a small threshold of error to perform the cleaning or sharpening operation.

Figure 19A:
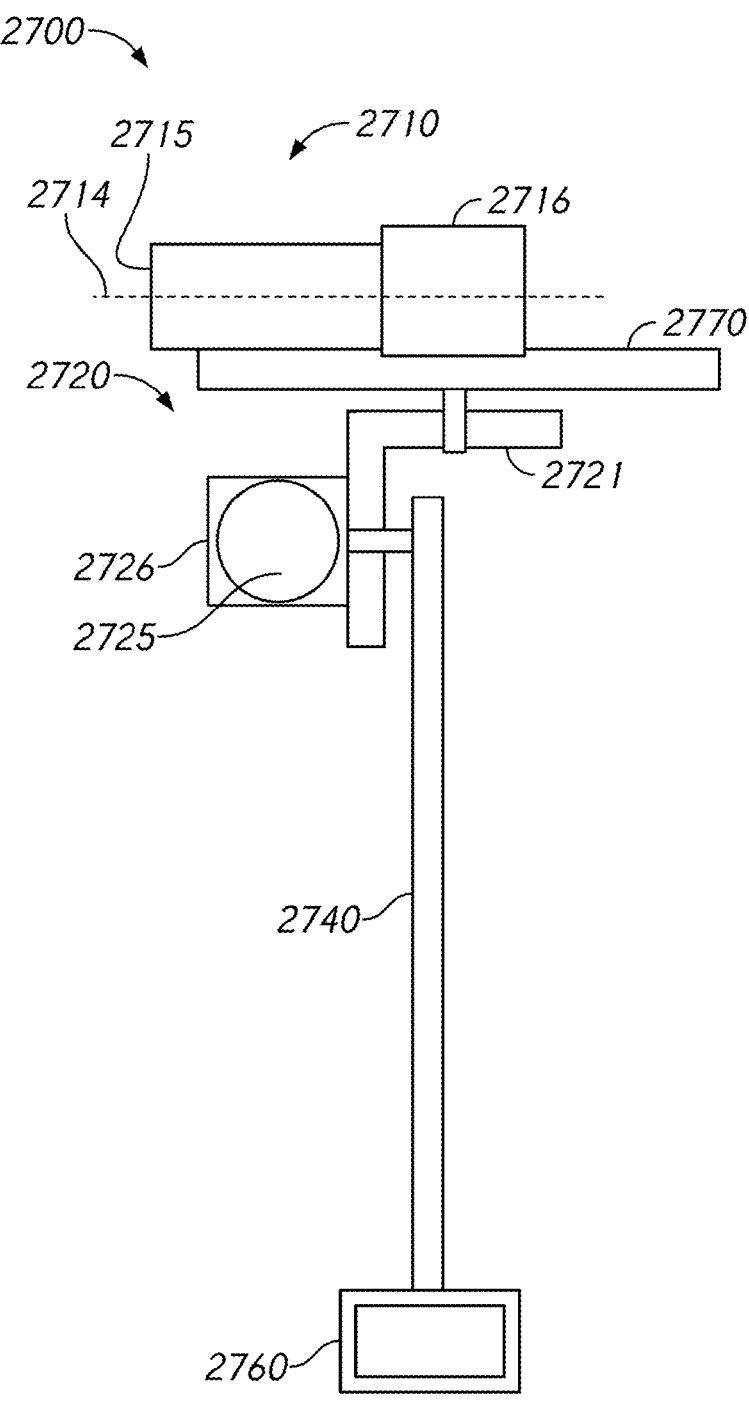
FIG. 19A is a diagram of a front view of a mechanical arm, according to an embodiment of the disclosure.
Figure 19B:
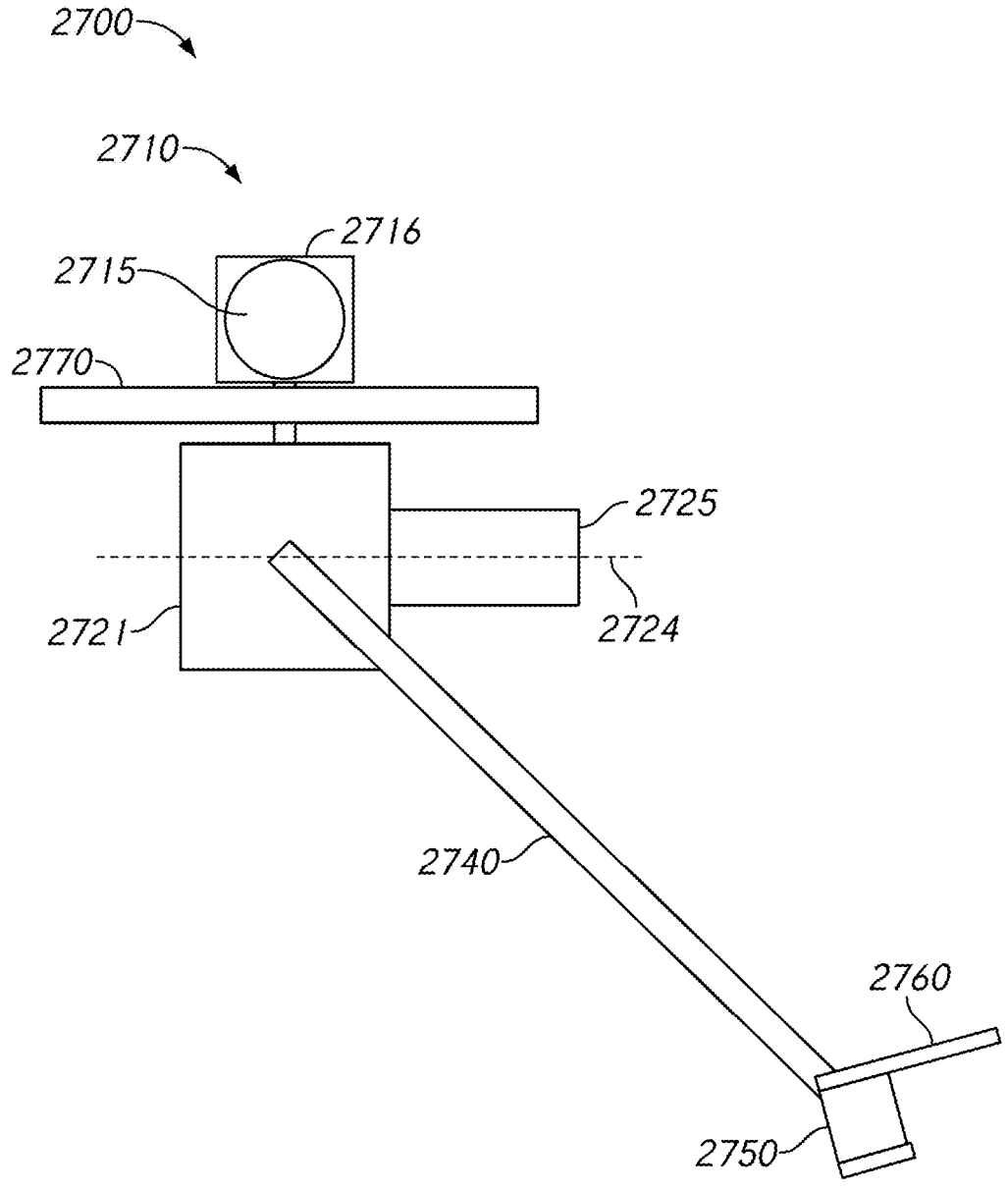
FIG. 19B is a diagram of a side view of a mechanical arm, according to an embodiment of the disclosure.
Figure 19C:
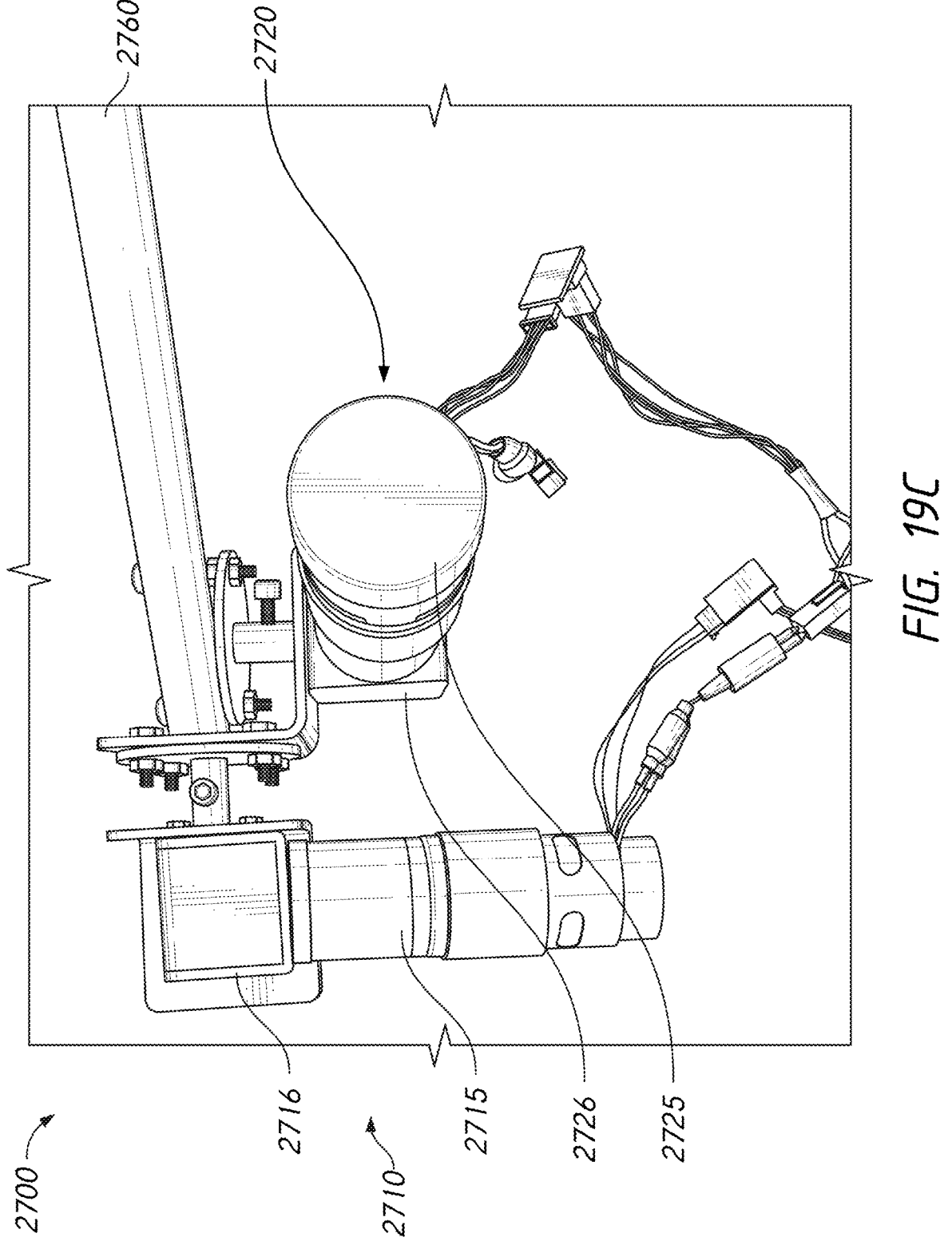
FIG. 19C is a diagram of a mechanical arm, according to an embodiment of the disclosure.

FIG. 19A-19C illustrate an embodiment of a robotic arm 2700 (which may be used as, for example, any of the robotic arms disclosed herein). The robotic arm 2700 includes a yaw motor 2710 (e.g., a first motor), a pitch motor 2720 (e.g., a second motor), a hoe arm 2740 (e.g., a mechanical arm and/or the like), a hoe 2750, and shovel 2760. Hoe arm 2740 is coupled to the ground robotic vehicle structure 2770 (which may be, for example, the undercarriage 652 of frame 650 disclosed herein). The hoe 2750 is coupled to the hoe arm 2740. The shovel 2760 is coupled to the hoe arm 2740. In some embodiments, the hoe is a warren hoe, a hula hoe, and/or the like.

In this embodiment, the pitch motor 2720 is connected to the vehicle structure 2770, with an output shaft 2725 of the pitch motor 2720 being oriented in a vertical direction such that the output shaft rotates about a vertical rotation axis 2724. A bracket 2721 is coupled to the output shaft of the pitch motor 2720, and the yaw motor 2710 is coupled to the bracket 2721. The yaw motor 2710 is positioned on the bracket 2721 such that an output shaft 2715 of the yaw motor 2710 is oriented in a horizontal direction, such that the output shaft rotates about a horizontally oriented rotation axis 2714. The output shaft 2715 of the yaw motor 2710 is coupled to a proximal end of the hoe arm 2740. With such an arrangement, the hoe arm 2740 can be caused to rotate about two separate axes of rotation, namely a vertical axis 2724 defined by the output shaft 2725 of the pitch motor 2720 and a horizontal axis 2714 defined by the output shaft 2715 of the yaw motor 2710. Other embodiments may include more or less drive motors and/or axes of rotation, other embodiments may position the multiple axes of rotation in different orientations, and/or the like. Further, in some embodiments, including the embodiment shown in FIG. 27A, the two motors are actually motor assemblies that each include a motor and gearbox (for example, gearbox 2726 for the pitch motor 2720 and gearbox 2716 for the yaw motor 2710. In such a configuration, the output shafts 2725 and 2715 are actually an output shaft of a gearbox that is coupled to the motor. Such a configuration can be desirable, for example, to provide a mechanical advantage, to change an orientation of the rotation axis, and/or the like.

In this embodiment, the motors 2710, 2720 desirably comprise brushless DC motors, which can operate relatively efficiently. Some embodiments may, however, use different types of electric motors, hydraulic and/or pneumatic motors, linear actuators, rack and pinon systems, hydraulic and/or pneumatic cylinders or actuators, and/or the like.

As shown in FIG. 20A, an embodiment of Hybrid Electrical Mechanical Autonomous Ground Vehicle 2800. Ground robot 2811 includes at least two wheels 2814 (and/or other propulsion systems, as discussed above), robotic arm 2840, hoe 2850, shovel 2860, and ground robot vehicle structure 2870. Robotic arm 2840 is coupled to the ground robotic vehicle structure 2870 and is powered by at least one motor (and desirably at least two motors, such as to control two separate degrees of motion and/or to control rotation of the arm about two separate rotational axes). Robotic arm 2840 can rotate around a central axis 2865 and move up and down. In this embodiment, the central axis is a pitch axis that is parallel to the wheel rotation axis. In other embodiments, the central axis may be a yaw axis or a roll axis. In some embodiments, robotic arm 2840 can use the structures of FIGS. 19A-19C. Further details of example rotation axis orientations are provided above with reference to FIGS. 19A-19C. The hoe 2850 is coupled to the robotic arm 2840. The shovel 2860 is coupled to the robotic arm 2840. FIG. 20B, shows a front view of an embodiment of ground robot 2811.

FIG. 20A shows robotic arm 2840 in three functional positions. Position one is shown by robotic arm 2840A, hoe 2850A, and shovel 2860A. Position two is shown by robotic arm 2840B, hoe 2850B, and shovel 2860B. Position three is shown by robotic arm 2840C, hoe 2850C, and shovel 2860C. Position one is shown by robotic arm 2840A, where it can be used for plant management by mechanical or electrical means where robotic arm 2840 can hoe weeds and/or electrocute weeds as previously described.

FIG. 20A shows robotic arm 2840 in a second position at 2840B, where shovel 2860B can be used to dig holes in the ground 2802 and perform terraforming operations. Shovel 2860B can be used to dig holes when ground robot 2811 moves on wheels 2814 forwards and backwards or side to side while the robotic arm 2840B moves in one or more planes of motion using motors (for example, like motors 2710 and 2720 in FIG. 19A).

This method of digging holes is advantageous for creating pockets in the ground that can retain water and seeds. In one application, ground robot 2811 can use robot arm 2840 in position 2840B to dig crescent pockets shown in FIG. 29. When rainwater falls and seeds blow in the wind, the pockets collect the water and seeds to promote regrowth of vegetation. This application is advantageous to restore vegetation to land in previously arid environments and degraded farmland. In other embodiments, the pockets created can be half-circle, half-square or any other shaped hole that promotes water and/or seed retention.

Figure 21:
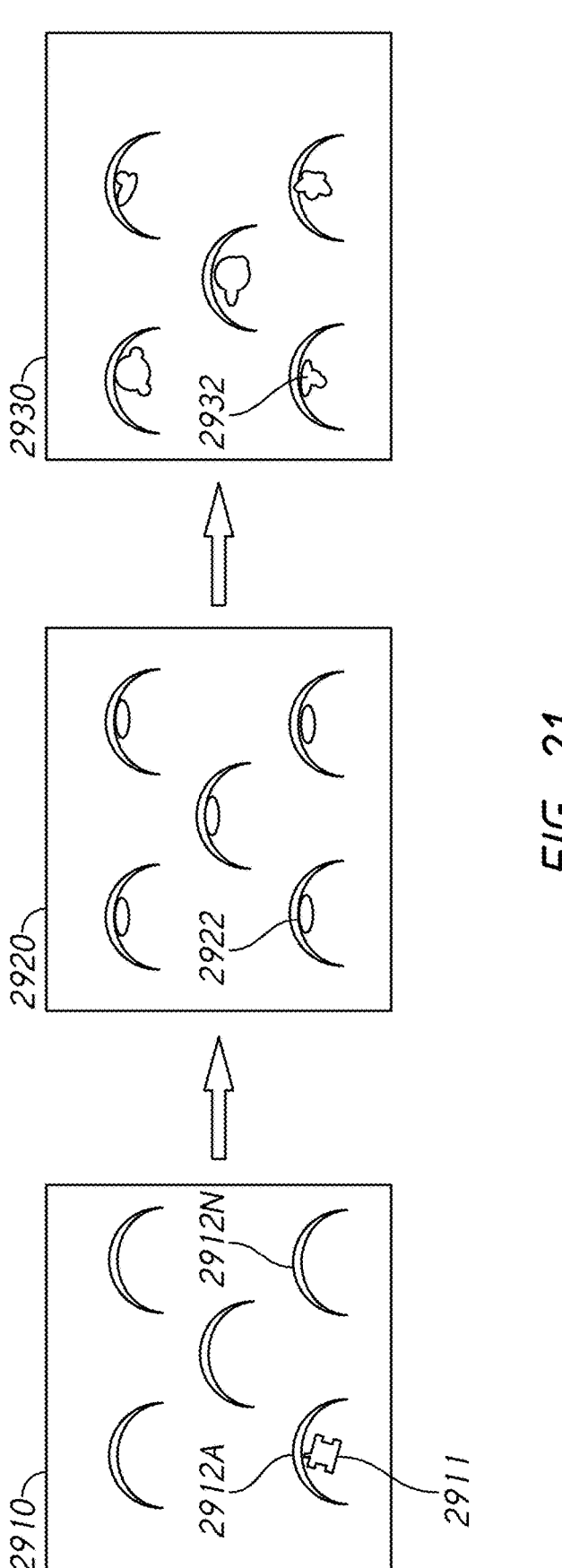
FIG. 21 is a diagram showing land improvement over time.

As shown in FIG. 21, an embodiment of a flow diagram 2900. At step 2910, an embodiment of ground robot 2911 creates crescent shaped pockets 2912A-2912N in the ground. At step 2920, seeds and water 2922 collect in the pockets 2912A-2912N through natural means such as rain and wind. At step 2930, after a certain amount of time, vegetation such as plants, trees, crops, and/or the like 2932, whose seeds land in the pockets grow in the pockets.

Figure 22:
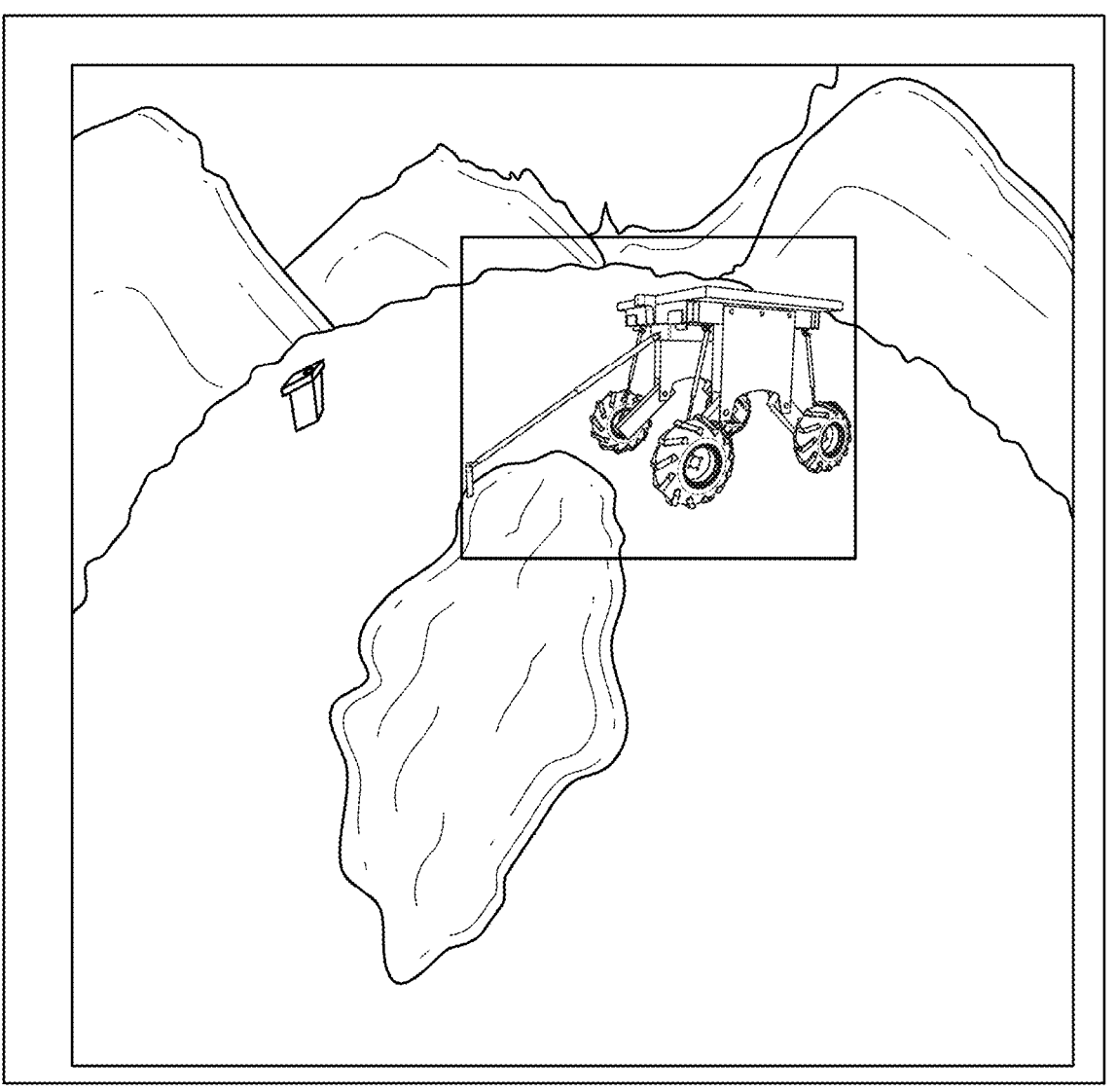
FIG. 22 is an image of a Hybrid Electrical Mechanical Autonomous Ground Vehicle creating soil water retention pockets, according to an embodiment of the disclosure.

FIG. 22 shows an embodiment of Hybrid Electrical Mechanical Autonomous Ground Vehicle using a shovel to create a soil water retention pocket. In some embodiments, a soil water retention pocket may be referred to as a ground pocket.

FIG. 20A shows robotic arm 2840 in a third position at 2840C. When robotic arm 2840C is moved in a plane or planes of motions, for example, from side to side or up and down or in a combination thereof by motors (for example, like motors 2710 and 2720 in FIG. 27A), ground robot 2811 can be used to herd livestock 2880. Livestock can be any animal such as cattle, sheep, and/or the like. In some embodiments, herding livestock can be moving different livestock from one area to another while the livestock graze.

Use of ground robot 2811 to move livestock can be advantageous because in some embodiments, ground robot 2811 can use cameras (for example, such as camera 2420 in FIG. 16A) and an AI system to analyze the plant life the livestock are eating. By monitoring which plant life is consumed and the quantity consumed by livestock, ground robot 2811 can prevent detrimental overgrazing of the land. In some embodiments, ground robot 2811 uses AI system to determine the value of the plants prior to moving the livestock to a specific area. In some embodiments, ground robot 2811 uses AI system to determine the value of the plants while herding the livestock to a specific area. In some embodiments, the AI system determines the value of plants by comparing the generated image of the plant to a data store, catalogue, list, look up table, and/or the like of other plants. In some embodiments, plants traditionally seen as a weed can be value adding, because the weeds can be used to store carbon in the ground or add nutrients to the soil. In some embodiments, the catalogue, list, look up table and/or the like is stored on a cloud server. In some embodiments, ground robot 2811 uses camera and CPU (for example, like CPU 507 in FIG. 4A) to map the land for analysis. In some embodiments, robotic arm 2840C has reflector, lights, a method of producing sounds, ribbons, strings, wires, and/or the like coupled to the end effector. In some embodiments, robotic arm 2840C may use the electrodes on the end effector, for example, similar to a taser, for moving livestock.

Use of ground robots disclosed herein (such as ground robot 2811, 2611, 2411 and/or the like), to dig soil water retention pockets is advantageous to prevent soil compression, which is common when standard construction vehicles are used to dig holes in the ground. In some embodiments, a ground robot weighs no more than, for example, 150 pounds, which allows a single robot to be shipped over standard freight and reduces soil compaction and damage to the land. In some embodiments, ground robot weights no more than 75 pounds, 100 pounds, 125 pounds, 175 pounds, 200 pounds, and/or the like. In some embodiments, ground robot's light weight is achieved by using large solar panel size instead of larger batteries. Further, in some embodiments, the light weight of ground robot is achieved by allowing the solar panel to pivot to improve solar efficiency by up to, for example 35%. In some embodiments, the increase in solar efficiency can be 5%, 10%, 15%, 20%, 25%, 30%, 35%, 40%, and/or the like. In some embodiments, ground robot's weight is reduced because it does not have any onboard fuel inputs, gas engines, heavy tools such as lasers and/or the like. In some embodiments, ground robot has two or more cameras. In some embodiments, ground vehicle unit is constructed with aluminum extrusions, thin steel, and/or the like. In some embodiments, ground robot applies a pressure of for example, approximately 6 PSI (pounds per square inch) on the ground. In some embodiments, ground robot applies a pressure on the ground of less than 4 PSI, 5 PSI, 6 PSI, 7 PSI, 8 PSI, 9 PSI, 10 PSI, 11 PSI, 12 PSI, 13 PSI, 14 PSI, 15 PSI, and/or the like. In some embodiments ground robot 2811 applies a pressure of less than 15 PSI on the soil to prevent soil compression. In some embodiments ground robot is symmetrical. In some embodiments, ground robot can operate the same way whether moving forwards or backwards. In some embodiments, ground robot has a mechanical propulsion mechanism that comprises mechanical legs. In some embodiments, ground robot has a mechanical propulsion mechanism that comprises four wheels. In some embodiments, the software in ground robot can be changed to complete any of the operations disclosed herein.

Figures 23A, 23B:
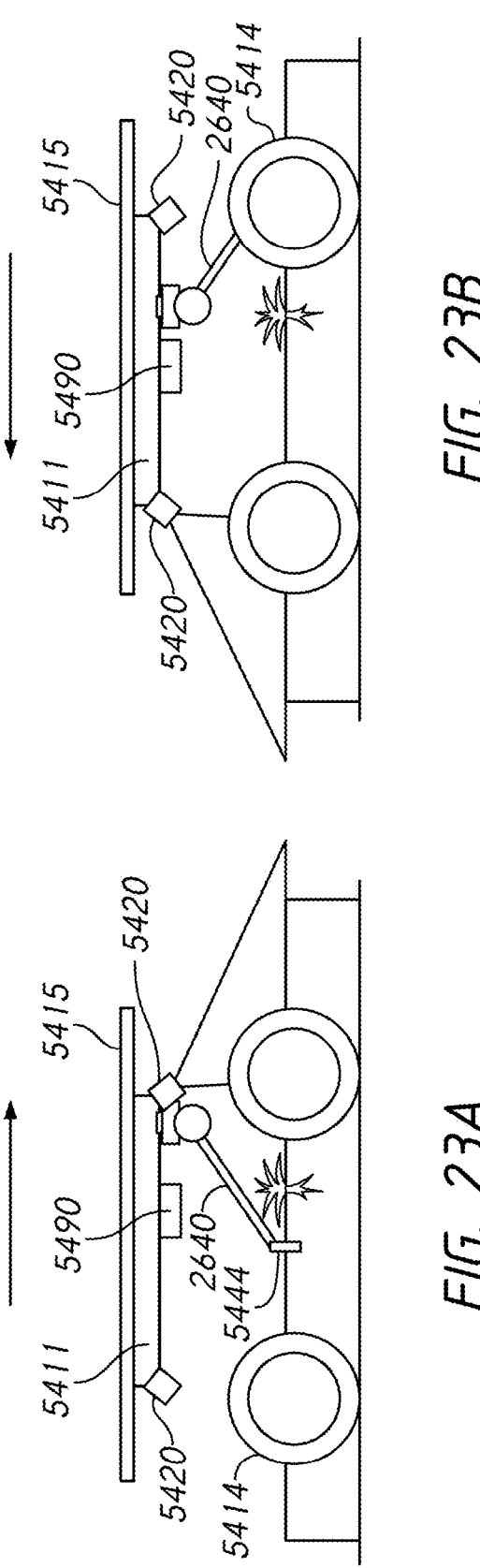
FIG. 23A-23B is a diagram of Hybrid Electrical Mechanical Autonomous Ground Vehicle showing symmetric reverse turning, according to an embodiment.

As shown in FIGS. 23A-23B, another embodiment of a ground robot 5411 generally comprises at least two wheels 5414, solar panel 5415, two cameras 5420, computer 5490, and robotic arm 2640. The robotic arm 2640 includes a hybrid mechanical electrical end-effector 5444.

In some embodiments, ground robot 5411 is symmetrical. Symmetrical means that ground robot 5411 may have the same or similar components on each side (for example, a camera and/or the like) such that ground robot 5411 can perform agricultural plant and soil management operations whether moving forwards or in reverse. Being symmetrical and able to move and perform operations while moving forwards or in reverse is beneficial because it enables ground robot to move up and down crop rows without having to turn. FIG. 23A shows ground robot 5411 moving in a forward direction. FIG. 23B shows ground robot 5411 moving in a reverse direction.

Figures 23C, 23D:
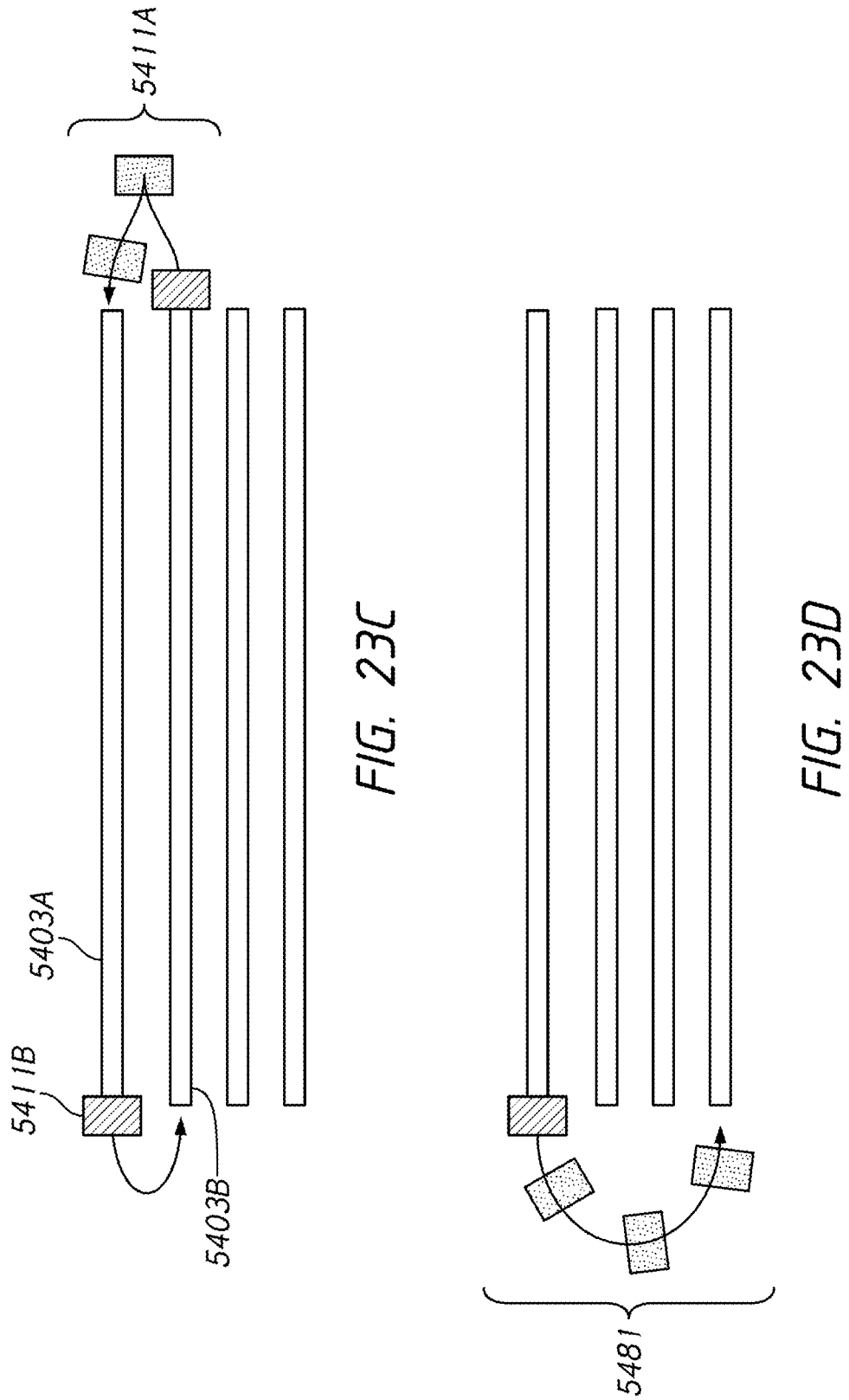
FIG. 23C is a diagram showing symmetric multiple crop row turning methods.
FIG. 23D is a diagram showing normal robotic crop row turning.

As shown in FIG. 23C, ground robot 5411A can symmetrically reverse which enables ground robot to progressively move down crop row 5403B in a forward direction and perform agricultural plant and soil management operations, then move down crop row 5403A in a reverse direction and perform agricultural plant and soil management operations without skipping a row. In some embodiments, ground robot 5451B has additional motors to rotate each wheel to provide for a tight turning radius. As shown in FIG. 23D, a ground robot 5481 without symmetrical turning or additional motors in each wheel may have to skip rows due to a large turning radius.

When completing operations (e.g., on a farm), it may be beneficial to have ground robots that have a larger width. For example, when performing weed management operations on a farm, some crop rows may be too large for a ground robot to drive with wheels on either side of the row. To address this issue, in some embodiments, the ground robots described herein may be configured to combine with another ground robot to form a larger ground robot. For example, components on the ground robots may be easily removable and the ground robots may be configured to receive additional components (e.g., adaptors) to allow multiple ground robots to be combined for greater width.

FIGS. 24A-24E illustrate embodiments of a ground robot 2411A being combined with a ground robot 2411B to form a large ground robot 2412. It is recognized that ground robot 2411 is used as an example only and any of the ground robots described herein may combine with other ground robots to form a large ground robot. FIG. 55A illustrates an embodiment of a ground robot 2411A. The ground robot 2411A may be configured so that certain component, such as, for example, one or more wheels 2414 can be manually removed.

Figures 24A, 24B, 24C:
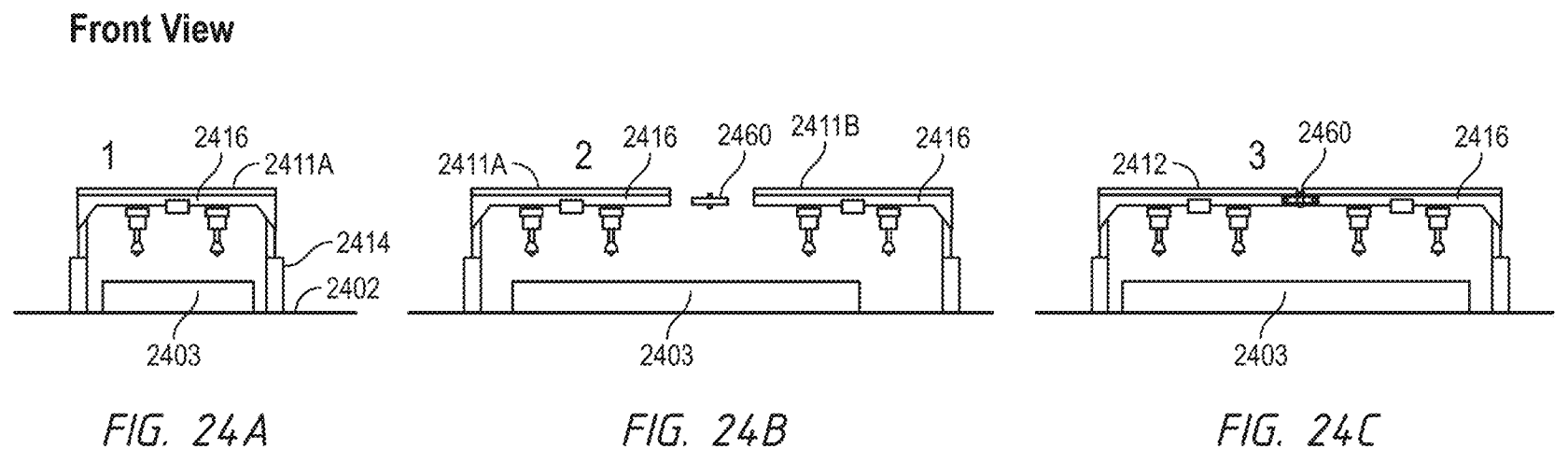
Figure 24D:
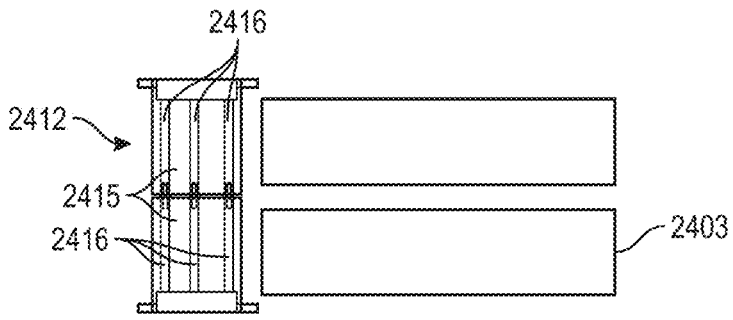
Figure 24E:
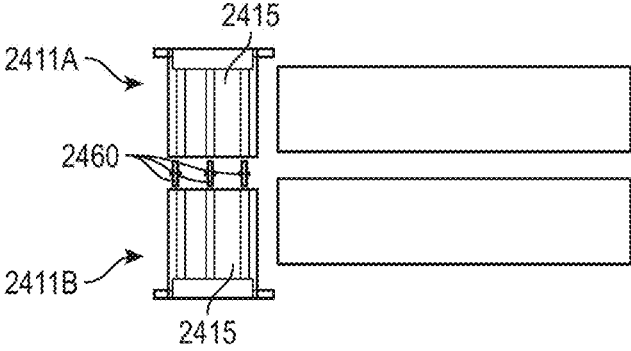

FIGS. 24B and 24E illustrate embodiments of the ground robot 2411A, a second similar/identical ground robot 2411B, and adaptors 2460. Ground robots 2411A and 2411B may each comprise a frame that includes one or more rails 2416. For example, ground robots 2411A/2411B may include 1, 2, 3, 4, 5, 6, 7, 8, 9, 10 and/or the like rails 2416. Each rail 2416 may be configured to receive and securely hold an adaptor 2460. For example, the adaptors 2460 may be locked in place once inserted into a rail 2416. The adaptors 2460 may comprise a metal, polymer, and/or other suitable material. The adaptors 2460 may be configured such that one side an adaptor 2460 may be inserted into a rail of a first ground robot (e.g., ground robot 2411A) and the second side of the adaptor 2460 may be inserted into a corresponding rail of a second ground robot (e.g., ground robot 2411B). As shown, ground robots 2411A/2411B each have had two wheels 2414 removed and are positioned close to each other (e.g., manually) so that one or more adaptors 2460 can be inserted into the rails 2416.

FIGS. 24C and 24D illustrate embodiments of a large ground robot 2412. Large ground robot 2412 was completed by connecting the corresponding rails 2416 of ground robot 2411A and 2411B using adaptors 2460. It is recognized that rails 2416 are viewable through solar panels 2415 for illustrative purposes only and would not be viewable from a top view of the ground robots 2411A/2411B. The completed large ground robot 2412 can now operate and perform operations (e.g., weed management operations) at a larger scale. In some embodiments, only the one or more wheels 2414 are removed from each ground robot 2411A/2411B such that large ground robot 2412 includes all of the remaining original components of each ground robot 2411A/2411B. For example, large ground robot 2412 may comprise two solar panels 2415, two robotic arms 2440, two robotic arms 2450, two computers 2490, and so forth. In some embodiments, due to the two computer systems, the computers 2490 may be configured to communicate with each other such that one computer 2490 controls the large ground robot's operations (e.g., driving, navigation, and/or the like). In some embodiments, each computer 2490 may control their respective robotic arms during operations.

The completed large ground robot 2412 can perform operations in the same manner as other ground robots described herein but may advantageously be able to perform operations quicker and/or at a larger scale. For example, due to the increased number of robotic arms, large ground robot 2412 may be configured to perform weed management operations on large crop rows using all four robotic arms.

In some embodiments, ground robots that are configured to combine to form large ground robots may be equipped with wheels that include two motors on the drive trains. For example, each wheel (e.g., wheel 2414) may include a motor on the outside of the wheel and a motor on the inside of the wheel. The additional motors may provide benefits such as allowing the large ground robots to compensate for the additional weight provided by combining two normal ground robots. In some embodiments, more than two ground robots (e.g., three, four, five, and/or the like) may be able to be combined. Being able to combine two ground robots into one large ground robots may provide benefits such as only requiring one sized ground robot even when large operations are required.

In some embodiments, the ground robots described herein may be configured to use their solar panels as an additional propulsion method. For example, a ground robot may be able to raise the solar panel in windy conditions such that the solar panel acts as a sail. Due to the large size of the solar panels relative to the weight of the ground robots, significant power may be generated from the solar panel when used as a sail. Use of the solar panel as a sail may provide benefits due to the often windy conditions the ground robots are operating in and particularly on days when the amount of solar energy generated by the solar panel is low (e.g., cloudy weather). In some embodiments, the ground robot's motors (e.g., brushless motors) may be configured to return power back to the batteries through motor regeneration.

In some embodiments, the ground robots described herein may be configured to determine local wind conditions around the ground robot such as, for example, local wind velocity. For example, the ground robots may include a wind measurement system such as an anemometer. In another example, the ground robots may be able to calculate the wind speed and direction based on the force on the extended solar panel. For example, when the ground robot extends the solar panel, the control system may be configured to determine the increase in velocity relative to the previous velocity. Using the increase in velocity and known parameters such as, for example, the angle of the solar panel, area of the solar panel, direction of travel, and the like, the ground robot may be able to approximate the speed of the wind and the direction of the wind. In some embodiments, the ground robot may use a measurement of current to determine if velocity is higher than anticipated and the relative increase in velocity. In another example, the ground robots described herein may be configured to receive local wind conditions. For example, local wind conditions may be transmitted to the ground robots via their computer systems from a third-party computer system or database. The local wind conditions may impact the various operations the ground robots perform as described below.

Multiple methods of determining the wind conditions may provide benefits such as allowing the ground robots to have multiple estimates of local wind conditions. For example, weather data may provide a rough estimate of local wind conditions and can be used to determine if certain operations should be performed as described herein. However, wind conditions at the ground robot's level may vary, so additional methods of determining local conditions may provide a more accurate gauge of wind velocity near the ground robot's level.

In some embodiments, the ground robots described herein may be configured to optimize the angle of the solar panel to maximize energy production from both the wind and the sun using the control system and/or AI system. For example, using one or more of the methods described above and/or other methods of wind detection, the ground robots can approximate a wind velocity at their local area. Additionally, the ground robots can determine the amount of energy currently being generated by the solar panel from the sun. Using this information, the control system can adjust the solar panel to determine the angle at which the most amount of power is being generated. For example, on a day with low wind speeds, the ground robot may determine that a solar panel orientated at 0 degrees is generating the most energy, particularly if the sun is directly above the ground robot. In another example, on a day with high wind speeds and low sun levels, the ground robot may determine that an angle between 0 and 90 degrees provides the most energy. In yet another example, on a sunless day or at night, the ground robot may determine that the solar panel is generating no solar energy and may extend the solar panel to 90 degrees to optimize the wind energy.

In some embodiments, the control system may be configured to adjust the angle of the solar panel periodically to determine the optimum angle. For example, the angle may be adjusted every 1, 2, 3, 4, 5, 6, 7, 8, 9, 10, 15, 20, 30, and/or the like minutes. In some embodiments, prior to adjusting the angle of the solar panel, the ground robot may access local weather data as described above to determine if the wind speed is too high or too low to extend the solar panel. For example, if the wind speed is too low, the ground robot may focus on solar optimization. In another example, if the wind speed is too high (e.g., above a threshold), the ground robot may not extend the solar panel at all to prevent tilt. In some embodiments, the ground robot may be configured to determine if there is a risk of falling over based on the extended solar panel. For example, the ground robots may include one or more accelerometers that can be used to determine if unanticipated acceleration is occurring. If unanticipated acceleration is occurring, the ground robot may retract the solar panel to prevent the ground robot from being blown over.

In operation, the ground robot may extend the solar panel to a first angle and determine the energy production from both the sun and wind at the first angle. After a time-interval, the ground robot may extend the solar panel to a second angle and determine the energy production from both the sun and wind at the second angle. The ground robot may continually adjust the angle, make energy determinations, and make further angle adjustments throughout the day to continuously optimize the energy production. For example, if the ground robot knows the energy production at zero degrees, an adjustment to 45 degrees may be made and the energy production may be determined. If there was an increase in energy production, the solar panel may be extended further. Conversely, if there was a decrease in energy production, the solar panel may be retracted (e.g., to 20 degrees) and further energy determinations will be made. The change in degrees for each adjustment can vary for each adjustment, for example, the angle can be changed by 1, 2, 3, 4, 5, 10, 15, 30, 45, 90 degrees, and/or the like at each change.

The amount of energy generated by the solar panel when acting as a sail may depend on factors such as the size of the solar panel, the direction of the wind, and/or like. In some embodiments, when operating under normal conditions at a moderate wind speed (e.g., 20 mph), a fully extended solar panel may be able to generate the same force or that the force of one drive motor of the ground robot. In some embodiments, the ground robot may be configured to retract the solar panel completely when the ground robot changes directions. For example, if the solar panel was being used as a sail in a first direction (e.g., because the direction of the ground robot and the wind were similar), when the ground robot moves in the opposite direction, the solar panel may be completely or partially retracted to prevent the wind from negatively impacting the energy production. However, because the ground robot is configured to optimize solar and wind energy, it is recognized that the solar panel could be partially extended, even with a negative wind effect, to optimize the solar energy and total energy production.

FIGS. 25A-25B and 26A-26F illustrate embodiments of a ground robot 2411 extending the solar panel 2415 to optimize energy production using two different lift systems. It is recognized that ground robot 2411 is used as an example only and any of the ground robots described herein may include similar lift systems and optimize energy production.

Figure 25A:
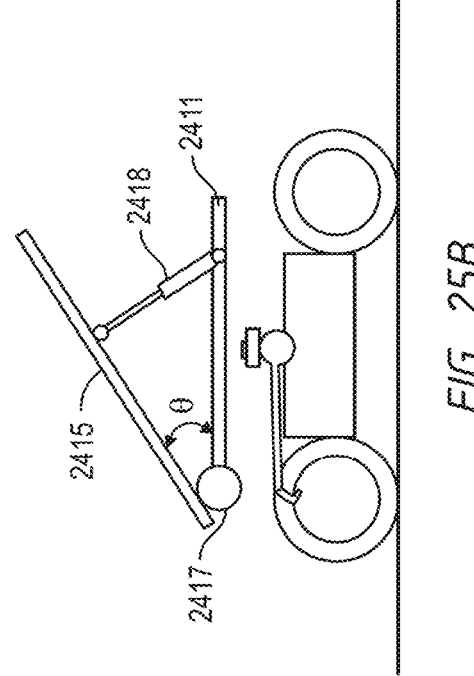
FIGS. 25A-25B illustrate embodiments of a ground robot using a linear actuator lift system.
Figure 25B:
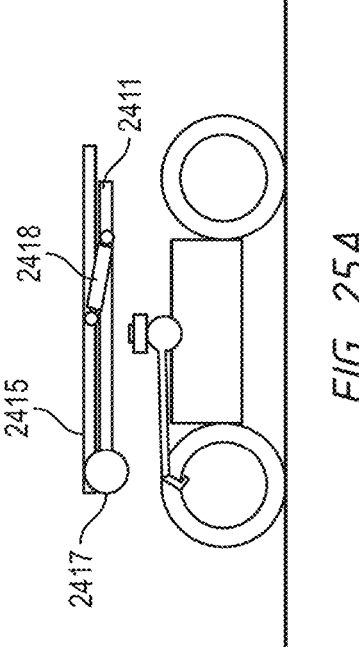

FIGS. 25A and 25B illustrate embodiments of a ground robot 2411 using a first lift system comprising one or more linear actuators 2418 and one or more pivots 2417. FIG. 56A illustrates the solar panel 2415 at an angle of zero and FIG. 56B illustrates the solar panel 2415 at an angle theta. Solar panel 2415 is coupled to pivot(s) 2417 on one side of the ground robot 2411 (e.g., at the back) and coupled to the one or more linear actuators 2418 (e.g., at the sides of the solar panel). To control the angle of the solar panel 2415, the ground robot 2411 extends or retracts the linear actuator(s) 2418, which cause the solar panel 2415 to rotate about pivot(s) 2417 creating an angle theta. In some embodiments, ground robot 2411 includes a first linear actuator 2418 and a first pivot 2417 on a first side and a second linear actuator 2418 and second pivot 2417 on the opposite side. Having two linear actuators 2418 and two pivots 2417 may provide benefits such as greater stability and control on the solar panel 2415. In some embodiments, linear actuator 2418 is a pneumatic linear actuator. In some embodiments, linear actuator 2418 is a hydraulic linear actuator. In some embodiments, pivot 2417 is a hinge mechanism capable of at least 90 degrees of rotation.

FIGS. 26A-26F illustrate an embodiment of a ground robot 2411 using a second lift system. In some embodiments, the second lift system may comprise one or more spring hinges 2419, pulley motor 2481, pulley shaft 2480, pulley cable 2482, and one or more spool sections 2483. For example, in some embodiments, the second lift system may comprise two spool sections (e.g., spool 2483) stacked on one motor (e.g., pulley motor 2481). A two spool arrangement may provide benefits such as preventing the cables (e.g., pulley cables 2482) from getting tangled. Solar panel 2415 may be coupled to the one or more spring hinges 2419 on one side of the ground robot 2411 and solar panel 2415 may be coupled to pulley cable 2482 on an opposite side of the ground robot 2411. The spring hinges 2419 are configured to cause the solar panel 2415 to rotate about the spring hinges 2419 such that the solar panel is continually biased towards an extended position. Pulley cables 2482 prevent rotation of solar panel 2415. For example, if the pulley cables 2482 were disconnected, the solar panel 2415 would rotate to a maximum angle theta (e.g., 90 degrees). In some embodiments pulley cables 2482 may be connected at a first end on opposite sides of solar panel 2415. Pulley cables 2482 may be threaded through one or more spool sections 2483, which may be connected to the ground robot 2411 frame. The pulley cables 2482 may be attached at a second end to pulley shaft 2480. Pulley shaft 2480 is coupled to pulley motor 2481, such that pulley motor 2481 causes rotation of pulley shaft 2480. The pulley motor 2481 may rotate in a first direction (e.g., clockwise) and a second direction (e.g., counterclockwise). Rotation of pulley shaft 2480 in a first direction may cause the pulley cables 2482 to spool around the pulley shaft 2480, which causes the solar panel 2415 to rotate about the one or more spring hinges 2419, reducing the angle theta (e.g., retract). Rotation of pulley shaft 2480 in a second direction may cause the pulley cables 2482 to unspool from the pulley shaft 2480, which causes the solar panel 2415 to rotate about the one or more spring hinges 2419 increasing the angle theta (e.g., extend).

FIGS. 26A and 26D show the ground robot 2411 in a first position where the solar panel is not extended, and the angle theta is 0 degrees. For example, this position of the solar panel 2415 may be optimal for windy days where tilt is a concern or when the sun is directly above the solar panel 2415 and the ground robot 2411 determined that a zero degree angle theta is optimal to maximize power.

FIGS. 26B and 26E show the ground robot 2411 in a second position where the solar panel is partially extended, and the angle theta is greater than 0 degrees. For example, this position of the solar panel 2415 may be optimal for windy days where tilt is not a large concern and/or the ground robot 2411 determined the angle of the solar panel 2415 to optimize both wind and solar energy production.

FIGS. 26C and 26D show the ground robot 2411 in a third position where the solar panel is extended further than the second position, and the angle theta is greater than 0 degrees. For example, this position of the solar panel 2415 may be optimal for windy days where tilt is not a large concern and/or the ground robot 2411 determined that there is more energy being generated from the wind than the sun and adjusted the angle of the solar panel 2415 to optimize both wind and solar energy production.

Being able to optimize the angle of the solar panel for maximum energy production from both the sun and the wind may provide benefits of allowing the ground robots to operate for longer and more efficiently than if the solar panel was not used as a sail. Optimizing the solar panel angle for wind and solar energy production is difficult to do because it is difficult to determine local wind conditions autonomously and to continuously modify the angle for maximum production. Additional benefits of using the solar panel as a sail may include reducing the amount of energy used during night operations and allowing the battery to last longer.

In some embodiments, the ground robots described herein may use the wind conditions to determine if they need to protect themselves from wind related issues. Wind related issues may include the ground robots being blown over due to high wind speeds, objects blowing in the wind and contacting the ground robots, wind damaging components of the ground robots, and/or the like. The wind speed at which a ground robot may begin a wind protection operation may depend on the specific ground robot, such as, for example, weight, aerodynamic profile, size, and/or the like, and on the external conditions such as, for example, tree or plant wind protection, slope of ground, direction of travel, and/or the like. In some embodiments, a ground robot may undergo a wind protection operation at wind speeds of 10, 15, 20, 25, 30, 35, 40, 45, 50 and/or the like miles per hour. In some embodiments, a ground robot may begin a wind protection operation at wind speeds above a specific threshold for that specific robot.

In some embodiments, a ground robot may undergo one or more wind protection operation when, for example, wind speeds are determined to be above the specific threshold. Wind protection operations a ground robot could perform can include, for example, returning to a base of operations for storage in a building (e.g., a farm), seeking shelter behind natural objects within the robot's vicinity (e.g., trees, rocks, dense bushes, buildings, and/or the like), orientating itself to limit the amount of drag from the wind, digging into the ground with the robotic arms to latch itself to the ground, and the like. In some embodiments, the ground robot may execute one or more wind protection operations. For example, the ground robot may seek shelter behind a natural object and use the robotic arm to latch itself to the ground. In some embodiments, the ground robot's AI system may determine which operation(s) to perform. For example, the ground robot's AI system may consider the distance to the base of operations, the density of the ground, the direction of the wind, the distance to natural objects, the level of protection provided by a natural object, and/or the like. In some embodiments, a ground robot may send an alert to a base of operation (e.g., third-party computer system) to indicate that high winds speeds have been detected and a wind protection operation has or will be performed. The alert may include a GPS location so that the ground robot can be manually retrieved if conditions worsen or if wind conditions necessitate manual pickup (e.g., tornado warnings, hurricane warnings, heavy rainfall warnings, and/or the like).

FIGS. 28A-28F illustrate embodiments of a ground robot 2411 performing a wind protection operation where the ground robot 2411 latches itself to the ground. It is recognized that ground robot 2411 is used as an example only and any of the ground robots described herein may perform wind protection operations. It is also recognized that while certain steps are described, in other embodiments, a ground latching wind protection operation may include more or less steps and/or the steps may be performed in a different order.

Figures 28A, 28B, 28C, 28D, 28E, 28F:
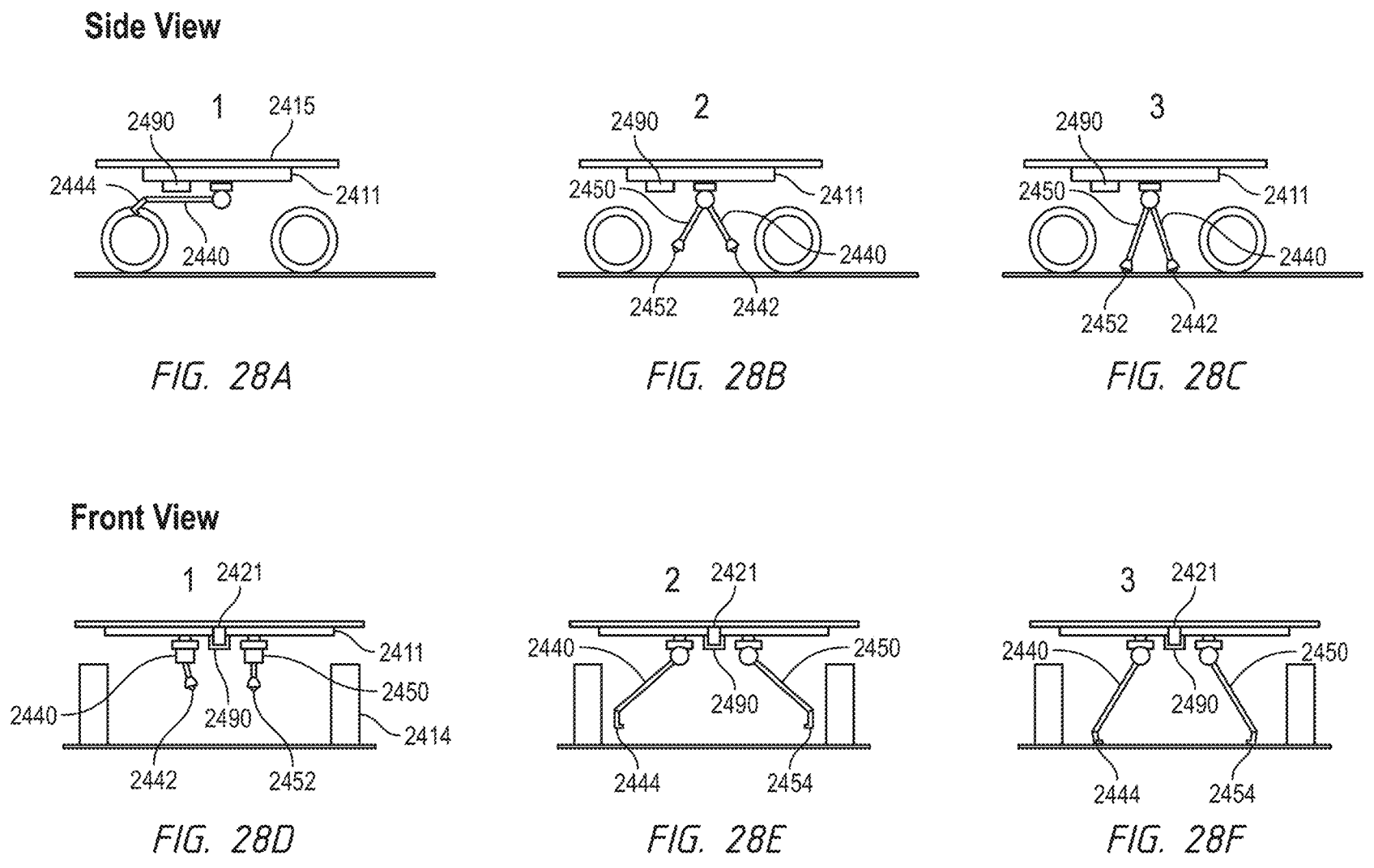

FIGS. 28A and 28D illustrate the first step in a ground latching wind protection operation, where the ground robot 2411 determines that the wind speed is above a specific threshold and determines that a wind protection operation is required (e.g., using the AI system). In the example shown, the ground robot 2411 determines that it should latch itself to the ground for wind protection. However, it is recognized that the ground robot may have also performed additional protection steps such as orienting itself to be more aerodynamic, seeking shelter, and/or the like.

FIGS. 28B and 28E illustrate the second step in a ground latching wind protection operation, where the ground robot 2411 begins moving robotic arms 2440 and 2450 towards the ground to latch into the ground. In some embodiments, the ground robot 2411 may use the end effectors (e.g., hoes 2444 and 2454) to dig into the ground, while in other embodiments, the ground robot 2411 may use the shovel portions or other portions of the end-effector to dig into the ground. In some embodiments, the ground robot 2411 may use the camera 2420 to determine an optimal position to dig into the ground. An optimal position may include a portion of the soil that is sufficiently packed down to allow the ground robot 2411 to anchor, while not being too hard packed that the ground robot 2411 cannot penetrate the ground. The camera 2420 may also be used to determine if other wind protection measures are viable and/or to identify another object to latch onto.

FIGS. 28C and 28F illustrate the third step in a ground latching wind protection operation, where the ground robot 2411 digs robotic arms 2440 and 2450 into the ground to create an anchor or latch to the ground. For example, the ground robot 2411 may dig the end effectors (e.g., hoes 2444 and 2454) into the ground. In some embodiments, the ground robot 2411 may dig some soil out of the ground first using the robotic arms 2440 and 2450 prior to creating the ground latch. In some embodiments, the ground robot 2411 may create the ground latch by pulling at a portion of the ground (e.g., in the holes) using the robot arms 2440 and 2450 to reduce the chance of unwanted movement from the wind.

Being able to perform wind protection operations may provide benefits of allowing the ground robots to operate autonomously and at far away distances from the base of operations. Because the ground robots can protect themselves from wind damage, they may not need to be monitored closely, allowing operators to focus on other aspects of the farming operations.

In some embodiments, the ground robots described herein may include a cooling system. The cooling system may be used to cool the electrical components of the ground robots, such as, for example, components associated with the computer (e.g., computer 2490), and/or the like. In some embodiments, the cooling system may comprise an air inlet at the front of the ground robots and an air outlet at the back of the ground robots. The air inlet and air outlet may comprise tubes or pipes that lead to a central electronics assembly. The cooling system may include one or more filters to protect the central electronics assembly from external contaminants such as dust, dirt, debris, and the like. For example, a first filter may be positioned between the air inlet and the central electronics assembly, and a second filter may be positioned between the air outlet and the central electronics assembly. The cooling system may also include one or more fans that can be used to direct airflow to the central electronics assembly. In some embodiments, the fans may be able to travel in two directions (e.g., clockwise, and counterclockwise). The direction of the fan may be controlled by the control system and may be dependent on the direction of travel. The cooling system may also include one or more heatsinks that can be used to disperse heat from the central electronics assembly.

For example, in operation, as a ground robot drives in a first direction, air may enter into the air inlet and be directed to the central electronics assembly due to the movement of the ground robot and the fan. External contaminants may be caught by the one or more filters and the air may pass over the central electronics assembly to cool down the components. The warmed air flow may then pass out the back of the ground robot and through the air outlet. In some embodiments, because the ground robots may be symmetrical (e.g., can perform operations moving in a forward or reverse direction) when the ground robot moves in a second direction (e.g., in reverse), the air outlet may function as an inlet and the air inlet may function as an outlet. For example, in this configuration, the direction of the fan may be reversed from the first direction and the central electronics assembly may be cooled in a similar manner.

Being able to reverse the cooling system may provide benefits of allowing the ground robots to perform operations in a forward or reverse direction without compromising the cooling of the central electronics assembly. An additional benefit may be that each time the ground robots switch directions, the cooling system may blow dust off one of the filters on either side of the central electronics assembly. For example, when a ground robot travels in a first direction, contaminants may accumulate on the first filter due to air entering the air inlet. When the ground robot travels in the second direction, contaminants may accumulate on the second filter due to air entering the air outlet. The air entering the air outlet may pass over the first filter and allow contaminants to be removed (e.g., due to the air flow) and some contaminants may be blown out the air inlet. As the ground robots continue to perform operations and change directions (e.g., working up and down a crop row), the flow of air in the cooling system also changes, providing continuous cleaning of the filters and the entire cooling system. Because the ground robots may operate at farms where dust contamination is significant, having a self-cleaning cooling system may allow the ground robots to operate for long periods of time without requiring manual filter changes or cooling system inspections. The cooling system allows the ground robots to operate autonomously.

In some embodiments, the air flow passing out of the air inlet and/or air outlet may be directed towards the one or more cameras of the ground robots to provide camera cleaning. For example, air flow passing through the cooling system may be directed such that a continuous flow of air blows over a first camera in a first direction and a second camera in a second camera. Using the cooling system to clean the cameras may provide a benefit such as allowing the ground robots to operate without require manual camera cleaning or more energy intensive cleaning methods to remove contaminants that accumulate on the cameras.

In some embodiments, the ground robots described herein may be configured to determine if debris has accumulated on the camera(s). For example, when in operation, debris such as dust or dirt may accumulate on the camera lens. Debris on the camera may result in compromised images (e.g., used for soil analysis) and/or impact other ground robot operations. In some embodiments, the ground robot's control system may be configured to determine if debris is on the camera(s) by, for example, comparing images taken in sequence. For example, if the same object (e.g., debris) is detected in the same location in both images, the control system may determine that the object is debris on the camera.

If there is debris on the camera, the ground robot may be configured to perform one or more camera cleaning operations. In some embodiments, camera cleaning operations may include directing air towards the camera using the cooling system (as described above), moving the solar panel (e.g., using a pulley system or linear actuator) to generate a gust of wind at camera, using another robot (e.g., an inspection robot) to blow air at the camera, and/or the like. In some embodiments, the ground robots may include one or more fans on the frame for use in cleaning the cameras.

In some embodiments, a ground robot and an inspection robot can perform a camera cleaning operation. The inspection robot can be perched on a perch bar of the ground robot using latching legs. In some embodiments, perch bar can be replaced by a box, an enclosure, or a substantially similar feature located under the solar panel of the ground robot where the inspection robot can land and take off from. The ground robot may be performing normal operations.

If the ground robot has determined that there is debris on the camera, the ground robot may communicate with inspection robot and request that inspection robot direct air flow towards one or more of the cameras.

In some embodiments, the inspection robot may direct airflow for a certain amount of time, such as, for example, 1, 2, 3, 4, 5 10, 15, 30, 60, and/or the like. In some embodiments, the camera may be configured to take test images to determine if the camera was sufficiently cleaned after a camera cleaning operation. Use of inspection robot to clean the ground robot's cameras may provide the benefit of limiting the number of manual cleanings that are required. Reduced manual cleaning allows the ground robots to perform operations for longer periods of time autonomously.

In some embodiments, the ground robots described herein may interact with the inspection robot described herein to perform additional operations. For example, in some embodiments, inspection robot may be used to clean debris that accumulates on the solar panels of the ground robots. Ground robots may determine that their solar panel needs to be cleaned by, for example, determining that the amount of solar energy being produced by the solar panel has decreased. In another example, the inspection robot may perform regular check-ins on the ground robots and use their cameras to determine if the solar panels need to be cleaned. Once it is determined that there is too much debris on the ground robot's solar panel, one method of cleaning may be that the inspection robot directs the air flow towards the ground robot's solar panel. Use of an inspection robot to clean a ground robot's solar panel may provide improved cleaning benefits over, for example, tilting the solar panel, because the force of air flow from the inspection robot s may remove more debris and dust that is not easily blown away by the wind.

In some embodiments, the ground robot and/or another robot determines that there is sufficient debris on the solar panel. Based on this determination, the ground robot opened the solar panel to allow inspection robot to take off. A previously perched inspection robot can perform the solar panel cleaning operation, or any inspection robot in the area could perform the same operation.

In some embodiments, the inspection robot described herein may be used to determine and verify the location of the ground robots described herein. Because GPS systems may not always provide an exact location, in some cases, it may be beneficial to have an inspection robot verify the location of a ground robot prior to performing an operation. For example, if a ground robot was near a potentially dangerous obstacle (e.g., a road, body or water, stream, and/or the like), the GPS may not provide sufficient location accuracy prior to the ground robot departing in a direction for a new operation. Instead, in some embodiments, an inspection robot could verify and transmit the exact location of the ground robot, relative to objects around the ground robot, to the ground robot.

In some embodiments, an inspection robot may use the ground robot's GPS data to determine an approximate location of the ground robot and move to that location to verify and provide further guidance to the ground robot. In some embodiments, the inspection robot can use their cameras and control systems to perform object inferencing/recognition similar to the ground robots as described above. In some embodiments, based on the object recognition, the inspection robot may be able to identify the ground robots as well as other landmarks and objects such as, for example, roads, streams, bodies of water, trees, hills, farms, rocks, and/or the like. Once the inspection robot determines a ground robot's location, the inspection robot may transmit this data to the ground robot's control system. In some embodiments, the inspection robots may be able to identify a ground robot at distances or altitudes up to 400 ft, however, it is recognized that the distance is impacted by the resolution of the camera.

In some embodiments, the ground robots described herein may include patterns or other distinctive marks so that an inspection robot can identify a specific ground robot. For example, when multiple ground robots are close together, it may be difficult to determine which ground robot is which. Patterns on the solar panels may allow the inspection robot to easily recognize the ground robot the inspection robot is looking for.

In some embodiments, other methods may be used to identify a specific ground robot in a group of ground robots. In one example, the ground robots may each include an individual machine-readable code (e.g., a QR code) on for example, their solar panels. The inspection robots may be configured to scan the machine-readable code and determine which ground robot is the one the inspection robot is looking for. The distance at which the inspection robot can identify a ground robot by a machine-readable code may depend on the resolution of the camera, the size of the code, the reflection of the sun, and/or the line. In another example, inspection robots may identify a specific ground robot by communicating with the ground robot and asking the ground robot to perform an action. For example, the ground robot could perform a movement using its wheels, raise/lower the solar panel, and/or the like. Being able to verify a ground robot's location without relying entirely on GPS data may provide benefits of more accurate location determination. More accurate location determination may allow the ground robots to perform operations autonomously with a reduced risk of harm to the ground robots based on inaccurate location information.

Dynamic, Infrastructure Free Robotic Network

It should be noted that the disclosed embodiments of a Dynamic, Infrastructure free Robotic Network may be combined with any embodiments disclosed herein, and individual features of the Dynamic, Infrastructure free Robotic Network may be combined with individual features of any other embodiment. Any other embodiments may also be combined with the disclosed Dynamic, Infrastructure free Robotic Network, and individual features of any embodiment may be combined with individual features of the disclosed Dynamic, Infrastructure free Robotic Network.

An embodiment of a Dynamic, Infrastructure free Robotic Network generally comprises at least one link inspection robot, at least one satellite, and sun. Link inspection robots may move on the ground to collect data with sensors or cameras. In some embodiments, the link inspection robot has a solar panel. Sun beams emitted from the sun that hit the solar panel of link inspection robot provide power for movement (e.g., ground movement), data collection, and data transmission to satellite. In other embodiments, the link inspection robot has batteries (for example, battery 503 in FIG. 4A). In yet another embodiment, the link inspection robot has solar panels and batteries.

In some embodiments, the link inspection robot transmits data to cloud computing and storage via satellite. In some embodiments, the link inspection robot is controlled via on-board AI processor. In some embodiments, a remote operator (not shown) can control link inspection robot through satellite. In some embodiments, the link inspection robot communicates with a private network of inspection robots. The private network of inspection robots includes at least one inspection robot. In some embodiments, network inspection robot can move or fly and perform an inspection task, such as taking pictures of a plot of land and transfer the pictures to link inspection robot via LTE network. After the picture is received by link inspection robot, link inspection robot can transmit the picture to cloud computing and analysis through satellite. In some embodiments, all of the networking, private LTE, WI-FI, and/or the like can be done between all of the robots themselves.

Robots generally comprise one or more antennas, cameras, CPU, memory, and controllers. Antenna transfers data over Wi-Fi, satellite, cellular networks, or private LTE networks at predetermined frequencies. In some embodiments, antenna transfers data over 900 Megahertz (MHz) private network between other network inspection robots and link inspection robots. By having two or more antennas, a robot is capable of transferring data over Wi-Fi, satellite, or a cellular network at the same time that data is transferring to the private LTE network.

In some embodiments, more than two antennas may be used, including Multi-Input Multi-Output (MIMO) antennas. In some embodiments, solar cells on the top of the wing of the inspection robot can be used as an antenna. All the solar cells may be used as a single antenna or the solar cells may be grouped into smaller antennas.

The camera provides visual capability to the inspection robot during movement to locate obstructions and potential threats. In addition, the camera can take pictures of objects of interests, such as crops on a farm. The CPU performs most of the processing inside the robot. In some embodiments, the CPU compresses image and data files prior to transfer. The memory is used for storing data during inspection. The controller controls robots during movement for auto stabilization. In some embodiments, a robot may have a single CPU processor and may or may not include a GPU processor.

Some Disclosed Embodiments May Include One or More of the Following Benefits and Advantages Current networking technology is too expensive and requires too much infrastructure to support remote and rural areas. For example, satellites require large investments into rockets to launch into space, and even technology such as Starlink™ requires users to set up ground stations, which is not feasible in remote and rural areas. Furthermore, these ground stations require high power consumption on the order of 25 watts for data transfer, which is not feasible in developing countries where individuals are struggling to keep a light bulb lit.

Alternatively, low altitude solar planes cannot immediately land to establish a Wi-Fi signal for a user; these planes require large amounts of power to operate and are expensive; and furthermore, low altitude solar planes require infrastructure for landing and cannot immediately land to improve solar charging capability. Solar planes typically require a custom receiver, and the planes themselves are very expensive. Balloons like Google Loon and solar planes are subject to issues with weather, wind, and clouds which prevent them from providing constant uplink. Also, solar planes require large, heavy battery packs to fly at night.

While cellular towers are viable options in urban areas, cellular towers are too expensive for rural areas, especially ones that are in developing countries. Cellular towers are also immobile and infrastructure, such as roads, must be in place to access the cellular tower for maintenance and service. In addition, most cellular towers require power and hardline communications connections in order to function, which are both challenging to get in rural and developing areas.

Method for Latching on the Ground or Objects for Link Inspection Robots

An Embodiment of Dynamic, Infrastructure Free Robotic Network can include a link inspection robot on the top of a building and transferring data to a satellite and a private inspection robot network comprising at least one inspection robot. In some embodiments, a link inspection robot transfers data between a cellular tower and a private inspection robot network comprising at least one inspection robot. In some embodiments, data includes cell phone calls, text messages, pictures, videos, and email. The link inspection robot can latch to the top of the building to avoid being blown away by the wind from the building.

The link inspection robot may have the ability to latch onto ground or objects, such as building, using its legs. When the link inspection robot is transferring data, the ideal configuration is for the link inspection robot to be elevated above ground to eliminate ground effects and signal distortion by greater than 5 wave lengths of communication signal from the ground. In some embodiments, the number of wave lengths is approximately 10. In addition, by being on a building, the link inspection robot is able to transfer data to a satellite, cellular tower, private inspection robot network or an individual with less obstructions than if the link inspection robot was latched on the ground, improving the data quality and transfer. By latching onto the ground or building, the link inspection robot can avoid being blown away by the wind, rain, or extreme weather conditions. The link inspection robot is able to create a temporary Wi-Fi router allowing individual in building to transfer data from a device to the internet since the link inspection robot can connect to satellite or cellular tower. In some embodiments, there could be more than one link inspection robot to improve bandwidth of the private inspection robot network.

The latching legs extend and retract, which allows the inspection robot to "walk" on the ground. The inspection robot can have two or more latching legs, and one desirable method is to have two latching legs to minimize the weight and complexity of the inspection robot.

The latching legs position and geometry allow the link inspection robot to attach itself to the environment, which is essential in extreme weather. Furthermore, if there are high winds, the link inspection robot can quickly land and latch to the environment to avoid damage to the inspection robot. In some embodiments, the inspection robot can latch to a tree, shrub, another object in nature, or manmade object.

A method for the inspection robot latching on the ground, according to an embodiment is set forth below:

a. The link inspection robot on the ground and the rear latching leg as well as the multi-functional stabilizers make contact with the ground;

b. The front latching leg extends to the maximum angle;

c. Once the front latching leg reaches the maximum angle, the rear latching leg and the front latching leg latching attachment fixture (hook) make contact with the ground;

d. The servomotors apply torque to retract the front latching legs and extend the rear latching leg such that the latching attachment fixtures (hooks) dig into the ground;

e. At a specific predetermined force or duration of time, the front latching leg servomotor will stop extension, the rear latching leg servomotor will stop retraction, and the link inspection robot will be rooted to the ground.

In some embodiments, sun beams emitted from the sun hit solar panels of the link inspection robot and/or solar panels of the private network inspection robot to provide power for movement (e.g., ground movement), data collection, and data transmission to a satellite, Wi-Fi Router, and/or the like. In some embodiments, the link inspection robot and/or private network inspection robot have solar panels. In other embodiments, the link inspection robot and/or private network inspection robot has batteries (for example, like battery 503 in FIG. 4A). In yet another embodiment, the link inspection robot and/or private network inspection robot have solar panels and batteries.

In an embodiment of Dynamic, Infrastructure Free Robotic Network, a link inspection robot can be attached to a power line. The proposed design utilizes the latching legs of link inspection robot to extend and retract, which allows the inspection robot to "latch" onto the power line. The link inspection robot may have more than two latching legs. When the link inspection robot is transferring data, the ideal configuration is for the link inspection robot to be elevated above ground to eliminate ground effects and signal distortion by greater than 5 wave lengths of communication signal from the ground.

Certain Advantages of the Disclosed Embodiments of Dynamic, Infrastructure Free Robotic Networks An embodiment of Dynamic, Infrastructure Free Robotic Network 4900 comprises a Wi-Fi connection, a ground, a cellular tower, at least one link inspection robot which may include a solar panel, a sun which produces sun beams, at least one network inspection robot, a hill, and a Wi-Fi user. In some embodiments, the link inspection robot provides Wi-Fi connects to remote Wi-Fi router. Some embodiments of Dynamic, Infrastructure free Robotic Networks disclosed herein may have one or more of the following advantages or benefits over traditional inspection robots:

1. Ability to latch onto the ground. In extreme weather, the inspection robot can quickly land and latch onto the ground. Other inspection robots would simply be blown away and damaged. Inspection robots can fly during the day and maneuver on the ground and provide a remote Wi-Fi router to a user. Both the link inspection robot and private network inspection robot can be latched to the inspection robot during the night and may transfer data to the remote Wi-Fi router to a user. The inspection robots need to latch to the ground at night for protection from the environment and to conserve energy.

2. Ability for link inspection robot and private network inspection robot to maneuver on uneven terrain. By using the latching legs, the inspection robot can land and maneuver on any terrain. This inspection robot can use its camera to detect if there is danger and maneuver on the side of a mountain or in someone's yard to avoid danger while transmitting data.

3. Ability for link inspection robot and private network inspection robot to charge both in movement and on the ground. This allows the inspection robot to be fully autonomous and eliminates the need to go back to centralized charging locations. Furthermore, the ability to charge on the ground and in movement will enable telecommunication and connectivity networks of inspection robot to expand quickly since the need for infrastructure development is no longer needed. In addition, all of the private network inspection robots can land during the night to reduce power draw used for the powertrains and focus on using power to transfer data.

4. Ability to align to the sun when on the ground provides up to a 25% to 35% charging efficiency improvement and support high power draw for transferring data to satellites.

5. Unlike traditional networks that are stationary in nature, this network can scale and change quickly based on user demands.

6. Unlike traditional networks that are stationary in nature, this network can extend the range of cellular towers and Wi-Fi providers into remote and rural areas that do not have access to connectivity.

Infrastructure Free Agriculture Connectivity Network

It should be noted that the disclosed embodiments of an Infrastructure Free Agriculture Connectivity Network may be combined with any embodiments disclosed herein, and individual features of the Infrastructure Free Agriculture Connectivity Network may be combined with individual features of any other embodiment. Any other embodiments may also be combined with the disclosed Infrastructure Free Agriculture Connectivity Network, and individual features of any embodiment may be combined with individual features of the disclosed Infrastructure Free Agriculture Connectivity Network.

An embodiment of an Infrastructure Free Agriculture Connectivity Network generally comprises at least one link inspection robot connected to at least one Wi-Fi connection, a private inspection robot network where the private network comprises at least one network inspection robot, and farming technology devices. The link inspection robot may move on the ground and be within 460 feet of the Wi-Fi Connection. In some embodiments, link inspection robot may be connected to a satellite or cellular tower. In some embodiments there may be more than one link inspection robot.

The link inspection robot communicates with a private network of inspection robots (e.g., a plurality of inspection robots). The private network of inspection robots is at least one inspection robot. In some embodiments, a network inspection robot can move and perform an inspection task, such as taking pictures of a plot of land and transferring the pictures to link inspection robot via a private LTE network. In some embodiments, the link inspection robot can communicate with cellular tower. In some embodiments, the private network inspection robot may have solar panels. Any one of the inspection robots in the private inspection robot network can communicate and transfer data with farming technology devices. Farming technology devices includes sensors for smart-crop monitoring, other farming robots such as pesticide spraying robots, sensors for live-stock monitoring, autonomous farming machines such as tractors, and building and equipment. In this situation, sensors on the farm can communicate to other equipment on the farm via the private inspection robot network. The sensors and equipment will have an antenna matching the frequency of the private inspection robot network. For example, automated tractors can access GPS via this network and use data from the inspection robot to harvest crops at the optimal times.

When private network inspection robot takes a picture, records a video, and/or the like of crops on a farm, the network inspection robot sends pictures, videos, and/or the like of crops to link inspection robot via private inspection robot network. Link inspection robot receives image of the crops. Depending on the embodiment, the inspection robot may use different methods to send images. In some embodiments, the inspection robot may use multiple combinations of the methods of sending images.

In some embodiments, the link inspection robot can send imagery to crop analytics platform via satellite, Wi-Fi, or cellular tower. The crop analytics platform receives imagery and performs analysis. The crop analytics platform sends analysis back to the farmer over the internet. In some embodiments, the analysis is sent to mobile application.

An example of a method performed by a Multi-Modal, Weather Resistant Robot Network involves performing diagnostic tests to determine signal strength and bandwidth and implementing a process to strengthen signal and bandwidth in regions that are found to be low.

The Multi-Modal, Weather Resistant Robot Network performs periodic diagnostic tests to determine signal strength and bandwidth. The Multi-Modal, Weather Resistant Robot Network determines signal strength is low in region X. The Multi-Modal, Weather Resistant Robot Network uses AI to determine how many more inspection robots are needed to strengthen signal and bandwidth in region X. The Multi-Modal, Weather Resistant Robot Network uses AI to space inspection robots evenly to boost signal strength in region X.

In some embodiments, inspection robots that are charging and/or transmitting data can detect danger and relocate to a safe location to continue charging and/or transmitting data (e.g., when a inspection robot is charging via sun and transmitting data). The inspection robot camera and/or sensor detects danger approaching the inspection robot. In some embodiments, danger may be an extreme weather system, a group of animals approaching, and/or the like. The inspection robot can immediately take off or otherwise escape.

The inspection robot determines the closest area away from the danger but within the network distance requirements of Wi-Fi of 460 ft, satellite of clear form obstruction, and/or cell tower from 2-30 miles. The inspection robot determines a safe location and lands, and continues to transfer data and/or charge via sun rays.

Some Disclosed Embodiments May Include One or More of the Following Benefits and Advantages Most farms do not have connectivity because they are located in remote areas and rural areas, especially ones in developing countries. Rural areas do not have the money to invest into cellular network towers and Wi-Fi has limited range from the router. Farms need a more flexible, low-cost solution for data transfer and telecommunications.

Current inspection robots use standard infrastructure for charging the inspection robot and taking shelter during extreme weather. However, these solutions require tethered power, and as a result, the solutions are static and cannot adapt to the environment or the mission. Some solutions also require human interaction and planning, which are not ideal when performing inspection and/or data transfer in remote areas or urban areas that do not have space for temporary infrastructure. Current surveillance systems also suffer from the same infrastructure problems that create a barrier for implementation of large-scale surveillance systems as it requires a significant investment into a charging station infrastructure. The disclosed technology aims to, among other things eliminate the need for additional infrastructure and promote flexible and sustainable inspection and data transfer networks.

Conventional thinking uses large solar panels attached to infrastructure to charge batteries; however, in our design, the inspection robot itself will have the solar panels attached to it for charging on the ground shown in an embodiment, which eliminates the need for expensive, static infrastructure. In addition, conventional thinking also doesn't account for the importance of how spending the majority of time charging on the ground instead of in the air makes the solar panel charging practical. Also, the proposed design has features that allow the inspection robot to mimic nature and affix itself to the environment.

Infrastructure Free Agriculture Connectivity Network.

Some embodiments of the Infrastructure Free Agriculture Connectivity Network may include one or more of the following advantages or benefits:

1. Compared to traditional transportation systems, the inspection robots do not require human or robotic assistance to charge and take shelter.
2. Compared to traditional systems, the proposed system can connect link inspection robots to multiple Wi-Fi connections and the private inspection robot network can balance the data transfer between different networks to increase the speed.
3. Compared to traditional systems, the inspection robots can facilitate communication between sensors and equipment on the farm, enabling advanced IoT at farms.
4. Compared to traditional systems, the inspection robots can facilitate data transfer between farms and cloud analysis software, which will enable next generation analytics at farms to increase yield and reduce waste.

Spool Mechanism to Angle the Solar Panel

Figure 29A:
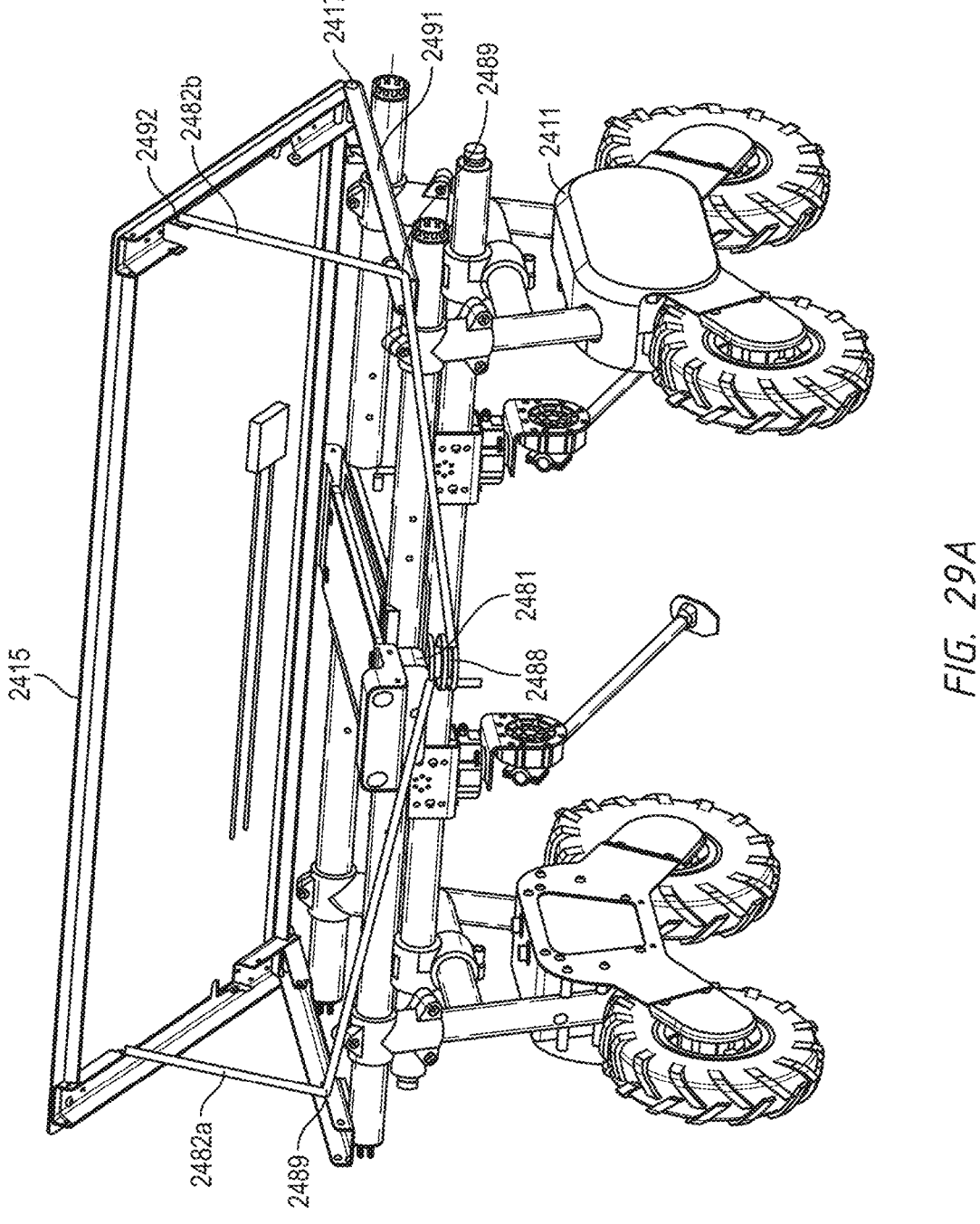
FIGS. 29A-B illustrate embodiments of a ground robot using a spool to angle a solar panel.
Figure 29B:
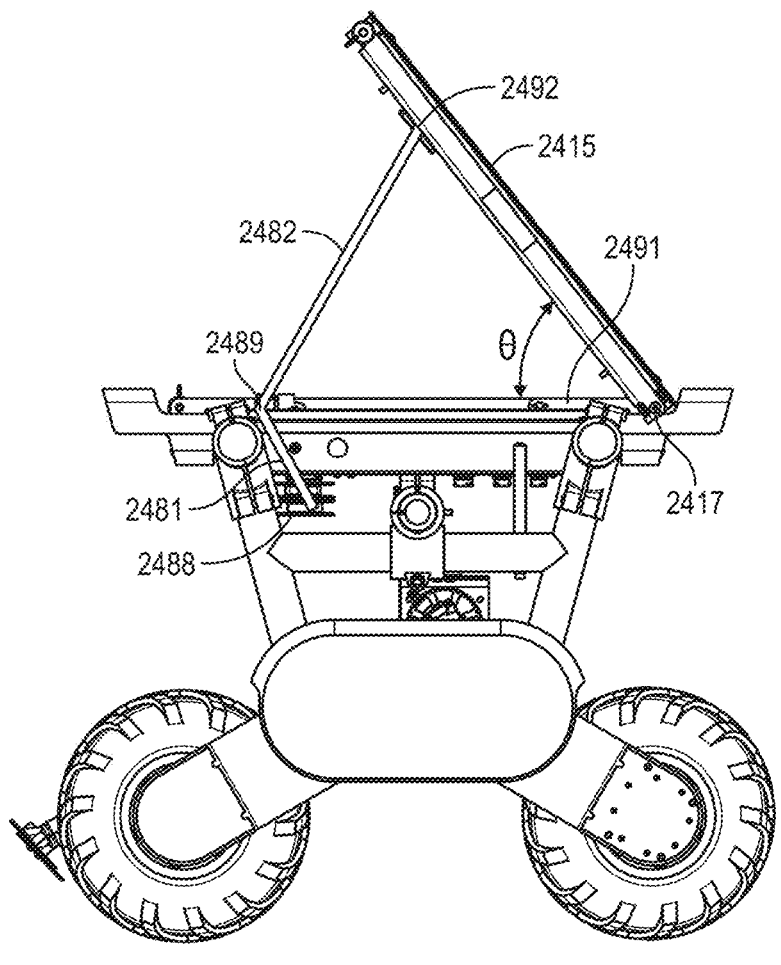

FIGS. 29A-B illustrate embodiments of the ground robot 2411 using a spool 2488 to angle the solar panel 2415. In the illustrated embodiment, the spool 2488 is oriented vertically and coupled to the robot 2411 via a motor 2481. In some embodiments, the motor 2481 is operated to induce rotation of the spool 2488, which winds or unwinds first and second cables 2482a and 2482b. The first and second cables 2482a and 2482b are coupled, via cord guides 2489, to stopper grommets 2492 coupled to a solar panel lifter 2491, which is biased to be in a lifted position via a biasing member 2417 (e.g., a torsion spring). In some embodiments, the spool 2488 can wind the first and second cables 2482a and 2482b to decrease the angle θ of the lifter 2491, and thus the angle θ of the solar panel 2415 relative to the robot 2415. In some embodiments, the spool 2488 can unwind the first and second cables 2482a and 2482b to increase the angle θ. The first and second cables 2482a and 2482b can remain in tension while coupled to the solar panel 2415. In some embodiments, the angle θ can range from 0 degrees to 90 degrees or more. In some embodiments the maximum angle θ can be at least 30 degrees, 45 degrees, 60 degrees, 90 degrees, etc.

Figure 30A:
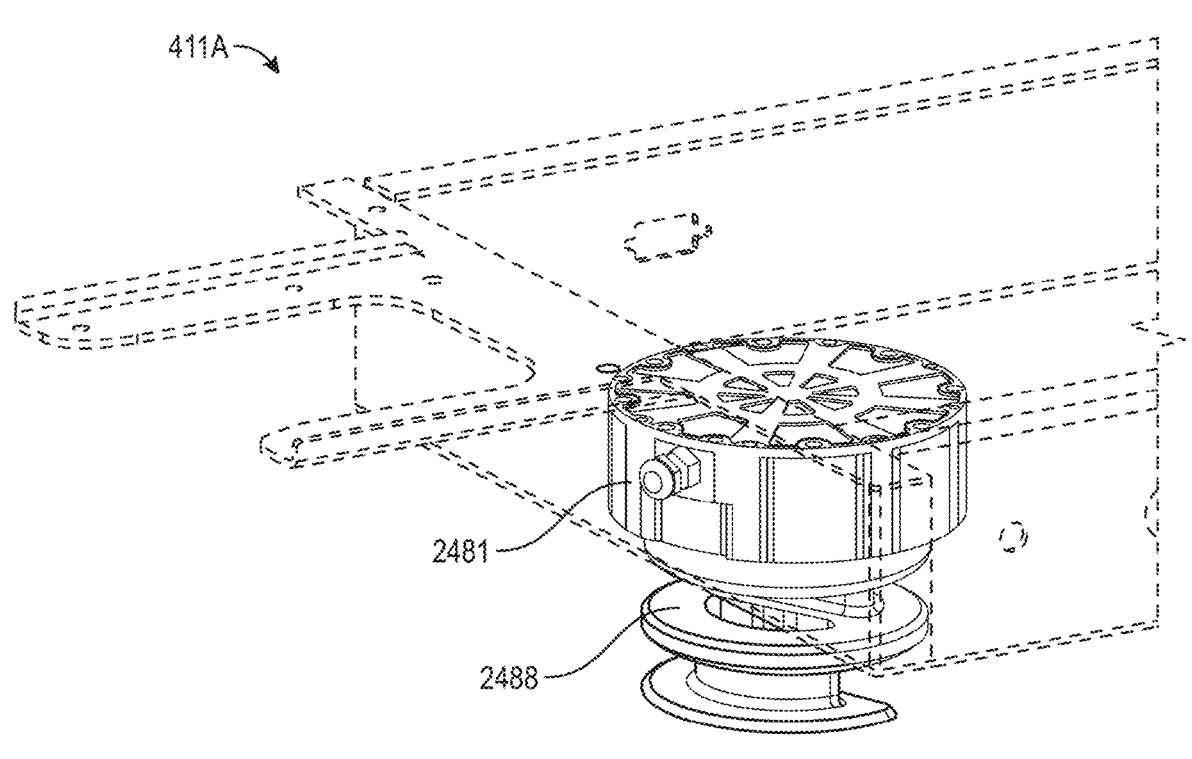
FIGS. 30A-C illustrate an embodiment of a spool used to angle a solar panel.
Figure 30B:
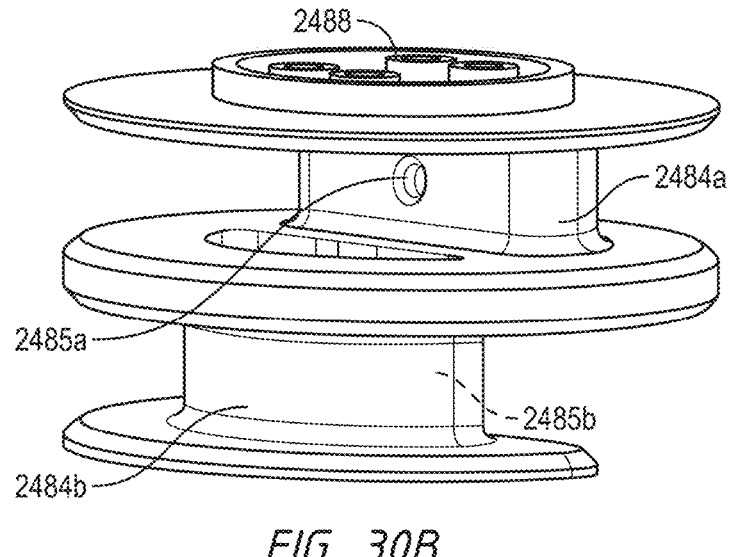
Figure 30C:
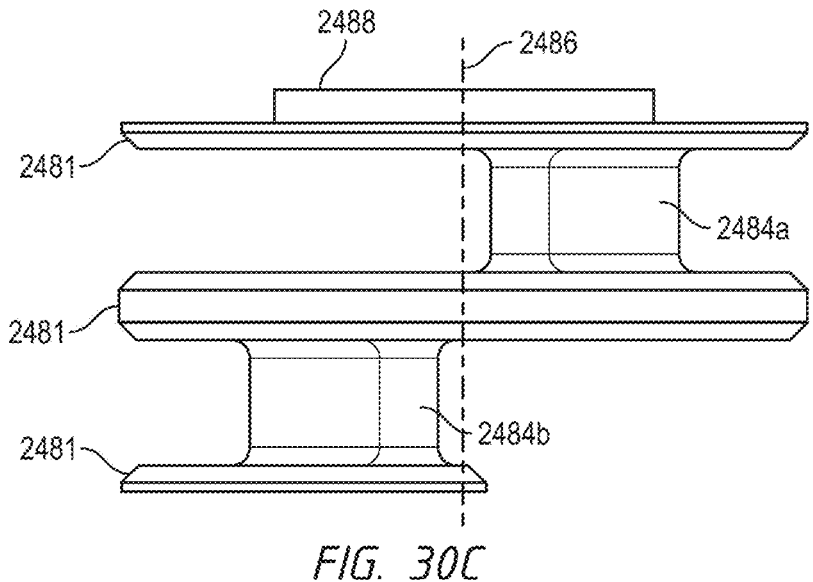

FIGS. 30A-C are enlarged views of the spool 2488. Referring to FIG. 30A, the spool 2488 can be controlled (i.e., rotated) by the motor 2481. In some embodiments, the motor 2481 can be the same type of motor used in other parts of the robot 2411, which can increase the efficiency and simplicity of building the robot 2411. In some embodiments, the motor 2481 is different from other motors used in other parts of the robot 2411. Referring to FIGS. 30B and 30C together, the spool 2488 includes multiple flanges 2481 that separate a first spool portion 2484a and a second spool portion 2484b. In some embodiments, the first and second spool portions 2484a and 2484b are on opposites sides of a rotation axis 2486 of the spool 2488. In some embodiments, the spool 2488 includes only one or more than two spool portions. In some embodiments, each of the first and second spool portions 2484a and 2484b includes a cable attachment hole 2485a/b. For example, the first cables 2482a can be attached to the first cable attachment hole 2485a, and the second cable 2482b can be attached to the second cable attachment hole 2485b.

Figure 31A:
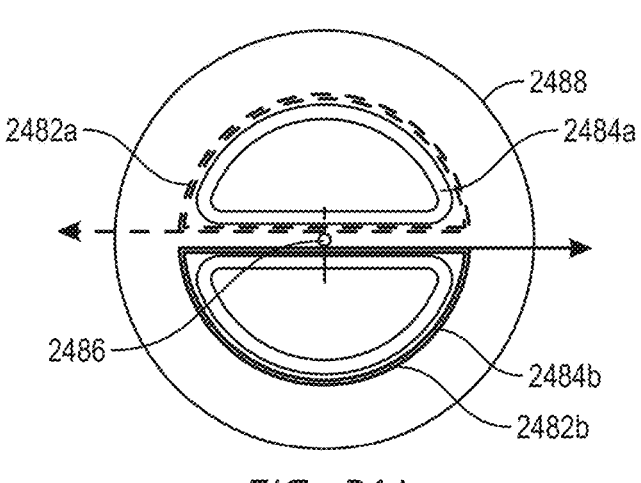
FIGS. 31A-C illustrate operation of an embodiment of a spool to angle a solar panel.
Figure 31B:
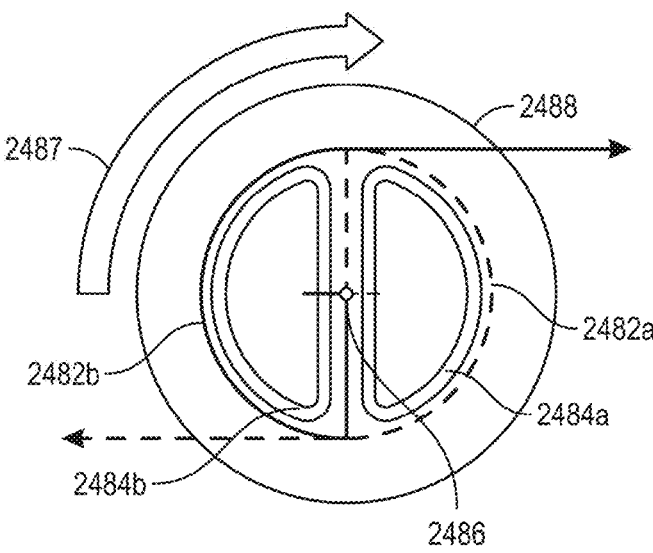
Figure 31C:
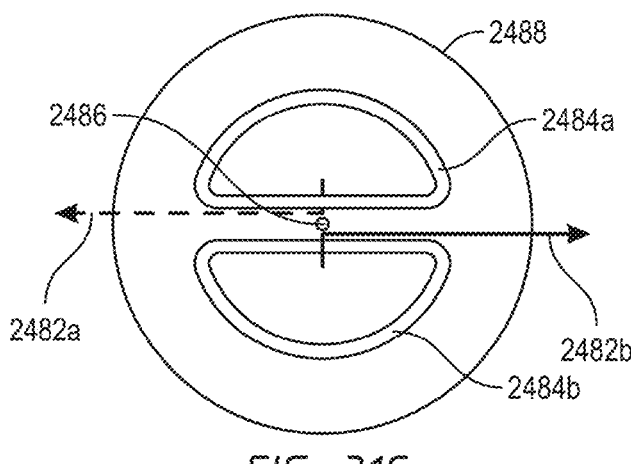

FIGS. 31A-C illustrate tops views of operation of the spool 2488 to angle the solar panel 2415. In the illustrated embodiments, the first cable 2482a is wound around the first spool portion 2484a and the second cable 2482b is wound around the second spool portion 2484b such that the two cables are wound on opposite sides of the rotation axis 2486. Referring to FIG. 31A, the cables 2482a and 2482b are wound around their respective spool portions 2484a and 2484b multiple times, indicating a wound state in which the angle θ may be small and the solar panel is in a lowered position.

In some embodiments, the tension in the cables (e.g., due to the biasing member 2417) apply pulling forces on the cables outward, as illustrated. However, because the direction of the pulling force ("line of action") applied intersects or nearly intersect the rotation axis 2486 (i.e., a lever arm distance of almost zero), almost no torque is applied on the spool 2488. Therefore, the solar panel 2415 can be maintained at the angle θ without needing the motor 2481 to be on, even while the biasing member 2417 is applying tension on the cables 2482a and 2482b. During operation of the robot 2411, the solar panel 2415 may need to be maintained at a certain angle for an extended period of time, so the ability to keep the motor 2481 during that period can result in significant power savings.

Referring to FIG. 31B, the motor 2481 can be operated to rotate the spool in a first direction 2487 around the rotation axis 2486 in order to unwind the cables 2482a and 2482b and lift the solar panel 2415 to a greater angle θ. As the cables 2482a and 2482b unwind, the lines of action no longer intersect the rotation axis 2486 (i.e., a non-zero lever arm distance), leading the tension in the cables to apply torque to the spool 2488.

Referring to FIG. 31C, once the spool 2488 has made a full 360-degree rotation or multiples of it (e.g., 720 degrees, 1080 degrees), the lines of action intersect the rotation axis 2486 once again. Therefore, in some embodiments, the spool 2488 provides a plurality of rotation positions at which the solar panel 2415 can be fixed at a certain angle while the motor 2481 is turned off. The plurality of rotation positions (i.e., multiples of 360 degrees from the rotation positions illustrated in FIG. 31A or 31C, "power saving rotation positions") can correspond to certain angles θ of the solar panel ("power saving angles"). For example, the angle θ may range from 0 degrees to 60 degrees with seven different power saving angles at which the solar panel 2415 can be set without needing the motor 2481 to be on. In some embodiments, once the spool 2488 is fully unwound (i.e., the solar panel 2415 is oriented at the maximum angle θ), the motor 2481 can continue to rotate the spool 2488 in the same direction to wind the cables 2482a and 2482b again, but in the opposite direction. In some embodiments, once the spool 2488 is fully unwound, the motor 2481 can rotate the spool 2488 in the opposite direction to wind the cables 2482a and 2482b again in the same direction.

Figure 32:
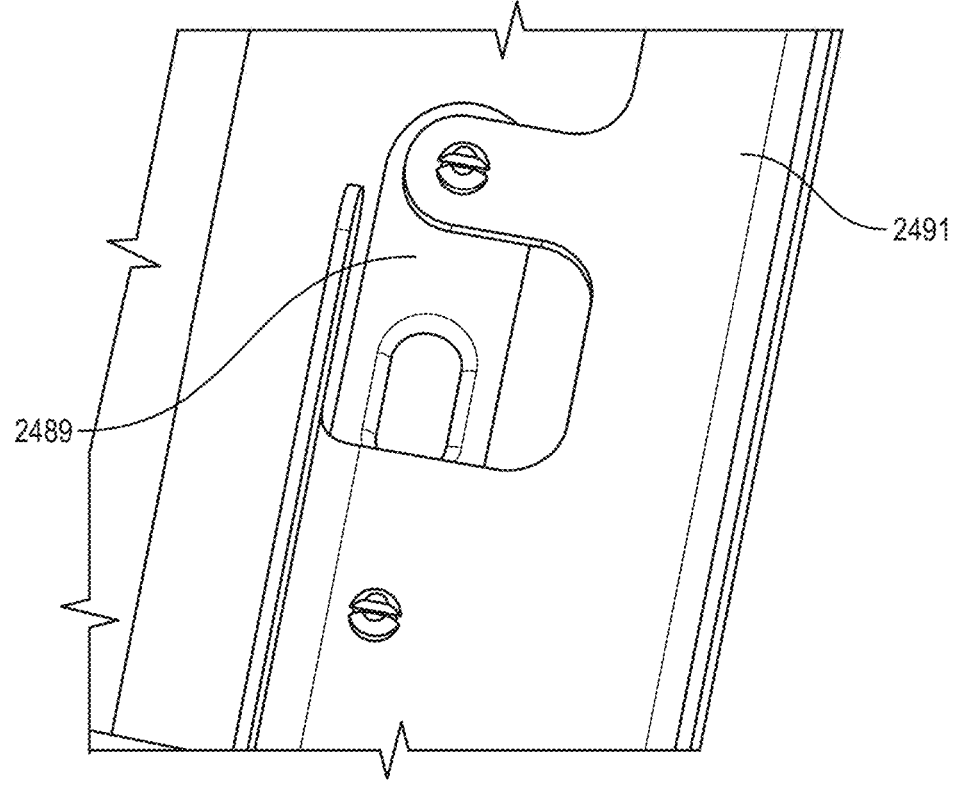
FIG. 32 illustrates an embodiment of a cord guide coupled to a solar panel lifter.

FIG. 32 illustrates the cord guide 2489 coupled to the solar panel lifter 2491 (e.g., via fasteners, welding, integrated structure, etc.). In some embodiments, the cord guides 2489 convert the generally horizontal orientation of the first and second cables 2482a and 2482b from the spool 2488 to the cord guides 2489 to a generally vertical orientation from the cord guides 2489 to the stopper grommets 2492. The cord guides 2489 (e.g., the apertures in the cord guides) can provide a smooth surface for the cables 2482a and 2482b to slide on when the angle θ is being adjusted. In some embodiments, the cord guides 2489 are coupled to a lower side of the solar panel lifter 2491 such that the solar lifter 2491 can fully close.

The use of the spool 2488 provides several advantages. For example, the spool and the cables 2482a and 2482b can be lighter than a linear actuator (e.g., the linear actuator 2418), reducing the level of soil compression as the robot 2411 travels and increasing battery range. Further, the two cables 2482a and 2482b may serve as backup for each other such that the solar panel 2415 may be kept at the desired angle θ even if one of the cables snaps. Moreover, the power savings from being able to keep the motor 2481 turned off at various angles θ can be maximized by configuring the length of the cables 2482a and 2482b such that the spool is at a power saving rotation position when the solar panel lifter 2491 is fully closed (i.e., 0 degrees is a power saving angle).

Optimization of the Solar Panel Angle and the Travel Direction of the Robot

Figure 33A:
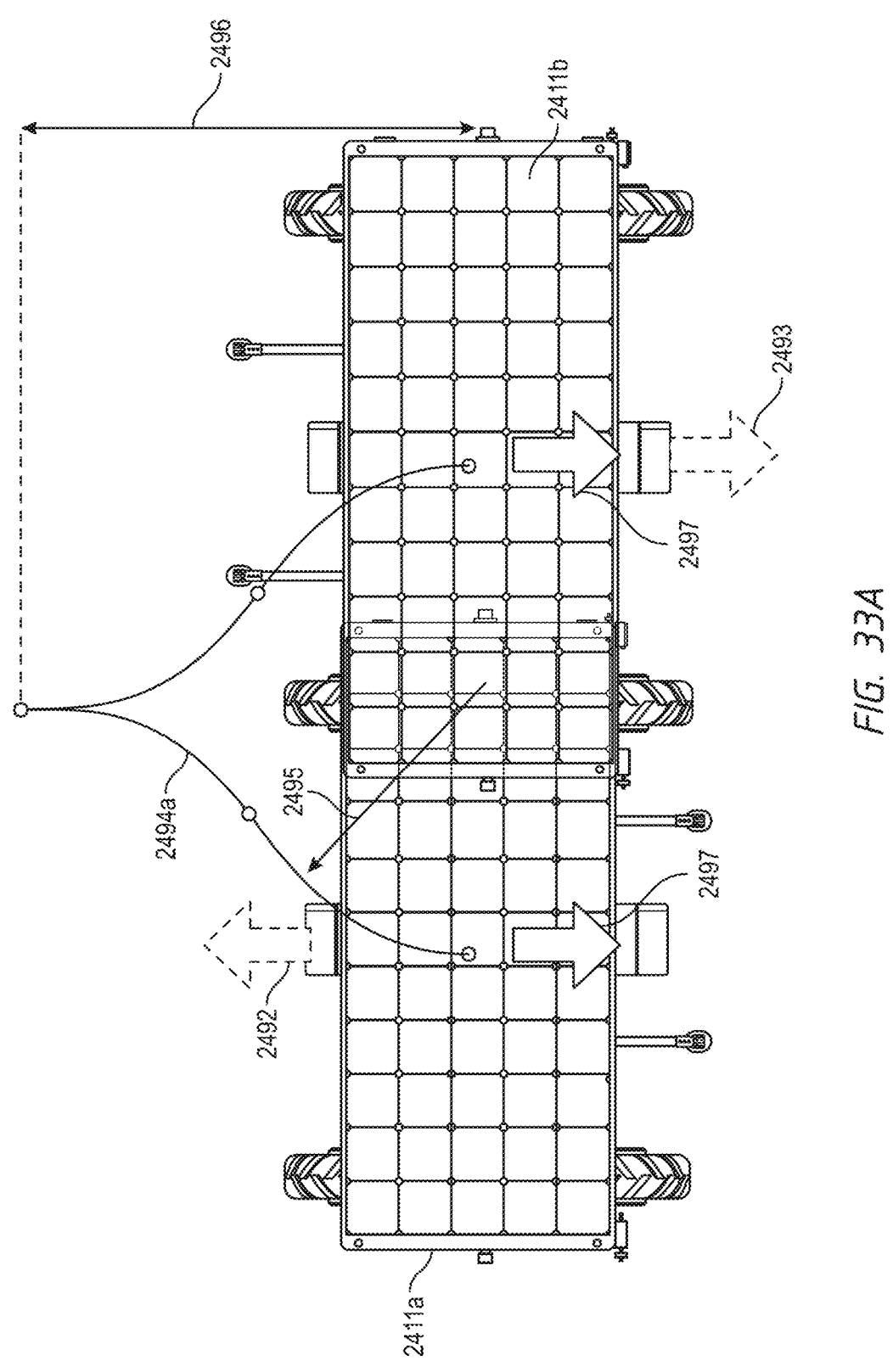
FIGS. 33A-C illustrate different paths an embodiment of a robot can take when moving from one crop row to another.
Figure 33B:
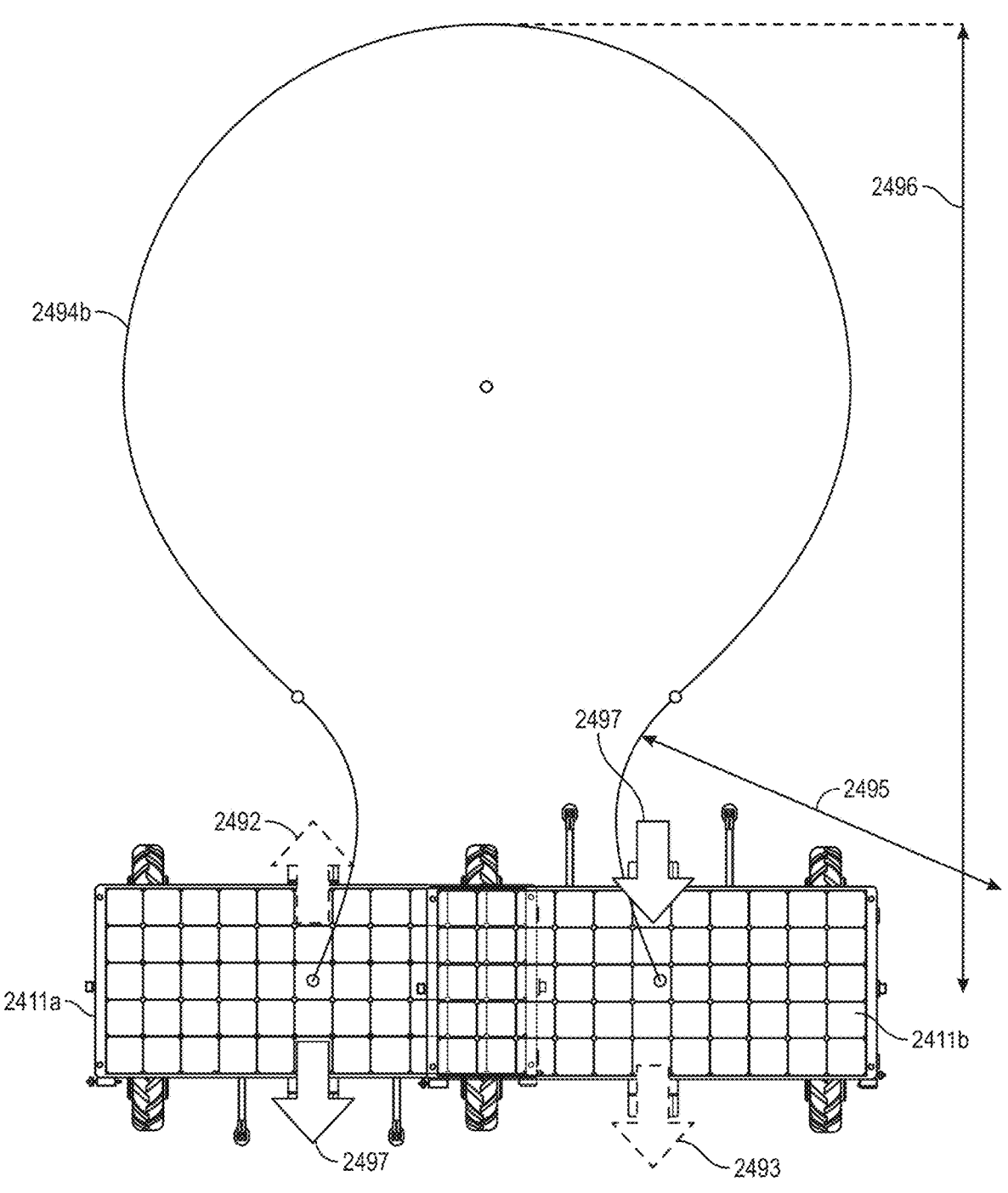
Figure 33C:
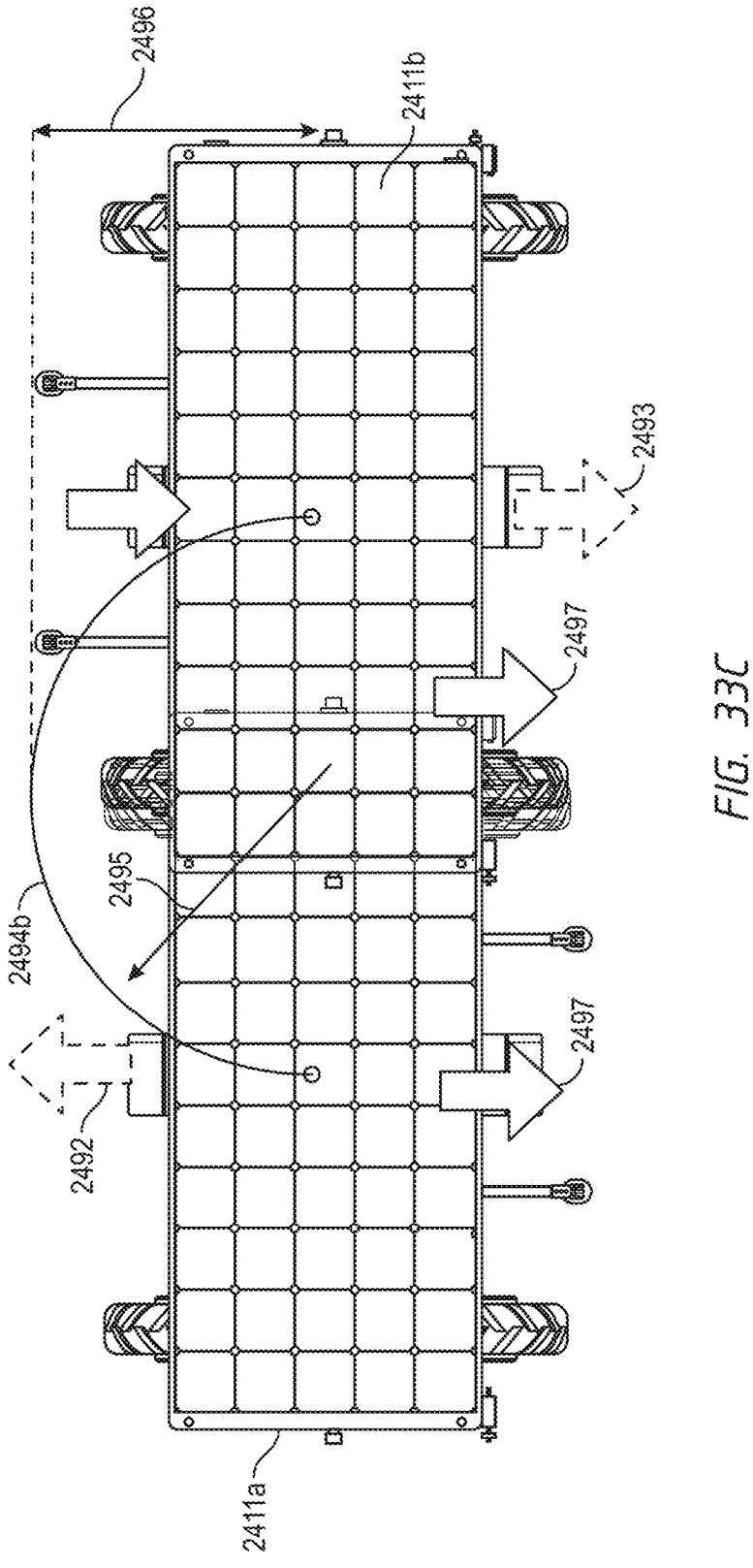

FIGS. 33A-C illustrate different paths the robot 2411 can take when moving from one crop row to another. Referring to the three figures together, the robot may be in a first position 2411a moving in a first travel direction 2492. The sunlight 2497 may be directed in the opposite direction of the first travel direction 2492 such that the robot is moving towards the sun. In some embodiments, the robot arrives at a second position 2411b and continues moving, but in a second travel direction 2493 such that the robot moves away from the sun.

Referring to FIG. 33A, the robot can take a "wine glass" path 2494a in which the robot takes four different but continuous arcs, each with a curve radius 2495. In some embodiments, the robot—and thus the solar panel on the robot—does not change its orientation when traveling along the "wine glass" path 2494a. In some embodiments, the platform drive, sensors, and weeding implements are arranged symmetrically such that they can function whether the robot is traveling in the first or second directions 2492 or 2493.

Referring to FIGS. 33B and 33C, the robot can take a "U-turn" path 2494b in which the robot takes three different but continuous arcs (FIG. 33B) or a single continuous arc (FIG. 33C), each with a curve radius 2495. In some embodiments, the robot—and thus the solar panel on the robot—reverses its orientation when traveling along the "U-turn" path 2494b. In both embodiments, the length of the path 2494 along the same axis as either travel direction 2492 or 2493 is shown as length 2496 (i.e., "operating envelope," e.g., distance the robot travels away from a crop field).

The "wine glass" path 2494a illustrated in FIG. 33A can provide the advantage of keeping the solar panel oriented towards the sun whether the robot is traveling in the first or second directions 2492 or 2493. In some embodiments, the robot may only need to rotate the arms underneath and the robot can operate equally effectively when traveling in the second direction 2493 as compared to traveling in the first direction 2492. The "wine glass" path 2494a can also provide the advantage of reduced power consumption. In some embodiments, skid steering of the robot consumes less power when the radius 2495 is larger, but the operating envelope 2496 may become longer. For example, by increasing the radius 2495 threefold, the skid steering power consumption may be dramatically reduced while the operating envelope 2496 may increase less than twofold. In some embodiments, the power savings from increasing the radius 2495 may be limited by physical factors such as available space in the vicinity of the crop field.

In some embodiments, the "U-turn" path 2494b causes the robot—and thus the solar panel on the robot—to face the opposite direction, which may reduce solar power generation. In some embodiments, the three-arc "U-turn" path 2494b illustrated in FIG. 33B may result in lower power consumption due to the larger radius 2495, but may also result in a much larger operating envelope 2496.

Figures 34A, 34B:
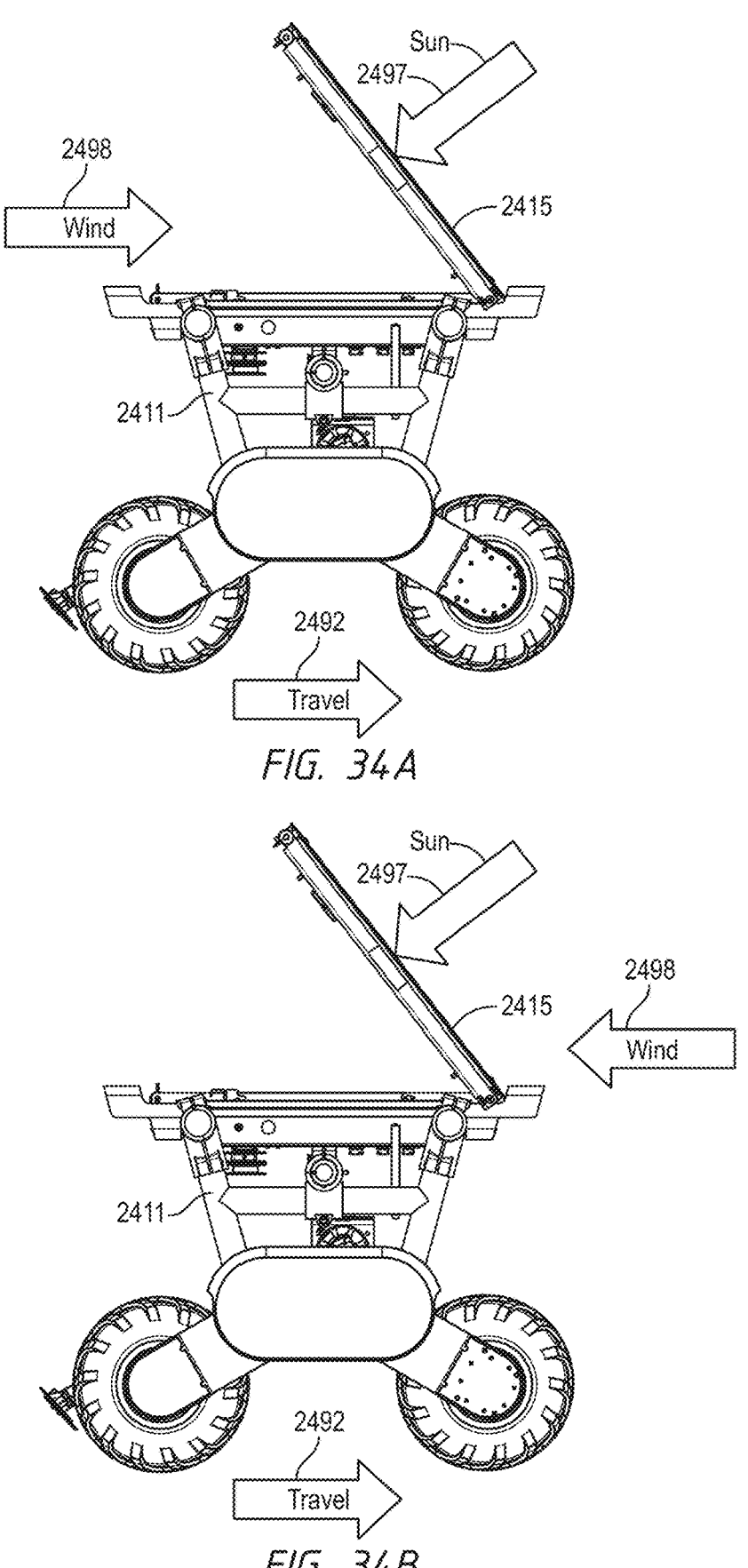
FIGS. 34A-D illustrate different directions an embodiment of a robot can travel in relative to the direction of the wind and the direction of the sunlight.
Figures 34C, 34D:
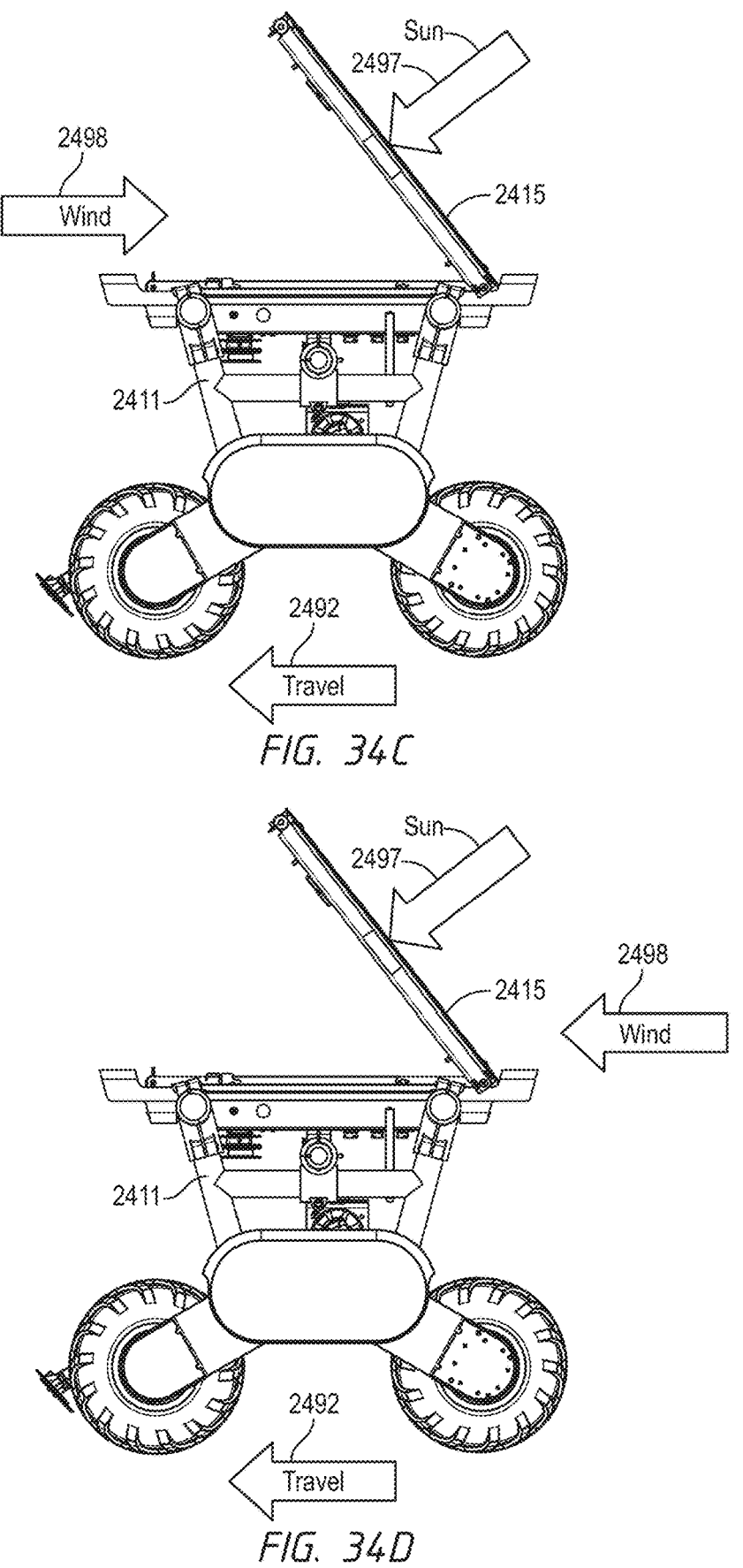

FIGS. 34A-D illustrate different directions the robot 2411 can travel in relative to the direction of the wind 2498 and the direction of the sunlight 2497. In FIG. 34A, when the robot 2411 is traveling in the first travel direction 2492, the solar panel 2415 can be raised and used as a solar sail while also facing the sun. In FIG. 34B, when the robot 2411 is traveling in the first travel direction 2492, the solar panel 2415 can be lowered to reduce the resistance from the wind 2498 at the cost of lowering solar power generation. In some embodiments, the angle of the solar panel 2415 is optimized based on the sunlight level and the wind speed. In FIG. 34C, when the robot 2411 is traveling in the second travel direction 2493, the solar panel 2415 can be lowered to reduce the resistance from the wind 2498 at the cost of lowering solar power generation. In some embodiments, the angle of the solar panel 2415 is optimized based on the sunlight level and the wind speed. In some embodiments, the angle of the solar panel 2415 is optimized based on the sunlight level and the wind speed. In FIG. 34D, when the robot 2411 is traveling in the second travel direction 2493, the solar panel 2415 can be raised and used as a solar sail while also facing the sun.

FIGS. 34A-D show that the adjustable angle of the solar panel 2415 can be optimized to balance the aerodynamic profile of the robot 2411 and the level of solar power generation. In some embodiments, when experience detrimental wind loading, the efficiency of the overall system can be optimized by balancing the energy generated by the solar panel 2415 due to the relative angle of the panel to the sunlight 2497 and the excess energy consumed due to the additional aerodynamic drag. In some embodiments, the optimization allows for taking advantage of beneficial wind loading and minimizing detrimental wind loading.

Single and Double Width Ground Robots

Figure 35A:
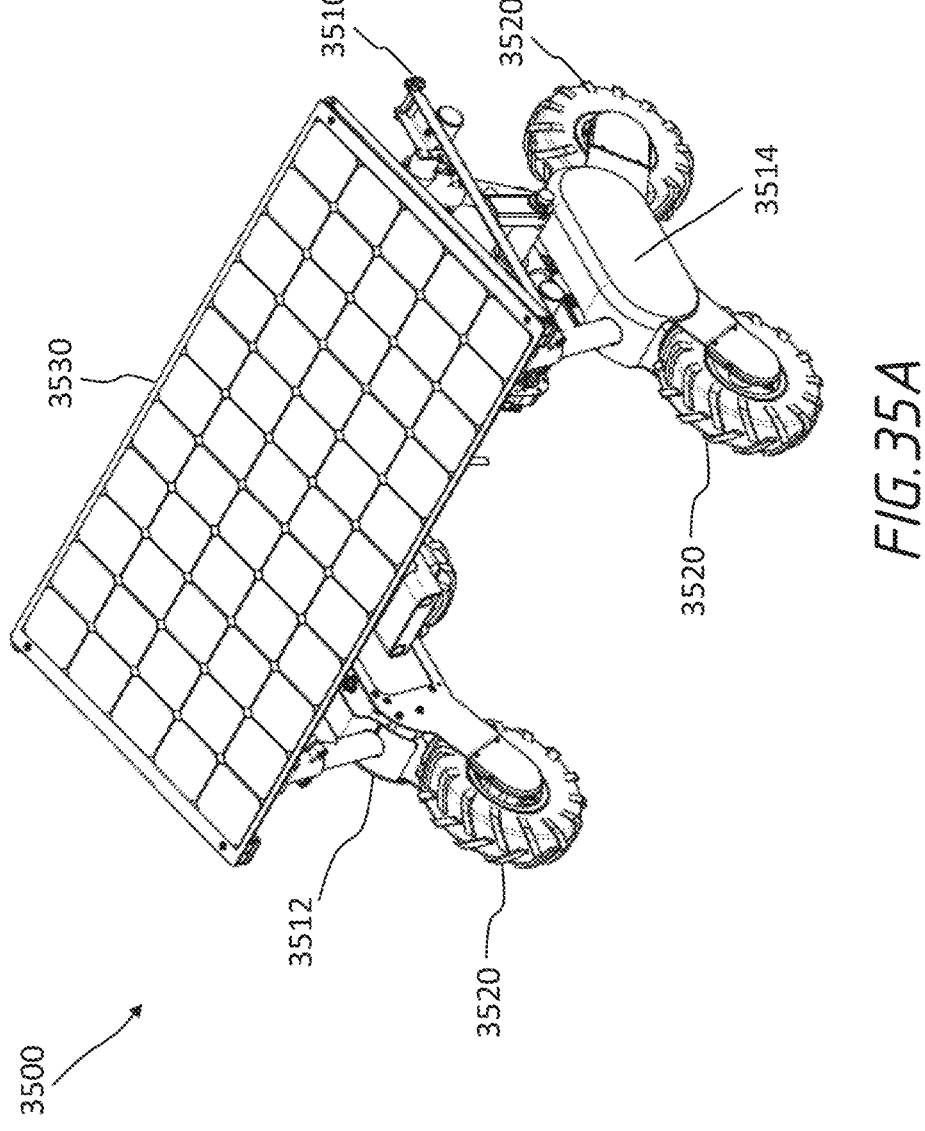
FIGS. 35A-G illustrate perspective, front, rear, right side, left side, top, and bottom views, respectively, of a single width ground robot.
Figures 35B, 35C:
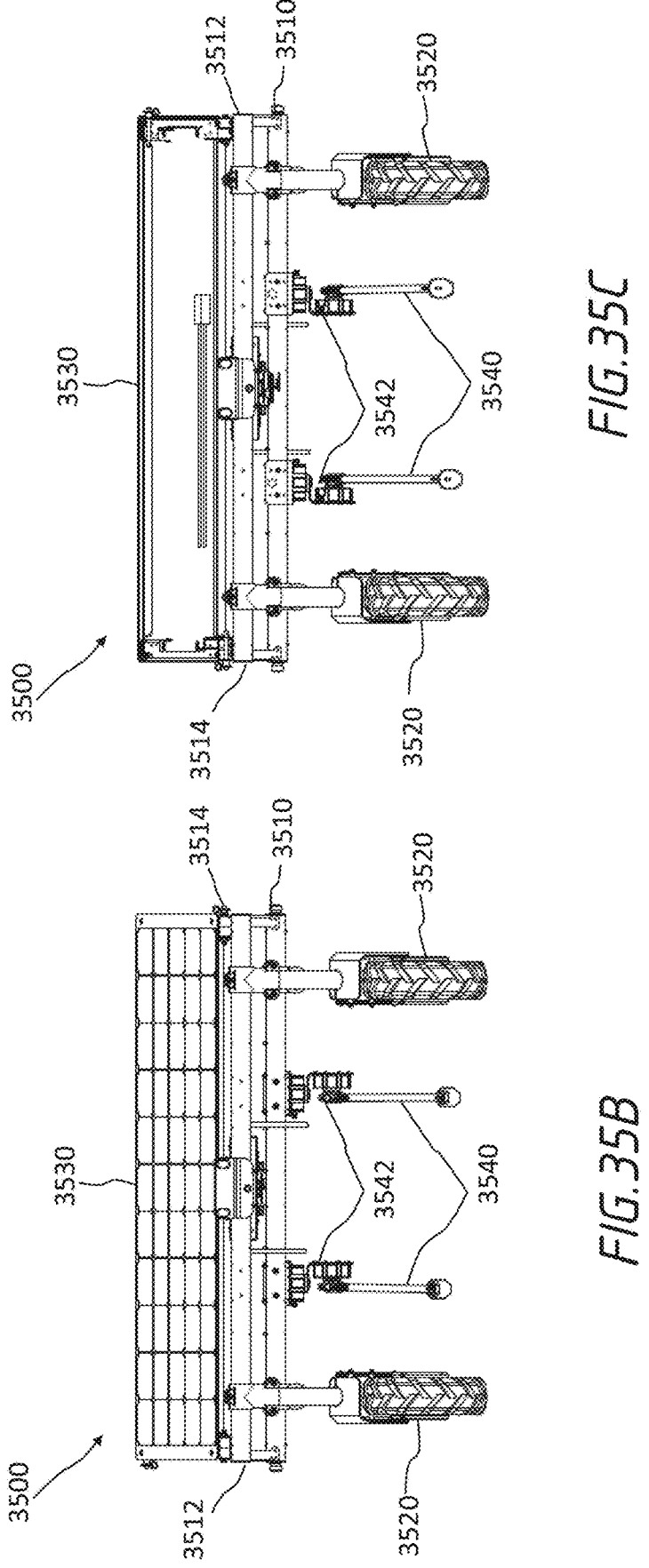
Figure 35D:
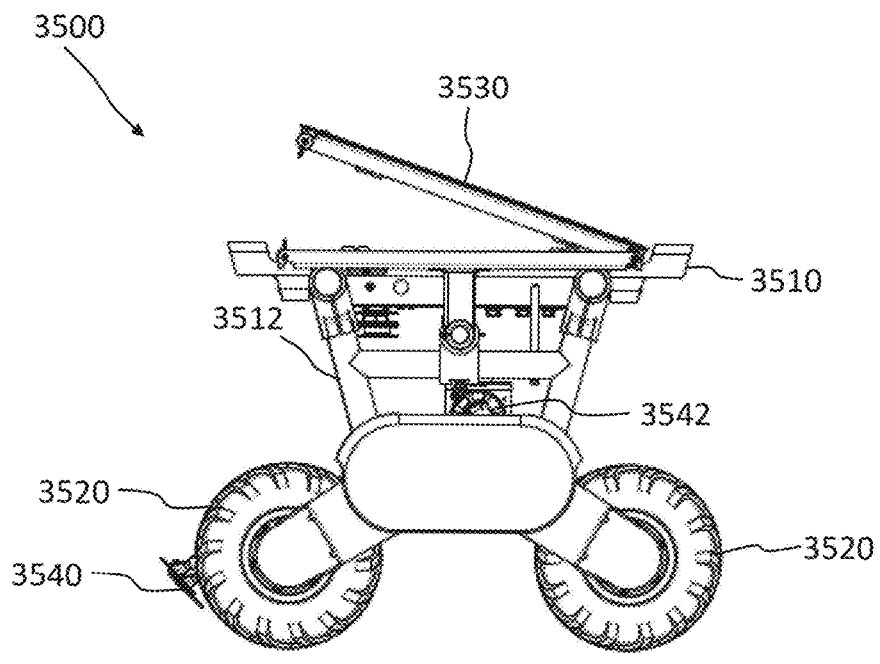
Figure 35E:
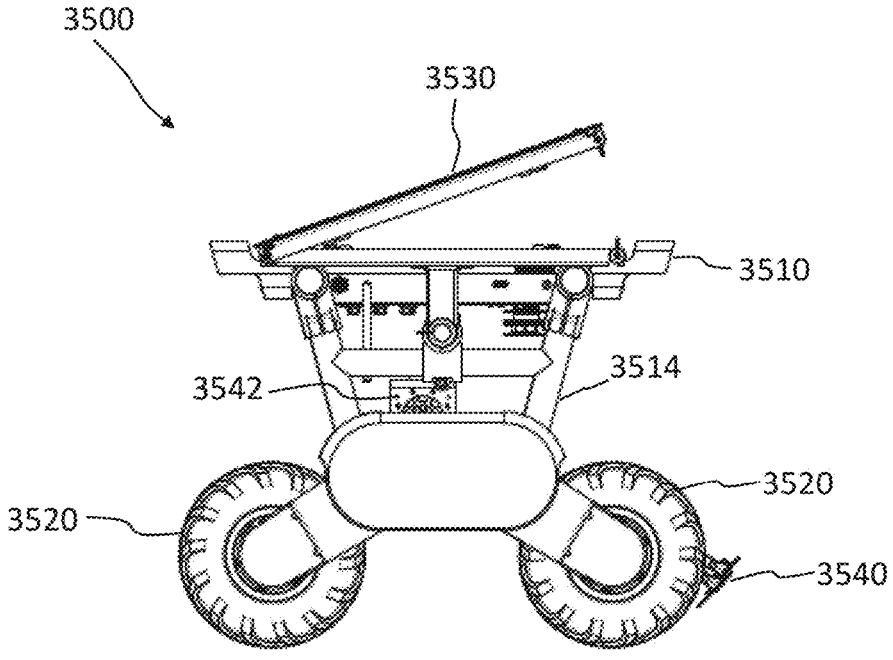

FIGS. 35A-G illustrate perspective, front, rear, right side, left side, top, and bottom views, respectively, of a single width ground robot 3500 ("robot 3500"). Referring first to FIG. 35A, in some embodiments, the robot 3500 includes a body frame 3510, which can be made of metal (e.g., steel, aluminum), plastic, wood, etc. The body frame 3510 can include a right side portion 3512 and a left side portion 3514. A plurality of wheels 3520 can be attached to the right and left side portions 3512, 3514 of the body frame 3510 for ground transportation. In the illustrated embodiment, two wheels 3520 are attached on each of the right and left side portions 3512, 3514 of the body frame 3510. In some embodiments, the robot 3500 can also include a solar panel 3530 for powering various components of the robot 3500. As will be described in further detail below, the solar panel 3530 can be tilted at various angles relative to the body frame 3510 in order to maximize solar power generation. In some embodiments, the solar panel 3530 can be mounted on a body panel attached to the body frame 3510 such that tilting the body panel tilts the solar panel 3530.

Referring next to FIGS. 35B, 35C, 35D, and 35E, which are front, rear, right side, and left side views, respectively, the robot 3500 can also include one or more equipment 3540. In some embodiments, the robot 3500 can include various types of equipment 3540. In some embodiments, the equipment 3540 can include farming equipment, such as hoes, fertilizer applicators, seed planters, etc. In some embodiments, the equipment 3540 can include non-farming equipment. In some embodiments, one or more control members 3542 can be attached between the body frame 3510 and the equipment 3540 in order to control the movement of the equipment 3540. In some embodiments, the control members 3542 can include motorized gears controllable locally or remotely in order to angle the equipment 3540 as desired. The control members 3542 can also include telescoping features to allow the equipment 3540 to be retracted when not in use.

Figure 35F:
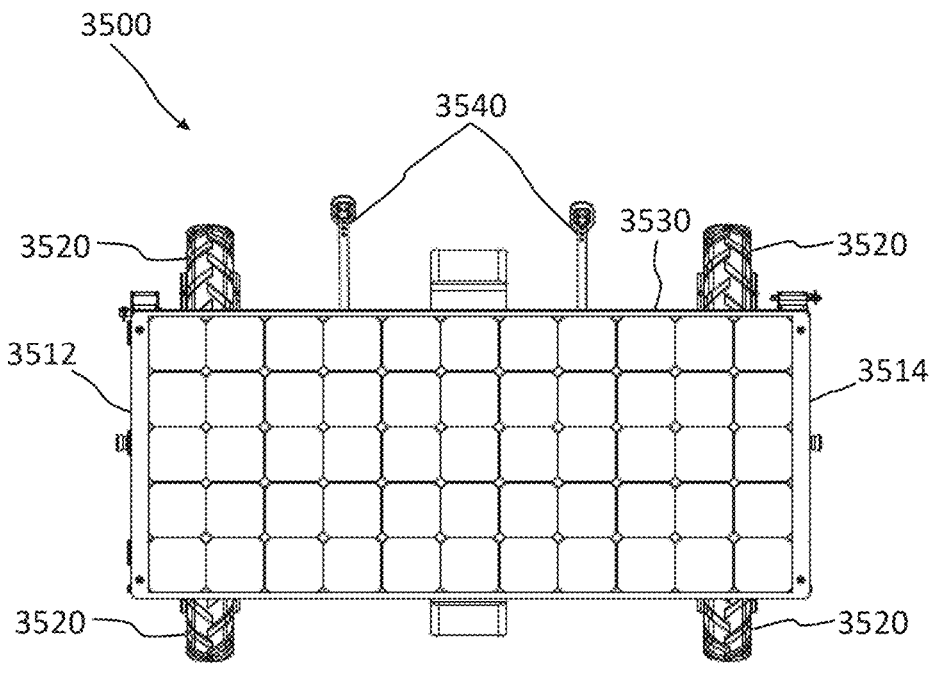
Figure 35G:
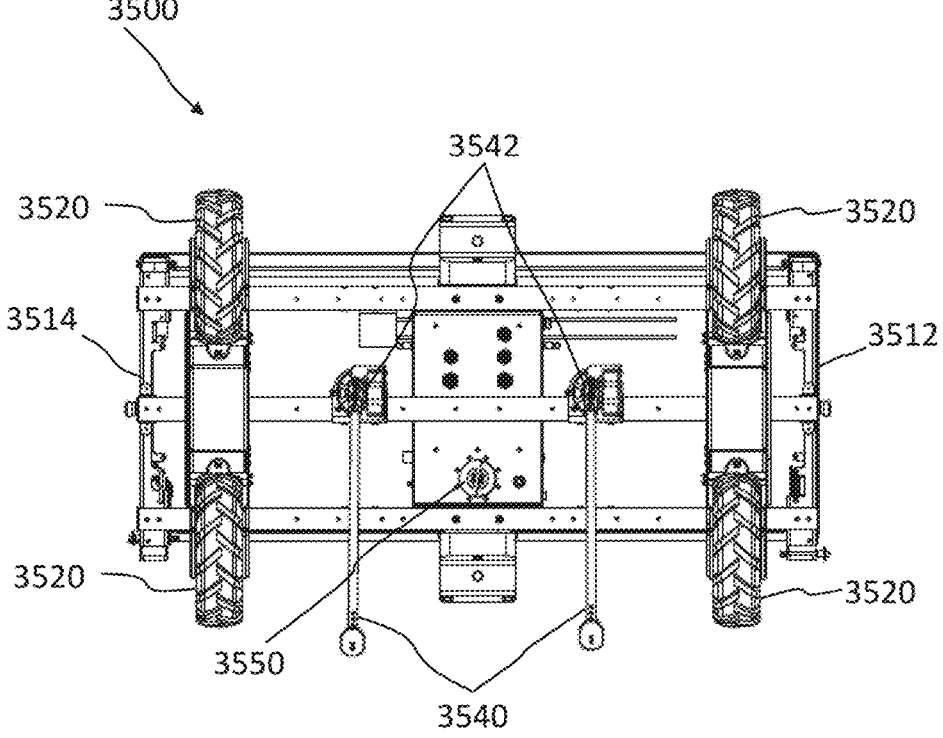

Referring next to FIGS. 35F and 35G, which are top and bottom views, respectively, the robot 3500 can include a motorized spool 3550 with a cable attached to the solar panel 3530 and/or the body panel. In some embodiments, the motorized spool 3550 can be an example of the spool 2488 illustrated in FIGS. 29A-30C. In some embodiments, the solar panel 3530 can be angled via different mechanisms.

Figure 36A:
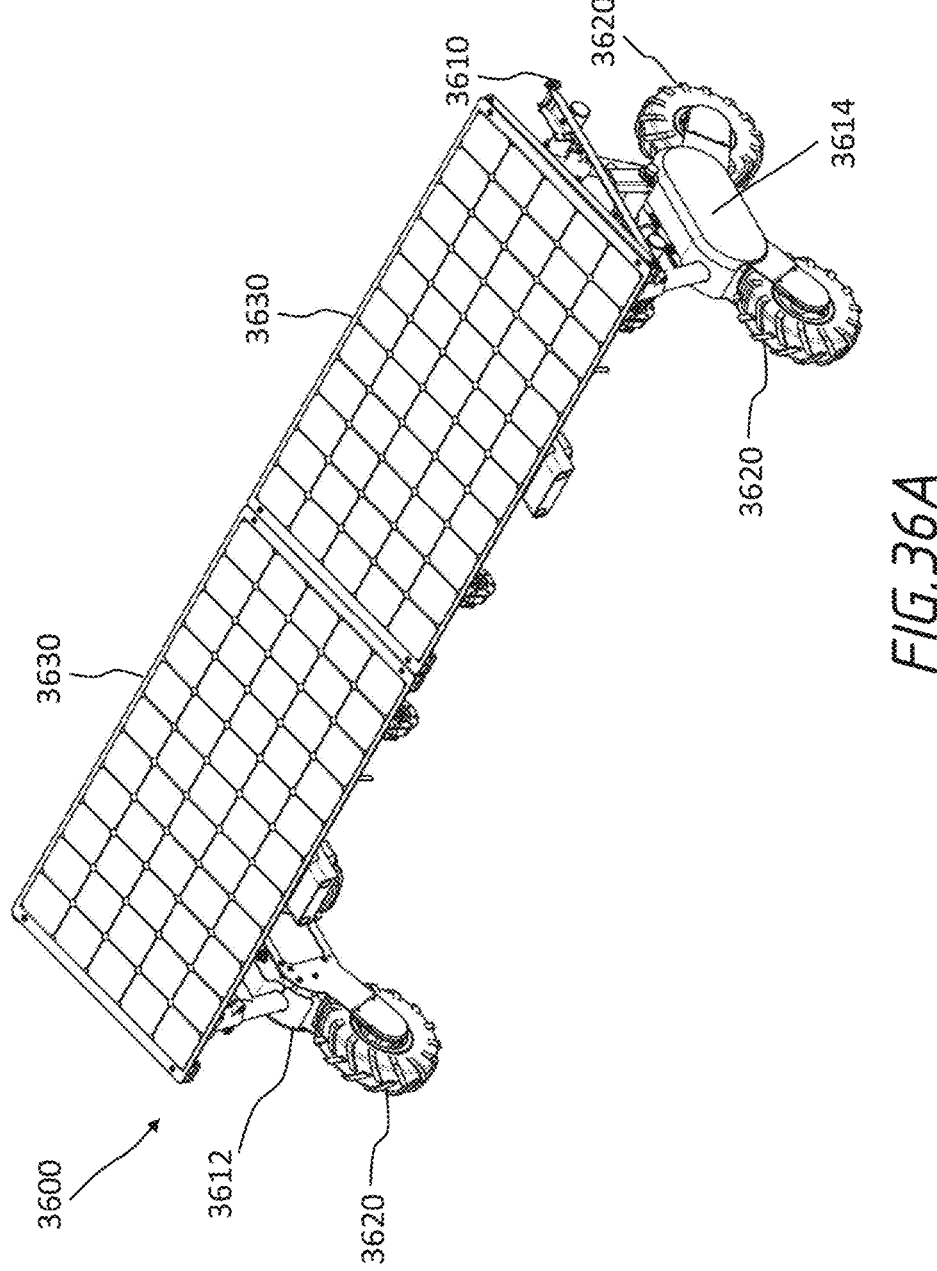
FIGS. 36A-G illustrate perspective, front, rear, right side, left side, top, and bottom views, respectively, of a double width ground robot.
Figures 36B, 36C:
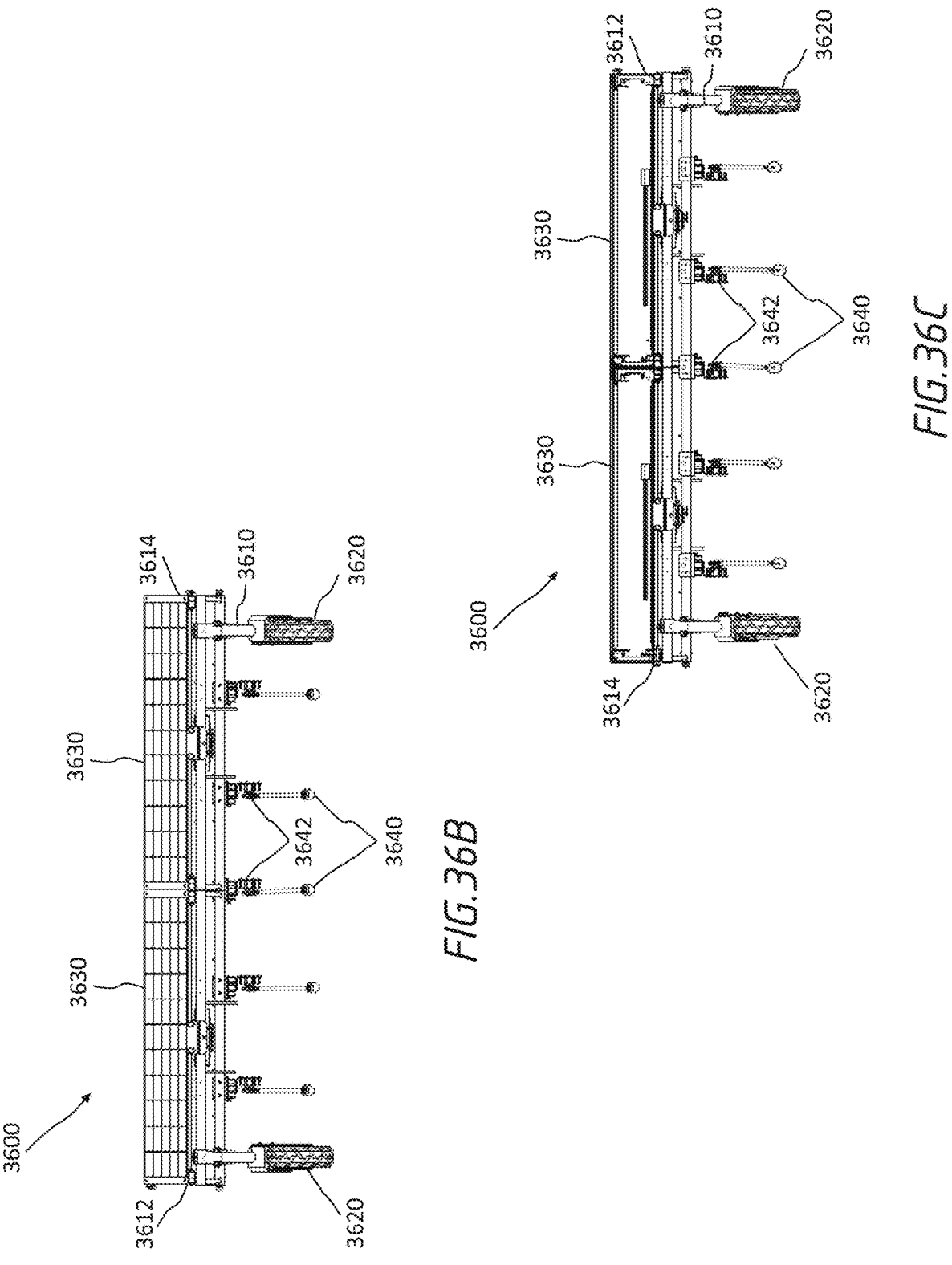
Figures 36D, 36E:
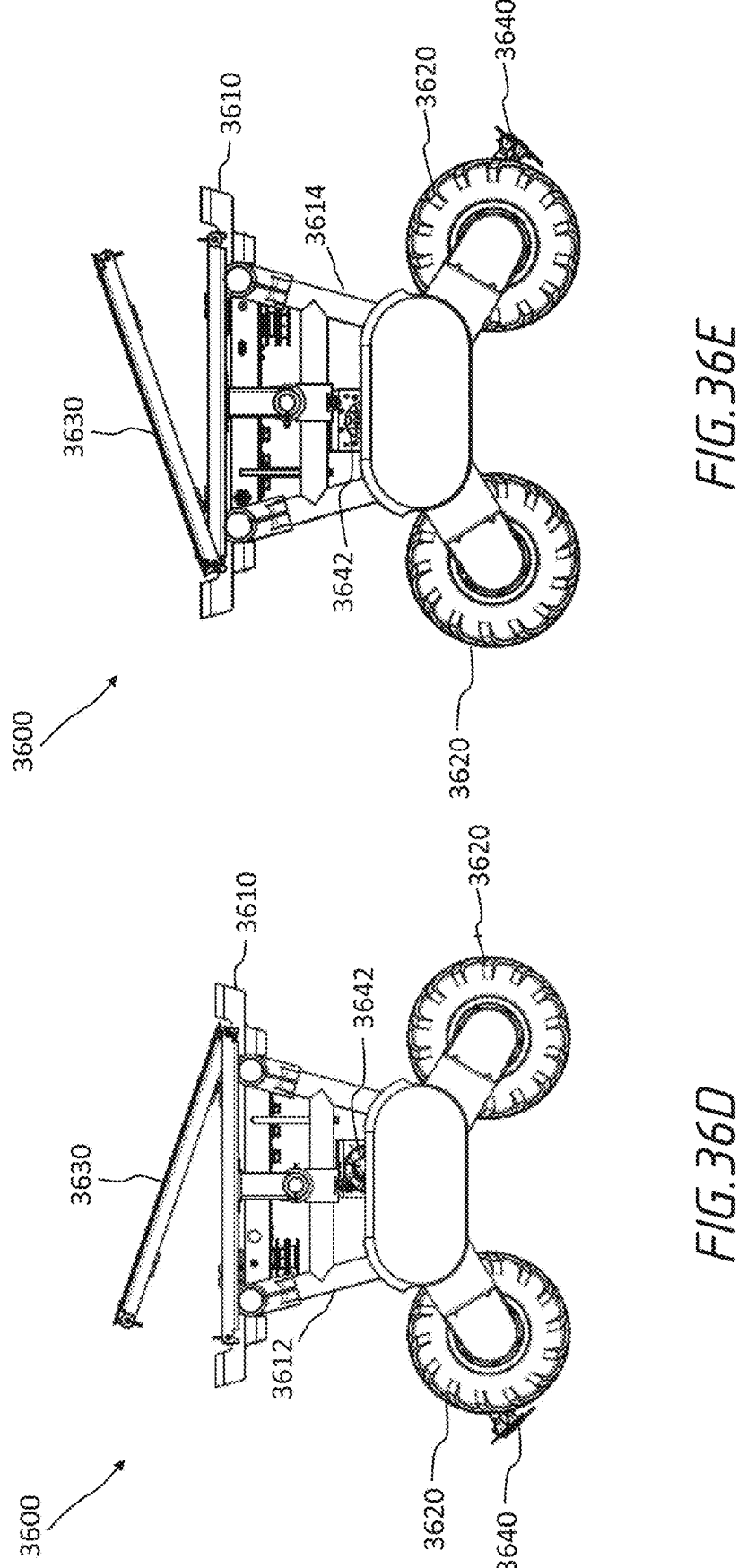

FIGS. 36A-G illustrate perspective, front, rear, right side, left side, top, and bottom views, respectively, of a double width ground robot 3600 ("robot 3600"). Referring first to FIG. 36A, the robot 3600 generally includes features similar to the robot 3500 illustrated in FIGS. 35A-G. For example, the robot 3600 has a body frame 3610 including a right side portion 3612 and a left side portion 3614. In the illustrated embodiment, the robot 3600 has two wheels 3620 attached to each side portion 3612, 3614 of the body frame 3610. Compared to the robot 3500, however, robot 3600 is wider (e.g., twice as wide). For example, the robot 3600 can include two solar panels 3630 arranged side-by-side, as shown. In some embodiments, the robot 3600 can include more solar panels arranged in various arrangements (e.g., four solar panels arranged in quadrants). In some embodiments, the solar panels 3630 can be mounted on one or more frame panels. For example, each solar panel 3630 can be mounted on a separate frame panel or the two solar panels 3630 can be mounted on the same frame panel. In some embodiments, the frame panel can be tilted to angle the solar panels 3630 to maximize solar power generation.

Referring next to FIGS. 36B, 36C, 36D, and 36E, which are front, rear, right side, and left side views, respectively, the robot 3600 can also include one or more equipment 3640 and one or more control members 3642. In some embodiments, each equipment 3640 is coupled to the body frame 3610 through a respective one of the control members 3642. Compared to the robot 3500, the robot 3600 can include more equipment 3640 and/or control members 3642 due to having a wider body frame 3610. In the illustrated embodiment, the robot 3600 includes five equipment 3640 attached to the body frame 3610 via one of five control members 3642.

Figure 36F:
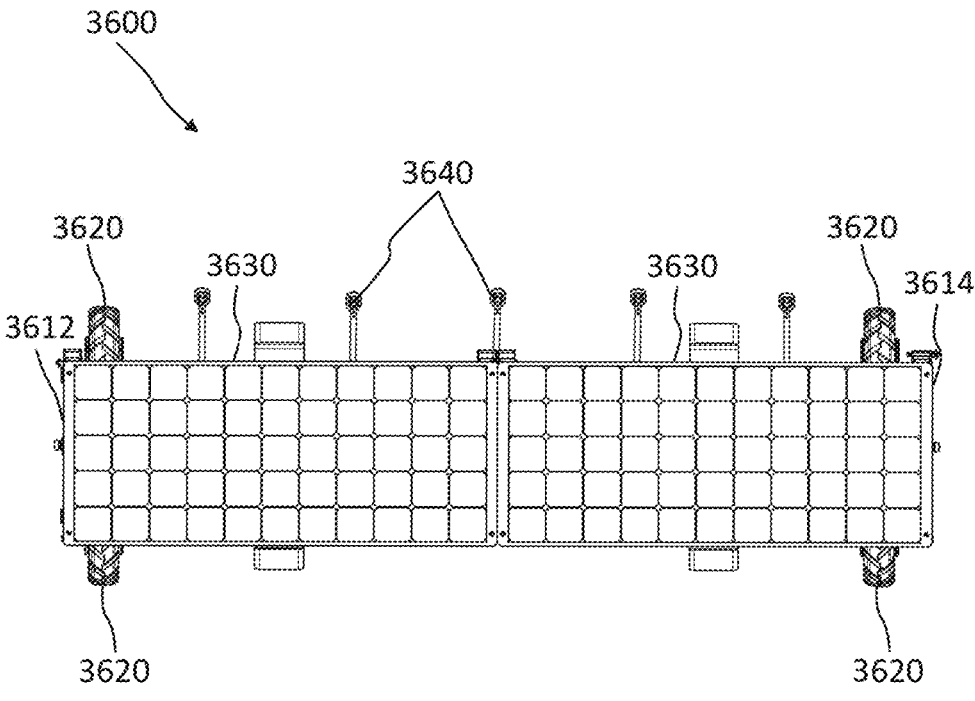
Figure 36G:
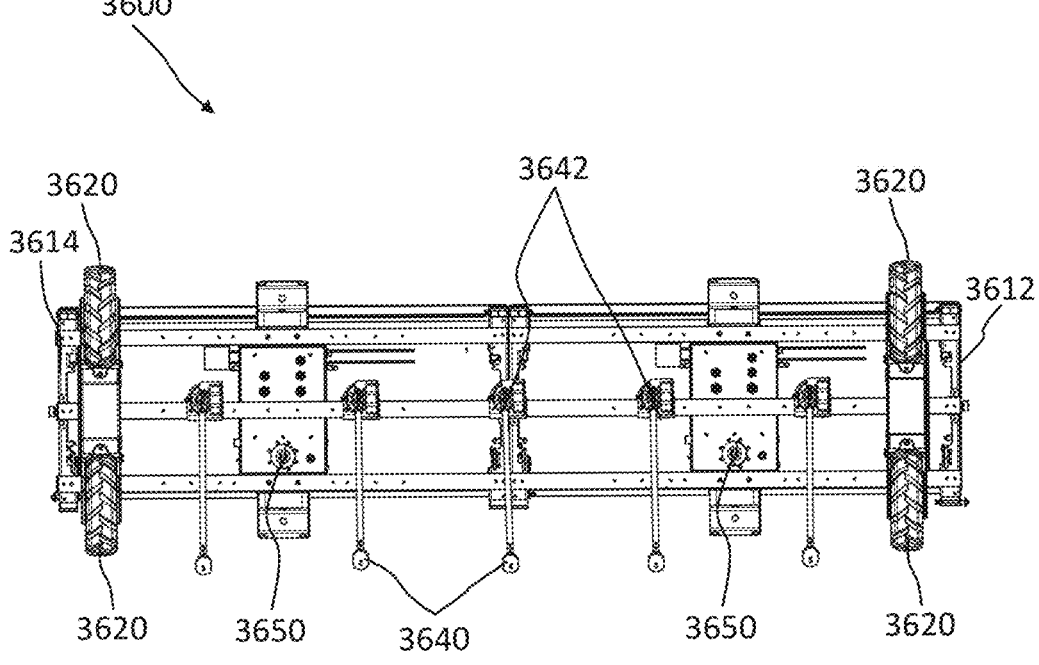

Referring next to FIGS. 36F and 36G, which are top and bottom views, respectively, the robot 3600 can include two motorized spool 3650 with cables attached to the respective solar panels 3630 and/or the body panels. In some embodiments, the motorized spools 3650 can be examples of the spool 2488 illustrated in FIGS. 29A-30C. As shown, by attaching the two solar panels 3630 to different spools 3650, the angle of each solar panel 3630 can be individually controlled. In some embodiments, the robot 3600 can include fewer or more spools 3650. For example, more spools 3650 can be included to control one or more additional solar panels 3630. In some embodiments, the solar panels 3630 can be angled via different mechanisms.

Tractor Implement

Figure 37A:
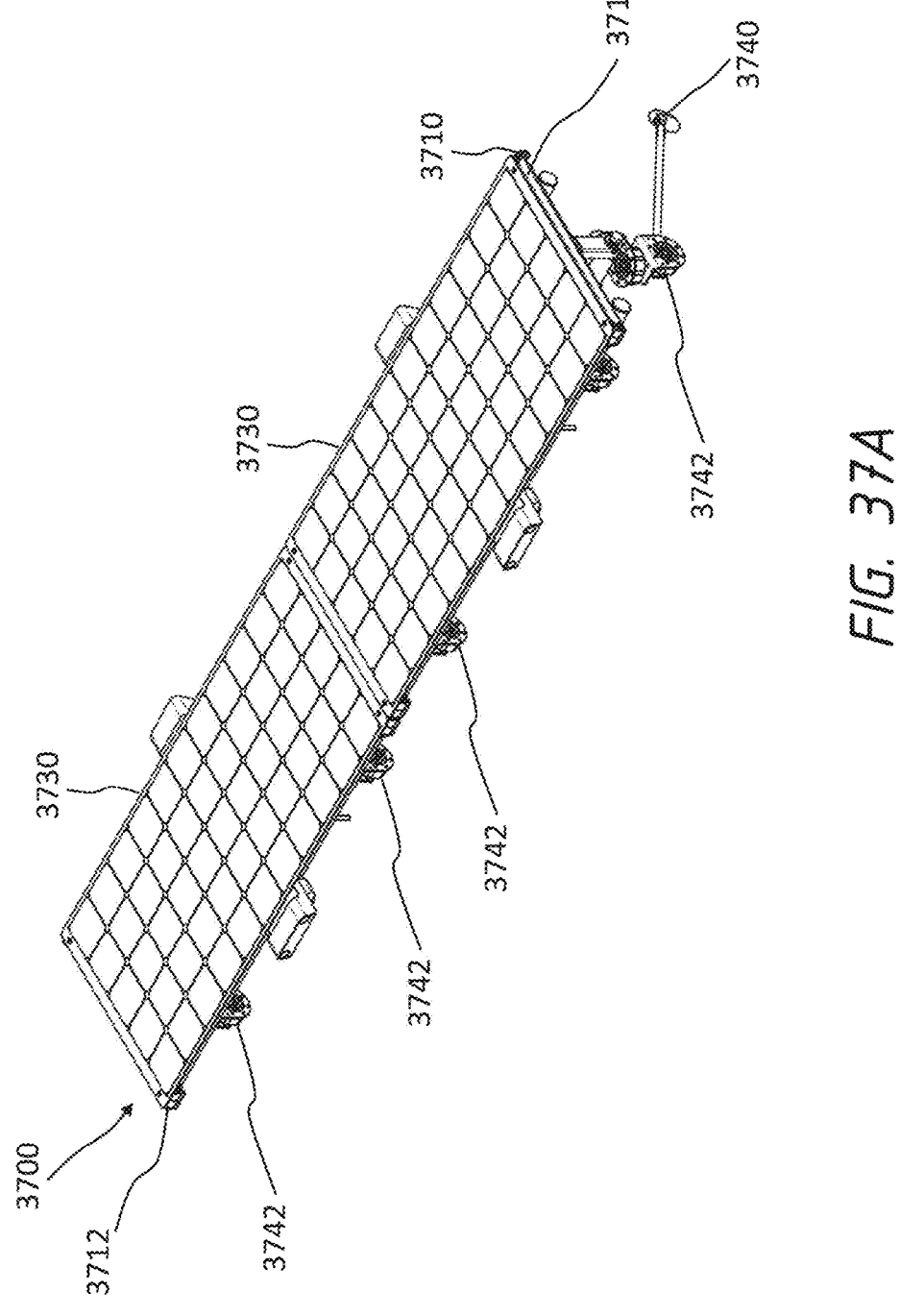
FIGS. 37A-C illustrate perspective, front, and left side views, respectively, of a tractor implement compatible with a conventional tractor.
Figure 37B:
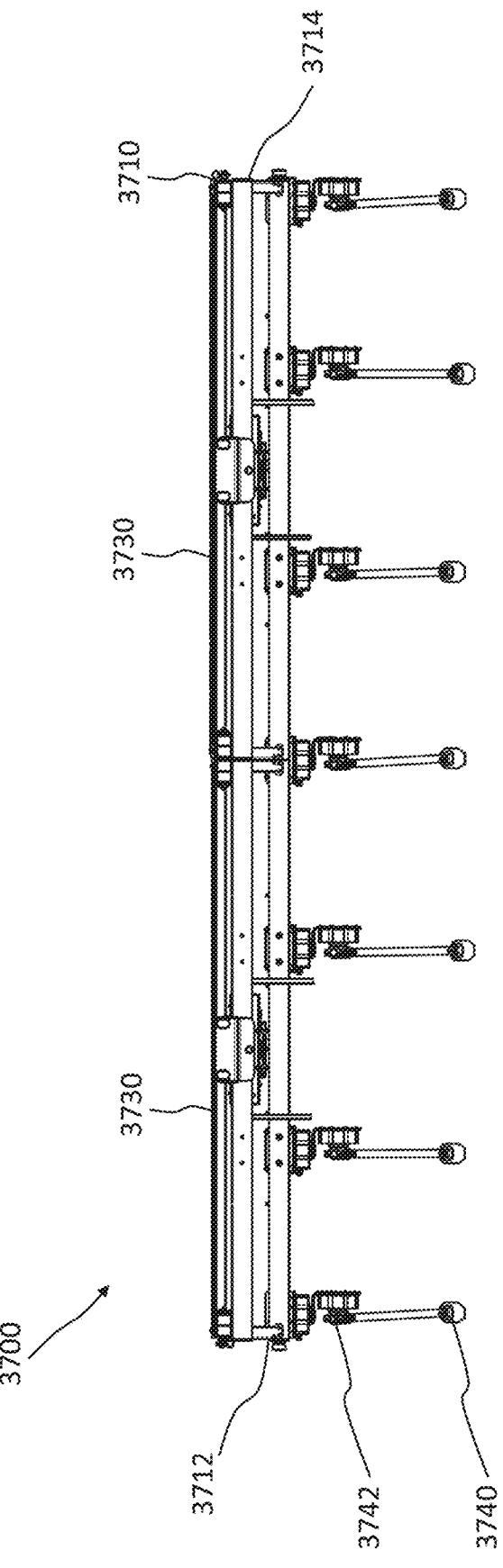
Figure 37C:
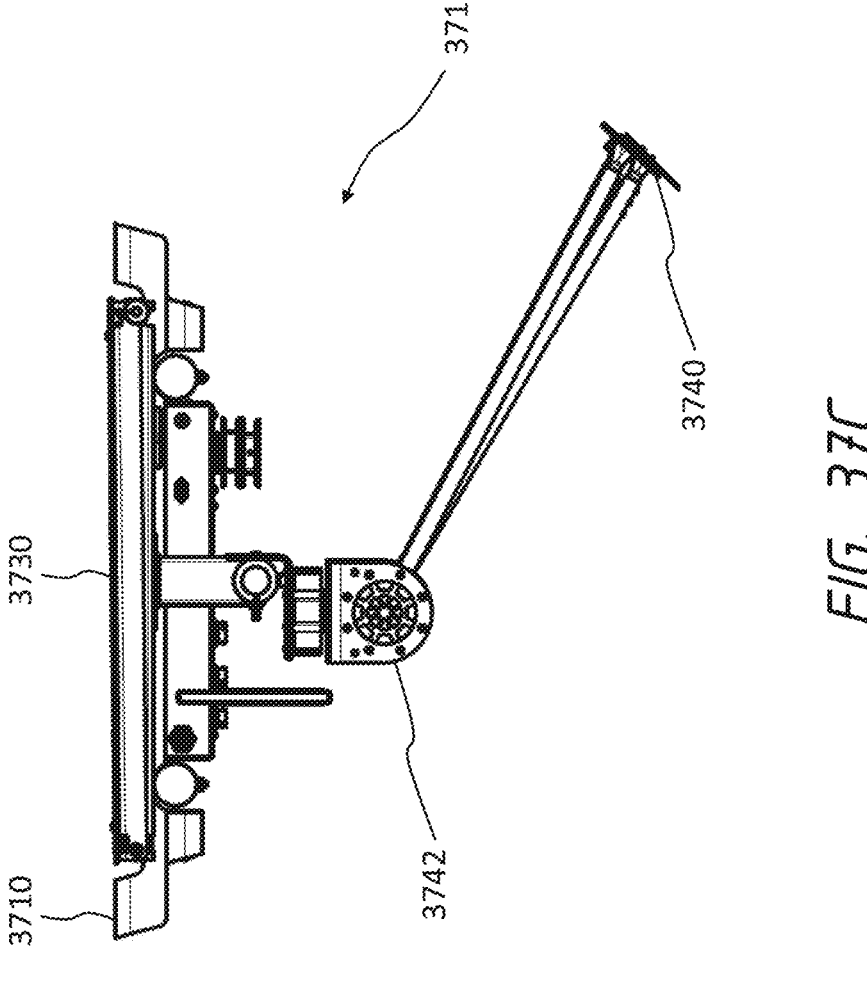

FIGS. 37A-C illustrate perspective, front, and left side views, respectively, of a tractor implement 3700 compatible with a conventional tractor. Referring FIGS. 37A-C together, in some embodiments, the tractor implement 3700 includes a body frame 3710, which can be made of metal (e.g., steel, aluminum), plastic, wood, etc. The body frame 3710 can include a right side portion 3712 and a left side portion 3714. In some embodiments, the tractor implement 3700 can also include one or more solar panels 3730 for powering various components of the tractor implement 3700. In some embodiments, the solar panels 3730 can be tilted at various angles relative to the body frame 3710 in order to maximize solar power generation. In some embodiments, the solar panels 3730 can be mounted on a body panel attached to the body frame 3710 such that tilting the body panel tilts the solar panel 3730. In some embodiments, the tractor implement 3700 does not include the solar panels 3730, and instead draws power from a tractor or other vehicle to which the tractor implement 3700 is attached.

In some embodiments, the tractor implement 3700 can include various types of equipment 3740. In some embodiments, the equipment 3740 can include farming equipment, such as hoes, fertilizer applicators, seed planters, etc. In some embodiments, the equipment 3740 can include non-farming equipment. In some embodiments, one or more control members 3742 can be attached between the body frame 3710 and the equipment 3740 in order to control the movement of the equipment 3740. In some embodiments, the control members 3742 can include motorized gears controllable locally or remotely in order to angle the equipment 3740 as desired. The control members 3742 can also include telescoping features to allow the equipment 3740 to be retracted when not in use.

In some embodiments, the tractor implement 3700 can be either of the robots 3500, 3600 with the wheels 3520, 3620 removed such that the same device or assembly can be either used as a stand-alone robot (e.g., robots 3500, 3600) or attached to a conventional tractor (e.g., the tractor implement 3700). In some embodiments, the width of the tractor implement 3700 (i.e., the distance between the right side portion 3712 and the left side portion 3714) is modular, as exemplified in the discussion above with respect to FIGS. 35A-36G. In some embodiments, the width of the tractor implement 3700 can be 0.5 meters, 1 meter, 2, meters, 3 meters, 4, meters, 5 meters, 6 meters, 7 meters, 8 meters, 9 meters, 10 meters, 20 meters, 30 meters, or more. In some embodiments, multiple tractor implements 3700 can be attached to the same tractor or other vehicle (e.g., with the multiple tractor implements 3700 arranged side-by-side to increase the effective width of the tractor implements 3700). In some embodiments, the number and/or the arrangement of equipment 3740 can be changed depending on the width of the tractor implement 3700, farming demands, etc.

Off-Season Robot Solar Power Generation and Storage

During the off-season in a farming cycle, farmers and other users may not deploy the robots to manage fields and crops as described above. Storage of multiple robots (e.g., 5, 10, 50, 100, or more robots) not performing any function during the off-season can be unappealing, given the space required to store the multiple robots and associated costs. The ground robots of the present technology can be utilized as efficient solar power generators during such off-seasons instead of sitting idle. As will be described in further detail below, the ground robots can optimize solar power generation and discharge into a residential bus (e.g., 120 V) or the grid such that the energy can be used directly by the farmers, sold to utility companies, etc.

Figure 38:
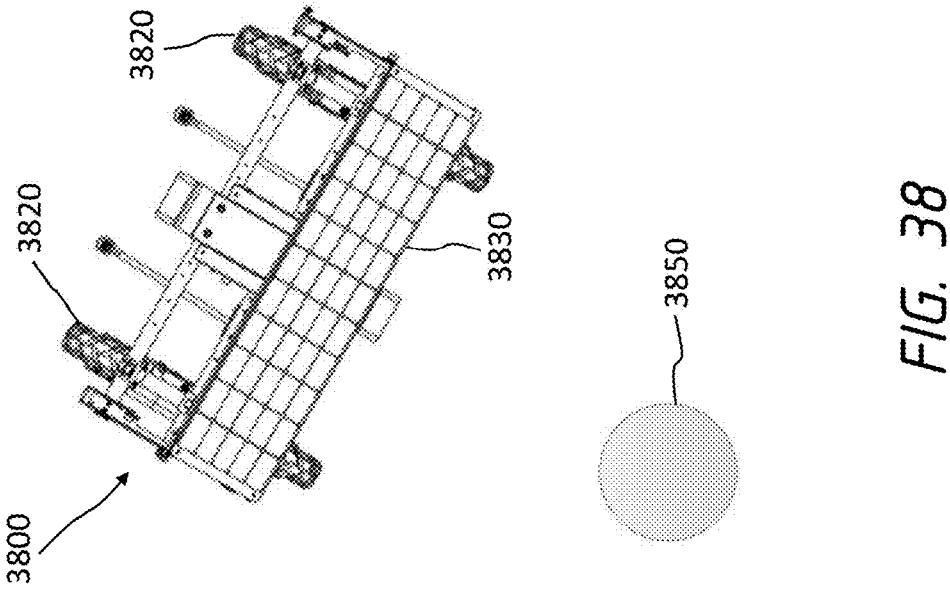
FIG. 38 illustrates a ground robot with an on-board maximum-power-point-tracker maximizing solar power generation.

FIG. 38 illustrates a ground robot 3800 with an on-board maximum-power-point-tracker (MPPT) configured to maximize solar power generation. During the day, as the sun 3850 moves, the on-board MPPT can identify the position and orientation of the robot 3800 and the solar panel 3830 at which solar power generation is maximized. In some embodiments, the on-board MPPT can include hardware (e.g., IV curve tracer) to trace the IV curve of the solar panel 3830 to find the position and orientation of maximum energy generation. Based on the results of the MPPT, the robot 3800 can then use the wheels 3820 to position and orient the robot 3800, and use mechanisms (e.g., the spool 2488) to angle the solar panel 3830 accordingly. In some cases, because the robot 3800 is not operating on crop rows, the robot 3800 is free to position and orient freely and optimize solar power generation.

In some embodiments, one or more of GPS technology, positioning and orienting the robot 3800, or known positions of the sun based on the time of day can be used with or without the MPPT to adjust the solar panel angle.

Figure 39:
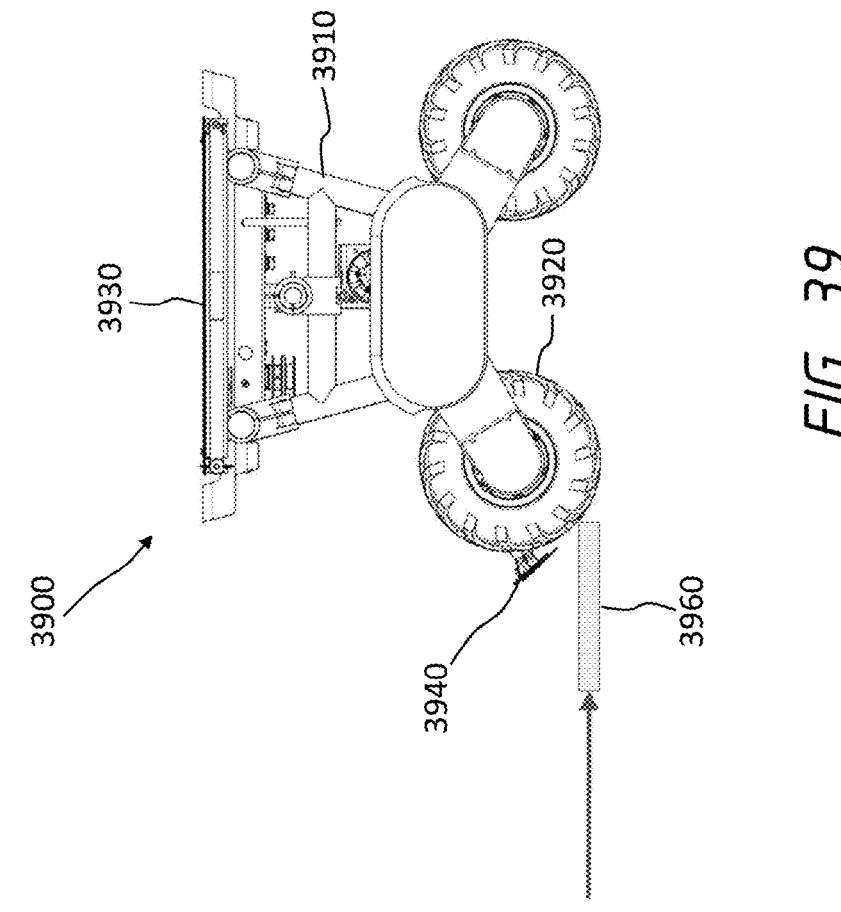
FIG. 39 illustrates a ground robot at a dock for charging and grid-tie discharging.

FIG. 39 illustrates a ground robot 3900 at a docking station 3960 for charging and/or grid-tie discharging. In some embodiments, once solar panel 3930 on the robot 3900 has generated enough energy (e.g., battery at 85%), the robot 3900 can move to the docking station 3960 to discharge the generated energy to a residential bus, the grid, etc. In some embodiments, the docking station 3960 can have a relatively low profile as shown (e.g., on the ground, flat). In some embodiments, the docking station 3960 can have a more complex configuration (e.g., stands taller in order to, for example, interface with the body frame 3910).

The robot 3900 can discharge energy via the body frame 3910, the wheels 3920, and/or the equipment arm 3940 via a wired connection (e.g., a plug-in cable) or wirelessly (e.g., capacitive discharging, inductive discharging). In some embodiments, the equipment arm 3940 can include wires for supply power and control signals to farming equipment (e.g., an electric end effector) during the growing season, and the same wires can be used to charge and discharge during the off-season. In some embodiments, the equipment arm 3940 can include separate wires for use during the growing season and the off-season. In some embodiments, the equipment arm 3940 itself can be composed of a conductive material and be used to charge and discharge during the off-season. In some embodiments, the robot 3900 can move into a position on the docking station 3960 and interface with the docking station 3960 via the wheels 3920. In some embodiments, cleaning equipment can be positioned proximate to the docking station 3960 and/or on the robot 3900 to clean dirt and other debris off the wheels 3920 for optimal charging and discharging. In some embodiments, the docking station 3960 can electrically connect to the body frame 3910, a battery on the robot 3900, and/or the solar panels 3930.

Figure 40:
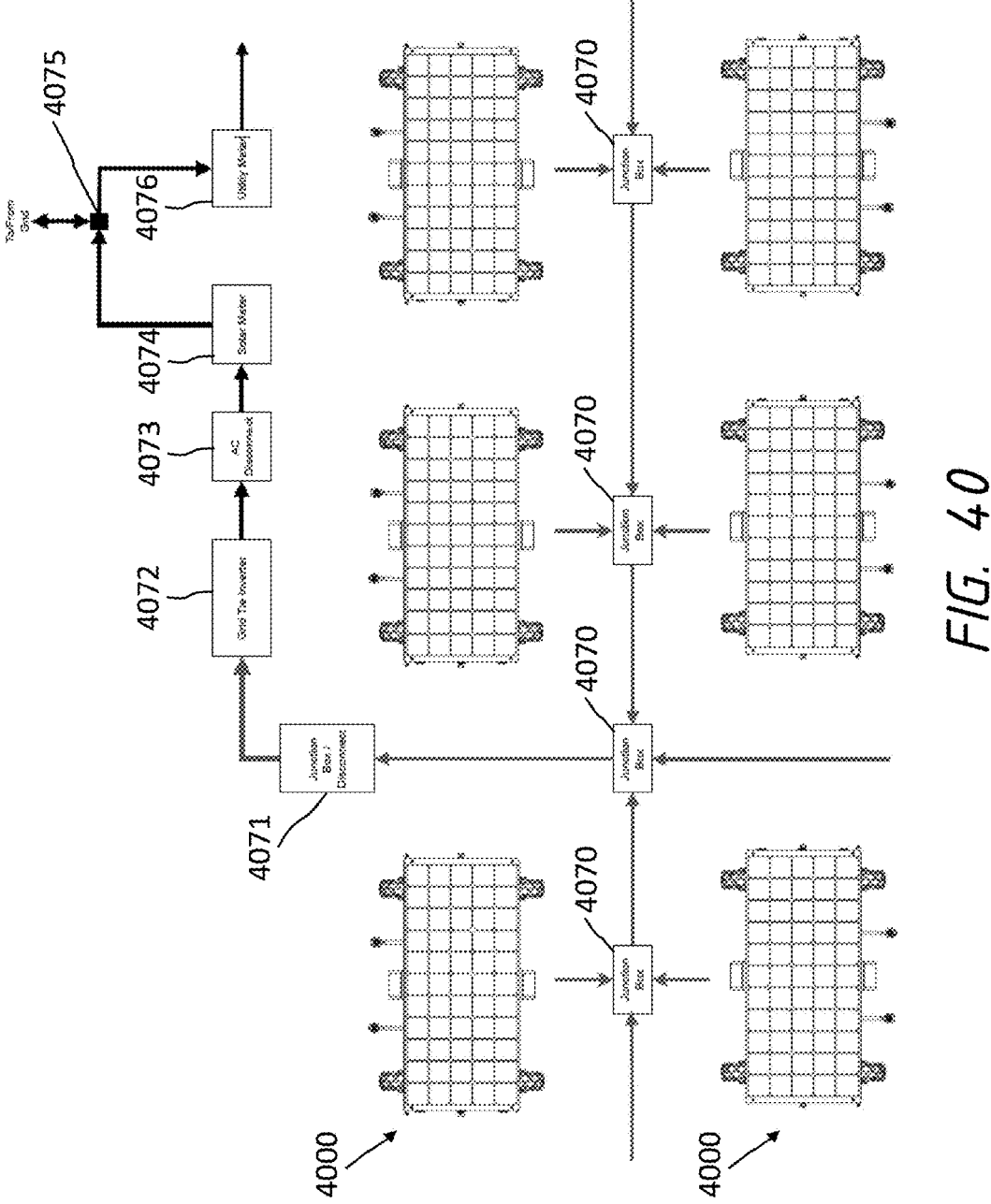
FIG. 40 illustrates multiple ground robots connected to a grid-tie inverter via multiple junction boxes.

FIG. 40 illustrates multiple ground robots 4000 connected to a grid-tie inverter 4072 via multiple junction-disconnect boxes 4070, 4071. In the illustrated embodiment, the robots 4000 are connected to a global junction-disconnect box 4071 via a plurality of local junction-disconnect boxes 4070 through wired connections (e.g., cables). The local junction-disconnect boxes 4070 can control which of the robots 4000 are electrically connected to the grid-tie inverter 4072. The global junction-disconnect box 4071 can control whether the multiple robots 4000 as a group is connected to the grid-tie inverter 4072. In some embodiments, the grid-tie inverter 4072 can be a commercial-off-the-shelf (COTS) grid-tie inverter. In some embodiments, the grid-tie inverter 4072 can be in the kilowatt range.

In some embodiments, all of the robots 4000 can be connected to the global junction-disconnect box 4071 without the local junction-disconnect boxes 4070. In some cases, the use of the local junction-disconnect boxes 4070 can reduce the total amount of wiring needed. In some embodiments, the robots 4000 can be connected in parallel, as shown. In some embodiments, the robots 400 can be connected in series.

The grid-tie inverter 4072 can be connected to a solar meter 4074 via an AC disconnect 4073. The solar utility meter 4074 can be connected to a grid junction 4075 which connects to the grid, and the grid junction 4075 can further be connected to a utility meter 4076. During operation, the solar power generated by each robot 4000 is fed into a common bus, and because each robot 4000 can have its own MPPT, a stable battery bus and an optimal power feed can be achieved.

In some embodiments, the robots 4000 can be connected to multiple inverters (e.g., the inverter 4072) instead of a single inverter. The multiple inverters can each comprise a micro-inverter (e.g., in the 200-700 W range). The multiple inverters can be tied together into a standard grid tie configuration, such as the illustrated embodiment of the ACT disconnect 4073 tied through the separate solar utility meter 4074.

In some embodiments, the inverter (e.g., a micro-inverter) can be on-board each of the robots 4000. The on-board inverters can serve as DC chargers. The on-board inverters can also be included in the on-board MPPT (with the inverter at the output). During operation, the robots 4000 can be connected to an AC power cable (e.g., with an integrated charger and inverter), which can be used for charging and/or grid-tie discharging the robot from or to a residential bus, the grid, etc.

It is appreciated that the solar power generation function described above can be used beyond the off-season, including the growing season.

OTHER REMARKS

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the disclosures or claims.

Any ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although the features that have been disclosed in the context of certain preferred embodiments and examples, it will be understood by those skilled in the art that the present disclosure extends beyond the specifically disclosed embodiments to other alternative embodiments and/or uses of the disclosure and obvious modifications and equivalents thereof. For example, inspection robots can be operated in conjunction with or in place of the ground robots to perform similar or additional functions. Additionally, the skilled artisan will recognize that any of the above-described methods can be carried out using any appropriate apparatus (e.g., drones). For example, the inspection robots described herein can comprise aircraft, VTOL aircraft, unmanned aerial vehicles, drones, ground robots, etc. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure herein disclosed should not be limited by the particular disclosed embodiments described above.

What is claimed is:

1. An autonomous ground vehicle comprising:

a ground vehicle unit having two or more wheels or mechanical propulsion mechanisms coupled to the ground vehicle unit;

one or more camera units coupled to the ground vehicle unit, the one or more camera units configured to generate images;

an energy storage unit housed in the ground vehicle unit;

a solar panel unit coupled to the ground vehicle unit, the solar panel unit electrically coupled to the ground vehicle unit, the solar panel unit configured to electrically recharge the energy storage unit;

a solar panel control mechanism configured to change an angle of tilt of the solar panel unit relative to the ground vehicle unit, wherein the angle of tilt of the solar panel unit can be changed as the ground vehicle unit moves to improve solar power generation;

a first mechanical arm coupled to a first undercarriage portion of the ground vehicle unit, the first mechanical arm having a first end effector;

a non-transitory electronic memory storage medium housed in the ground vehicle unit, the non-transitory electronic memory storage medium comprising computer-executable instructions; and one or more processors housed in the ground vehicle unit, the one or more processors in electronic communication with the non-transitory electronic memory storage medium, the one or more processors configured to execute the computer-executable instructions stored in the non-transitory electronic memory storage medium for implementing a method comprising:

analyzing, by the one or more processors, the generated images to identify a plant organism and surrounding soil;

determining, by the one or more processors, that the identified plant organism is set for plant organism control based on a plant species type of the identified plant organism;

generating, by the one or more processors, ground vehicle unit control instructions configured to advance the ground vehicle unit and/or the first mechanical arm to be within a threshold proximity of the identified plant organism;

generating, by the one or more processors, mechanical arm control instructions for mechanical control comprising:

positioning at least the first end effector to be in contact with soil distal to the identified plant organism;

moving the first end effector through the soil to remove at least a portion of the identified plant organism;

executing, by the one or more processors, the generated mechanical arm control instructions; and generating, by the one or more processors, solar panel control instructions for the solar panel control mechanism to change the angle of tilt of the solar panel unit based on a relative position of the sun to the ground vehicle unit.

2. The autonomous ground vehicle of claim 1, wherein the autonomous ground vehicle is configured to combine with a second autonomous ground vehicle by connecting an adaptor between the autonomous ground vehicle and the second autonomous ground vehicle to form a large autonomous ground vehicle.

3. The autonomous ground vehicle of claim 1, wherein the autonomous ground vehicle further comprises a camera cleaning system.

4. The autonomous ground vehicle of claim 1, wherein the autonomous ground vehicle further comprises a camera cleaning system, and wherein the camera cleaning system comprises at least one of: a cooling system; and the solar panel unit, wherein the solar panel unit is further configured to pivot up and down to create an air flow.

5. The autonomous ground vehicle of claim 1, wherein the autonomous ground vehicle further comprises a second mechanical arm coupled to a second undercarriage portion of the ground vehicle unit, the second mechanical arm having a second end effector.

6. The autonomous ground vehicle of claim 1, wherein the solar panel control mechanism comprises one or more linear actuators coupled to the ground vehicle unit at a first end and the solar panel unit at a second end, wherein the one or more linear actuators are configured to adjust the angle of tilt the solar panel unit.

7. The autonomous ground vehicle of claim 1, wherein the solar panel control mechanism comprises a pulley lift system, the pulley lift system comprising:

a motor;

one or more spools coupled to the motor;

one or more spring hinges, wherein the one or more spring hinges are coupled to the ground vehicle unit and the solar panel unit; and one or more cables, wherein each cable of the one or more cables comprises a first cable end and a second cable end, wherein the first cable end is coupled to the solar panel unit and the second cable end is coupled to and spooled around one of the one or more spools.

8. The autonomous ground vehicle of claim 1, wherein the solar panel control mechanism comprises a pulley lift system, the pulley lift system comprising:

a motor;

one or more spools coupled to the motor;

one or more spring hinges, wherein the one or more spring hinges are coupled to the ground vehicle unit and the solar panel unit; and one or more cables, wherein each cable of the one or more cables comprises a first cable end and a second cable end, wherein the first cable end is coupled to the solar panel unit and the second cable end is coupled to and spooled around one of the one or more spools, wherein the one or more spring hinges are configured to bias the solar panel unit to a maximum angle, wherein the pulley lift system is configured to control and adjust the angle of tilt the solar panel unit.

9. The autonomous ground vehicle of claim 1, wherein the autonomous ground vehicle is configured to communicate with one or more third party systems.

10. The autonomous ground vehicle of claim 1, wherein the autonomous ground vehicle is configured to communicate with one or more third party systems, wherein the one or more third party systems comprise at least one of a computer system and a database.

11. The autonomous ground vehicle of claim 1, wherein the solar panel unit comprises one or more machine-readable codes, wherein the one or more machine-readable codes can be used to identify the autonomous ground vehicle.

12. The autonomous ground vehicle of claim 1, wherein the computer-executable instructions, when executed by the one or more processors, further cause implementation of a carbon estimation operation comprising:

generating, by the one or more camera units, a first set of images comprising one or more images of a first layer of soil under the autonomous ground vehicle;

analyzing, by the one or more processors, the first set of images to determine a soil color of the first layer of soil; and determining, by the one or more processors, a soil carbon estimate of the first layer of soil in the first set of images.

13. The autonomous ground vehicle of claim 12, wherein the carbon estimate operation further comprises:

generating, by the one or more processors, additional mechanical arm control instructions comprising:

positioning the first end effector to be in contact with the first layer of soil; and moving the first end effector through the first layer of soil to remove at least a portion of soil, wherein moving at least a portion of the soil exposes a second layer of soil;

executing, by the one or more processors, the additional mechanical arm control instructions;

generating, by the one or more camera units, a second set of images comprising one or more images of the second layer of soil;

analyzing, by the one or more processors, the generated second set of images to determine a soil color of the second layer of soil; and determining, by the one or more processors, a soil carbon estimate of the second layer of soil in the second set of images.

14. The autonomous ground vehicle of claim 12, wherein the autonomous ground vehicle is configured to perform the carbon estimation operations at night.

15. The autonomous ground vehicle of claim 1, wherein the autonomous ground vehicle further comprises one or more lights configured to illuminate at least the soil beneath the ground vehicle unit.

16. The autonomous ground vehicle of claim 1, wherein the autonomous ground vehicle further comprises a second mechanical arm coupled to a second undercarriage portion of the ground vehicle unit, the second mechanical arm having a second end effector, and wherein at least one of the first mechanical arm and the second mechanical arm comprise a color calibration component.

17. The autonomous ground vehicle of claim 1, wherein the autonomous ground vehicle is configured to discharge from the energy storage unit into a residential grid.

18. The autonomous ground vehicle of claim 1, wherein the autonomous ground vehicle is configured to determine a local wind speed, and wherein the autonomous ground vehicle is configured to perform wind protection operations based on the determined local wind speed.

19. The autonomous ground vehicle of claim 1, wherein the autonomous ground vehicle further comprises a second mechanical arm coupled to a second undercarriage portion of the ground vehicle unit, the second mechanical arm having a second end effector, wherein the autonomous ground vehicle is configured to determine a local wind speed, and wherein the autonomous ground vehicle is configured to perform wind protection operations based on the determined local wind speed, wherein wind protection operations comprise at least one of: returning to a base of operations, looking for shelter, orientating the ground vehicle unit to be more aerodynamic, and latching to ground below the ground vehicle unit using the first mechanical arm and second mechanical arm.

20. The autonomous ground vehicle of claim 1, wherein the autonomous ground vehicle further comprises a cooling system, the cooling system comprising:

an air inlet;

an air outlet;

one or more filters; and at least one of a heatsink or a fan, wherein the cooling system is configured to cool a central electronic unit of the autonomous ground vehicle.

* * * * *